(12) United States Patent
Kwak et al.

(10) Patent No.: US 11,323,218 B2
(45) Date of Patent: May 3, 2022

(54) METHOD AND APPARATUS FOR CONFIGURING REFERENCE SIGNAL AND FOR GENERATING CHANNEL INFORMATION IN MOBILE COMMUNICATION SYSTEM

(71) Applicant: Samsung Electronics Co., Ltd., Gyeonggi-do (KR)

(72) Inventors: Youngwoo Kwak, Gyeonggi-do (KR); Hoondong Noh, Gyeonggi-do (KR); Jinyoung Oh, Seoul (KR); Younsun Kim, Gyeonggi-do (KR); Jeongho Yeo, Gyeonggi-do (KR); Seunghoon Choi, Gyeonggi-do (KR); Cheolkyu Shin, Gyeonggi-do (KR)

(73) Assignee: Samsung Electronics Co., Ltd

( * ) Notice: Subject to any disclaimer, the term of this patent is extended or adjusted under 35 U.S.C. 154(b) by 828 days.

(21) Appl. No.: 16/074,371

(22) PCT Filed: Feb. 3, 2017

(86) PCT No.: PCT/KR2017/001198
§ 371 (c)(1),
(2) Date: Jul. 31, 2018

(87) PCT Pub. No.: WO2017/135737
PCT Pub. Date: Aug. 10, 2017

(65) Prior Publication Data
US 2021/0242988 A1    Aug. 5, 2021

Related U.S. Application Data

(60) Provisional application No. 62/290,711, filed on Feb. 3, 2016, provisional application No. 62/336,187, filed
(Continued)

(51) Int. Cl.
*H03D 3/22*     (2006.01)
*H04L 5/00*     (2006.01)
(Continued)

(52) U.S. Cl.
CPC ......... *H04L 5/0048* (2013.01); *H04B 7/0456* (2013.01); *H04B 7/0626* (2013.01)

(58) Field of Classification Search
CPC .... H04L 5/0048; H04B 7/0626; H04B 7/0456
(Continued)

(56) References Cited

U.S. PATENT DOCUMENTS

2002/0191703 A1    12/2002    Ling et al.
2008/0144733 A1    6/2008    ElGamal et al.
(Continued)

FOREIGN PATENT DOCUMENTS

CN    102271027    12/2011
CN    102957467    3/2013
(Continued)

OTHER PUBLICATIONS

PCT/ISA/210 Search Report issued on PCT/KR2017/001198 (pp. 4).
(Continued)

*Primary Examiner* — Helene E Tayong
(74) *Attorney, Agent, or Firm* — The Farrell Law Firm, P.C.

(57) ABSTRACT

The present disclosure relates to a communication technique for combining a 5G communications system that supports higher data transmission rates after 4G systems with IoT technology, and a system therefor. The present disclosure can be applied to intelligent services based on 5G communications technology and IoT related technology (for example, smart homes, smart buildings, smart cities, smart cars or connected cars, healthcare, digital education, retail businesses, security and safety related services, and the like). The method for a terminal according to the present invention is characterized by comprising the steps of: receiving a reference signal; generating channel state information by
(Continued)

means of a circular application of a precoding matrix for each resource element; and transmitting the channel state information to a base station.

15 Claims, 73 Drawing Sheets

Related U.S. Application Data on May 13, 2016, provisional application No. 62/401,587, filed on Sep. 29, 2016, provisional application No. 62/418,456, filed on Nov. 7, 2016.

(51) Int. Cl.
*H04B 7/0456* (2017.01)
*H04B 7/06* (2006.01)

(58) Field of Classification Search
USPC .......................................... 375/329
See application file for complete search history.

(56) References Cited

U.S. PATENT DOCUMENTS

| | | | |
|---|---|---|---|
| 2011/0007685 A1* | 1/2011 | Ma | H04B 7/0632 370/315 |
| 2011/0194540 A1 | 8/2011 | Baligh et al. | |
| 2012/0051257 A1* | 3/2012 | Kim | H04B 7/0617 370/252 |
| 2013/0121276 A1 | 5/2013 | Kim et al. | |
| 2014/0029695 A1 | 1/2014 | Liu et al. | |
| 2014/0037029 A1* | 2/2014 | Murakami | H04L 25/03949 375/340 |
| 2015/0124732 A1 | 5/2015 | Seo et al. | |
| 2016/0072572 A1 | 3/2016 | Kang et al. | |
| 2016/0344458 A1 | 11/2016 | Zhao et al. | |

FOREIGN PATENT DOCUMENTS

| | | |
|---|---|---|
| CN | 104811229 | 7/2015 |
| EP | 1786118 | 5/2007 |
| WO | WO 2008/024462 | 2/2008 |
| WO | WO 2015/016489 | 2/2015 |

OTHER PUBLICATIONS

PCT/ISA/237 Written Opinion issued on PCT/KR2017/001198 (pp. 7).
Samsung, "Reduced Feedback Scheme for Rel. 13 FD-MIMO", R1-153388, 3GPP TSG RAN WG1 Meeting #81, May 25-29, 2015, 5 pages.
European Search Report dated Dec. 14, 2018 issued in counterpart application No. 17747782.5-1220, 9 pages.
Chinese Office Action dated Feb. 20, 2021 issued in counterpart application No. 201780020705.1, 29 pages.

* cited by examiner

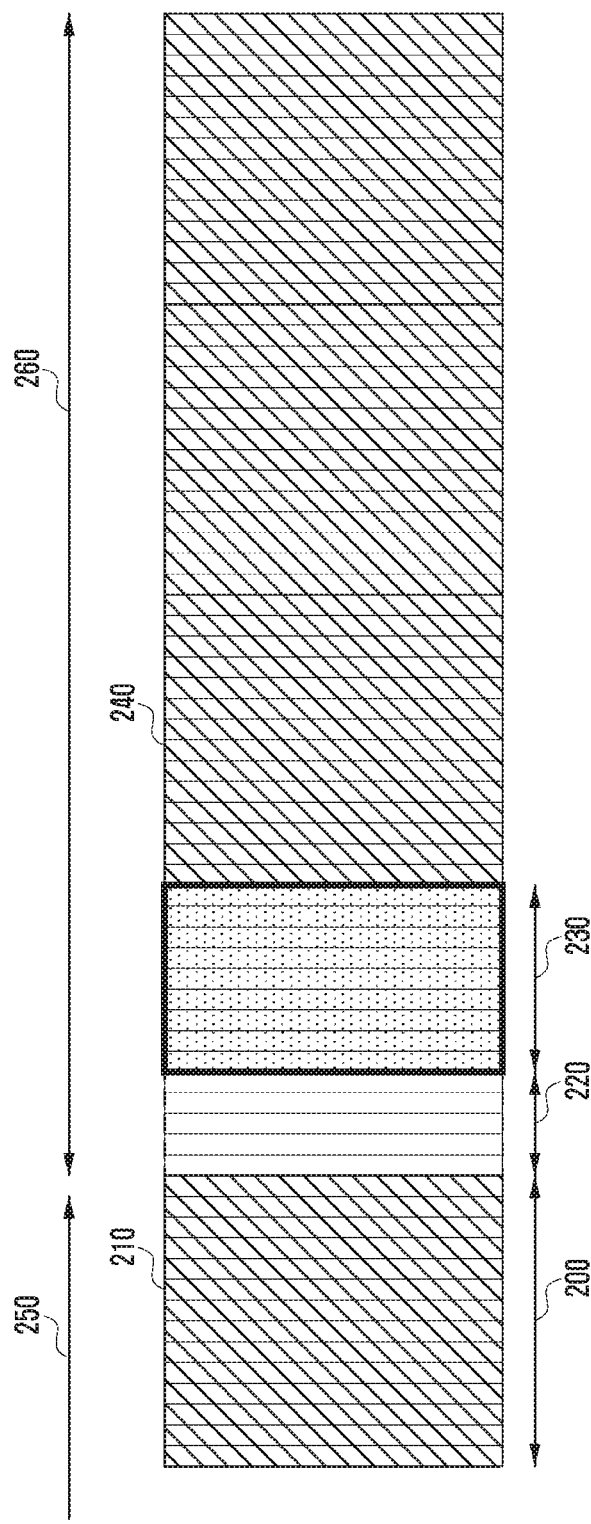

Precoder cycling pattern A

|   | 0 | 1 | 2 | 3 |
|---|---|---|---|---|
| 0 | 1 | 2 | 3 | 4 |
| 1 | 5 | 6 | 7 | 8 |
| 2 | 9 | 10 | 11 | 12 |
| 3 | 13 | 14 | 15 | 16 |

BEAM INDEX IN FIRST DOMAIN (rows) / BEAM INDEX IN SECOND DOMAIN (columns)

Precoder cycling pattern B

|   | 0 | 1 | 2 | 3 |
|---|---|---|---|---|
| 0 | 9 | 10 | 11 | 12 |
| 1 | 13 | 14 | 15 | 16 |
| 2 | 1 | 2 | 3 | 4 |
| 3 | 5 | 6 | 7 | 8 |

BEAM INDEX IN FIRST DOMAIN (rows) / BEAM INDEX IN SECOND DOMAIN (columns)

FIG. 45

METHOD AND APPARATUS FOR CONFIGURING REFERENCE SIGNAL AND FOR GENERATING CHANNEL INFORMATION IN MOBILE COMMUNICATION SYSTEM

PRIORITY

This application is a National Phase Entry of PCT International Application No. PCT/KR2017/001198 which was filed on Feb. 3, 2017, and claims priority to U.S. Provisional Patent Application Nos. 62/290,711, 62/336,187, 62/401,587, and 62/418,456, which were filed on Feb. 3, 2016, May 13, 2016, Sep. 29, 2016, and Nov. 7, 2016, respectively, the content of each of which is incorporated herein by reference.

TECHNICAL FIELD

The present disclosure relates to a mobile communication system, and more particularly, to a method and an apparatus for configuring a reference signal and generating channel information.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, in a 5G communication system, a wider bandwidth is used as compared with the existing communication system, and as a result, the amount of information for uplink resource allocation increases. Therefore, a new method for uplink resource allocation is actually needed.

Further, in the case of using semi closed-loop MIMO, precoder circulation can be considered, and performance can be further improved when precoding is performed for each RE than when the precoding is performed for each RB. However, in a DMRS of current LTE, REs belonging to one RB cannot be decoded through different precoded channels according to RE locations and to this end, a new method is required.

In addition, although the performance is enhanced when cycling a larger number of precoding, the DMRS in a current system supports up to 8 DMRSs in one RB, which means that up to 8 precoded channels can be used in one RB. Therefore, a method for using 8 or more precoding should be defined. Further, signaling for supporting a plurality of layers and terminals based on the method is required.

In addition, in codebooks up to release 13, a beam group is not designed considering a channel status of a high-mobility terminal. In addition, in the case of newly introduced codebooks in the release 13, it is possible to configure the shape of the beam group differently based on the Codebook-Config, but it is difficult to adaptively adapt to a change in channel due to an operation based on higher layer signaling and a method for solving the difficulty is actually required.

Further, CSI-RS overhead is increased as the number of antennas supported by a base station in a mobile communication system and the need for CSI-RS support for each UE according to support of UE specific beamformed CSI-RS technology increase. As a result, a method is actually required in which the base station allocates and supports an aperiodic CSI-RS to a UE according to needs of the base station and the UE for efficient system and CSI-RS operation unlike the existing periodic CSI-RS and the UE reports channel state information based on the aperiodic CSI-RS.

In addition, in FDI-MIMO, CSI-RS overhead can be reduced as compared with existing non-precoded CSI-RS (hereinafter, referred to as non-precoded CSI-RS) by using beamformed CSI-RS (hereinafter, referred to as beamformed CSI-RS). However, when the number of cell specific beams supported by a cell-specific beamformed CSI-RS increases, the overhead may increase. In order to minimize the increase of the overhead, a measurement restricting method that restricts a time resource of the CSI-RS measured by the terminal can be applied. However, in the case of a CSI report transmitted using PUCCH, RI, W1, W2, and CQI cannot be transmitted at one time due to characteristics of the PUCCH, and in this case, when RI/W1 and W2/CQI are combined with measurement restriction the time resource is thus changed, reliability of the reported RI/W1 may be problematic.

DISCLOSURE OF INVENTION

Technical Problem

The present disclosure is proposed to solve the problem and an object of the present disclosure is to provide a method and an apparatus for allocating uplink resource.

Further, an object of the present disclosure is to provide a method for cycling precoding for each RE by using a DMRS and a method for transmitting a PDSCH by using 8 or more precoded channels. In addition, in order to support data transmission through a plurality of layers and terminals, proposed are precoder circulation hypothesis and DMRS port matching for each RE for channel status reporting. Further, in order to support cycling of 9 or more precoders for PDSCH decoding, a method that combines two or four RBs and transmits the DMRSs and maps the DMRSs for each RE and an offset configuration for supporting multi-layer and MU-MIMO in closed loop MIMO are proposed.

In addition, an object of the present disclosure is to provide a method and an apparatus for measuring a reference signal, generating channel state information, and transmitting the channel state information by the terminal for semi closed-loop transmission in an FD-MIMO system. Specifically, the channel state information generated and reported by the terminal may include additional information for improving performance efficiency and stability of the existing semi closed-loop transmission. Further, an object of the present disclosure is to provide a method and an apparatus for transmitting a reference signal to the terminal and receiving the channel state information transmitted by the terminal.

In addition, an object of the present disclosure is to provide a method of configuration and allocation for aperiodic CSI-RS transmission in order for a base station to allocate an aperiodic CSI-RS to the terminal. Further, an object of the present disclosure is to provide a method that allows the terminal to effectively report the channel status even with respect to a periodic channel status report in which a measurement restriction is configured.

Solution to Problem

In order to achieve the above objects, a method by a terminal according to an embodiment of the present disclosure includes: receiving a reference signal; generating channel state information by cyclically applying a precoding matrix for each resource element; and transmitting the channel state information to a base station.

Further, in order to achieve the above objects, a method by a base station according to another embodiment of the present disclosure includes: transmitting a reference signal to a terminal; and receiving channel state information generated by cyclically applying a precoding matrix for each resource element from the terminal.

In addition, in order to achieve the above objects, a terminal according to yet another embodiment of the present disclosure includes: a transceiver transmitting/receiving a signal; and a controller configured to receive a reference signal, generate channel state information by cyclically applying a precoding matrix for each resource element, and transmit the channel state information to a base station.

Moreover, in order to achieve the above objects, a base station according to still yet another embodiment of the present disclosure includes: a transceiver transmitting/receiving a signal; and a controller configured to transmit a reference signal to a terminal and receive channel state information generated by cyclically applying a precoding matrix for each resource element from the terminal.

Advantageous Effects of Invention

According to the embodiment of the present disclosure, a base station can efficiently allocate uplink resources to a terminal.

Further, according to the embodiment of the present disclosure, a precoder circulation can be applied in one RE based on a DMRS for semi-loop MIMO transmission. In this case, a plurality of RBs can be grouped and transmitted to support 9 or more precoders. In addition, transmission through a plurality of layers and terminals is available through an offset.

Further, according to the embodiment of the present disclosure, performance efficiency and stability of a semi closed-loop transmission technique can be improved at the base station and the terminal including a plurality of antennas. The base station can determine a precoder cycling pattern of the semi closed-loop transmission or perform multi-user (MU) scheduling by referring additionally reported channel state information.

Further, according to the embodiment of the present disclosure, a precoder circulation can be applied in one RE based on a DMRS for semi-loop MIMO transmission. In this case, a plurality of RBs can be grouped and transmitted to support 8 or more precoders. In addition, transmission through a plurality of layers and terminals is available through an offset.

Further, according to the embodiment of the present disclosure, the terminal can effectively report the channel status even with respect to a periodic channel status report in which measurement restriction is configured.

BRIEF DESCRIPTION OF DRAWINGS

FIG. 2 is a diagram illustrating a method in which a base station transmits data or a control signal to a terminal.

FIG. 17 is a diagram illustrating a method for cycling precoding for each RE.

FIG. 22 is a diagram illustrating a method for mapping the DMRS and the PDSCH RE when the number of cycling precoders is 9 or more using DMRS port mapping method 3.

FIG. 23 is a diagram illustrating a method for dividing a DMRS port into four RB units and transmitting the DMRS port unlike the existing DMRS port structure.

FIG. 33 is a diagram illustrating an example of two precoder cycling patterns applied in one precoder cycling unit.

FIG. 45 is a diagram illustrating downlink resource allocation type 2.

MODE FOR THE INVENTION

Figure 1A:
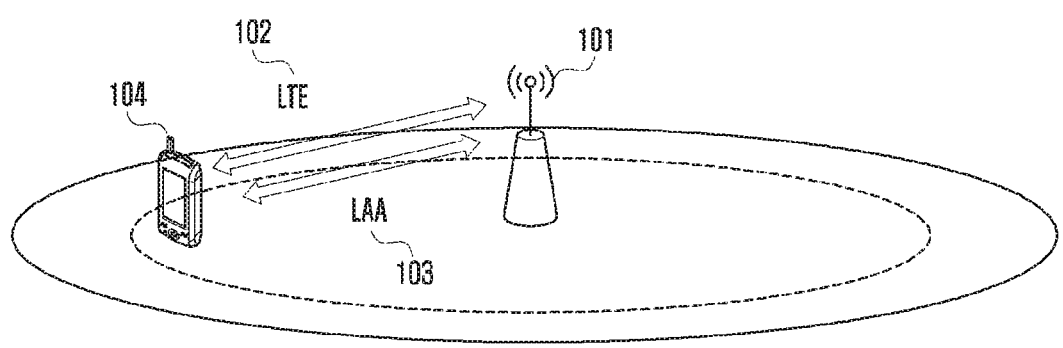
FIGS. 1A and 1B are diagrams illustrating a communication system to which the present disclosure is applied.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transfer a gist of the present disclosure by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flow charts. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate some of modules, segments, or codes including one or more executable instructions for executing a specific logical function (s) Further, it is to be noted that functions mentioned in the blocks occur regardless of a sequence in some alternative embodiments. For example, two blocks that are consecutively illustrated may be simultaneously performed in fact or be performed in a reverse sequence depending on corresponding functions sometimes.

Here, the term '-unit' used in the present embodiment means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

Further, in the drawings illustrating a method in embodiments, the order of description does not necessarily correspond to the order of execution, and the order relationship may be changed or executed in parallel.

In addition, the present invention describes, by way of example, a case of a wireless communication system for convenience of explanation, but the content of the present invention may also be applied to a wired communication system Embodiment 1

In recent years, a mobile communication system has developed into a high-speed and high-quality wireless packet data communication system for providing data service and multimedia service apart from providing initial voice-oriented services. Various mobile communication standards such as 3rd Generation Partnership Project (3GPP), high speed downlink packet access (HSDPA), high speed uplink packet access (HSUPA), long term evolution (LTE), long term evolution advanced (LTE-A), high rate packet data (HRPD) of 3GPP2, and 802.16 of the Institute of Electrical and Electronics Engineers (IEEE) have been developed to support high-speed, high-quality wireless packet data transmission services.

In particular, standards of LTE/LTE-A (hereinafter, referred to as LTE) continues to develop and evolve to enhance a system capacity and frequency efficiency. Typically, the LTE system can greatly increase data transmission rate and the system capacity by using carrier aggregation (CA) capable of operating a system using a plurality of frequency bands.

Meanwhile, the frequency band in which the LTE system is currently operated is generally a licensed spectrum (licensed carrier) in which a licensee can use his/her own authority. However, since a frequency band (for example, a frequency band of 5 GHz or less) that provides a mobile communication service is already occupied by another carrier or another communication system, it is difficult for the carrier to secure a plurality of license band frequencies and it is difficult to expand the system capacity using the CA technology. Therefore, in order to process mobile data, which is explosively increasing in an environment where the license band frequency is difficult to secure, recently, a technique for utilizing an LTE system in an unlicensed spectrum or unlicensed carrier has been studied (for example, LTE-U LTE in unlicensed and LAA Licensed-Assisted Access).

In particular, a relatively smaller number of communication devices in a 5 GHz band are used than a 2.4 GHz unlicensed band in the unlicensed band and a very large bandwidth may be used, it is relatively easy to secure an additional frequency band. Therefore, licensed band and unlicensed band frequencies may be utilized by using LTE technology that integrates and uses multiple frequency bands, that is, the CA technology. That is, an LTE cell in the licensed band is configured as a primary carrier (primary cell PCell or Pcell) and an LTE cell (LAA cell or LTE-U cell) in the unlicensed band is configured as a secondary subcarrier (secondary cell SCell or Scell) to operate the LTE system in the licensed band and the unlicensed band by using the existing CA technology.

In this case, the system may be applied to CA in which the licensed band and the unlicensed band are connected by ideal backhaul and a dual connectivity (hereinafter, referred to as dual connectivity) environment in which the licensed band the unlicensed band are connected by non-ideal backhaul.

In general, the LTE/LTE-A system is a scheme that transmits data using an orthogonal frequency division multiple access (OFDMA) transmission scheme. In an OFDM scheme, a modulated signal is positioned in a two-dimensional resource constituted by a time and a frequency. Resources on a time axis are distinguished by different OFDM symbols and the resources are orthogonal to each other. The resources on a frequency axis are distinguished by different subcarriers and the resources are also orthogonal to each other. That is, in the OFDM scheme, when a specific OFDM symbol is designated on the time axis and a specific subcarrier is designated on the frequency axis, one minimum unit resource may be indicated and is referred to as a resource element (hereinafter, referred to as RE).

Different REs have a characteristic that the different REs are orthogonal to each other even though the REs pass through a frequency selective channel, so that signals transmitted to different REs may be received by a receiving side without mutual interference. In the OFDM communication system, a downlink bandwidth is constituted by multiple resource blocks (hereinafter, referred to as RB) and each physical resource block (hereinafter, referred to as PRB) may be constituted by 12 subcarriers arranged on the frequency axis and 14 or 12 OFDM symbols arranged on the time axis. Herein, the PRB is a basic unit of resource allocation.

A reference signal (hereinafter, referred to as RS) as a signal received from the base station, which enables the terminal to perform channel estimation is constituted by a common reference signal (hereinafter, referred to as CRS) and one demodulation reference signal (hereinafter, referred to as DMRS) in the LTE communication system.

The CRS as a reference signal transmitted over an entire downlink band may be received by all terminals and is used for channel estimation, feedback information configuration of the terminal, or demodulation of control channels and data channels. The DMRS which is also the reference signal transmitted over the entire downlink band is used for the data channel demodulation and the channel estimation of a specific terminal and is not used for the feedback information configuration unlike the CRS. Therefore, the DMRS is transmitted through the PRB resource to be scheduled by the terminal.

A subframe on the time axis is constituted by two slots having a length of 0.5 msec length, i.e., a first slot and a second slot. A physical dedicated control channel (PDCCH) area which is a control channel area and an enhanced PDCCH (ePDCCH) area which is a data channel area are split and transmitted on the time axis. This is to quickly receive and demodulate control channel signals. In addition, the PDCCH area is positioned over the entire downlink band, and one control channel is split into small-unit control channels, which are dispersed and positioned in the entire downlink band. An uplink is generally divided into the control channel (PUCCH) and the data channel (PUSCH) and a response channel and other feedback information for a downlink data channel are transmitted through the control channel when there is no data channel and transmitted to the data channel when there is the data channel.

Figure 1B:
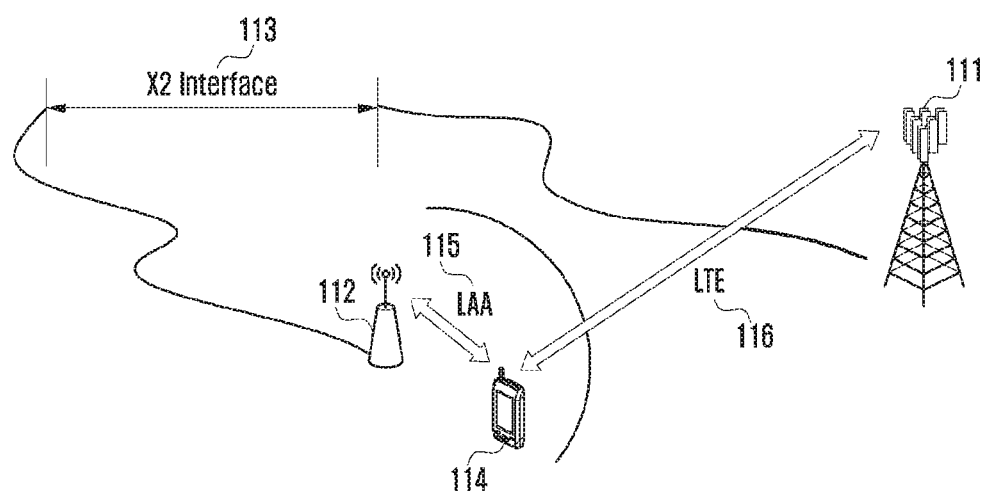

FIGS. 1A and 1B are diagrams illustrating a communication system to which the present disclosure is applied.

Referring to FIGS. 1A and 1B, FIG. 1A illustrates a case where LTE cell 102 and LAA cell 103 coexist in one small base station 101 in a network and a terminal 104 transmits and receives data to and from the base station through the LTE cell 102 and the LAA cell 103. There is no restriction on a duplex scheme of the LTE cell 102 or the LAA cell 103 and a cell performing a data transmission and reception operation using the licensed band may be assumed as the LTE cell 102 or PCell and a cell performing the data transmitting and receiving operation by using the unlicensed band may be assumed as the LAA cell 103 or SCell. However, uplink transmission may restrict the data to be transmitted only through the LTE cell 102 when the LTE cell is the PCell.

FIG. 1B illustrates that an LTE macro base station 111 for wide coverage and an LAA small base station 112 for increasing a data transmission amount are installed in a network and in this case, there is no restriction on a duplex scheme of an LTE macro base station 111 or an LAA small base station. In this case, the LTE macro base station 111 may be replaced with the LTE small base station. Further, the uplink transmission may be configured to transmit the data only through the LTE base station 111 when the LTE base station is the PCell. In this case, it is assumed that the LTE base station 111 and the LAA base station 112 have ideal backhaul networks. Therefore, rapid inter-base station X2 communication 113 is enabled, and as a result, even though the uplink transmission is transmitted only to the LTE base station 111, the LAA base station 112 may receive related control information from the LTE base station 111 through the X2 communication 113 in real time. The schemes suggested by the present disclosure are applicable to both the system of FIG. 1A and the system of FIG. 1B.

Further, the schemes proposed by the present disclosure may also be applied to a communication system that does not use the unlicensed band.

Generally, in the unlicensed band, the same frequency band or channel is shared and used by a plurality of devices. In this case, the devices using the unlicensed band may be different systems. Therefore, general operations of the devices operated in the unlicensed band for mutual coexistence among various devices are as follows.

A transmission device requiring signal transmission including data or a control signal may check whether other devices occupy a channel with respect to the unlicensed band or channel in which the signal transmission is performed before performing the signal transmission and may occupy or not occupy the channel according to the determined channel occupancy state of the channel. Such an operation is generally referred to as listen-before-talk (LBT). In other words, the transmission device may determine whether the channel may be occupied according to a predefined or configured method.

In this case, a method for detecting the channel may be defined or configured in advance. Further, a time of detecting the channel may be defined or configured in advance and may also be selected to a predetermined value within a specific range. In addition, the channel detection time may be set in proportion to a set maximum channel occupancy time. In this case, the channel detecting operation for determining whether the channel is occupied may be configured differently according to an unlicensed frequency band in which the operation is performed or according to regional or country-specific regulations. For example, in the United States, the unlicensed band may be used without a separate channel detecting operation other than an operation for radar detection in a 5 GHz frequency band.

A transmission device that desires to use the unlicensed band detects whether other devices uses the corresponding channel through the channel detecting operation (or LBT) and when the channel occupancy of other devices is not detected in the channel, the transmission device may occupy and use the channel. In this case, the devices using the unlicensed band may operate by defining or setting the maximum channel occupancy time for which the devices may continuously occupy the channel after the channel detecting operation. In this case, the maximum occupancy time may be defined in advance according to the regulations defined according to the frequency band and the area or may be separately set from the base station in the case of another device, for example, the terminal. In this case, the channel occupancy time may be set differently according to the unlicensed band or the regional or country-specific regulations. For example, in Japan, the maximum occupancy time in the unlicensed band of the 5 GHz band is regulated to 4 ms. On the contrary, in Europe, the channel may be occupied continuously up to 10 ms or 13 ms. In this case, the devices occupying the channel for the maximum occupancy time may re-occupy the channel according to the channel detection result after re-performing the channel detecting operation.

The channel detecting and occupancy operations in the unlicensed band will be described below with reference to FIG. 2.

FIG. 2 is a diagram illustrating a method in which a base station transmits data or a control signal to a terminal.

FIG. 2 is a diagram illustrating a downlink transmission process in which THE base station transmits the data or control signal to the terminal as an example and is also applicable to the uplink transmission in which the terminal transmits the signal to the base station.

An LTE subframe 200 of FIG. 2 may have a length of 1 ms and may be constituted by a plurality of OFDM symbols. In this case, the base station and the terminal capable of communication using the unlicensed band may communicate with each other by occupying the corresponding channel for the set channel occupancy time (or TXOP) (250 and 260). When the base station occupying the channel for the set channel occupancy time 250 requires additional channel occupancy, the base station may perform a channel detecting operation 220 and then, occupy and use or not use the channel again according to a result of the channel detecting operation. In this case, a required channel detection interval (or length) may be defined in advance between the base station and the terminal, may be set to the terminal through a higher layer signal (for example, a radio resource control (RRC)) by the base station, or may be set differently according to a transmission/reception result of the data transmitted through the unlicensed band.

In addition, at least one of variables applied to the channel detecting operation re-performed as described above may be set differently from the previous channel detecting operation.

In this case, the channel detecting and occupancy operations may be configured differently according to the frequency band or the regional or country-specific regulations. The channel detecting and occupancy operations will be described below in detail by using a load-based equipment which is one scheme of channel connection methods in EN301 893 which is a regulation for the 5 GHz band in Europe as an example.

After the maximum channel occupancy time 250, the base station needs to determine whether the channel is occupied by other devices during the minimum channel detection interval 220 if additional channel use is required. In this case, the minimum channel detection interval 220 may be determined as follows according to the maximum channel occupancy interval.

Maximum channel occupancy interval: $13/32 \times q$, ($q=4, \ldots, 32$)

Minimum channel detection interval: ECCA slot length × rand(1, q)

Herein, the ECCA slot length is a minimum unit (or length) of the channel detection interval defined or configured in advance. That is, when $q=32$, the transmission device may occupy the unlicensed band for a maximum of 13 ms. In this case, the minimum required channel detection interval is randomly selected from 1 to q (i.e., between 1 and 32) and a total channel detection interval is the ECCA slot length × the arbitrary value selected above. Therefore, when the maximum occupancy interval of the channel increases, the minimum channel detection interval period also generally increases. The maximum channel occupancy interval and the minimum channel detection interval setting method are only examples and may be applied differently according to the frequency band, and regional and country-specific regulations and may be changed according to frequency regulation revision in the future. In addition, the maximum channel occupancy interval and the minimum channel detection interval setting method may be configured to include an additional operation (for example, introduction of an additional channel detection interval) in addition to the channel detecting operation in accordance with the frequency regulation.

When it is determined that the other devices using the corresponding unlicensed band are not detected in the channel detection interval 220, that is, when it is determined that the channel is in an idle state, the base station may immediately occupy and use the channel.

In this case, the determination as to whether another device occupies the channel during the channel detection interval 220 may be made by using a reference value defined or set in advance. For example, when the magnitude of a received signal received from other devices during the channel detection interval is larger greater than a predetermined reference value (for example, −62 dBm), it may be determined that the channel is occupied by other devices. When the magnitude of the received signal is smaller than the reference value, it may be determined that the channel is in the idle state. In this case, the method for determining the channel occupancy may include various methods including predefined signal detection including the magnitude of the received signal, and the like.

Since a general LTE operation is performed by the unit of the subframe, the signal may not be transmitted or received in a specific OFDM symbol immediately after the channel detecting operation is performed (for example, signal transmitting and receiving operations are performed from a first OFDM symbol of the subframe). Accordingly, the base station, which detects an idle channel during the channel detection interval 220 of the subframe as described above may transmit a specific signal 230 for the channel occupancy from the time when the channel detection interval 220 ends until the time just before transmission of the first OFDM symbol of a next subframe, that is during the interval 230. In other words, before transmitting a first signal (e.g., general (E)PDCCH and PDSCH) transmitted from the subframe 210 or 240, the base station may transmit a second signal (e.g., PSS/SSS/CRS or a newly defined signal, etc.) for the channel occupancy of the corresponding unlicensed band and synchronization of the terminal. In this case, the transmitted second signal may not be transmitted according to an end point of the channel detection interval. Further, when a start time of the corresponding channel occupancy is set within a specific OFDM symbol, a third signal (newly defined signal) may be transmitted up to the start time of the next OFDM symbol and then the second signal or the first signal may be transmitted. In the present disclosure, for easy description, the channel detecting operation interval will be described by using an OFDM symbol unit, but the channel detecting operation interval may be configured independently of the OFDM symbol of the LTE system.

Herein, as the second signal, a synchronization (for example, PSS/SSS) used in the current LTE system may be reused or the second signal may be generated by using at least one of the PSS and the SSS by using a sequence different from a root sequence used in the current licensed band. Further, the second signal is generated by using sequences other than a PSS/SSS sequence required for generating an unlicensed band base station unique value (physical cell ID (PCID) to be used not to be confused with a base station unique value. In addition, the second signal may include at least one of a CRS or CSI-RS used in the current LTE system or the (E)PDCCH or PDSCH or a signal which is a modified form of the signal may be used as the second signal.

In this case, since the interval 230 of transmitting the second signal is included in the channel occupancy time, minimum information may be transmitted through the second signal transmitted in the interval 230, thereby maximizing frequency efficiency.

As described above, the LTE system (hereinafter referred to as an LAA or LAA cell) using the unlicensed band requires a new type of channel access (or LBT) scheme different from a scheme using the existing licensed band for mutual coexistence with another system (hereinafter, referred to as WiFi) using the unlicensed band as well as satisfaction of the regulation for the unlicensed band to be used. The channel access scheme for using the unlicensed band in the WiFi system will be described below in brief with reference to FIG. 3.

Figure 3:
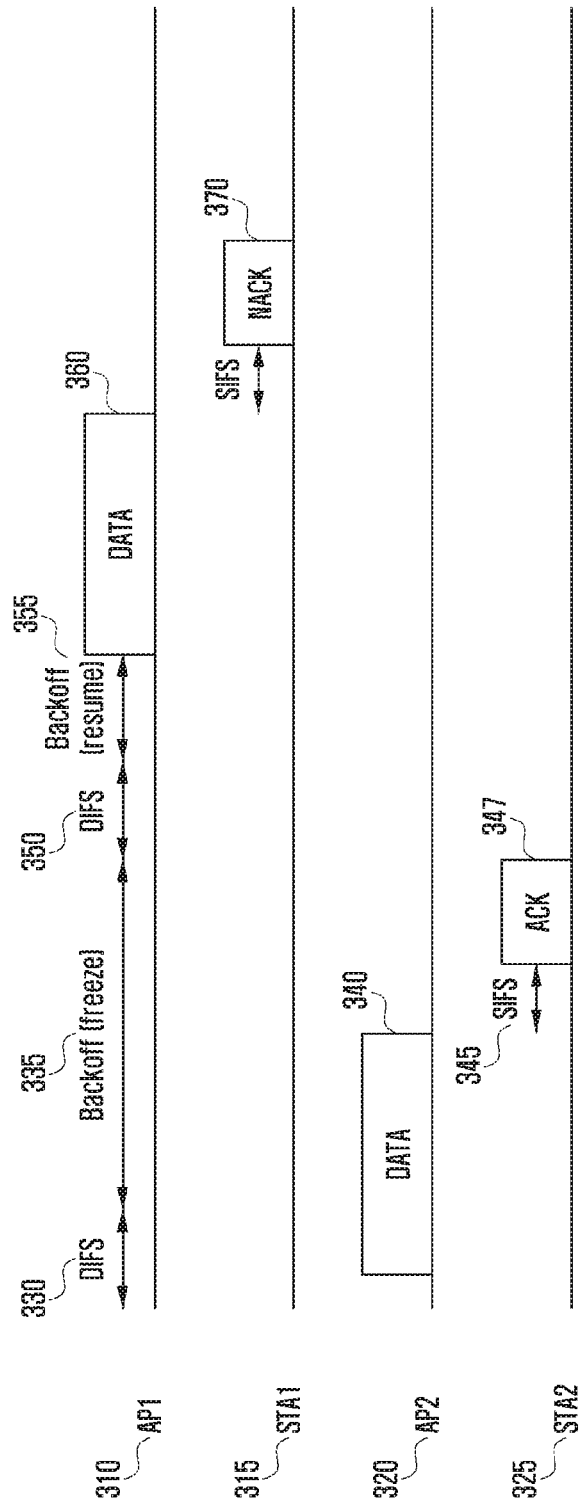
FIG. 3 is a diagram illustrating a channel access scheme for using an unlicensed band of a WiFi system.

FIG. 3 is a diagram illustrating a channel access scheme for using an unlicensed band of a WiFi system.

Referring to FIG. 3, when there is data to be transmitted from a WiFi AP1 310 to Station 1 (STA1) or terminal 1 315, the channel detecting operation for the corresponding channel needs to be performed for channel occupancy. In this case, the AP1 330 may detect the channel for a DCF interframe space (DIFS) time 330. Whether another device is occupied by the channel may be determined in various methods including a strength of the signal received for the time or detection of a predefined signal, and the like. When it is determined that the channel is occupied by another device 320 for the channel detection time 330, the AP1 310 selects a predetermined variable 355, e.g., N in a configured contention window (e.g., 1 to 16). Such an operation may be generally referred to as a backoff operation. The AP1 310 may then detect the channel for a predefined time (e.g., 9 us) and subtract the selected variable N 355 by 1 when it is determined that the channel is in the idle state. That is, the AP1 310 may update the N to N=N−1.

When it is determined that the channel is occupied by another device for the time, the variable N 355 is maintained without being subtracted. Further, an STA2 325 that receives data transmitted from an AP2 320 as described above 340 transmits an ACK or NACK 347 for reception of the data 340 after an SIFS time 345 elapsed. In this case, the STA2 325 may transmit the ACK/NACK 347 without performing a separate channel detecting operation.

After the ACK 347 transmission of the STA2 325 is completed, the AP1 310 may know that the channel is in the idle state. In this case, when the AP1 310 determines that the channel is idle for the DIFS 350, the AP1 310 detects the channel for a predetermined time (for example, 9 us) defined or set in advance for the backoff operation and subtracts the variable N 355 selected when it is determined that the channel is in the idle state again. That is, the N is updated to N=N−1. In this case, if N=0, the AP1 310 may transmit data 360 to the STA1 315 by occupying the channel.

Thereafter, the terminal that receives the data 360 may transfer the ACK or NACK for the reception of the data to the API1 310 after the SIFS time elapsed. In this case, the AP1 310 that receives the NACK from the STA1 315 may select a predetermined variable N used in a next backoff operation within a contention window. For example, it is assumed that the contention window used is [1,16] and when a reception result of the data of the STA1 315 is NACK, the contention window of the AP1 310 receiving the NACK may increase to [1,32]. When the AP1 310 receives the ACK, the AP1 310 may set the contention window to an initial value (e.g., [1,16]) or decrease or maintain a preconfigured contention window.

However, for example, in the case of the WiFi system, communication is performed between one AP (or base station) and one STA (or terminal) at the same time.

Further, as shown by reference numerals 347 and 370 in FIG. 3, the STA (or the terminal) transmits a data reception state (for example, ACK or NACK) thereof to the AP (or the base station) immediately after receiving the data. In this case, the AP 310 or 320 receives the ACK or NACK from the terminal 315 or 325 and thereafter, performs the channel detecting operation for a next data transmission operation.

However, in the case of the LAA system, data transmission may be performed from one base station to a plurality of terminals at the same time. Further, one or more terminals receiving the data at the same time (e.g., time n) may transmit the ACK or NACK to the base station at the same time (e.g., n+4 in FDD).

Therefore, the LAA base station may receive the ACK or NACK from one or more terminals at the same time unlike the WiFi system. Further, a difference between an ACK/NACK transmission time of the terminal and the data transmission time of the base station may be at least 4 ms or more. Therefore, when the LAA base station configures (or reconfigures) the contention window by the ACK/NACK received from the terminal like the WiFi, the base station may receive the ACK/NACK from a plurality of terminals at a specific time, and as a result, ambiguity may occur in configuring the contention window. In addition, when the terminal performs an uplink channel detecting operation for the uplink transmission, each terminal may independently perform the channel detecting operation.

When the terminal independently performs the channel detecting operation as described above, only the terminal for which the channel detecting operation is first terminated may perform the configured uplink transmission. Accordingly, the present disclosure proposes a method that configures the channel detection interval based on a reception result of an uplink signal which the base station receives from the terminal and configures the configured channel detection interval in the terminals to allow a plurality of terminals to perform the channel detecting operation at the same time. Therefore, according to the present disclosure, it is possible to more efficiently perform the channel occupancy operation for using the unlicensed band and to enhance coexistence performance among the devices using the unlicensed band by clearly establishing a criterion for the channel occupancy operation.

Hereinafter, a long term evolution (LTE) system and an LTE-Advanced (LTE-A) system are exemplified in the present specification, but the present disclosure may be applied to other communication systems using a license band and an unlicensed band.

Figure 4:
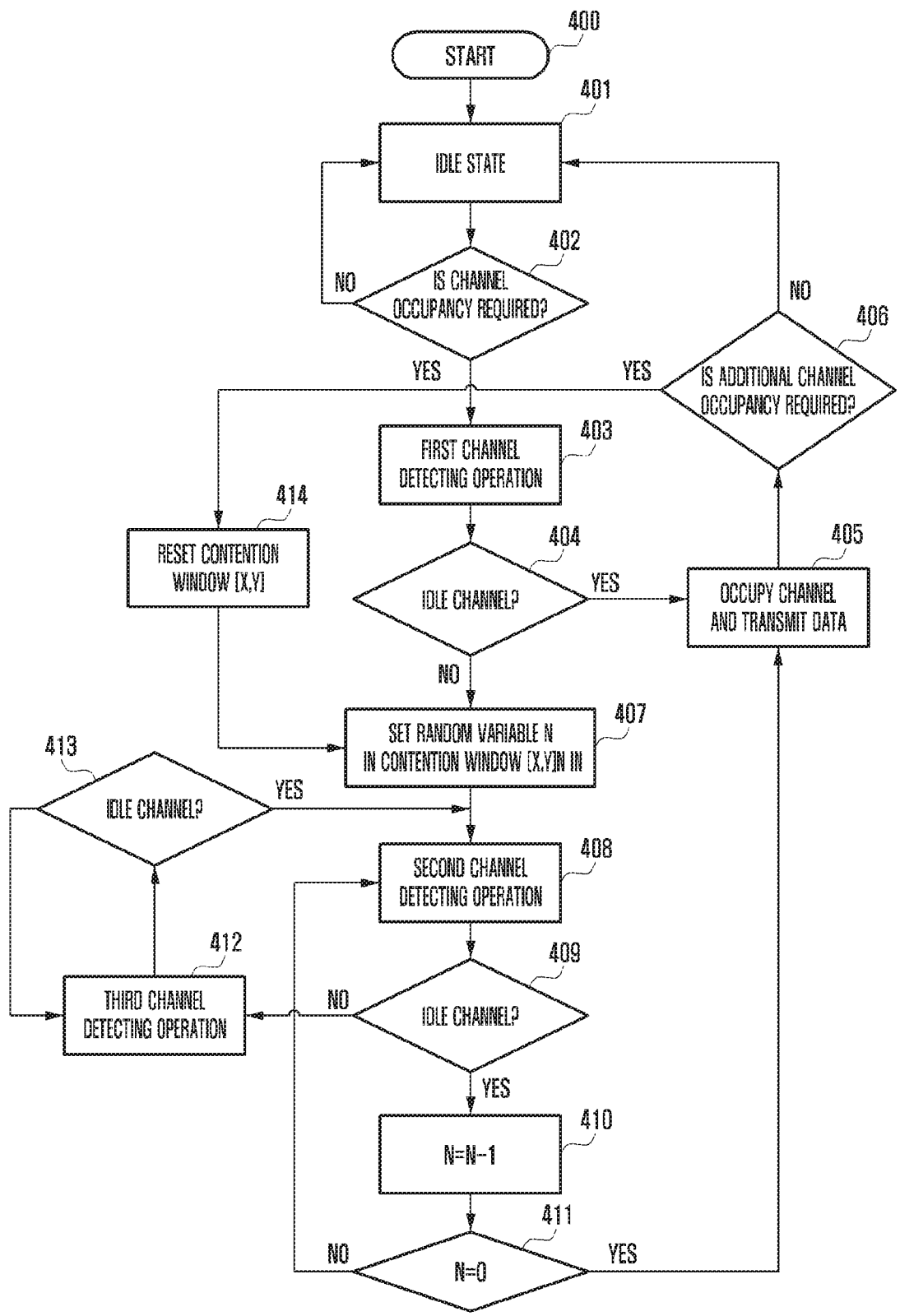
FIG. 4 is a diagram illustrating a channel occupancy scheme for using the unlicensed band in an LAA system.

FIG. 4 is a diagram illustrating a channel occupancy scheme for using the unlicensed band in an LAA system.

The LAA cell (or LAA SCell, LAA Cell, or LAA base station) that does not need to transmit data maintains the idle state in step 401. In this case, the idle state may mean a state in which the LAA cell does not transfer a data signal to the unlicensed band.

For example, the idle state 401 may mean a state in which there is no data signal to be transferred to the terminal in an active LAA cell or a state in which there is data to be transferred to the terminal, but no data is transferred to the terminal.

In addition, in step 402, the LAA cell may check whether the channel occupancy is required for data or control signal transmission.

When the LAA cell needs the channel occupancy for transmitting the data or control signal to the terminal, the LAA cell may perform a first channel detecting operation in step 403.

In this case, the first channel detecting operation is configured differently according to at least one of a predetermined time (for example, 34 us) or a time set from another device or a type of data or control signal to be transmitted by the LAA cell.

For example, an execution time of the first channel detecting operation when the control signal is transmitted without the data to be transmitted to the specific terminal in the LAA cell may be set different from the execution time of the first channel detecting operation in the case of transmitting the data to the specific terminal in the LAA cell (for example, in the case of transmitting only the control signal, performing the first channel detecting operation for a shorter time than in the case of transmitting the data signal). In this case, settable values for the first channel detecting operation may be defined in advance. Herein, in regard to at least one of other variables (for example, a received signal strength threshold value for determining whether the channel is detected) as well as the execution time of the first channel detecting operation, the first channel detecting operation when the data is transmitted to the specific terminal in the LAA cell may be configured differently from the first channel detecting operation when the data is transmitted to the specific terminal in the LAA cell. In this case, the LAA cell may set the contention window used in a second channel detecting operation as an initial value. In this case, the first channel detecting operation is an operation for determining the occupancy state of the corresponding channel by other devices by using various methods including measurement of the strength of the received and detection of the signal defined in advance for the time set for the first channel detecting operation. In this case, variables required for the first channel detecting operation including a first channel detection time may adopt a value set in advance or may be set from other devices.

When it is determined in step 404 that the channel is in the idle state, the LAA cell may transmit the signal by occupying the channel in step 405.

When it is determined in step 404 that the channel is occupied by other devices, the random variable N may be selected in the contention window [x, y] set in step 407. In this case, an initial contention period may be set in advance or may be (re)set from the base station. Further, the set contention window may be set by using various values including the number of attempts to occupy the channel, an occupancy rate (e.g., traffic load) of the channel, or a reception result (e.g., ACK/NACK) of the terminal with respect to the data signal transmitted when occupying the channel.

For example, when it is determined in step 405 that the LAA cell occupying the channel requires additional occupancy of the channel in step 406, the LAA cell may set the contention window in step 414 by using a result of the data transmission performed in step 405 or at least one of the various methods described above.

In this case, a method for setting the contention window by using the data transmission result for step 405 is only an example and the contention window may be set by the previous channel occupation and data transmission step or a value set in advance. For example, when the LAA cell performs data transmission to the UE during the channel occupancy interval and receives the NACK from the terminal as the reception result of the data transmission, the LAA cell may increase or maintain the contention window. When the LAA cell occupying the channel by using the increased or maintained contention window performs the data transmission to the terminal during the channel occupancy interval and receives the NACK from the terminal as the reception result of the data transmission, the LAA cell may increase or maintain the contention window or set the contention window as the initial contention window. In this case, the method for setting the contention window by using the ACK/NACK is only one example and the contention window may be set using the other criteria described above.

When the predetermined variable N is set in the predetermined contention window in step 407, the LAA cell may perform the second channel detecting operation in step 408 using the set N. In this case, the second channel detecting operation is an operation for determining the occupancy state of the channel by using at least one of measurement of a signal received for a predetermined time or detection of a signal defined in advance and a different determination criterion from the first channel detecting operation may be established. That is, a reference time for the second channel detecting operation may be the same as the reference time for the first channel detecting operation or may be set to be shorter than the first channel detection time.

For example, the first channel detection time may be set to 34 us and the second channel detection time may be set to 9 us. Further, a second channel detecting operation reference threshold may be set differently from the first channel detecting operation reference threshold.

When it is determined that the channel detected in step 408 is an idle channel in step 409, the LAA cell subtracts 1 from the variable N set in step 410. In this case, the subtracting of 1 is only one example and the variable N may be differently set according to the set value or may be set differently according to the type or characteristic of the signal to be transmitted by the LAA cell.

In addition, the LAA cell may check whether the value of the variable subtracted in step 411 is 0.

When the value of the subtracted variable N is 0, the LAA cell may perform the channel occupancy and the data transmission in step 405.

When the value of the subtracted variable N is not 0, the LAA cell may perform the second channel detecting operation again in step 408.

When it is determined in step 408 that the channel is not the idle channel in step 409 through the second channel detecting operation, the LAA cell may perform a third channel detecting operation in step 412. In this case, the third channel detecting operation may be the same as the first channel detecting operation or the second channel detecting operation.

For example, the first channel detecting operation reference time and a third channel detecting operation reference time may be similarly set to 34 us. In this case, the first channel detection reference threshold and a third channel detection reference threshold may be set differently. The channel detecting operation reference time and threshold are only examples and the variables or criteria required for the third channel detecting operation may be the same as those of the first channel detecting operation or at least one of the variables or criteria may be set differently from that of the first channel sensing operation.

Further, the third channel detecting operation may be configured to perform an operation of generating a time delay without performing separate channel detecting or channel occupancy operations. In addition, the third channel detection time may be set to be the same as or differently from at least one of the first channel detection time or the second channel detection time.

Further, the LAA cell determines whether the other devices occupy the channel in step 413 by using a reference value set for the third channel detecting operation.

When the determined channel occupancy state is the idle state, the LAA cell may perform the second channel detecting operation again in step 408.

When the channel determined in step 413 is not in the idle state, the LAA cell performs the third channel detecting operation configured in step 412. In this case, at least one of the first channel detecting operation, the second channel detecting operation, and the third channel detecting operation may be omitted according to the type or characteristics of data or control signal to be transmitted by the LAA cell.

For example, when the LAA cell transmits only a control signal (e.g., a discovery reference signal (DRS)), the LAA cell may occupy the channel according to the result of the channel detecting operation after performing only the first channel detecting operation. In this case, the DRS is only one example in which at least one of the first channel detecting operation, the second channel detecting operation, and the third channel detecting operation may be omitted as described above and is also applicable to other control signal transmission. In addition, the terminal may perform an uplink channel detecting operation for uplink channel occupancy and uplink signal transmission in the channel detection and channel occupancy manner described above.

Meanwhile, when an uplink signal is transmitted to the unlicensed band, maximum power that may be transmitted per unit frequency may be limited according to the frequency band for the corresponding unlicensed band or the regional regulation. For example, in Korea, when using a 20 MHz system bandwidth in a 5.1 to 5.2 GHz frequency band, maximum transmittable power per 1 MHz is limited to 2.5 mW.

As described above, since the maximum transmission power is limited within a predetermined bandwidth, the power usable by the terminal may be limited when the RB is continuously allocated. Detailed contents will be described with reference to FIG. 5.

Figure 5:
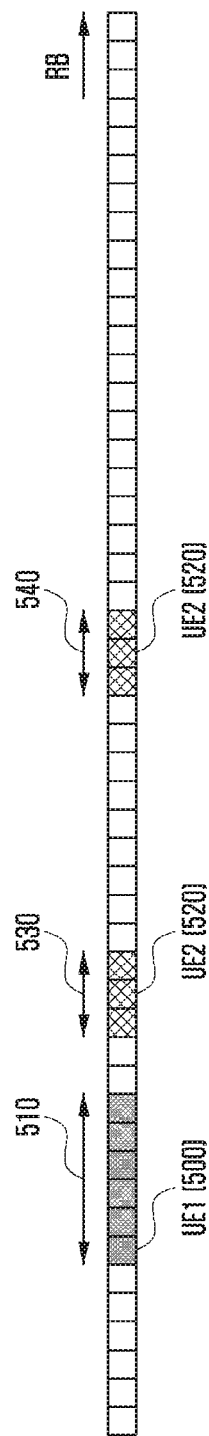
FIG. 5 is a diagram illustrating various methods in which a base station allocates resources to a terminal.

FIG. 5 is a diagram illustrating various methods in which a base station allocates resources to a terminal.

Referring to FIG. 5, in the current LTE standard, one continuous frequency band or RB may be allocated (510) or up to two discontinuous frequency bands or RBs may be allocated (530 and 540) in the uplink transmission.

In the case of terminal 1 500 which is allocated with 6 continuous RBs 510, the maximum transmission power is approximately 2.5 mW due to a transmission power limit per unit frequency. That is, in the case of terminal 1 500, total power that may be transmitted through six allocated resource blocks may not exceed 2.5 mW.

On the contrary, in the case of terminal 2 520 allocated with the same 6 RBs but allocated RBs 530 and 540 of two discontinuous frequency bands, each of the resource blocks 530 and 540 allocated in each frequency band may transmit the power of total 2.5 mW.

That is, terminal 2 520 may use twice the transmission power in each resource block, as compared to terminal 1 500 that is continuously allocated with 6 RBs 510.

In this case, when only one RB is allocated per unit frequency, that is, when an uplink frequency is allocated to use only one RB per 1 MHz, the terminal may perform the uplink transmission using 2.5 mW of power per RB.

As described above, a method is required, which increases discontinuous frequency band allocation currently limited to two in order to enhance the uplink signal transmission performance of the terminal in an environment where there is the transmission power limit per unit frequency in the unlicensed band. Accordingly, the present disclosure proposes a method in which the terminal transmits an uplink data channel using two or more discontinuous frequency resource regions.

Meanwhile, as described above, the present disclosure proposes a method in which the base station allocates the uplink resource so that the terminal may use two or more discontinuous frequency resource regions in the unlicensed band, but the scope of the present disclosure is not limited thereto. That is, the present disclosure may also be similarly applied to a case where the uplink resource is allocated in a frequency band other than the unlicensed frequency band.

Specifically, the base station may configure the uplink transmission of the terminal including the uplink transmission resource region using DCI format 0 or format 4 of the downlink control channel or a format for transmitting new uplink control information. In this case, many bits are required to configure the uplink transmission in a plurality of discontinuous frequency resource regions.

Accordingly, the present disclosure proposes a method that defines a resource allocation group (RB group, hereinafter, referred to as RBG) in the uplink and divides a plurality of RBs for the uplink transmission into one RBG to reduce bits required for allocation of the uplink frequency resource region.

The present disclosure will not assume the uplink control channel transmission in the unlicensed band for easy description, but the embodiments of the present disclosure may be applied even though the uplink control channel transmission is configured in the unlicensed band. For example, when the uplink control channel transmission is configured, the method described in the embodiment of the present disclosure may be applied to the remaining regions excluding the configured resources in all uplink transmission resources. As another example, when the uplink control channel transmission is configured, the method described in the embodiment of the present disclosure may be applied to the remaining regions excluding all uplink transmission regions without the configured resources in all uplink transmission resources.

Further, the uplink transmission configuration mentioned in the present disclosure may mean that the base station transfer to the terminal configuration information required for the uplink transmission of the terminal including the uplink transmission resource region using DCI format 0 or format 4 of the downlink control channel or the format for transmitting the new uplink control information.

Figure 6:
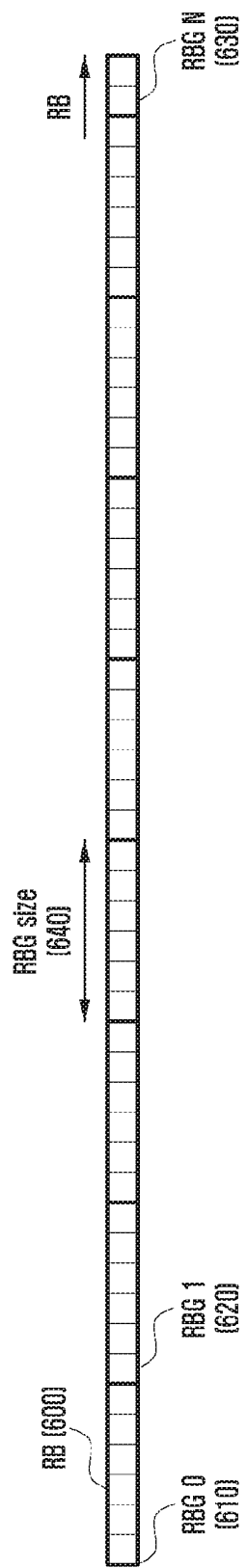
FIG. 6 is a diagram illustrating frequency resources in a system bandwidth.

FIG. 6 is a diagram illustrating frequency resources in a system bandwidth.

In order to reduce the number of bits required for the allocation of the uplink frequency resource region, K uplink transmission resources (RBs) may be assumed as one RBG. In FIG. 6, K=6 is assumed, but K=6 is only one example and may be predefined as a different value or set by the base station through a higher layer signal (for example, RRC signaling). Further, K may be set differently according to the system bandwidth and the base station may set a larger value of K as the system bandwidth increases. In this case, it is also possible that K is fixed without changing according to the system bandwidth.

FIG. 6 illustrates a case where up to 50 RBs are used for the uplink data channel transmission in a system bandwidth of 10 MHz. Since a maximum of 50 RBs are assumed and six RBs are configured as one RBG, a total of 9 RBGs may be configured. In this case, the last RBG may be constituted by RBs of a number less than K, but may be regarded as one RBG.

The method for allocating the uplink resource by using the RBG is described below.

[First Method]

The base station may configure the RBG as an uplink transmission frequency resource unit and configure the uplink transmission resources to the terminal by the unit of RBG using a bitmap.

Figure 7:
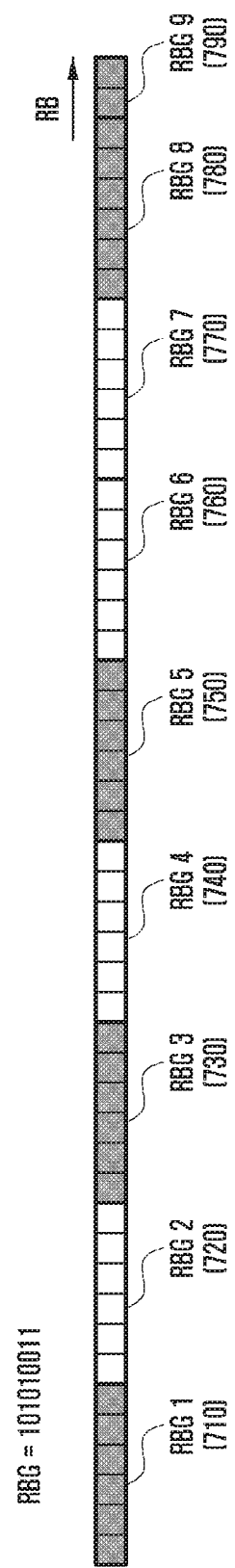
FIG. 7 is a diagram illustrating a method in which the base station configures uplink transmission frequency resources to the terminal by the unit of RBG.

FIG. 7 is a diagram illustrating a method in which the base station configures uplink transmission frequency resources to the terminal by the unit of RBG.

Referring to FIG. 7, the base station may configure bitmap information by the unit of RBG and transmit the bitmap information to the terminal and the terminal may confirm the RBG to which resources are allocated using the bitmap information. For example, the base station may set the RBG portion allocated to the terminal to 1 in the bitmap.

In this case, the bitmap information configured by the unit of RBG may be referred to RBG allocation information.

For example, when the terminal receives the RBG allocation information 101010011, the terminal may use the RBs included in RBG indexes 1, 3, 5, 8, and 9 of FIG. 7 for the uplink transmission.

In this case, the most significant bit (hereinafter, referred to as MSB) of the RBG allocation information may indicate RBG index 0 and the least significant bit (hereinafter, referred to as LSB) of the RBG allocation information may indicate RBG index N.

In addition, when the RBG allocation information is 1, the RGB allocation information may mean that the uplink transmission resource is allocated to the corresponding RBG index and when the RBG allocation information is 0, the RBG allocation information may mean that the uplink transmission resource is not allocated to the corresponding RBG index.

The base station may allocate the uplink transmission resource region of the terminal to the terminal using one of the DCI formats used for the uplink transmission configured in the downlink control channel.

In this case, an RBG size or the number of RBs included in the RBG may be defined differently according to the uplink transmission bandwidth.

In addition, the RBG size or the number of RBs included in the RBG which is defined above may be set to the terminal through the higher layer signal (e.g., RRC signaling).

When one or more frequency resource allocation methods are supported, the base station may inform the terminal of the frequency resource allocation method applied to the uplink transmission included in the uplink transmission configuration information.

For example, one of the uplink resource allocation schemes proposed by the present disclosure, which is newly added to the uplink resource allocation scheme used up to Rel-13, is designated as the resource allocation scheme used for the uplink transmission of the terminal and included in the uplink transmission configuration information to be informed to the terminal. In this case, the uplink resource allocation scheme used up to Rel-13 is not used and one of the uplink resource allocation schemes proposed by the present disclosure is designated as the resource allocation scheme used for the uplink transmission of the terminal and included in the uplink transmission configuration information to be informed to the terminal.

[Second Method]

The base station may continuously allocate some of the RBs in the RBG. Specifically, the base station may inform the terminal of the RBG of the RBG to which the uplink transmission frequency resource is allocated by using the bitmap and continuously allocate some of the RBs in the allocated RBG using a resource indication value (hereinafter, referred to as an RIV value or RIV allocation information).

Figure 8:
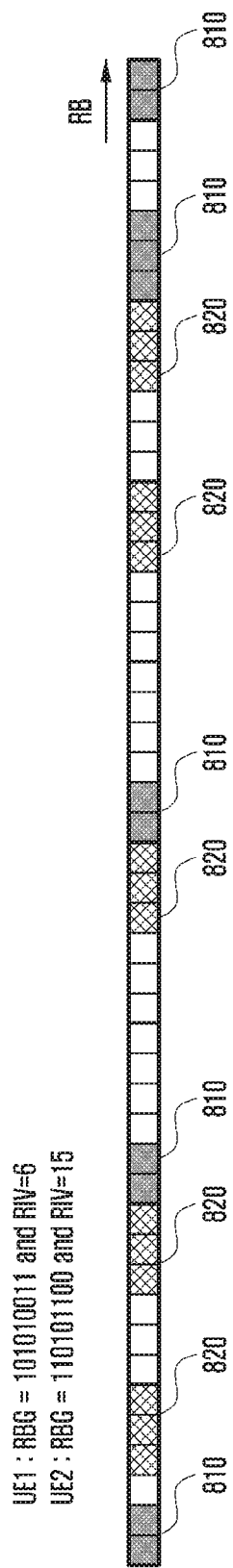
FIG. 8 is a diagram illustrating a method in which the base station continuously allocates some of RBs in the RBG to the terminal.

FIG. 8 is a diagram illustrating a method in which the base station continuously allocates some of RBs in the RBG to the terminal.

Referring to FIG. 8, the base station may configure bitmap information by the unit of RBG and transmit the bitmap information to the terminal and the terminal may confirm the RBG to which resources are allocated using the bitmap information. For example, the base station may set the RBG portion allocated to the terminal to 1 in the bitmap.

In this case, the bitmap information configured by the unit of RBG may be referred to the RBG allocation information.

In addition, the base station may transmit the RIV value, which is information of the RB to which the resources are allocated in the RBG, to the terminal. Therefore, the terminal may confirm the information regarding the continuous RBs to which the resources are allocated in the RBG using the resource indication value.

For example, when terminal 1 receives RBG allocation information 101010011 and RIV allocation information 6 and terminal 2 receives RBG allocation information 110101100 and RIV allocation information 15, the transmission resource allocated by terminal 1 may be a resource 810 and the transmission resource allocated by terminal 2 may also be a resource 820.

In this case, the MSB of the RBG allocation information may mean RBG index 0, and the LSB of the RBG allocation information may mean RBG index N. In addition, when the RBG allocation information is 1, the RGB allocation information means that the uplink transmission resource is allocated to the corresponding RBG index and when the RBG allocation information is 0, the RBG allocation information means that the uplink transmission resource is not allocated to the corresponding RBG index.

Herein, the RIV information is configured in the RBG as a starting point (RB_start) of the RB allocated to the uplink transmission and the lengths or number (L_CRB) of continuously allocated RBs as follows. Herein, NRBGRB may mean the number of RBs in the RBG. For example, when RIV=6, first and second RBs in the RBG are allocated as the uplink resources. When RIV=11, all RBs in the RBG are allocated as the uplink resources. The RB allocation in the RBG for the RIV value refers to FIG. 9 and Equation 1.

If $(L_{CRB}-1) \leq \lfloor N_{RB}^{RBG}/2 \rfloor$ then $RIV = N_{RB}^{RBG}(L_{CRB}-1) + RB_{start}$ else $RIV = N_{RB}^{RGB}(N_{RB}^{RGB} - L_{CRB}+1) + (N_{RB}^{RBG}-1-RB_{start})$ [Equation 1]

Figure 9:
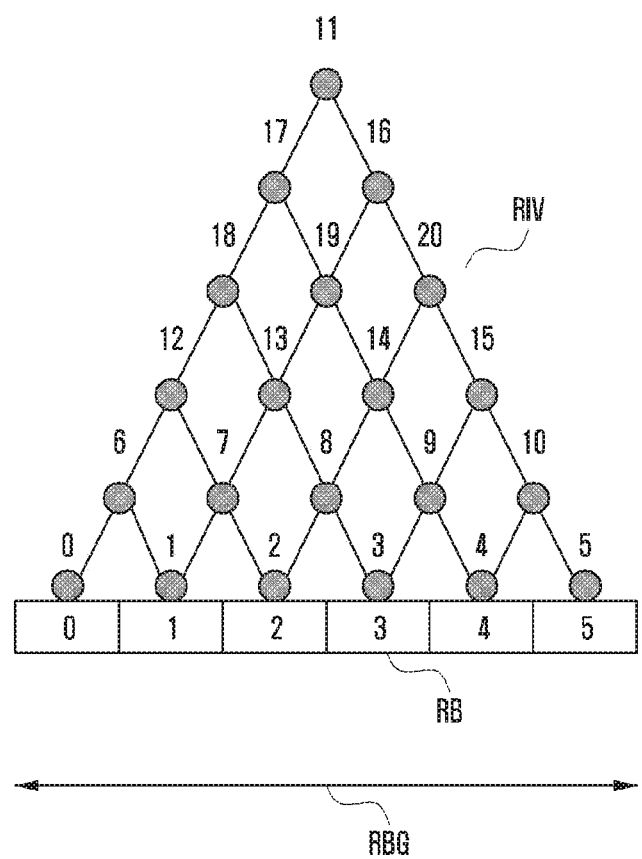
FIG. 9 is a diagram illustrating RB allocation in the RBG for an RIV value.

FIG. 9 is a diagram illustrating RB allocation in the RBG for the RIV value.

Referring to FIG. 9, FIG. 9 illustrates the RB allocation in the RBG for the RIV value determined using Equation 1.

For example, when the RIV value is 6, the RIV value corresponds to RB 1 and RB 2 and the terminal may confirm that RB 1 and RB 2 in the RBG are allocated as the uplink resources.

Further, when the RIV value is 11, the RIV value corresponds to all RBs and the terminal may confirm that all RBs in the RBG are allocated as the uplink resources.

The base station may allocate the uplink transmission resource region of the terminal to the terminal using one of the DCI formats used for the uplink transmission configured in the downlink control channel.

In this case, an RBG size or the number of RBs included in the RBG may be defined differently according to the uplink transmission bandwidth.

In addition, the RBG size or the number of RBs included in the RBG which is defined above may be set to the terminal through the higher layer signal (e.g., RRC signaling).

When one or more frequency resource allocation methods are supported, the base station may inform the terminal of the frequency resource allocation method applied to the uplink transmission included in the uplink transmission configuration information.

For example, one of the uplink resource allocation schemes proposed by the present disclosure, which is newly added to the uplink resource allocation scheme used up to Rel-13, is designated as the resource allocation scheme used for the uplink transmission of the terminal and included in the uplink transmission configuration information to be informed to the terminal. In this case, the uplink resource allocation scheme used up to Rel-13 is not used and one of the uplink resource allocation schemes proposed by the present disclosure is designated as the resource allocation scheme used for the uplink transmission of the terminal and included in the uplink transmission configuration information to be informed to the terminal.

[Third Method]

The base station divides the entire uplink data channel transmission resource region into M clusters (hereinafter referred to as a cluster) and divide each cluster into a plurality of RBGs to minimize the bits required for the uplink frequency resource region allocation to allocate the uplink transmission frequency resource.

In this case, it may be defined that the allocation information in the RBG in one cluster is allocated to the same RBG in other clusters.

Figure 10:
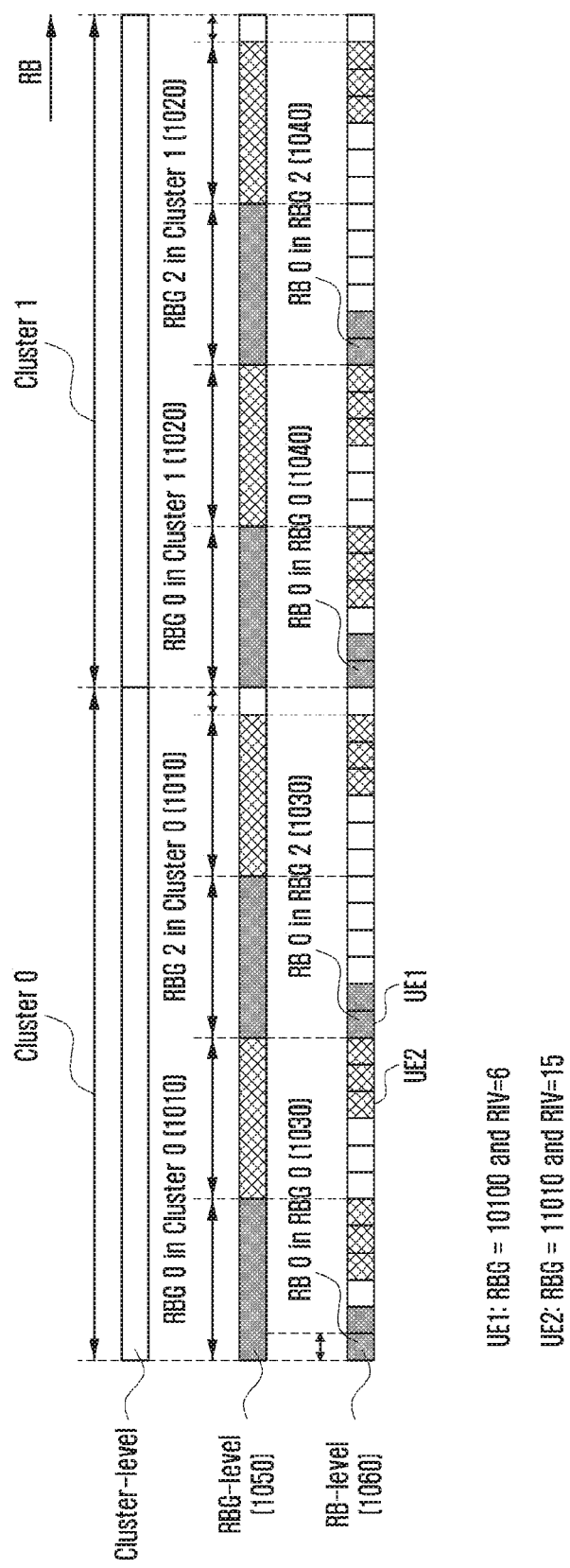
FIG. 10 is a diagram illustrating another method that allocates the uplink transmission frequency resource to the terminal.

FIG. 10 is a diagram illustrating another method that allocates the uplink transmission frequency resource to the terminal.

Referring to FIG. 10, for example, the base station may divide the entire frequency band into M=2 clusters and divide one cluster into the plurality of RBGs. In FIG. 10, it is assumed that 5 RBGs are included in one cluster by assuming one RBG is constituted by 6 RBs and 5 RBGs, but the number of RBGs included in the cluster and the number of RBs included in the RBG may be changed.

Assuming that resources are allocated by the unit of RBG in the cluster-divided resources, the uplink resource allocation information or the RBG allocation information may be set to 10100 in the setting for the uplink transmission received from the base station by terminal 1.

In this case, the terminal may determine that uplink resource regions for RBG indexes 0 and 3 of cluster 0 are allocated like the RBG-level allocation 1050 of FIG. 10.

In addition, the terminal may regard the uplink resources to be allocated in the same RBG index of the other cluster including cluster 0. In other words, even in the cluster 1 of FIG. 10, the uplink resources for the resource regions of RBG indexes 0 and 3, which are the same as the RBG resource allocation of cluster 0, may be regarded as being allocated.

That is, the number of bits required for the uplink transmission allocation may be reduced by dividing the entire uplink data channel transmission resource region into two clusters and applying the RBG allocation information in one cluster even to other clusters. In this case, the MSB of the RBG allocation information may mean RBG index 0, and the LSB of the RBG allocation information may mean RBG index N. In addition, when the RBG allocation information is 1, the RGB allocation information means that the uplink transmission resource is allocated to the corresponding RBG index and when the RBG allocation information is 0, the RBG allocation information means that the uplink transmission resource is not allocated to the corresponding RBG index.

When the uplink transmission allocation is intended by the unit of RB, the uplink resources may be allocated by the unit of RB by configuring the RIV allocation information (or RB allocation information) in addition to the uplink resource allocation information (or RBG allocation information) during the configuration for the uplink transmission. That is, as illustrated in FIG. 10, the terminal having the RBG allocation information set to 10100 and the RB allocation information RIV set to 6 may confirm that the uplink resources corresponding to RB indexes 0 and 1 of RBG indexes 0 and 3 of cluster 0 are allocated. In addition, the terminal may regard that the resources corresponding to RB indexes 0 and 1 of RBG indexes 0 and 3 of the other cluster as the uplink transmission resources.

The base station may allocate the uplink transmission resource region of the terminal to the terminal using one of the DCI formats used for the uplink transmission configured in the downlink control channel.

In this case, the base station may inform the number of clusters, which is included in the uplink resource allocation information in the configuration for the uplink transmission or the number of clusters may be set through the higher layer signal or defined in advance. In this case, the number of clusters may be set or defined differently depending on the uplink transmission bandwidth.

Further, the RBG size or the number of RBs included in the RBG may be defined differently according to the uplink transmission bandwidth.

In addition, the RBG size or the number of RBs included in the RBG which is defined above may be set to the terminal through the higher layer signal (e.g., RRC signaling).

When one or more frequency resource allocation methods are supported, the base station may inform the terminal of the frequency resource allocation method applied to the uplink transmission included in the uplink transmission configuration information.

For example, one of the uplink resource allocation schemes proposed by the present disclosure, which is newly added to the uplink resource allocation scheme used up to Rel-13, is designated as the resource allocation scheme used for the uplink transmission of the terminal and included in the uplink transmission configuration information to be informed to the terminal. In this case, the uplink resource allocation scheme used up to Rel-13 is not used and one of the uplink resource allocation schemes proposed by the present disclosure is designated as the resource allocation scheme used for the uplink transmission of the terminal and included in the uplink transmission configuration information to be informed to the terminal.

Figure 11:
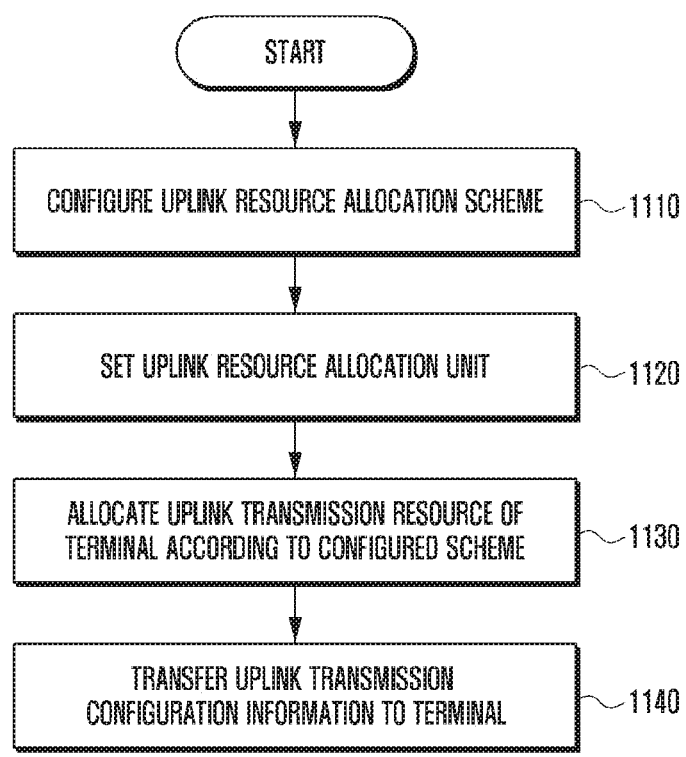
FIG. 11 is a diagram illustrating a method in which the base station configures the uplink transmission resources according to the present disclosure.

FIG. 11 is a diagram illustrating a method in which the base station configures the uplink transmission resources according to the present disclosure.

A method for configuring the uplink transmission resources by the base station according to the embodiment of the present disclosure will be described below with reference to FIG. 11.

In step 1110, the base station configures the uplink resource allocation scheme. The resource allocation scheme may include the uplink resource allocation scheme proposed in the embodiment of the present disclosure including the existing uplink resource allocation scheme used up to Rel-13.

In step 1120, the base station configures the uplink resource allocation unit. In this case, the uplink resource allocation unit may be the units of the cluster, the RBG, and the RB described in the above example. For example, according to the first method described above, the unit of the resource allocation may be the RBG and the RB according to the second and third methods. Further, according to the third method, the unit of the resource allocation may be the RBG in the cluster. Further, the uplink resource allocation unit may have at least one value different according to the frequency bandwidth in which the uplink transmission is possible. For example, depending on the frequency bandwidth, the number of clusters may be different or the RBG size or the number of RBGs in the RBG may be set differently.

Specifically, according to the first method, the base station may divide the entire bandwidth by the unit of RBG and transmit the RBG allocation information configured by the bitmap to the terminal. Accordingly, the terminal may transmit data in the RBG allocated in the uplink transmission. In this case, the number of RBs included in the RBG or the number of RBGs included in the bandwidth may be predetermined or may be set by the base station and the detailed contents are the same as described above.

According to the second method, the base station may divide the entire bandwidth by the unit of RBG and transmit the RBG allocation information configured by the bitmap to the terminal. Further, the base station may allocate only some RBs in the RBG to the terminal and transmit the RIV value for the allocation to the terminal. Accordingly, the terminal may transmit data in some RBs or all RBs in the RBG allocated in the uplink transmission. In this case, the number of RBs included in the RBG or the number of RBGs included in the bandwidth may be predetermined or may be set by the base station and the detailed contents are the same as described above.

According to the third method, the base station may divide the entire bandwidth by the unit of cluster and divide each cluster into a plurality of RBGs again to allocate the uplink resource. In this case, the base station may transmit resource allocation information for one of a plurality of clusters (or a cluster corresponding to a partial bandwidth of the entire bandwidth) to the terminal and the terminal may determine that the resources are allocated even to other clusters in the same method.

Further, the first method or the second method may be used as a method for informing the terminal of the uplink resource allocation information in one cluster. The detailed contents are the same as those described above and are omitted below. In this case, the number of RBGs included in the cluster of the cluster included in the entire bandwidth and the number of RBs included in the RBG may be predetermined or set by the base station.

In step 1130, the base station that configures the uplink resource allocation scheme and the resource allocation unit may allocate the uplink transmission resources to the terminal that configures the uplink transmission.

In addition, the base station may transfer the uplink transmission configuration information to the terminal by setting other parameters related to the uplink transmission including the uplink transmission resources configured in step 1140.

Further, the base station may receive data or control information from the terminal in the allocated resource.

Figure 12:
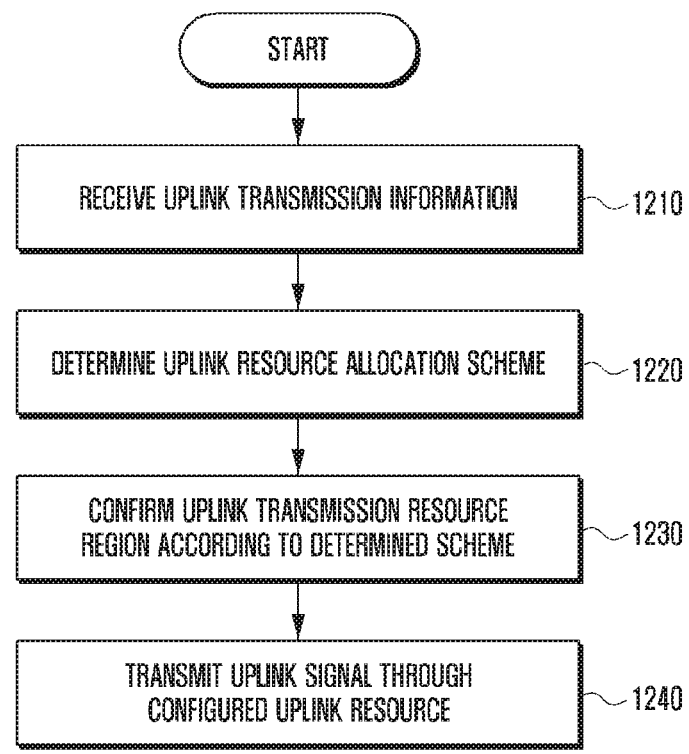
FIG. 12 is a diagram illustrating a method in which the terminal receives the uplink transmission resources according to the present disclosure.

FIG. 12 is a diagram illustrating a method in which the terminal receives the uplink transmission resources according to the present disclosure.

The method for configuring the uplink transmission resources by the terminal according to the embodiment of the present disclosure will be described below with reference to FIG. 12.

In step 1210, the terminal may receive configuration information related to the uplink transmission in the downlink control channel from the base station.

In step 1220, the terminal receiving the uplink transmission information may determine the resource allocation scheme configured by the base station in the uplink transmission. Alternatively, the base station may notify the terminal of the resource allocation scheme through higher layer signaling and the terminal may confirm the resource allocation scheme using the notification.

Then, the terminal may determine the uplink transmission resource allocation region configured according to the scheme determined in step 1230.

Specifically, according to the first method, when the entire bandwidth is divided by the unit of RBG, the terminal may receive the RBG allocation information and confirm the RBG to which the uplink resource is allocated by using the received RBG allocation information. Accordingly, the terminal may transmit data in the RBG allocated in the uplink transmission.

According to the second method, when the entire bandwidth is divided by the unit of RBG, the terminal may receive the RBG allocation information and confirm the RBG to which the uplink resource is allocated by using the received RBG allocation information. Further, the terminal may be allocated with only some RBs in the RBG to the terminal and receive the RIV value for the allocation. Accordingly, the terminal may confirm the RB in the RBG allocated in the uplink transmission by using the RIV value and transmit data in the confirmed RB.

According to the third method, the base station may divide the entire bandwidth by the unit of cluster and divide each cluster into a plurality of RBGs again to allocate the uplink resource. In this case, the base station may transmit the resource allocation information for one of the plurality of clusters (or the cluster corresponding to the partial bandwidth of the entire bandwidth) to the terminal.

Accordingly, the terminal may receive the resource allocation information in one cluster and similarly apply the resource allocation information even to other clusters.

Further, the first method or the second method may be used as a method for configuring the resource allocation information in one cluster.

That is, the base station may divide the cluster by the unit of RBG and transmit information on the RBG to which the uplink resources are allocated to the terminal as the RBG allocation information, and the terminal may confirm the RBG to which the resources are allocated using the RBG allocation information.

Alternatively, the base station may transmit to the terminal the RBG in the RBG allocation information to which the uplink resource is allocated and the RIV value which is the information on the RB to which the resources are allocated and the terminal may confirm the RB in the RBG to which the resources are allocated by using the RBG allocation information and the RIV value.

In this case, as described above, the base station may transmit information on the cluster, information on the RBG, information on the RB, and the like to the terminal through the higher layer signaling.

The terminal performs the configured uplink signal transmission through the uplink resources determined in step 1240.

Figure 13:
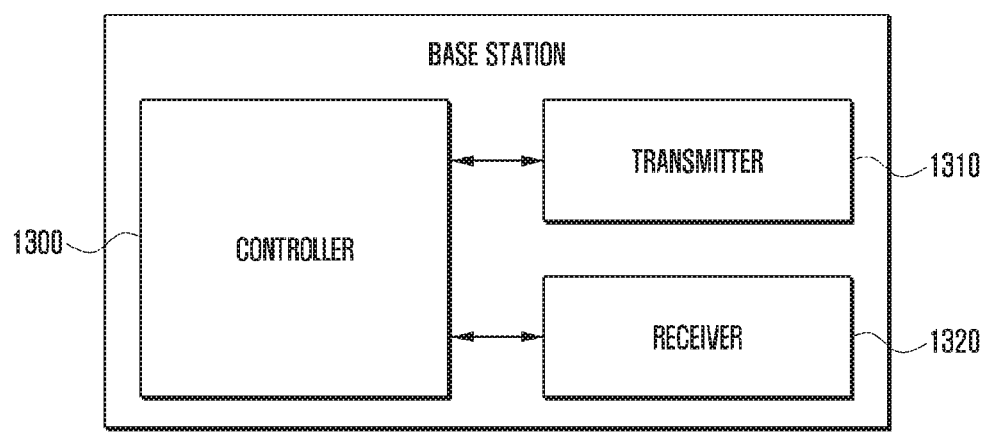
FIG. 13 is a device diagram of the base station according to the embodiment of the present disclosure.

FIG. 13 is a device diagram of the base station according to the embodiment of the present disclosure.

Referring to FIG. 13, the base station includes a transmitter 1310, a receiver 1320, and a controller 1300.

The transmitter 1410 may transmit a signal to the base station or another terminal and the receiver 1420 may receive the signal from the base station or another terminal.

The receiving unit 1320 may serve to receive the signal from the base station, the terminal, or the like or measure the channel from the base station, the terminal, or the like.

In addition, the controller 1300 may determine the reception result of the signal received from the terminal through the receiver 1320, configure the contention window required for the channel detecting operation of the terminal according to the determined result, and set a channel detecting interval value of the terminal by selecting a predetermined variable within the configured contention window.

In addition, the controller 1300 may transmit a control signal for configuring the uplink signal transmission of the terminal through the downlink control channel, which includes the channel detection interval value, uplink transmission resource region, uplink transmission resource configuration scheme, and the like of the terminal, which are set in the transmitter 1310 of the base station through the downlink control channel.

Further, the controller 1300 may allocate the uplink resources to the terminal through the aforementioned method. In this case, the controller 1300 may use the uplink resource allocation method described above and the detailed contents are the same as those described above.

Besides, the controller 1300 may control the entire operation of the base station described in the present disclosure.

Further, although not illustrated in the figure, the base station may further include a storage or the like and may store information generated by the controller or transmitted and received by the transmitter and the receiver.

Further, although the transmitter and the receiver are separated in this figure, the scope of the present disclosure is not limited thereto and a method in which the transmitter and the receiver are configured in the form of one transceiver is also available.

Figure 14:
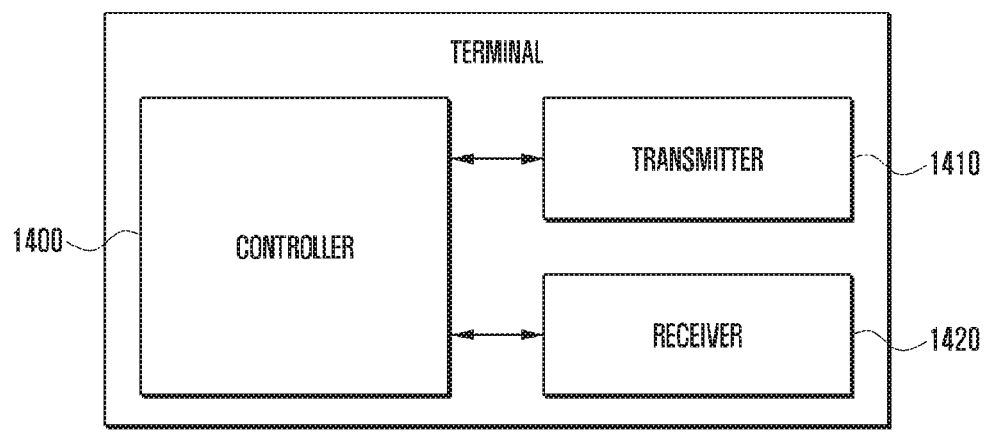
FIG. 14 is a device diagram of the terminal according to the embodiment of the present disclosure.

FIG. 14 is a device diagram of the terminal according to the embodiment of the present disclosure.

Referring to FIG. 14, the terminal may include a controller 1400, a transmitter 1410, and a receiver 1420.

The transmitter 1410 may transmit the signal to the base station or another terminal and the receiver 1420 may receive the signal from the base station or another terminal.

In FIG. 14, the controller 1400 may configure the channel detecting operation so that the terminal performs the channel detecting operation during the channel detection interval required for transmission of the uplink signal in the unlicensed band configured by the base station using the receiver 1420. Further, the receiver 1420 may receive the uplink transmission information configured to the terminal through the downlink control channel by the base station.

The controller 1400 may configure uplink transmission in time and frequency resources configured according to the uplink signal transmission configured by the base station which is received through the receiver 1420.

When the uplink transmission configured by the controller 1400 is transmission in the unlicensed band, the receiver 1420 may detect the channel for the channel during a predetermined channel detection interval and when the controller 1400 determines that the channel is in the idle state based on the strength of the signal which the receiver receives during the channel detection interval, the transmitter 1410 may configure the uplink transmission in the time and frequency resources configured according to the uplink signal transmission configured by the base station.

Further, the controller 1400 may receive the uplink resource allocation information determined through the aforementioned method. The uplink resource allocation information may be determined through the aforementioned method and the detailed contents are the same as described above.

Besides, the controller 1300 may control the entire operation of the terminal described in the present disclosure.

Further, although not illustrated in the figure, the terminal may additionally include the storage or the like and may store the information generated by the controller or transmitted and received by the transmitter and the receiver.

Further, although the transmitter and the receiver are separated in this figure, the scope of the present disclosure is not limited thereto and a method in which the transmitter and the receiver are configured in the form of one transceiver is also available.

Embodiment 2

The present disclosure relates to a general wireless mobile communication system, and more particularly, to a method for mapping a reference signal in a wireless mobile communication system adopting a multiple access scheme using multi-carriers, such as an orthogonal frequency division multiple access (OFDMA).

A current mobile communication system has developed into a high-speed and high-quality wireless packet data communication system for providing data service and multimedia service apart from providing initial voice-oriented services. To this end, various standardization groups such as 3GPP, 3GPP2, and IEEE perform a third-generation evolved mobile communication system standard using the multiple access scheme with the multi-carriers. Recently, a variety of mobile communication standards such as long term evolution (LTE) of 3GPP, ultra mobile broadband (UMB) of 3GPP2, and 802.16m of IEEE have been developed in order to support a high-speed and high-quality wireless packet data transmission service based on the multiple access scheme with the multi-carriers.

The existing third-generation mobile communication systems such as LTE, UMB, and 802.16m are based on the multi-carrier multiple access scheme and is characterized in that in order to improve transmission efficiency, multiple input multiple output (MIMO, multiple antennas) is adopted and various techniques such as beam-forming, an adaptive modulation and coding (AMC) method, and a channel sensitive scheduling method are used. The various techniques improves system capacity performance by improving the transmission efficiency through a method such as concentrating transmission power transmitted from several antennas or adjusting an amount of transmitted data according to a channel quality or the like and selectively transmitting the data to a user having a high channel quality. Most of the techniques operate based on channel state information between a base station (evolved Node B (eNB)) (a base station (BS)) and a terminal (user equipment (UE)) (mobile station (MS)), the eNB or UE needs to measure a channel state between the base station and the terminal and in this case, a channel state indication reference signal (CSI-RS) is used.

The above-mentioned eNB refers to a downlink transmitting and uplink receiving device located at a predetermined place and one eNB performs transmission and reception with respect to a plurality of cells. In one mobile communication system, a plurality of eNBs is geographically dispersed and each eNB performs transmission and reception for the plurality of cells.

The existing third-generation and fourth-generation mobile communication systems such as LTE/LTE-A utilize an MIMO technique for transmitting data using a plurality of transmission/reception antennas in order to increase data rate and a system capacity. The MIMO technique spatially separates and transmits a plurality of information streams by using the plurality of transmission/reception antennas. Spatially separating and transmitting the plurality of information streams as described above is referred to as spatial multiplexing.

In general, to how many information streams the spatial multiplexing may be applied depends on the numbers of antennas of the transmitter and the receiver. In general, to how many information streams the spatial multiplexing may be applied is referred to as a rank of the corresponding transmission. The MIMO technique supported by standards up to the LTE/LTE-A Release 11 supports the spatial multiplexing for a case where each of the numbers of transmission and reception antennas is 8 and supports up to 8 ranks. In contrast, an FD-MIMO system to which the technique proposed by the present disclosure is applied corresponds to a case where 32 which is more than 8 or more transmission antennas are used as the conventional LTE/LTE-A MIMO technique evolves.

The FD-MIMO system refers to a wireless communication system that transmits data using dozens or more transmission antennas.

Figure 15:
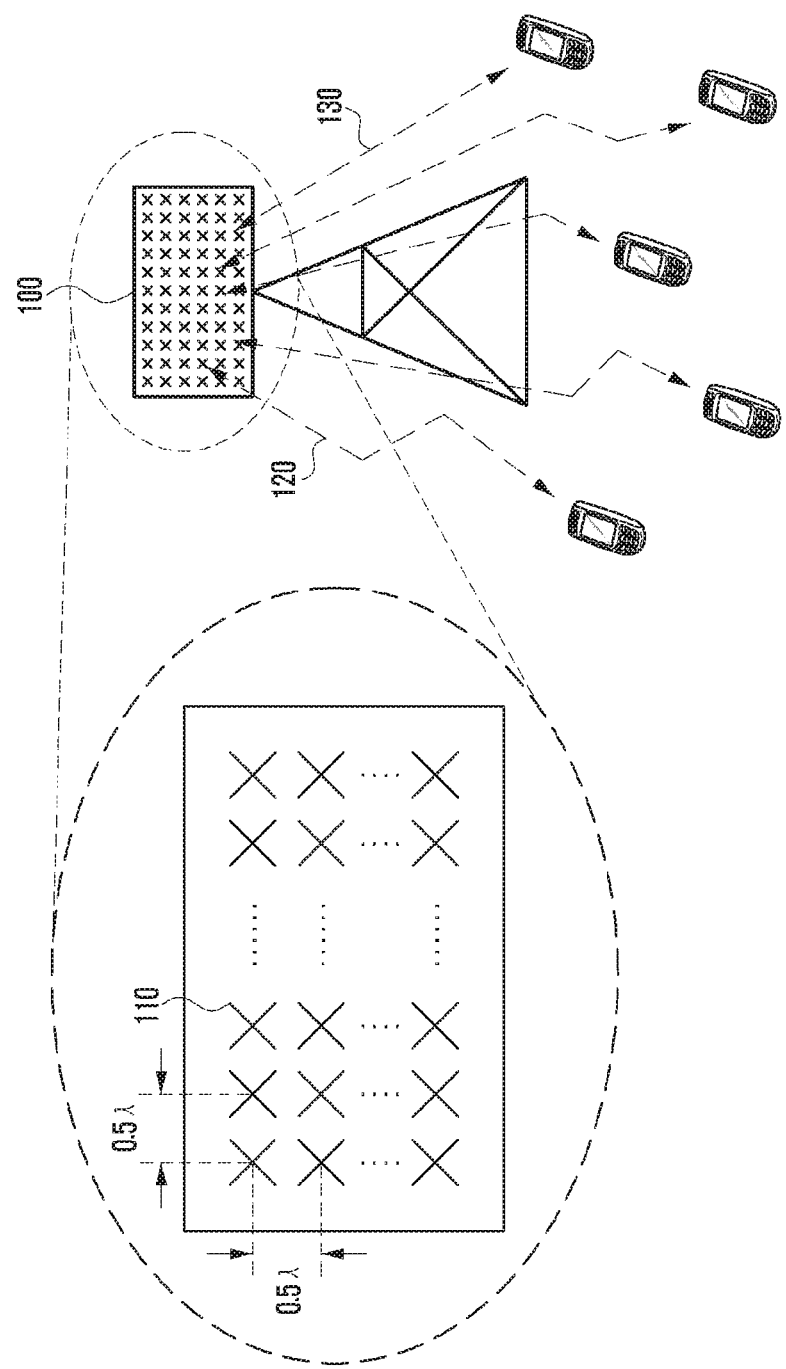
FIG. 15 illustrates an FD-MIMO system.

FIG. 15 illustrates an FD-MIMO system.

In FIG. 15, a transmitting equipment 1500 of the base station transmits the radio signal using dozens or more transmitting antennas. A plurality of transmitting antennas is arranged (1510) to maintain minimum distances therebetween.

One example of the minimum distance is half the wavelength length of the transmitted radio signal. In general, when the distance that is half the wavelength length of the radio signal is maintained between the transmitting antennas, the signals transmitted from the respective transmitting antennas are affected by radio channels having low correlation with each other. When the bandwidth of the transmitted radio signal is 2 GHz, the distance is 7.5 cm and when the bandwidth is higher than 2 GHz, the distance becomes shorter.

In FIG. 15, dozens or more transmission antennas arranged in the base station are used for one or a plurality of terminals 1520 to transmit the signals. Appropriate precoding (may be used in combination of precoding) is applied to a plurality of transmitting antennas to simultaneously transmit the signals to the plurality of terminals. In this case, one terminal can receive one or more information streams. In general, the number of information streams that can be received by one terminal is decided by the number of receiving antennas possessed by the terminal and channel conditions.

In order to effectively implement the FD-MIMO system, as described above, the terminal needs to accurately measure the channel conditions and interference magnitudes and transmit effective channel state information to the base station using the measured channel status and interference magnitudes. The base station receiving the channel state information decides to which terminals to perform transmission, at what data rate to perform transmission, what precoding to apply, and so forth, in association with downlink transmission by using the received channel state information. In case of the FD-MIMO system, since the number of transmitting antennas is large, when a method for transmitting/receiving the channel state information of the LTE/LTE-A system in the related art is applied, an uplink overhead problem that a lot of control information needs to be transmitted in uplink occurs.

In the mobile communication system, time, frequency, and power resources are limited. Therefore, when more resources are allocated to the reference signal, the resources that can be allocated to the transmission of the traffic channel (data traffic channel) are reduced, and as a result, an absolute amount of data to be transmitted can be reduced. In such a case, although the performance of channel measurement and estimation is improved, the absolute amount of data to be transmitted is reduced, so that overall system capacity performance may be still lowered. Therefore, a proper distribution between the resource for the reference signal and the resource for the traffic channel transmission is required so as to derive optimum performance in terms of a total system capacity.

Figure 16:
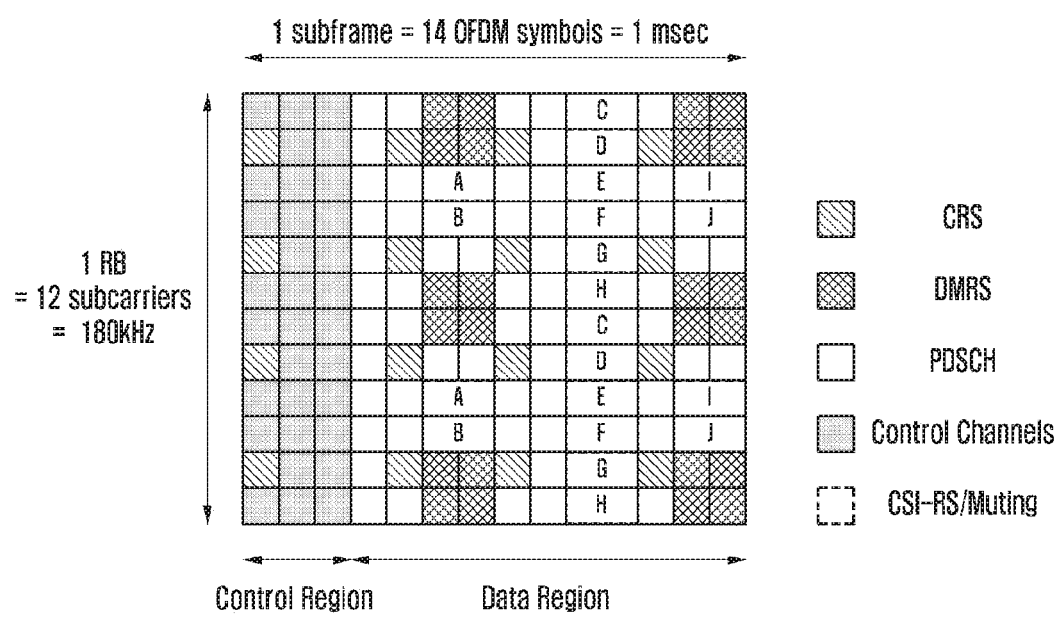
FIG. 16 illustrates radio resources in an LTE/LTE-A system.

FIG. 16 illustrates radio resources in an LTE/LTE-A system.

Referring to FIG. 16 above, the radio resource is constituted by one subframe on the time axis and one RB on the frequency axis. Such a radio resource is constituted by 12 subcarriers in a frequency domain and 14 OFDM symbols in a time domain, thereby providing a total of 168 natural frequency and time positions. In the LTE/LTE-A, respective natural frequencies and time positions in FIG. 2 are referred to as resource elements (hereinafter, referred to as RE).

A plurality of different types of signals below may be transmitted to the radio resource illustrated in FIG. 16.

1. Cell specific RS (hereinafter, CRS): Reference signal transmitted periodically for all terminals belonging to one cell and can be commonly used by a plurality of terminals.

2. Demodulation Reference Signal (hereinafter, DMRS): Reference signal transmitted for a specific terminal and is transmitted only when data is transmitted to the terminal. The DMRS can be constituted by a total of 8 DMRS ports (hereinafter, ports). In the LTE/LTE-A, port 7 to port 14 correspond to the DMRS port and the ports maintain orthogonality so as not to interfere with each other using code division multiplexing (hereinafter, CDM) or frequency division multiplexing (hereinafter, FDM).

3. Physical Downlink Shared Channel (hereinafter, PDSCH): Data channel transmitted in downlink, which is used by the base station to transmit traffic to the terminal, and the traffic is transmitted by using an RE in which the reference signal is not transmitted in a data region of FIG. 16.

4. Channel state information Reference Signal (hereinafter, CSI-RS): Reference signal transmitted for the terminals belonging to one cell and used for measuring a channel status. A plurality of CSI-RSs can be transmitted to one cell.

5. Other control channels (PHICH, PCFICH, and PDCCH): Used to provide control information required for the terminal to receive the PDSCH or transmit an ACK/NACK for operating HARQ for uplink data transmission.

In the LTE-A system, muting can be configured so that the CSI-RSs transmitted by another base station can be received without interference to the terminals of the corresponding cell in addition to the signal. The muting can be applied at the position where the CSI-RS can be transmitted and in general, the terminal receives a traffic signal by skipping the radio resource. In the LTE-A system, the muting may also be referred to as zero-power CSI-RS as another term. The reason is that the muting is applied to the position of the CSI-RS and transmission power is not transmitted due to a characteristic of the muting.

In FIG. 16, the CSI-RS can be transmitted using some of positions indicated by A, B, C, D, E, E, F, G, H, I, and J according to the number of antennas transmitting the CSI-RS. The muting can also be applied to some of the positions indicated by A, B, C, D, E, E, F, G, H, I, and J. In particular, the CSI-RS can be transmitted in 2, 4, or 8 REs depending on the number of antenna ports transmitting the CSI-RS. When the number of antenna ports is two, the CSI-RS is transmitted to half of specific patterns in FIG. 2, when the number of antenna ports is four, the CSI-RS is transmitted to all of the specific patterns, and when the number of antenna ports is eight, the CSI-RS is transmitted by using two patterns.

On the contrary, the muting is continuously made in unit of one pattern. That is, although the muting can be applied to a plurality of patterns, when the muting can not be applied to only a part of one pattern when the position of the muting does not overlap with the position of the CSI-RS. However, the muting can be applied only to a part of one pattern only when the position of the CSI-RS overlaps with the position of the muting.

When the CSI-RSs are transmitted for two antenna ports, the signal of each antenna port is transmitted in two REs connected on the time axis in respect to the CSI-RS and the signal of each antenna port is divided as an orthogonal code.

Further, when the CSI-RSs are transmitted for four antenna ports, signals for two remaining antenna ports are transmitted in the same manner by using two REs in addition to the CSI-RSs for two antenna ports. The same manner is applied when the CSI-RSs are transmitted for eight antenna ports.

As described above, the DMRS is a reference signal transmitted for a specific terminal and is transmitted only when data is transmitted to the corresponding terminal. The DMRS can be constituted by a total of 8 DMRS ports. In the LTE/LTE-A, port 7 to port 14 correspond to the DMRS port and the ports maintain orthogonality so as not to interfere with each other using CDM or FDM. First, when describing in more detail through Equations, a reference signal sequence for the DMRS may be expressed as Equation 2 below.

$$r(m) = \frac{1}{\sqrt{2}}(1 - 2 \cdot c(2m)) + j\frac{1}{\sqrt{2}}(1 - 2 \cdot c(2m+1)), \quad \text{<Equation 2>}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

Here, c(i) is a pseudo-random sequence, and an initial state for a scrambling sequence of the DMRS is generated for each subframe through Equation 3 below.

$$c_{init} = (\lfloor n_s/2 \rfloor + 1) \cdot (2n_{ID}^{(nSCID)} + 1) \cdot 2^{16} + n_{SCID} \quad \text{<Equation 3>}$$

Here, n, has an integer value of 0 to 19 as a slot index of the frame. In Equation 3, $n_{ID}^{(nSCID)}$ and $n_{SCID}$ are values related with the scrambling of the DMRS. $n_{ID}^{(nSCID)}$ corresponds to a virtual cell ID value and has an integer value of 0 to 503.

Further, $n_{SCID}$ corresponds a scrambling ID value and has a value of 0 or 1. In general, in LTE/LTE-A, one of two preset values $n_{ID}^{(nSCID)}$ is determined according to the value $n_{SCID}$. That is, as shown in Table 1 below, when the value $n_{SCID}$ is 0, the virtual cell ID value has the value of scramblingIdentity-r11 preset by the higher layer signaling and when the value $n_{SCID}$ is 1, the virtual cell ID value is the value of scramblingIdentity2-r11 preset by the higher layer signaling.

TABLE 1

| DMRS-Config configuration field | |
| --- | --- |
| -- ASN1START | |
| DMRS-Config-r11 ::= | CHOICE { |
| release | NULL, |
| setup | SEQUENCE { |
| scramblingIdentity-r11 | INTEGER (0..503), |
| scramblingIdentity2-r11 | INTEGER (0..503) |
| } | |
| } | |
| -- ASN1STOP | |

The reference signal sequence r(m) for the DMRS of Equation 2 above is mapped to the RE through Equation 4 when the PDSCH is allocated to $n_{PRB}$ with respect to an antenna port p=7, p=8 or p=7, 8, . . . , v+6.

$$a_{k,l}^{(p)} = w_p(l') \cdot r(3 \cdot l' \cdot N_{RB}^{max,DL} + 3 \cdot n_{PRB} + m') \quad \text{<equation 4>}$$

herein, $$w_p(i) = \begin{cases} \overline{w}_p(i) & (m' + n_{PRB}) \bmod 2 = 0 \\ \overline{w}_p(3-i) & (m' + n_{PRB}) \bmod 2 = 1 \end{cases}$$

$$k = 5m' + N_{sc}^{SB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{if in a special subframe with} \\ & \text{configuration 3, 4, 8 or 9 (see Table 4.2-1)} \\ l' \bmod 2 + 2 + 3 \lfloor l'/2 \rfloor & \text{if in a special subframe with} \\ & \text{configuration 1, 2, 6 or 7 (see Table 4.2-1)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with} \\ & \text{configuration 1, 2, 6, or 7 (see Table 4.2-1)} \\ 0, 1 & \text{if } n_s \bmod 2 = 0 \text{ and not in special subframe with} \\ & \text{configuration 1, 2, 6, or 7 (see Table 4.2-1)} \\ 2, 3 & \text{if } n_s \bmod 2 = 1 \text{ and not in special subframe with} \\ & \text{configuration 1, 2, 6, or 7 (see Table 4.2-1)} \end{cases}$$

$$m' = 0, 1, 2$$

In addition, $w_p(i)$ is given in Table 2 below. In the above equation Table 4.2-1 refers to LTE standard 3GPP TS 36.211.

TABLE 2

| Sequence $\overline{w}_p^{(i)}$ for normal cyclic prefix | |
| --- | --- |
| Antenna port p | $[\overline{w}_p(0) \ \overline{w}_p(1) \ \overline{w}_p(2) \ \overline{w}_p(3)]$ |
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The sequence $w_p(i)$ of Table 2 is an orthogonal cover code (OCC) for maintaining orthogonality between DMRS ports through CDM. The terminal may estimate the channel by separating the DMRS port used for the PDSCH transmission from the DMRS port not used through the OCC of Table 2 above.

Table 3 shows the DCI for indicating which DMRS port, nSCID and how many layers are allocated to the terminal for the PDSCH transmission.

In case of supporting MU-MIMO, up to two orthogonal transmission layers are supported using 12 DMRS REs and OCC having a length of 2 per PRB considering only antenna port p=7 and 8 in the related art.

Further, up to four quasi-orthogonal transmission layers may be supported using the value $n_{SCID}$. The antenna port in which the DMRS is transmitted, $n_{SCID}$, and the number of layers may be indicated by using Table 3 below through 3 bits in DCI formats 2C and 2D.

In Table 3, a first column corresponds to a case where the PDSCH is scheduled by transmitting one codeword and a second column corresponds to a case where the PDSCH is scheduled by transmitting one codeword. In addition, in the first column value=4, 5, and 6 are used only for retransmission of the corresponding codeword. In addition, in the first column, value=0, 1, 2, and 3 may be used to indicate DMRS information in MU-MIMO transmission.

Referring to Table 3, in the current LTE standard, up to two orthogonal transmission layers may be supported in the MU-MIMO transmission and up to four quasi-orthogonal transmission layers may be supported by using $n_{SCID}$.

TABLE 3

| Antenna port(s), scrambling identity and number of layers indication | | | |
| --- | --- | --- | --- |
| One Codeword: Codeword 0 enabled, Codeword 1 disabled | | Two Codewords: Codeword 0 enabled, Codeword 1 enabled | |
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Accordingly, the terminal determines the number of allocated layers, the RE mapping, and the reference signal sequence described in the PDSCH transmission on Table 3 based on the DCI indicated by the base station as described above and estimates the precoded channel to decode the PDSCH.

In this case, the DM-RS is continuously decoded by assuming that the same precoding is used in one RB when the precoding matrix index (PMI)/rank indicator (RI) reporting is not configured and it is determined that the DM-RS is the same in one precoding resource block group (hereinafter, referred to as PRG) when the PMI/RI reporting is configured.

In this case, the PRG unit varies in size according to the system bandwidth set for the terminal, which is shown in Table 4 below.

TABLE 4

Size of PRG

| System Bandwidth ($N_{RB}^{DL}$) | PRG Size (P') (PRBs) |
|---|---|
| ≤10 | 1 |
| 11-26 | 2 |
| 27-63 | 3 |
| 64-110 | 2 |

The MIMO system may be divided into a closed-loop MIMO system and an open-loop MIMO system depending on whether PMI information on the receiver side is used when forming a transmission beam pattern.

In the case of the closed-loop MIMO system, the terminal confirms the channel information using the CSI-RS, obtains the rank of the corresponding channel through the confirmed channel information, and notifies the base station through the RI. Further, the terminal may select an optimal precoding in a precoder set corresponding to the determined rank and transmit the PMI corresponding to the selected precoding to the base station.

In addition, the terminal feeds back a transmission rate that may be supported by the terminal to the base station through the CQI based on the current channel, which is obtained on the assumption that the optimal precoding is applied. The base station receiving the feedback may communicate with the terminal using the appropriate transmission/reception precoding based on the information.

Contrary to this, in the open-loop MIMO system, unlike the closed-loop MIMO system, the receiver side does not transmit PMI information to the transmitter side. Instead, the receiver of the open-loop MIMO system acquire supportable transmission rate by assuming precoding preconfigured by the scheme specified in the standard or the higher layer signal as precoding for the time and frequency space when generating the CQI according to the time and frequency resources and transfers the acquired transmission rate to the transmitter side through the CQI. The transmitter that receives the CQI from the receiver determines how the terminal should perform communication based on the corresponding information.

In general, it is known that the closed-loop MIMO may adaptively utilize the information of the channel and thus exhibits larger system performance than the open-loop MIMO. The reason is that in the case of the closed-loop MIMO, there is a process of selecting the precoding preferred by the terminal and notifying the base station of the precoding, while in the case of the open-loop MIMO, there is no such process and it is difficult to apply the precoding preferred by the terminal whenever the base station transmits the signal to the terminal.

However, in order to transmit/receive the signal through the closed-loop MIMO, additional overhead is required such that the terminal transmits the PMI to the base station. Further, in the case of transmitting and receiving the signal using the closed-loop MIMO, the beam pattern of the interference signal is rapidly changed with time in the case where the moving speed of the terminal is very fast or the channel is rapidly changed, and as a result, a performance loss due to the change of the interference signal may also occur. The interference is called dynamic interference.

On the contrary, in the open-loop MIMO system, the performance efficiency of the system itself is lower than that of the closed-loop MIMO system, but the effect of the dynamic interference is small and feedback overhead for the PMI etc. is small. The feedback overhead for PMI is especially important in FD-MIMO where the number of antennas increases. The reason is that as the number of transmission antennas of the base station increases, the number of bits constituting the PMI for notifying the terminal of the precoding preference needs to increase.

The semi closed-loop MIMO transmission may be considered to strengthen the advantages and improve the disadvantages of the open-loop MIMO transmission and the closed-loop MIMO transmission. In the semi closed-loop MIMO, only a part of the PMI preferred by the terminal is transferred to the base station and the base station may transmit the PDSCH by using the remaining PMIs in the PMI preferred by the terminal.

As an example of such a method, there may be a method for reporting the first PMI i1 in the dual structure codebook supported by LTE and transmitting the PDSCH in a cyclic manner to i2 belonging to the corresponding i1. In this case, i1 may be referred to as a first PMI, and i2 may be referred to as a second PMI.

Another example is a method of use in different dimensions. In Rel-13 FD-MIMO, N1, N2, O1, O1, and Codebook-Config may be set, which indicate the number of antennas for each dimension and an oversampling factor of the corresponding dimension, and a form of the beam group in order to generate the codebook. In this case, N1 and N2 may denote the number of antenna ports, and O1 and O2 may denote the oversampling factors.

Further, the first PMI of the first dimension may be represented as i11 and the first PMI of the second dimension may be represented as i12, and the terminal may report i11 corresponding to the first PMI of the first dimension and partial i2 corresponding to the corresponding dimension and the base station may transmit the data by circulating the PMI of the second dimension while fixing the PMI of the corresponding dimension.

In this case, the use of the semi closed-loop MIMO may be different depending on whether the cycling unit is the RB or RE similarly to the existing method.

Figure 17:
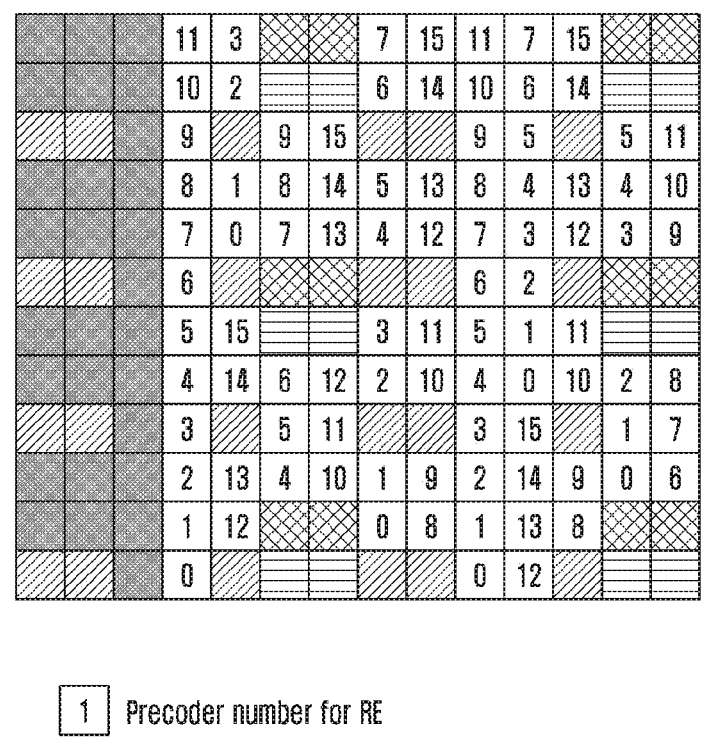

FIG. 17 is a diagram illustrating a method for cycling precoding for each RE.

Referring to FIG. 17, a precoder number is mapped to an RE except for a region where a reference signal is transmitted in the PDSCH region. As described above, the base station may transmit data by cyclically applying the precoder for each RE. In this case, cyclically applying the precoder for each RE may mean that a predetermined number of precoders are repeatedly applied to the RE. Specifically, referring to FIG. 17, an example of cycling 16 precoders is illustrated and after the precoders 0 to 15 are mapped to each RE, the precoders may be mapped to the next RE starting from precoder 0 again.

In this case, the performance of the semi closed-loop MIMO may vary depending on how many precoders are to be cycled in the cycling unit.

For example, performance may be different when the beam and corresponding co-phasing are all cycled in a beam group designated by one i1 or only the beam is cycled.

In this case, the co-paging may mean a value for compensating for a phase difference of the beam in antennas (for example, cross pole antenna) positioned in different directions.

Figure 18:
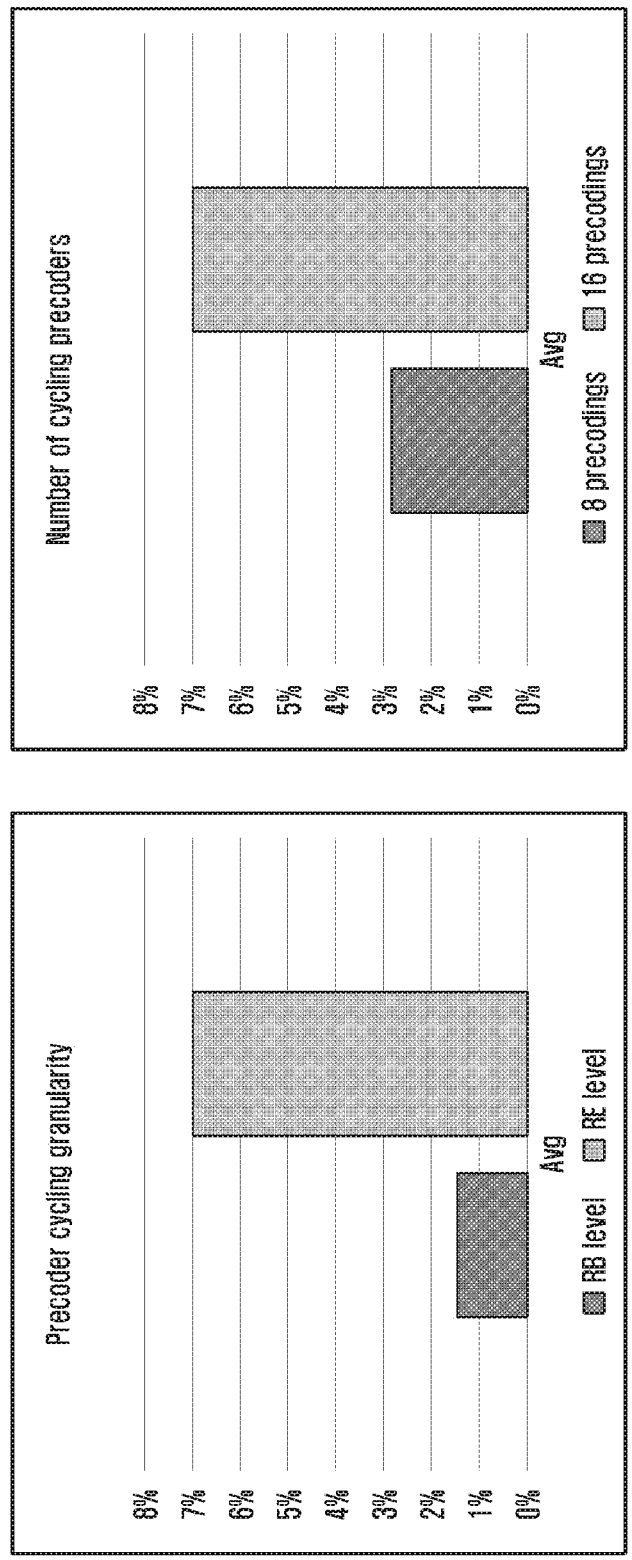
FIG. 18 is a diagram illustrating a system performance difference according to a precoder cycling unit and the number of precoders.

FIG. 18 is a diagram illustrating a system performance difference according to a precoder cycling unit and the number of precoders.

FIG. 18 is a diagram illustrating a comparison between the performance when one precoded channel is supported for each layer in one RB and the performance when the RE uses different precoding for each layer in one RB.

Referring to FIG. 18, it can be seen that the performance when the precoding is performed for each RE is further enhanced as compared with the case where the precoding is performed for each RB.

Further, it can be seen that the performance in the case of using 16 precoding is further enhanced as compared with the performance in the case of using 8 precoding. That is, it can be seen that the performance is improved when cycling a larger number of precoding.

However, in the current DMRS of LTE, REs belonging to one RB cannot be decoded through different precoded channels according to RE locations and to this end, a new method needs to be defined.

Further, the DMRS supports up to 8 DMRS in one RB, which means that up to 8 precoded channels may be used in one RB. Therefore, to this end, a new method needs to be also defined. Further, signaling for supporting a plurality of layers and terminals based on the method may also be considered.

Hereinafter, a long term evolution (LTE) system and an LTE-Advanced (LTE-A) system are exemplified in the present specification, but the present disclosure may be applied to other communication systems using a license band and an unlicensed band.

The present disclosure will be explained based on i1 as a first PMI and i2 a second PMI, but the present disclosure is also applicable to i1,1 and i1,2 structures used in class A codebook of Rel-13 FD-MIMO and besides, the present disclosure is applicable to all semi closed-loop MIMO structures in which the terminal reports only a part of i1 and a part of i2 and the base station cycles a part of the rest.

Embodiment 2-1

In order to support the semi closed-loop MIMO based on precoder cycling by the unit of RE described in FIG. 17, the terminal needs to transmit a part of the which is the channel state information and PMI, rank, CQI, PTI, CRI, etc.

To this end, an assumption for the precoder is required, which may be expressed as Equation 5 below.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(v-1)}(i) \end{bmatrix} \qquad <\text{Equation 5}>$$

In this case, the size of precoding matrix w(i) is P×υ and i=0, 1, ..., $M_{symb}^{ap}-1$, $M_{symb}^{ap}=M_{symb}^{layer}$. Assuming Equation 5 above, the terminal selects the precoder based on the codebook configured by the base station. In this case, the precoder may be expressed as $W(i)=C_k$ and precoder index k may be expressed as Equation 5 below according symbol i.

$$k = \left(\left\lfloor \frac{i}{\upsilon} \right\rfloor \bmod K\right) + 1 \in \{1, \ldots, K\} \qquad <\text{Equation 6}>$$

In this case, K represents the number of precoders used for the cycling in the corresponding semi closed-loop MIMO operation in Equation 5 and assuming that the terminal reports i1 and cycles i2, the number may be 16 by assuming rank 1. Further, when the beam or co-phasing cycling is considered, the corresponding number may be 2 or 4.

Tables 5 and 6 below show the number of i11/i12 bits per configuration supported in class A of Rel-13 FD-MIMO. In this case, i11 and i12 may constitute i1 as the first PMI and i11 may mean a first PMI of a first dimension and i12 may mean the first PMI of a second dimension. In addition, config information below may be informed to the terminal by the base station by the higher layer signaling and informed to the terminal through, for example, codebook configuration information (codebook config).

TABLE 5 i11 and i12 bits depending on configuration when Config = 1
Config = 1 (submode1 only)

| (N1, N2) | (O1, O2) | i11/i12 bits | (O1, O2) | i11/i12 bits |
|---|---|---|---|---|
| (8, 1) | (4, —) | 5 bits | (8, —) | 6 bits |
| (2, 2) | (4, 4) | 3 bits/3 bits | (8, 8) | 4 bits/4 bits |
| (2, 3) | (8, 4) | 4 bits/4 bits | (8, 8) | 4 bits/5 bits |
| (3, 2) | (8, 4) | 5 bits/3 bits | (4, 4) | 4 bits/3 bits |
| (2, 4) | (8, 4) | 4 bits/4 bits | (8, 8) | 4 bits/5 bits |
| (4, 2) | (8, 4) | 5 bits/3 bits | (4, 4) | 4 bits/3 bits |

TABLE 6 i11 and i12 bits depending on configuration when Config = 2, 3, 4
Config = 2, 3, 4 (submode2 only)

| (N1, N2) | (O1, O2) | i11/i12 bits | (O1, O2) | i11/i12 bits |
|---|---|---|---|---|
| (8, 1) | (4, —) | 4 bits | (8, —) | 5 bits |
| (2, 2) | (4, 4) | 2 bits/2 bits | (8, 8) | 3 bits/3 bits |
| (2, 3) | (8, 4) | 3 bits/3 bits | (8, 8) | 3 bits/4 bits |
| (3, 2) | (8, 4) | 4 bits/2 bits | (4, 4) | 3 bits/2 bits |
| (2, 4) | (8, 4) | 3 bits/3 bits | (8, 8) | 3 bits/4 bits |
| (4, 2) | (8, 4) | 4 bits/2 bits | (4, 4) | 3 bits/2 bits |

According to config above, the numbers of bits of rank1 and rank2 are 2 bits and 4 bits, respectively, so that the numbers of precoders included in i2 are 4 and 16, respectively, according to the beam group designated by i1. Although the Rel-13 class A codebook having 16 CSI-RS ports has been described above, the present disclosure may be applied regardless of the rank in all cases including 4, 8, 12, 16, and the like to which the dual structure codebook is applied.

In this case, k may be defined in the following method according to the semi closed-loop MIMO method based on the codebook configured by the base station.

Precoder index definition method 1: Defined as the number of precoders in the beam group selected by i1

Precoder index definition method 2: Defined as the number of precoders in co-phasing selected through a part of i2 in the beam group selected by i1

Precoder index definition method 3: Defined as the number of precoders in the beam selected through a part of i2 in the beam group selected by i1

Precoder index definition method 4: Defined as the number of remaining precoders other than the beam group selected by i11 or i12 and i2 components corresponding to relevant dimension Precoder Index Definition Method 1:

Precoder index definition method 1 is a method in which the terminal uses all second PMI (i2) indexes corresponding to the relevant beam group when reporting the RI and the first PMI (i1 or i11 and i12).

For example, in the case of config 2-4 in the class A codebook of Rel-13 FD-MIMO, the number of indexes i2 corresponding to rank 1 is 16 using a combination of four beams and four co-phasing. Therefore, in this case, Ck means a precoding matrix referred to by the predetermined number of antenna ports and the reported RI and i1 (or i11 and i12), and i2=k.

In the precoder index definition method 1, the beam and the co-phasing in the beam group may be applied differently. Table 7 and Table 8 below show that the beam and the co-phasing of the precoder index are defined differently at RB and RE levels, respectively.

TABLE 7

RB level beam cycling and RE level 4 co-phase cycling
{1, j, -1, -j}

| ⋮ | ⋮ | ⋮ |
| RB 5 | Beam 1 | Co-phase {1, j, -1, -j} |
| RB 4 | Beam 0 | Co-phase {1, j, -1, -j} |
| RB 3 | Beam 3 | Co-phase {1, j, -1, -j} |
| RB 2 | Beam 2 | Co-phase {1, j, -1, -j} |
| RB 1 | Beam 1 | Co-phase {1, j, -1, -j} |
| RB 0 | Beam 0 | Co-phase {1, j, -1, -j} |

TABLE 8

RB level beam cycling and RE level 2 co-phase cycling
{1, -1} or {j, -j}

| ⋮ | ⋮ | ⋮ |
| RB 5 | Beam 2 | Co-phase {j, -j} |
| RB 4 | Beam 2 | Co-phase {1, -1} |
| RB 3 | Beam 1 | Co-phase {j, -j} |
| RB 2 | Beam 1 | Co-phase {1, -1} |
| RB 1 | Beam 0 | Co-phase {j, -j} |
| RB 0 | Beam 0 | Co-phase {1, -1} |

In Table 7, the terminal assumes that the beam in the codebook is cycled by the unit of RB and the co-phase is cycled by the unit of RE. In this case, the co-phase may cycle four {1, j, -1, -j} values by the unit of RE or cycle two {1, -1} by the unit of RE. In such a method, a high diversity gain may be obtained by applying four co-phases, but CDM4 of the DMRS may be needed due to a limit of the number of precoders.

In this case, i2=4*(m % 4)+(k % 4) may be achieved with respect to i1 selected to support the precoder cycling and in this case, m represents an RB index for reporting the channel status and k represents the symbol or subcarrier index.

In Table 8, the terminal assumes that the beam in the codebook is cycled by the unit of RB and the co-phase is cycled by the unit of RE.

In this case, the co-phase may cycle {1, -1} or {j, -j} by the unit of RE according to whether the RB is an even-numbered RB (hereinafter, referred to as an even RB or an odd-numbered RB (hereinafter, referred to as an odd RB). In such a method, the high diversity gain may be obtained without supporting a high number of precoders per RB by applying two different co-phases to each RB and the high diversity gain may be sufficiently obtained only by the DMRS based on CDM2.

In this case, $$i2 = 4*\left(\left\lfloor \frac{m}{2} \right\rfloor \% 4\right) + 2*(k \% 2) + n$$

may be achieved with respect to i1 selected to support the precoder cycling and in this case, m represents the RB index for reporting the channel status, k represents the symbol or subcarrier index, and n is 0 in the even RB and 1 in the odd RB.

As another example, the co-phase within the selected beam group may be cycled by the unit of RE and the beam cycling may not be supported. As mentioned above, the co-phase cycles two {1, -1}, {j, -j} or {1, j, -1, -j} by the unit of RE and the beam adopts a fixed beam. In this case, the beam used for the channel status report may be defined by a codebook subset restriction.

In the above example, in the case of the corresponding beam cycling, it is exemplified that the beam is cycled for each of two RBs, but this may vary depending on one or a plurality of specific RBs or PRG sizes or a plurality of RBs linked to the PRG size.

In addition, the support of semi closed-loop transmission according to a codebook configuration may be changed. As mentioned above with reference to Table 5 and Table 6, the number of beams supported by the first PMI (i1) differs between codebook-config 1 and codebook-config 2,3,4. Therefore, in case of codebook-config 1, a diversity effect by the semi closed-loop transmission may be relatively small. For codebook-config 1, the following method may be considered. A semi closed-loop transmission supporting method for codebook-config 1 is to support co-phasing cycling even though a restricted beam direction is supported.

For example, since rank 1 contains only one beam direction, the beam cycling at the RB level is not considered and only the RE-level co-phasing cycling is considered. Therefore, i2=4*k % 4 for the selected i1 may be achieved.

Another semi closed-loop transmission supporting method for codebook-config 1 is that the terminal does not support the corresponding transmission and channel status report. Therefore, when the terminal is configured with codebook-config 1, the terminal may ignore codebook-config 1 even though a semi closed-loop configuration is made for the corresponding codebook configuration or generate the channel status report based on a closed loop or open loop configuration without confirming the corresponding configuration.

Precoder Index Definition Method 2

Precoder index definition method 2 above is a method for defining a precoder number when the terminal reports co-phasing information that is a part of the RI, the first PMI (i1), and the second PMI (i2). For example, the class A codebook is used and rank 1 terminal reports only i1 and only 2 bit (1 bit for rank 2), which means co-phasing among bits of i2. Therefore, the i2 of the cycling precoder may be defined as i2=4*k+i2', where i2' denotes LSB 2 bits of i2 which means the co-phasing assumed for reporting by the terminal. Therefore, in this case, Ck means a precoding matrix designated by the predetermined number of antenna ports and the reported RI=1 and i1 (or i11 and i12), and i2=4*k+i2'.

In case of Rank 2, since 3 bits are used for combination of beams and 1 bit is used for co-phasing, the terminal reports 1 bit, so i2 of the resulting cycling precoder may be defined like is i2=2*k+i2'. Therefore, in this case, Ck means a precoding matrix designated by the predetermined number of antenna ports and the reported RI=2 and i1 (or i11 and i12), and i2=2*k+i2'. Rank 3-8 may be expanded in a similar method thereto.

Precoder Index Definition Method 3

Precoder index definition method 3 is a method of defining the precoder index as the precoder number when the terminal reports a beam or a beam combination which is a part of i1 and i2.

For example, the class A codebook is used, and in case of rank 1, the terminal reports MSB 2 bit indicating the beam in bits of i2 together i1. In this case, the i2 of the cycling precoder may be defined as i2=4*i2'+k, where i2' denotes MSB 2 bit of i2 which means the beam or beam combination assumed for reporting by the terminal. Therefore, in this case, Ck means a precoding matrix designated by the predetermined number of antenna ports and the reported RI=1 and i1 (or i11 and i12), and i2=4*k+i2'.

In case of Rank 2, 3 bits are used for the combination of the beams and 1 bit is used for the co-phasing. Therefore, in this case, the terminal reports MSB 3 bit of i2 which means the beam or beam combination. Accordingly, the i2 of the cycling precoder may be defined as i2=8*i2'+k. Therefore, in this case, Ck means a precoding matrix designated by the predetermined number of antenna ports and the reported RI=2 and i1 (or i11 and i12), and i2=8*k+i2'. Rank 3-8 may be expanded in a similar method thereto.

Precoder Index Definition Method 4

Precoder index definition method 4 above is a method of defining the precoder index as the precoder number when the terminal reports one of i11 and i12 and the i2 component corresponding thereto.

For example, in case of rank1, the class A codebook is used and rank1 terminal reports MSB 1 BIT (or second MSB 1 bit meaning a 1st-dimension beam) meaning a 2nd-dimension beam in bits of i2 together with i12 (or i11).

In this case, when precoder index definition method 2 above is added, LSB 2 bit meaning the co-phasing in the bits of i2 may be additionally reported. Therefore, i11 (or i12) of the precoder which is cycled at this time has a payload according to Table 4 or 5 above.

Further, the i2 of the cycling precoder may be defined as i2=4*k+i2'+8*i2', where i2' is the LSB 2 bit, which means the co-phasing assumed for reporting by the terminal and i2" means MSB 1 bit of the i2 meaning a 2nd-dimensional beam assumed for reporting by the terminal (when i11 is reported, the 8*i2" may be accordingly modified to 6 i2"). Therefore, in this case, Ck means a precoding matrix designated by the predetermined number of antenna ports and the reported RI=1 and i1 (or i11 and i12), and i2=4*k+i2'+8*i2".

Therefore, in this case, Ck means a precoding matrix designated by the predetermined number of antenna ports and the reported RI=1 and i1 (or i11 and i12), i12 (or i11) which is not reported, and i2=4*k+i2'+8*i2".

As described above, the precoder index definition method for the semi closed-loop transmission may be variously modified depending on the environment such as the type of codebook and the precoder cycling method.

In the contents described above, a method of assuming the precoder when the terminal generates the channel state information has been described. That is, unlike the prior art which assumes that precoding is the same in one RB, the above description relates to a method for the terminal to decide the number of precoders for confirming a beam pair that cycles the precoder for each RE in at least one RB and has best channel state information. As described above, the terminal may report the channel state information on the assumption of the cycling of the precoder at the RE level and the base station may transmit data using the channel state information.

Hereinafter, a method in which the base station transmits data and the terminal receives data when cycling the precoder for each RE will be described.

Embodiment 2-2

In the DMRS-based system, it is necessary to generate and report the channel state information on the assumption of the above-mentioned definition methods in order for the terminal, to transmit the data based on the precoder cycling for each RE and the DMRS needs to be able to be measured differently for each RE. As described above, in order for the terminal to measure the DMRS port differently for each RE, the following methods may be considered.

DMRS port mapping method 1 for each RE: Mapping DMRS port based on one RB when there are eight precoders or less DMRS port mapping method 2 for each RE: Mapping DMRS port based on two RBs when there are nine precoders or more DMRS port mapping method 3 for each RE: Mapping DMRS port based on four RBs when there are nine precoders or more FIG. 19 is a diagram illustrating a method for supporting precoder cycling using a DMRS structure of LTE.

Figure 19:
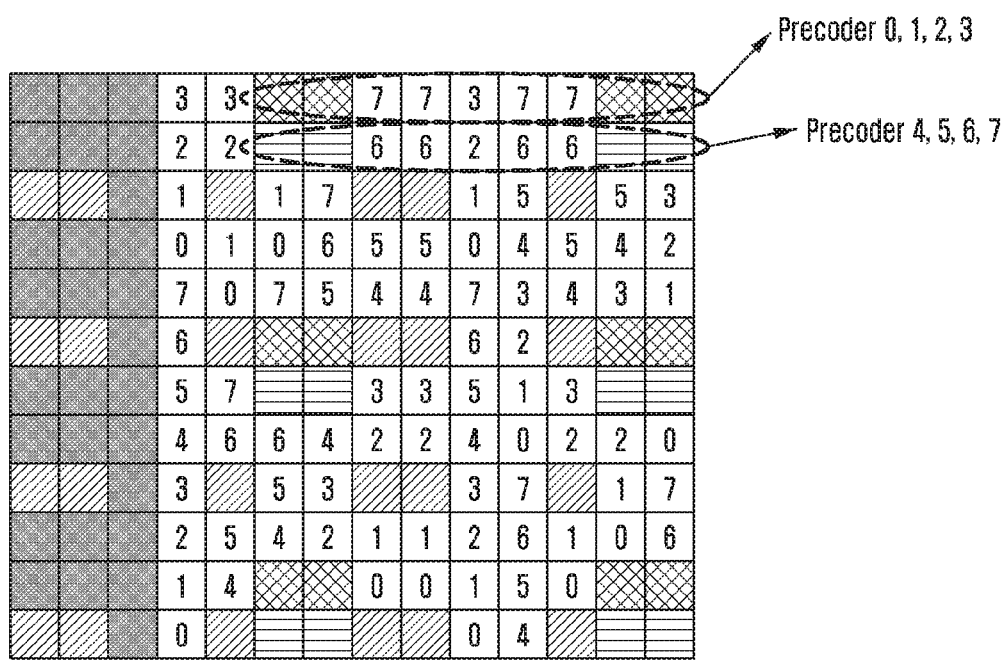
FIG. 19 is a diagram illustrating a method for supporting precoder cycling using a DMRS structure of LTE.

FIG. 19 illustrates a method for mapping the DMRS and the PDSCH RE when the number of cycling precoders is 8 or less using DMRS port mapping method 1.

In FIG. 19, the terminal may apply the precoder cycling mapped to the RE existing in the RB.

The example in FIG. 19 exemplifies a case of cycling using eight precoders.

Referring to FIG. 19, the terminal may assume precoders 0 to 7 as in the case of generating the channel status report in one RB. In this case, in order to decode the PDSCH, the terminal may map DMRS port 7 to a location of precoder 0, DMRS port 8 to a location of precoder 1, . . . , DMRS port 14 to a location of precoder 7 in order so as to decode the PDSCH.

Therefore, the base station may apply and transmit the same precoding to the data to be transmitted to the RE corresponding to each precoder number and the DMRS port corresponding to the precoder number. Accordingly, the UE may demodulate the data using the precoding applied to the DMRS port and the precoding applied to the RE of the precoder number corresponding to the DMRS port are the same. In this case, the base station may allocate four DMRS ports to the same RE by applying the OCC of size 4.

Referring to FIG. 19, the terminal may demodulate data received from the RE corresponding to each precoder using the DMRS received from the DMRS ports corresponding to precoders 0, 1, 2, and 3.

Similarly, the terminal may demodulate data received from the RE corresponding to each precoder using the DMRS received from the DMRS ports corresponding to precoders 4, 5, 6, and 7.

In this case, when all precoders are not cycled in the corresponding RB and the PRG unit is larger than 1, it is possible to map the DMRS port after the last used DMRS port in the previous RB to the precoder in the next RB.

For example, in FIG. 19, since up to precoder 3 is cycled, the last used DMRS port is DMRS port 10. Therefore, it is possible to start from port 11 at the location of precoder 0 in the next RB. In the above example, it is assumed that there are eight precoders, but when the number of precoders is four or less according to the structure of the DMRS, the DMRS port may be allocated by applying the OCC of size 2.

In this case, port 7, port 8, port 9, and port 10 may be allocated to location 0, location 1, location 2, and location 3, respectively. However, in this case, since 24 REs are continuously required for DMRS transmission, system performance may be degraded.

Therefore, another example for preventing system performance degradation is a method using OCC4 designed for MU-MIMO. The DMRS enhancement supported by Rel-13 FD-MIMO is a method that enables DMRS ports 7, 8, 11, and 13 to be used for MU-MIMO at a time. Therefore, by using such a method, it is possible to transmit four precoded channels while maintaining the DMRS overhead as 12 REs in one RB.

In this case, port 7, port 8, port 11, and port 13 may be allocated to location 0, location 1, location 2, and location 3, respectively. As in the case of cycling four precoders, in the case of cycling two precoders, the DMRS port may be allocated by applying OCC of size 2. In this case, port 7 is allocated to location 0 and port 8 is allocated to port 1.

In the above description, it is exemplified that the number of cycling precoders is 2, 4 and 8, but the number may be a predetermined number of 8 or less. As described above, there is a disadvantage that when the number of cycling precoders is small, the diversity gain may not be sufficiently obtained, and the effect of the open loop MIMO may not be sufficiently obtained, but there is an advantage that the DMRS overhead for obtaining the precoded channel of the precoder and the signaling therefor may be small.

In the OCC application of the DMRS, the application of the DMRS OCC may vary depending on the configuration of the method for channel state reporting. For example, when the RB-based beam cycling and the RE-based four co-phasing cyclic based channel status reports are configured as shown in Table 7, the DMRS OCC is assumed to be 4 and when a channel status report which is based on Table 7, but is based on two co-phasing cycling or a channel status report based on Table 8 is configured, the DMRS OCC may be assumed to be 2.

Figure 20:
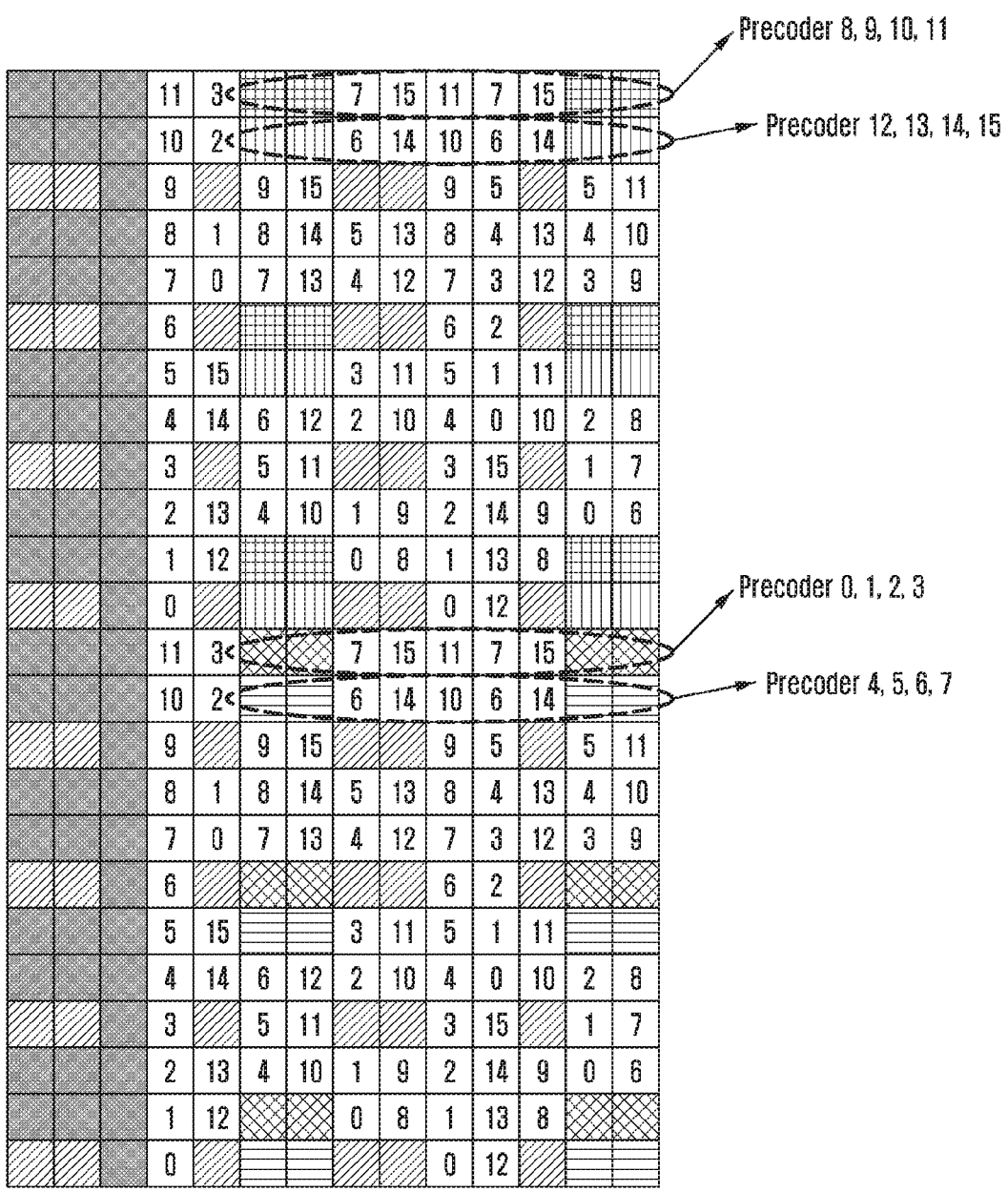
FIG. 20 is a diagram illustrating a method for mapping a DMRS and a PDSCH RE when the number of cycling precoders is 9 or more using DMRS port mapping method 2.

FIG. 20 is a diagram illustrating a method for mapping the DMRS and the PDSCH RE when the number of cycling precoders is 9 or more using DMRS port mapping method 2.

In FIG. 20, the terminal may apply the precoder cycling mapped to the RE existing in the RB. The example in FIG. 20 exemplifies a case of cycling using 16 precoders.

As illustrated in FIG. 20, the terminal may assume precoders 0 to 15 as in the case of generating the channel status report in one RB.

In this case, the terminal may use precoders 0 to 7 in the same order as in the case of 8 or less to decode the PDSCH. As mentioned above, the terminal may map DMRS port 7 to the location of precoder 0, DMRS port 8 to the location of precoder 1, . . . , DMRS port 22 to the location of precoder 7.

However, precoded channels corresponding to eight precoders may be transmitted in one RB.

Therefore, in this case, two RBs may be bundled to transmit the channel. In this case, the terminal may map DMRS port 7 of a second RB to the location of precoder 8, DMRS port 8 of the second RB to the location of precoder 9, . . . , DMRS port 22 to the location of precoder 15. Therefore, the terminal may estimate the DMRS channel at the same position as before based on one RB to thereby more than 8 precoder cycling.

Figure 21:
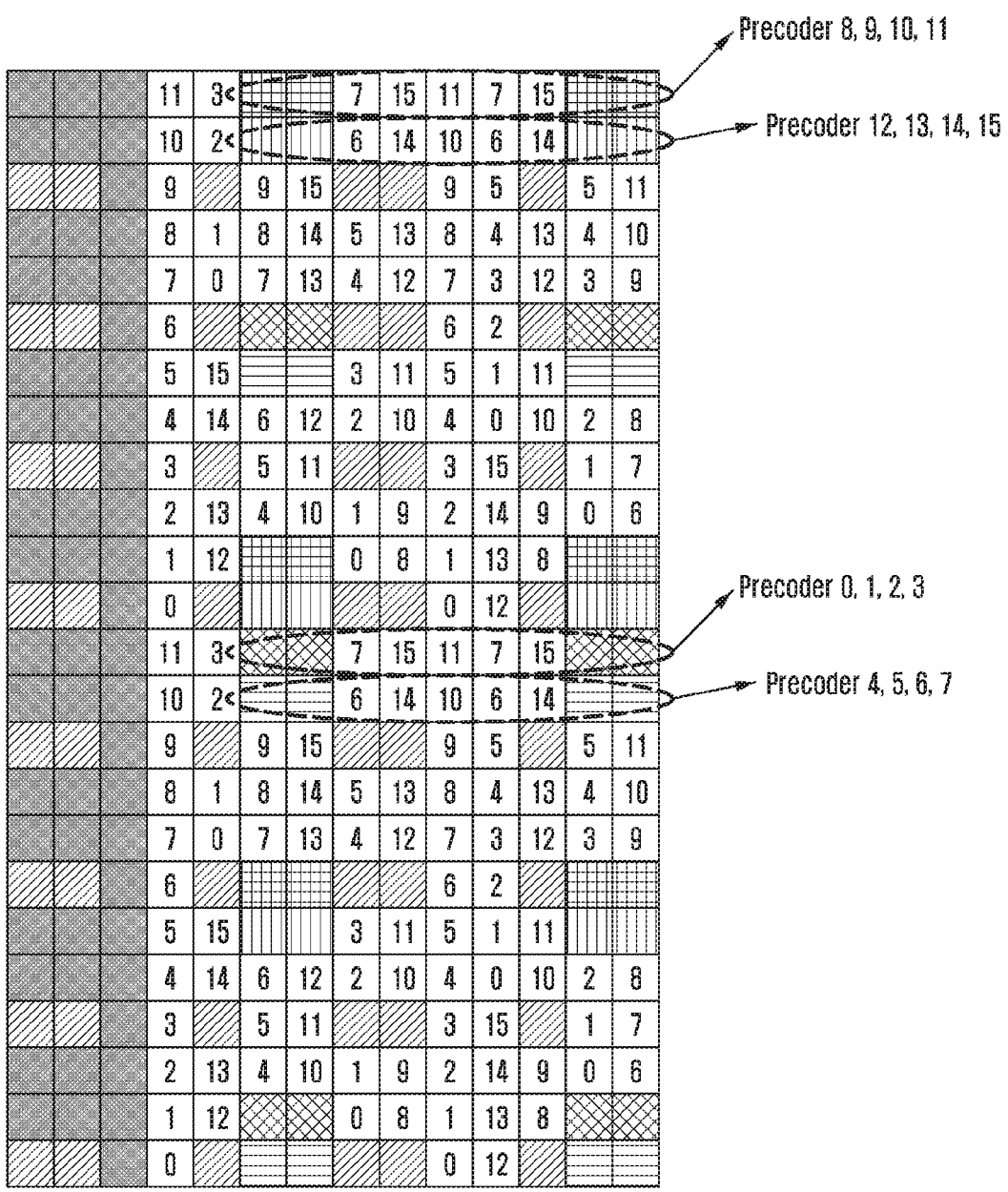
FIG. 21 is a diagram illustrating a method for dividing a DMRS port for each of two RBs and transmitting the DMRS port.

However, in this case, there is a disadvantage in that the unit of the PRG is continuously a multiple of two RBs, and there is also a limitation in terms of scheduling of the terminal. In addition, since only the precoded channels corresponding to precoders 0 to 7 and the precoded channels corresponding to precoders 8 to 15 may be estimated for each RB, the channel of the corresponding RB needs to be estimated by using a method such as interpolation or extrapolation in the remaining RB parts, and as a result, channel estimation performance may be deteriorated. Therefore, it is also possible to improve the channel estimation performance by supporting the DMRS structure illustrated in FIG. 21 for the semi closed-loop MIMO. FIG. 21 is a diagram illustrating a method for dividing a DMRS port for each of two RBs and transmitting the DMRS port.

As mentioned above, the existing DMRS is transmitted by occupying 12 REs based on three frequency positions and four time symbols in one RB for each port.

However, referring to FIG. 21, a location where one port is transmitted may be 8 REs based on two frequencies and four time symbols in one RB and 4 REs based on frequency and four time symbols in the other RB.

By dividing and transmitting the DMRS port for each of two RBs as described above, a reference signal for DMRS port transmission may be uniformly positioned within the RB. In this case, the channel estimation performance may be enhanced compared to that of FIG. 20, but the location of the channel estimation by the terminal is different from that of the existing 1 RB based structure, and as a result, new hardware may be required.

In this case, in a method using DMRS port matching method 2, 24 REs are continuously used even in rank 1 or 2 and the DMRS overhead increases, and as a result, the system performance may be degraded. Similar to mapping method 1 mentioned above, mapping method 2 may be arbitrarily applied and adopted under 9 to 16 cycling precoders as in the case of FIG. 20.

Figure 22:
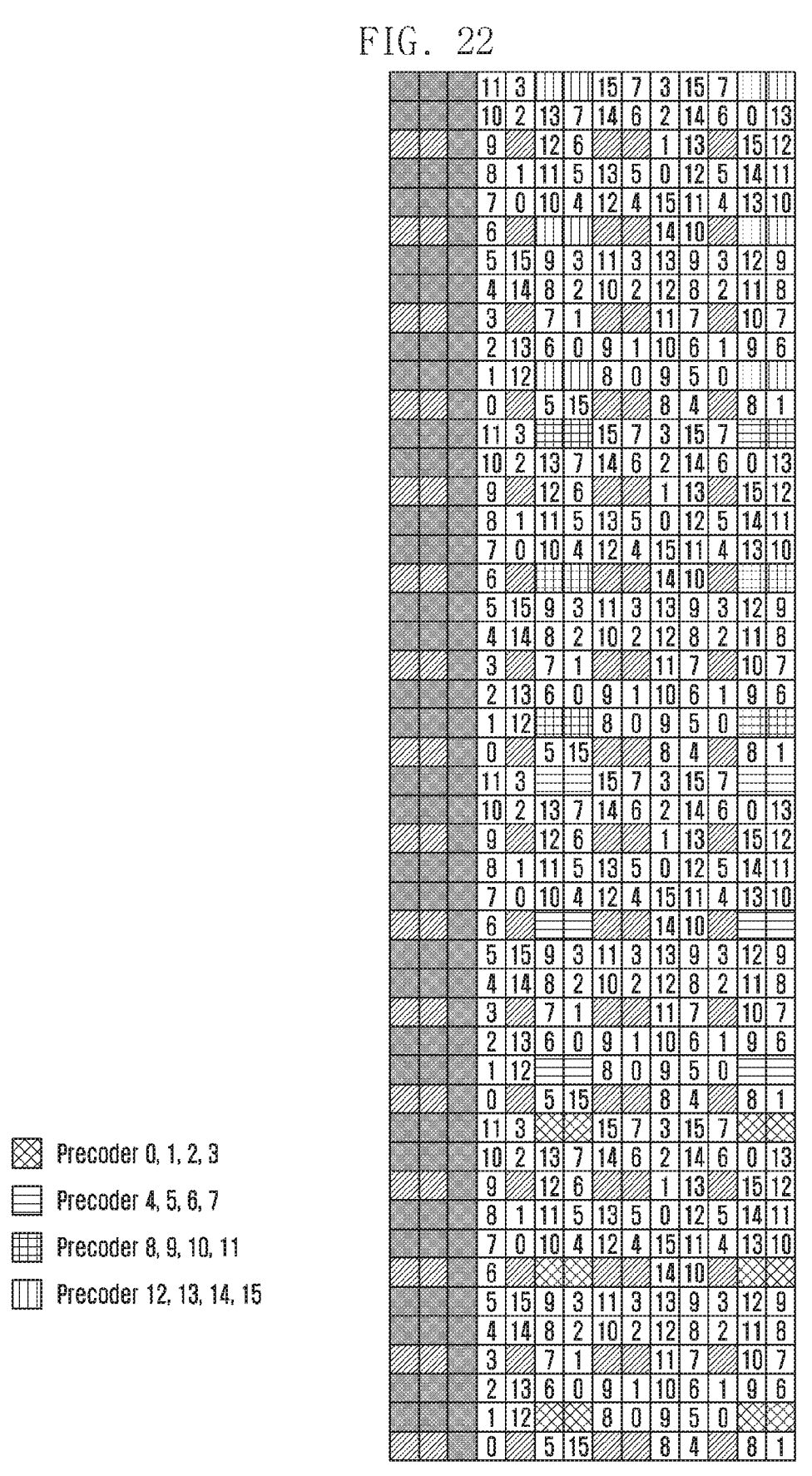

FIG. 22 is a diagram illustrating a method for mapping the DMRS and the PDSCH RE when the number of cycling precoders is 9 or more using DMRS port mapping method 3.

Since the method described in mapping method 2 above has to needs to continuously occupy 24 REs even in rank 1 as described above, the system performance is degraded.

Therefore, in order to solve the degradation of the system performance 4 DMRS ports are allocated by applying OCC 4 to 12 REs and 4 RBs are bundled and transmitted, thereby solving such overhead.

The example in FIG. 22 exemplifies a case of cycling using 16 precoders similarly to DMRS port mapping method 2.

As illustrated in FIG. 22, the terminal may assume precoders 0 to 15 as in the case of generating the channel status report in one RB.

In this case, the terminal may use precoders 0 to 3 in order as in a first RB in order to decode the PDSCH. Therefore, the terminal may map DMRS port 7 of the first RB to the location of precoder 0, DMRS port 8 of the first RB to the location of precoder 1, DMRS port 11 of the first RB to the location of precoder 2, and DMRS port 13 of the first RB to the location of precoder 3.

However, since only precoded channels corresponding to four precoders may be transmitted in one RB, the channel needs to be transmitted by bundling four RBs.

Therefore, the terminal may map DMRS port 7 of the second RB to the location of precoder 4, DMRS port 8 of the second RB to the location of precoder 5, DMRS port 11 of the second RB to the location of precoder 6, DMRS port 13 of the second RB to the location of precoder 7, . . . , DMRS port 13 of a fourth RB to the location of precoder 15. Therefore, the terminal may estimate the DMRS channel at the same location as MU-MIMO supporting four previous orthogonal layers based on one RB and support more than 8 precoder cycling through the estimated DMRS channel.

However, in this case, the unit of the PRG is continuously a multiple of four RBs and there may also be a limitation in terms of the scheduling of the terminal.

In addition, since only precoded channels corresponding to precoders 0 to 3, 4 to 7, 8 to 11, and 12 to 15 may be estimated for each RB, the channel of the corresponding RB needs to be estimated by using the method such as interpolation or extrapolation needs in the remaining RB part, and as a result, channel estimation performance may be degraded. Therefore, it is also possible to improve the channel estimation performance by supporting the DMRS structure illustrated in FIG. 23 for the semi closed-loop MIMO.

Figure 23:
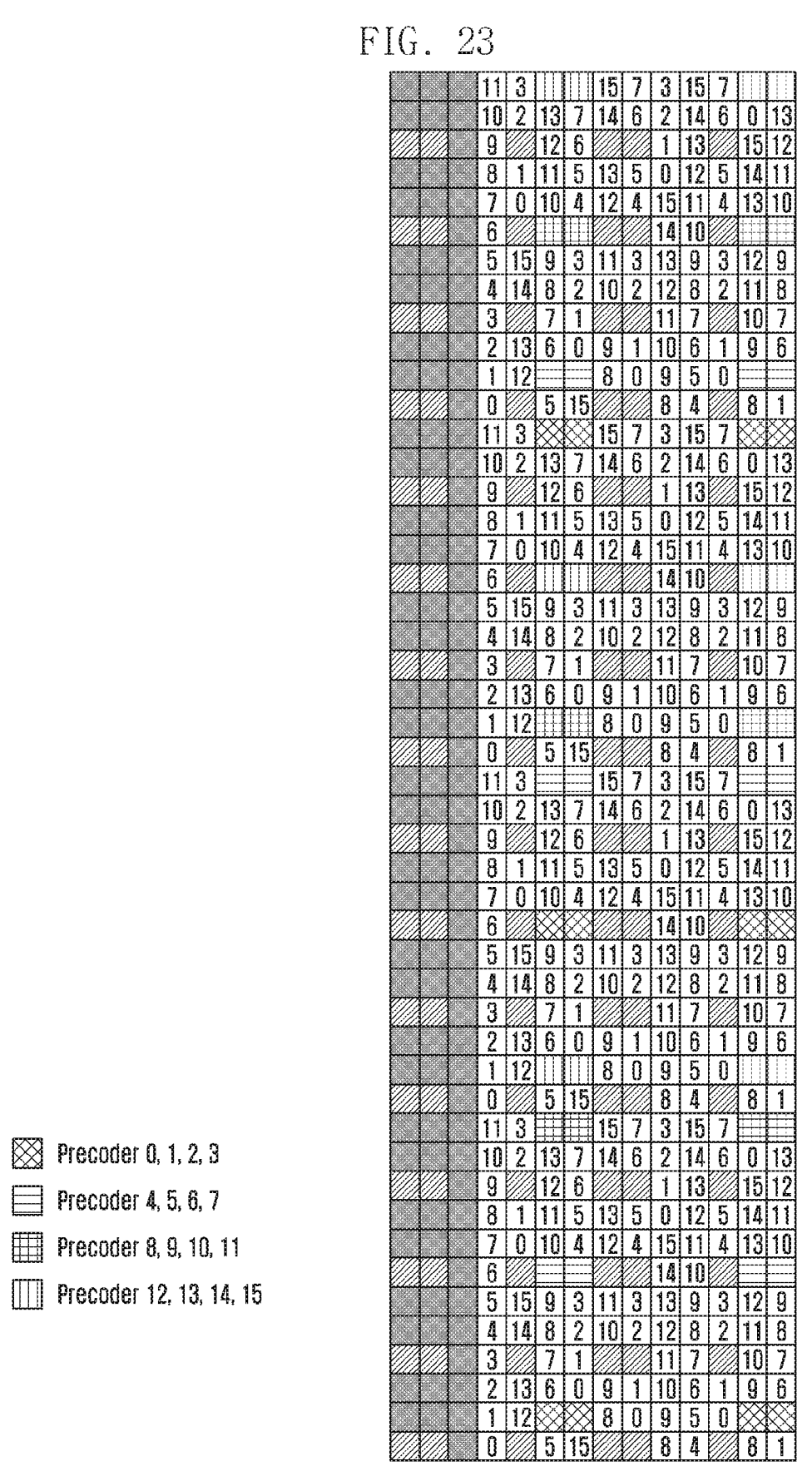

FIG. 23 is a diagram illustrating a method for dividing a DMRS port into four RB units and transmitting the DMRS port unlike the existing DMRS port structure.

As mentioned above, the existing DMRS is transmitted by occupying 12 REs based on three frequency positions and four time symbols in one RB for each port.

However, referring to FIG. 23, the DMRS is transmitted by dividing the location where one port is transmitted into 4 REs based on one frequency and four time symbols for each one RB to uniformly position the reference signal for the DMRS port transmission in the RB.

In this case, the channel estimation performance may be enhanced compared to that of FIG. 8, but the location of the channel estimation by the terminal is different from that of the existing 1 RB based structure, and as a result, new hardware is required. Similar to mapping methods 1 and 2 mentioned above, mapping method 3 may be arbitrarily applied and adopted under 9 to 16 cycling precoders.

Embodiment 2-3

The aforementioned mapping of the RE and the DMRS port may be transmitted in rank 1 transmission, but a port mapping method needs to be additionally defined in order to estimate the precoded channel for an additional layer in rank 2. In this case, the port mapping for the additional layer may be solved by defining an offset for the DMRS port mapping in the corresponding RE.

In config 2, 3, 4 of the current class A codebook, rank 2 is supported by using 8 beam combinations and 2 co-phasing in the beam group of rank 2. In this case, the combination may be divided into four beam combinations resulting from the same beam and different co-phasing and four beam combinations resulting from different beams.

When the beams are the same, beams orthogonal to four beams supported by one beam group are used.

The four beam combinations resulting from different beams may be configured by using a combination of (0,1), (2,3), (0,3), and (1,3)-th beams. Thus, the offset may be defined for each RE location to support the combination of the beams resulting from different beams. When OCC2 is used in the case of exemplification based on the beam combination, OCC2 may be used by connecting precoder 0 with port 7 and port 8, precoder 1 with port 9 and port 10, precoder 2 with port 7 and port 10, and precoder 3 with port 8 and port 10.

Similarly, when using OCC4, the DMRS port may be mapped as in (7,8), (11,13), (7,13), and (8,13) based on precoders 0 to 3. As another example, it may be assumed that the terminal reports co-phasing and it may be assumed that a beam orthogonal to the corresponding DMRS is immediately transmitted to the immediate next DMRS port.

For example, beam 7 is orthogonal to beam 8, beam 9 is orthogonal to beam 10, beam 11 is orthogonal to port 12, and beam 13 is orthogonal to port 14. When 8 beam combinations are all supported by such a method, port mapping may be defined as in (7,8), (9,10), (11,12), (13,14), (7,10), (7,14), and (9,14).

The port mapping may be directly defined in the standard based on the codebook and the offset or DMRS port combinations corresponding to 16 precoders may also be set in the RRC. Although only rank 2 has been described in the above example, the above example is applicable to all transmissions of rank 2 or more.

Further, in the above description, it is assumed that a different DMRS port is used for each RE, but it is also possible to use the same DMRS port. For example, when two DMRS ports are assumed, permutation is applied for each layer as in (7,8) for the first RE and (8,7) for the second RE. When the semi closed-loop transmission is configured, the terminal may apply the permutation for each layer as described above. Further, in the case of rank 3, the same principle may be applied to three REs as in (7,8,9), (8,9,7), and (9,7,8) and similarly, the same principle may be applied even to a higher rank.

Embodiment 2-4

For MU-MIMO transmission, it is also necessary to additionally transfer information on the port mapping to the terminal. In this case, when the semi closed-loop transmission is configured, the terminal may support only a low rank. In this case, the low rank may mean a rank having a value smaller than the rank which may be used by the terminal. For the MU-MIMO transmission, different precoders must be mapped to one RE for respective terminals. However, when the same port mapping is used, it is necessary to decode the PDSCH using the same precoder. Therefore, a method is required to use other precoders in the same RE by using additional information. Methods available for the MU-MIMO transmission are as follows.

MU-MIMO transmittable method 1 in semi closed-loop MIMO: Indicating the DMRS port start port and the terminal cycles the DMRS port based on the corresponding port MU-MIMO transmittable method 2 in semi closed-loop MIMO: Indicating the offset to the terminal and the terminal cycles the DMRS port after applying the corresponding offset to an original start port MU-MIMO transmittable method 3 in semi closed-loop MIMO: Dividing and using all available DMRS ports and indicating which DMRS port to be used.

MU-MIMO transmittable method 1

MU-MIMO transmittable method 1 is a method in which the start port is indicated to each terminal for the MU-MIMO transmission and the terminal circulates the DMRS based on the corresponding port. Table 9 shows an antenna port, a scrambling ID, and the number of layers indication for MU-MIMO.

TABLE 9

Antenna port(s), scrambling identity and number of layers indication

| One Codeword: Codeword 0 enabled Codeword 1 disabled | | Two Codewords: Codeword 0 enabled Codeword 1 enabled | |
| --- | --- | --- | --- |
| Value | Message | Value | Message |
| 0 | 1 layer, port 7, $n_{SCID}$ = 0 (OCC = 2) | 0 | 2 layer, port 7-8, $n_{SCID}$ = 0 (OCC = 2) |
| 1 | 1 layer, port 7, $n_{SCID}$ = 1 (OCC = 2) | 1 | 2 layer, port 7-8, $n_{SCID}$ = 1 (OCC = 2) |
| 2 | 1 layer, port 8, $n_{SCID}$ = 0 (OCC = 2) | 2 | 2 layer, port 7-8, $n_{SCID}$ = 0 (OCC = 4) |
| 3 | 1 layer, port 8, $n_{SCID}$ = 1 (OCC = 2) | 3 | 2 layer, port 7-8, $n_{SCID}$ = 1 (OCC = 4) |
| 4 | 1 layer, port 7, $n_{SCID}$ = 0 (OCC = 4) | 4 | 2 layer, port 11, 13, $n_{SCID}$ = 0 (OCC = 4) |
| 5 | 1 layer, port 7, $n_{SCID}$ = 1 (OCC = 4) | 5 | 2 layer, port 11, 13, $n_{SCID}$ = 1 (OCC = 4) |
| 6 | 1 layer, port 8, $n_{SCID}$ = 0 (OCC = 4) | 6 | 3 layer, port 7-9 |
| 7 | 1 layer, port 8, $n_{SCID}$ = 1 (OCC = 4) | 7 | 4 layer, port 7-10 |
| 8 | 1 layer, port 11, $n_{SCID}$ = 0 (OCC = 4) | 8 | 5 layer, port 7-11 |
| 9 | 1 layer, port 11, $n_{SCID}$ = 1 (OCC = 4) | 9 | 6 layer, port 7-12 |
| 10 | 1 layer, port 13, $n_{SCID}$ = 0 (OCC = 4) | 10 | 7 layers, ports 7-13 |
| 11 | 1 layer, port 13, $n_{SCID}$ = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Using fields of Table 9, the terminal may be allocated with the DMRS port and perform an MU-MIMO operation with the DMRS port as the starting point.

As an example, when the terminal is indicated with rank 1 port 11 and a DMRS cycling order is 7-8-11-13, the corresponding terminal may cycle and use the DMRS as in 11-13-7-8.

Through the DMRS port indication as described above, the terminal may indicate OCC 2 and OCC 4-based DMRS port cycling differently.

For values 0, 1, 2, and 3 for codeword 1 above, 1 layer port 7 and port 8 are shown. In this case, for the value 0 or 1, the terminal decodes the PDSCH in order of ports 7 and 8 in the corresponding PDSCH decoding.

Unlike this, for the values 2 and 3, the terminal decodes the PDSCH in order of ports 8 and 7. In this case, the corresponding DMRS may be based on OCC2, and selection of the DMRS is left to terminal implementation, and OCC=2 may not be clearly expressed.

In the case of values 4 to 11, the terminal may make the DMRS port applied to the PDSCH for each RE to be different as in (ports 7, 8, 11, and 13), (ports 8, 11, 13, and 7), (ports 11, 13, 7, and 8) and (port 13, 7, 8, 11) according to the corresponding indicated value. In this case, it is possible to support closed-loop transmission instead of the semi closed-loop transmission in a partial index instead of applying all of the above tables for the semi closed-loop transmission.

For example, there is a method that supports OCC 2-based spatial multiplexing when values 0 to 3 of codeword 1 are indicated and OCC 4-based semi closed-loop transmission is supported when values 4 to 11 are indicated.

Such a method has an advantage that OCC 2 is relatively strong in high-speed movement of the terminal to support better channel estimation performance.

Conversely, in such a method, it is also possible to support the semi closed-loop transmission for OCC2 and the closed-loop transmission for OCC4 and in this case, it is advantageous in that the MU-MIMO may be transmitted by using more orthogonal DMRS ports.

In the above example, only the DMRS port which starts for the semi-circle loop indication is illustrated, but all the DMRS ports may be expressed. For example, 1 layer port 7 may be expressed as 1 layer cycling of ports 7 and 8, 1 layer cycling of port 7, 8, 11, and 13 (OCC=4). Similarly when a starting port is 8, the starting port of 8 may be expressed 1 layer cycling of ports 8 and 7, and 1 layer cycling of ports 8, 11, 13, and 7 (OCC=4).

MU-MIMO Transmittable Method 3

MU-MIMO transmission method 2 is a method for transmitting the offset to each terminal through the DCI for the MU-MIMO transmission.

The aforementioned port allocation is used for SU-MIMO and is not required for the MU-MIMO transmission. This is due to a feature of closed-loop MIMO in which the precoder corresponding to a group indicated by the terminal is cycled in the SU-MIMO. Therefore, the port allocation may be used differently from the existing method for use in the MU-MIMO transmission.

A condition in which a port allocation table different from the existing table may be configured through the RRC or configured through a method such as a configuration of TM for supporting the closed-loop MIMO and it is possible to transfer the offset by using additional DCI 1 bit.

In this case, by transferring the rank and offset to the terminal using the corresponding DCI, the terminal may check what the precoder or DMRS port corresponding to the first RE is and then, apply the precoder for each RE in the order. In this case, the DCI may be configured 3 bits or 4 bits, for example, 3 bits for Rel-12 DMRS DCI and 4 bits for Rel-13 DMRS DCI.

These offset may also be defined based on a precoder index or RE location and also be defined based on the DMRS port. When offset 4 is transferred when the offset is defined based on the precoder index or RE location, first, DMRS mapping is applied by recognizing corresponding RE location 0 or precoder 0 as RE location 4 or precoder 4 and when the DMRS port based offset is allocated, the number of first RE, which corresponds to the offset corresponds to the offset is added in #7-based DMRS port mapping, and as a result, it may be considered that precoder 4 starts with #11 DMRS port mapping.

MU-MIMO Transmittable Method 3

In MU-MIMO transmittable method 3, all DMRS ports are divided and used by the number of terminals corresponding to the MU-MIMO transmission.

As an example, when DMRSs 7, 8, 9, 10, 11, 12, 13, and 14 which are OCC4 are used for two semi closed-loop MIMO of the terminal, DMRSs 7, 8, 9, 10, 11, 12, 13, and 14 are divided in half and DMRSs 7, 8, 11, and 13 are allocated to terminal 0 and DMRSs 9, 10, 12, and 14 are to terminal 1.

In this case, as a method for determining the number of terminals, a method for defining the number of terminals in the standard in advance, a method for setting the number of terminals through the RRC, and a method for dynamically indicating the number of terminals may be used.

In the method for defining the number of terminals in the standard in advance, for example, the number of persons allocated to the terminal is determined as two in the standard. In this case, it is not necessary to transfer the number of scheduled terminals through the DCI for indicating the DMRS or it is possible to design the DCI by reflecting that it is not necessary to transfer the number of scheduled terminals in a DCI design stage.

For example, when the number of terminals is determined as two, in the case where ranks 1 and 7 are allocated, the corresponding terminal may cycle the precoders in order of 7, 8, 11, and 13 and in the case where ranks 1 and 9 are allocated, the corresponding terminal may cycle the precoders in order of 9, 10, 12, and 14.

In the method for setting the number of terminals through the RRC, it is configured in how many terminals the MU-MIMO is made through the RRC. Thus, the DCI table for the DMRS indicated by the base station may be changed to a table designed for the number of corresponding terminals.

In the method for dynamically allocating persons, it is specified how many persons are allocated to the terminal by giving an indirectly specified field or individual fields in the DMRS DCI table. As an example, when the number of persons is two, the precoders may be divided and used as in 7-8-11-13 and 9-10-12-14 and when the number of persons is four, the precoders may be divided and used as in 7-8, 11-13, 9-10, and 12-14. When this is applied to four DMRS ports, the precoder may be divided and used into 7-8 and 11-13 and supported by using the DMRS indication field like the example of Table 10 below.

TABLE 10

Antenna port(s), scrambling identity and number of layers indication

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, 8 nSCID = 0 (OCC = 2) | 0 | 2 layer, port 7-8, nSCID = 0 (OCC = 2) |
| 1 | 1 layer, port 7, 8 nSCID = 1 (OCC = 2) | 1 | 2 layer, port 7-8, nSCID = 1 (OCC = 2) |
| 2 | 1 layer, port 8, 7 nSCID = 0 (OCC = 2) | 2 | 2 layer, port 8-7, nSCID = 0 (OCC = 2) |
| 3 | 1 layer, port 8, 7 nSCID = 1 (OCC = 2) | 3 | 2 layer, port 8-7, nSCID = 1 (OCC = 2) |
| 4 | 1 layer, port 7, 8 (OCC = 4) | 4 | 2 layer, port 7, 8, 11, 13 (OCC = 4) |
| 5 | 1 layer, port 8, 7 (OCC = 4) | 5 | 2 layer, port 8, 11, 13, 7 (OCC = 4) |
| 6 | 1 layer, port 11, 13 (OCC = 4) | 6 | 2 layer, port 11, 13, 7, 8 (OCC = 4) |
| 7 | 1 layer, port 13, 11 (OCC = 4) | 7 | 2 layer, port 13, 7, 8, 11 (OCC = 4) |

In addition, the DMRS indication table for the semi closed-loop transmission may support a lower rank than existing table. Since the semi closed-loop transmission has high mobility, the channel status report is used for relatively inaccurate terminals, and it may be difficult for such terminals to support a high rank. Therefore, it is possible to effectively transmit the DCI by reducing the overhead for DCI transmission by supporting only a low rank to the terminal. Tables 11 to 15 below illustrate the DMRS indication table when the rank is limited to 2.

TABLE 11

Antenna port(s), scrambling identity and number of layers indication

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, 8 nSCID = 0 (OCC = 2) | 0 | 2 layer, port 7-8, nSCID = 0 (OCC = 2) |
| 1 | 1 layer, port 7, 8 nSCID = 1 (OCC = 2) | 1 | 2 layer, port 7-8, nSCID = 1 (OCC = 2) |
| 2 | 1 layer, port 8, 7 nSCID = 0 (OCC = 2) | 2 | 2 layer, port 8-7, nSCID = 0 (OCC = 2) |
| 3 | 1 layer, port 8, 7 nSCID = 1 (OCC = 2) | 3 | 2 layer, port 8-7, nSCID = 1 (OCC = 2) |
| 4 | 1 layer, port 7, 8, 11, 13 (OCC = 4) | 4 | 2 layer, port 7, 8, 11, 13 (OCC = 4) |
| 5 | 1 layer, port 8, 11, 13, 7 (OCC = 4) | 5 | 2 layer, port 8, 11, 13, 7 (OCC = 4) |
| 6 | 1 layer, port 11, 13, 7, 8 (OCC = 4) | 6 | 2 layer, port 11, 13, 7, 8 (OCC = 4) |
| 7 | 1 layer, port 13, 7, 8, 11 (OCC = 4) | 7 | 2 layer, port 13, 7, 8, 11 (OCC = 4) |

TABLE 12

Antenna port(s), scrambling identity and number of layers indication (a)

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7 nSCID = 0 (OCC = 2) | 0 | 2 layer, port 7, 8, nSCID = 0 (OCC = 2) |
| 1 | 1 layer, port 7 nSCID = 1 (OCC = 2) | 1 | 2 layer, port 7, 8, nSCID = 1 (OCC = 2) |
| 2 | 1 layer, port 8 nSCID = 0 (OCC = 2) | 2 | 2 layer, port 8, 7, nSCID = 0 (OCC = 2) |
| 3 | 1 layer, port 8 nSCID = 1 (OCC = 2) | 3 | 2 layer, port 8, 7, nSCID = 1 (OCC = 2) |
| 4 | 1 layer, port 7 (OCC = 4) | 4 | 2 layer, port 7-8 (OCC = 4) |
| 5 | 1 layer, port 8 (OCC = 4) | 5 | 2 layer, port 8-7, (OCC = 4) |
| 6 | 1 layer, port 11 (OCC = 4) | 6 | 2 layer, port 11, 13 (OCC = 4) |
| 7 | 1 layer, port 13 (OCC = 4) | 7 | 2 layer, port 13, 11 (OCC = 4) |

(b)

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7 nSCID = 0 (OCC = 2) | 0 | 2 layer, port 7-8, nSCID = 0 (OCC = 2) |
| 1 | 1 layer, port 7 nSCID = 1 (OCC = 2) | 1 | 2 layer, port 7-8, nSCID = 1 (OCC = 2) |

TABLE 12-continued

| | One Codeword | | Two Codewords |
|---|---|---|---|
| 2 | 1 layer, port 8, nSCID = 0 (OCC = 2) | 2 | 2 layer, port 8-7, nSCID = 0 (OCC = 2) |
| 3 | 1 layer, port 8, nSCID = 1 (OCC = 2) | 3 | 2 layer, port 8-7, nSCID = 1 (OCC = 2) |
| 4 | 1 layer, port 7 (OCC = 4) | 4 | 2 layer, port 7, 11 (OCC = 4) |
| 5 | 1 layer, port 8 (OCC = 4) | 5 | 2 layer, port 11, 7 (OCC = 4) |
| 6 | 1 layer, port 11 (OCC = 4) | 6 | 2 layer, port 8, 13 (OCC = 4) |
| 7 | 1 layer, port 13 (OCC = 4) | 7 | 2 layer, port 13, 8 (OCC = 4) |

TABLE 13

Antenna port(s), scrambling identity and number of layers indication (a)

| | One Codeword: Codeword 0 enabled, Codeword 1 disabled | | Two Codewords: Codeword 0 enabled, Codeword 1 enabled |
|---|---|---|---|
| Value | Message | Value | Message |
| 0 | 1 layer, port 7, nSCID = 0 (OCC = 2) | 0 | 2 layer, port 7-8, nSCID = 0 (OCC = 2) |
| 1 | 1 layer, port 7, nSCID = 1 (OCC = 2) | 1 | 2 layer, port 7-8, nSCID = 1 (OCC = 2) |
| 2 | 1 layer, port 8, nSCID = 0 (OCC = 2) | 2 | 2 layer, port 7-8, nSCID = 0 (OCC = 4) |
| 3 | 1 layer, port 8, nSCID = 1 (OCC = 2) | 3 | 2 layer, port 7-8, nSCID = 1 (OCC = 4) |
| 4 | 1 layer, port 7, nSCID = 0 (OCC = 4) | 4 | 2 layer, port 8-7, nSCID = 0 (OCC = 2) |
| 5 | 1 layer, port 7, nSCID = 1 (OCC = 4) | 5 | 2 layer, port 8-7, nSCID = 1 (OCC = 2) |
| 6 | 1 layer, port 8, nSCID = 0 (OCC = 4) | 6 | 2 layer, port 8-7, nSCID = 0 (OCC = 4) |
| 7 | 1 layer, port 8, nSCID = 1 (OCC = 4) | 7 | 2 layer, port 8-7, nSCID = 1 (OCC = 4) |
| 8 | 1 layer, port 11, nSCID = 0 (OCC = 4) | 8 | 2 layer, port 11, 13, nSCID = 0 (OCC = 4) |
| 9 | 1 layer, port 11, nSCID = 1 (OCC = 4) | 9 | 2 layer, port 11, 13, nSCID = 1 (OCC = 4) |
| 10 | 1 layer, port 13, nSCID = 0 (OCC = 4) | 10 | 2 layer, port 13, 11, nSCID = 0 (OCC = 4) |
| 11 | 1 layer, port 13, nSCID = 1 (OCC = 4) | 11 | 2 layer, port 13, 11, nSCID = 1 (OCC = 4) |
| 12 | 2 layers, ports 7-8 | 12 | 3 layer, port 7-9 |
| 13 | Reserved | 13 | 4 layer, port 7-10 |
| 14 | Reserved | 14 | Reserved |
| 15 | Reserved | 15 | Reserved |

(b)

| | One Codeword: Codeword 0 enabled, Codeword 1 disabled | | Two Codewords: Codeword 0 enabled, Codeword 1 enabled |
|---|---|---|---|
| Value | Message | Value | Message |
| 0 | 1 layer, port 7, nSCID = 0 (OCC = 2) | 0 | 2 layer, port 7-8, nSCID = 0 (OCC = 2) |
| 1 | 1 layer, port 7, nSCID = 1 (OCC = 2) | 1 | 2 layer, port 7-8, nSCID = 1 (OCC = 2) |
| 2 | 1 layer, port 8, nSCID = 0 (OCC = 2) | 2 | 2 layer, port 8-7, nSCID = 0 (OCC = 2) |
| 3 | 1 layer, port 8, nSCID = 1 (OCC = 2) | 3 | 2 layer, port 8-7, nSCID = 1 (OCC = 2) |
| 4 | 1 layer, port 7, nSCID = 0 (OCC = 4) | 4 | 2 layer, port 7-8, nSCID = 0 (OCC = 4) |

TABLE 13-continued

Antenna port(s), scrambling identity and number of layers indication

| 5 | 1 layer, port 7, nSCID = 1 (OCC = 4) | 5 | 2 layer, port 7-8, nSCID = 1 (OCC = 4) |
|---|---|---|---|
| 6 | 1 layer, port 8, nSCID = 0 (OCC = 4) | 6 | 2 layer, port 8-7, nSCID = 0 (OCC = 4) |
| 7 | 1 layer, port 8, nSCID = 1 (OCC = 4) | 7 | 2 layer, port 8-7, nSCID = 1 (OCC = 4) |
| 8 | 1 layer, port 11, nSCID = 0 (OCC = 4) | 8 | 2 layer, port 11, 13, nSCID = 0 (OCC = 4) |
| 9 | 1 layer, port 11, nSCID = 1 (OCC = 4) | 9 | 2 layer, port 11, 13, nSCID = 1 (OCC = 4) |
| 10 | 1 layer, port 13, nSCID = 0 (OCC = 4) | 10 | 2 layer, port 13, 11, nSCID = 0 (OCC = 4) |
| 11 | 1 layer, port 13, nSCID = 1 (OCC = 4) | 11 | 2 layer, port 13, 11, nSCID = 1 (OCC = 4) |
| 12 | 2 layers, ports 7-8 | 12 | 3 layer, port 7-9 |
| 13 | Reserved | 13 | 4 layer, port 7-10 |
| 14 | Reserved | 14 | Reserved |
| 15 | Reserved | 15 | Reserved |

TABLE 14

Antenna port(s), scrambling identity and number of layers indication (a)

| | One Codeword: Codeword 0 enabled, Codeword 1 disabled | | Two Codewords: Codeword 0 enabled, Codeword 1 enabled |
|---|---|---|---|
| Value | Message | Value | Message |
| 0 | 1 layer, port 7, 8 nSCID = 0 (OCC = 2) | 0 | 2 layer, port 7-8, nSCID = 0 (OCC = 2) |
| 1 | 1 layer, port 7, 8 nSCID = 1 (OCC = 2) | 1 | 2 layer, port 7-8, nSCID = 1 (OCC = 2) |
| 2 | 1 layer, port 8, 7 nSCID = 0 (OCC = 2) | 2 | 2 layer, port 8-7, nSCID = 0 (OCC = 2) |
| 3 | 1 layer, port 8, 7 nSCID = 1 (OCC = 2) | 3 | 2 layer, port 8-7, nSCID = 1 (OCC = 2) |
| 4 | Reserved | 4 | Reserved |
| 5 | Reserved | 5 | Reserved |
| 6 | Reserved | 6 | Reserved |
| 7 | Reserved | 7 | Reserved |

(b)

| | One Codeword: Codeword 0 enabled, Codeword 1 disabled | | Two Codewords: Codeword 0 enabled, Codeword 1 enabled |
|---|---|---|---|
| Value | Message | Value | Message |
| 0 | 1 layer, port 7 nSCID = 0 (OCC = 2) | 0 | 2 layer, port 7, 8, nSCID = 0 (OCC = 2) |
| 1 | 1 layer, port 7 nSCID = 1 (OCC = 2) | 1 | 2 layer, port 7, 8, nSCID = 1 (OCC = 2) |
| 2 | 1 layer, port 8 nSCID = 0 (OCC = 2) | 2 | 2 layer, port 8, 7, nSCID = 0 (OCC = 2) |
| 3 | 1 layer, port 8 nSCID = 1 (OCC = 2) | 3 | 2 layer, port 8, 7, nSCID = 1 (OCC = 2) |
| 4 | Reserved | 4 | Reserved |
| 5 | Reserved | 5 | Reserved |
| 6 | Reserved | 6 | Reserved |
| 7 | Reserved | 7 | Reserved |

TABLE 15

Antenna port(s), scrambling identity and number of layers indication (a)

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, 8 nSCID = 0 (OCC = 2) | 0 | 2 layer, port 7-8, nSCID = 0 (OCC = 2) |
| 1 | 1 layer, port 7, 8 nSCID = 1 (OCC = 2) | 1 | 2 layer, port 7-8, nSCID = 1 (OCC = 2) |
| 2 | 1 layer, port 8, 7 nSCID = 0 (OCC = 2) | 2 | 2 layer, port 8-7, nSCID = 0 (OCC = 2) |
| 3 | 1 layer, port 8, 7 nSCID = 1 (OCC = 2) | 3 | 2 layer, port 8-7, nSCID = 1 (OCC = 2) |

(b)

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7 nSCID = 0 (OCC = 2) | 0 | 2 layer, port 7, 8, nSCID = 0 (OCC = 2) |
| 1 | 1 layer, port 7 nSCID = 1 (OCC = 2) | 1 | 2 layer, port 7, 8, nSCID = 1 (OCC = 2) |
| 2 | 1 layer, port 8 nSCID = 0 (OCC = 2) | 2 | 2 layer, port 8, 7, nSCID = 0 (OCC = 2) |
| 3 | 1 layer, port 8 nSCID = 1 (OCC = 2) | 3 | 2 layer, port 8, 7, nSCID = 1 (OCC = 2) |

Embodiment 2-5

The definition of the existing PRG may be changed in order to perform the semi closed-loop MIMO transmission. Such a method is a method in which when the condition for the semi closed-loop MIMO transmission is satisfied, the terminal recognizes the condition and uses a different PRG from the existing open loop (when the PMI/RI report is not configured) or closed loop (when the PMI-RI report is configured).

When the PMI/RI report is not configured as described above, the terminal performs decoding by assuming a precoding application unit as one RB and when the PMI/RI report is configured, the precoding application unit is assumed according to the number of PRBs defined according to the system bandwidth through Table 4.

The reason is that a TDD system that may find the downlink channel using the uplink reference signal (SRS, etc.) using channel reciprocity in the open loop may freely find the channel state information through the reference signal unlike an FDDM system that requires the PMI report to obtain the precoding information required for the downlink channel.

In order to expand the diversity gain mentioned in Tables 7 and 8 and to allow different precoder estimation for each beam in the semi closed-loop transmission, one RB-based PRG size that is smaller than the existing PRB bundling and is not PRB-bundled may be permitted even in the semi closed-loop transmission. Further, conversely, in order to improve the performance of the DMRS, it is possible to improve the DMRS channel estimation performance by allowing the terminal to use the entire allocated PRB or the PRG having a larger size. To this end, the PRG may be defined by the following methods.

PRG unit definition method 1 for semi closed-loop transmission: Assuming the allocated full band as the same precoding by the terminal PRG unit definition method 2 for semi closed-loop transmission: Defining and using the different PRG unit from the existing open loop/closed loop PRG unit definition method 1

The first PRG unit definition method is a method in which the terminal assumes the allocated full band as the same precoding. The terminal may dynamically receive downlink resource information, MCS, the number of DMRSs required for transmission through the downlink DCI for downlink data transmission. The terminal is allocated to assume that the same precoding is transmitted to each of the DMRS ports of the full bandwidth allocated to the terminal. Although such a method may improve the DMRS estimation performance, it is impossible to apply different precoding to each frequency, thereby improving the performance and therefore, and as a result, it is impossible to improve the performance through such a method.

PRG Unit Definition Method 2

The second method of defining the PRG unit is to use a lower or higher number of PRGs to the existing method in order to allow precoding for each subband to be partially applied.

A first method for the above method is a method that fixes the number of PRG to a specific number. When the semi closed-loop channel status report and the DMRS port cycling are supported, only one RB that does not support PRB bundling may be used. In addition, the different PRG bundling size from the existing size may be pre-designated in the standard to be used proportionally to the system bandwidth. Tables 16 and 17 are examples of the PRG definition.

Table 16 shows that the PRG size of a smaller number than the existing PRG size to allow the terminal to obtain high diversity.

Table 17 shows that PRBs which are twice as many PRBs as the existing PRG may be transmitted through the same precoding, allowing a higher PRG to be used when the system bandwidth is 100 RB.

100 RB has fewer PRGs than 50 RBs in the existing table and the semi closed-loop may not achieve higher performance using a lower PRG despite a higher bandwidth, and as a result, the corresponding table may be used.

TABLE 16

PRG definition example 1 for smaller size of PRG in semi closed-loop

| System Bandwidth ($N_{RB}^{DL}$) | PRG Size (P') (PRBs) |
|---|---|
| ≤10 | 1 |
| 11-26 | 1 |
| 27-63 | 2 |
| 64-110 | 2 |

TABLE 17

PRG definition example 2 for larger size of PRG in semi closed-loop

| System Bandwidth ($N_{RB}^{DL}$) | PRG Size (P') (PRBs) |
|---|---|
| ≤10 | 2 |
| 11-26 | 4 |
| 27-63 | 6 |
| 64-110 | 6 |

In addition, such loop transmission and the channel status reporting, and transmission based on PRGs of different sizes may be performed based on the following methods.

Semi closed-loop configuration method 1: Transferred through the DCI

Semi closed-loop configuration method 2: Transfer through DCI format transmission to announce the semi closed-loop transmission Semi closed-loop configuration method 3: Indirectly configured through a transmission mode (TM) to support the semi closed-loop channel status reporting and transmission Semi closed-loop configuration method 4: Indirectly configured through a DMRS table configuration to support the semi closed-loop Semi closed-loop configuration method 5: Indirectly configured through a channel status reporting mode configuration to support the semi closed-loop Semi closed-loop configuration method 6: Configured through a direct RRC field configuration Semi Closed-Loop Configuration Method 1

A first method for configuring the semi closed-loop is a method for dynamically configuring the semi closed-loop through the DCI field. The base station dynamically transfers downlink resource information, MCS, the number of DMRSs required for transmission through the downlink DCI for downlink data transmission. According to the first method, the base station may announce the corresponding configuration by adding 1 bit at the time of DCI transmission.

Such a method is advantageous in that the PRG unit may be dynamically informed to the terminal so that the DMRS channel estimation performance may be improved even in an open loop or closed loop operation instead of a semi closed-loop operation.

Further, as mentioned above, the DCI may be transferred through indirect 1 bit rather than direct 1 bit.

Semi Closed-Loop Configuration Method 2

A second method for configuring the semi closed-loop is a method that uses the DCI format to announce the semi closed-loop transmission.

A DCI format (for example, DCI format 2E) different from the existing DCI format may be used for the semi closed-loop loop transmission. In this case, when the terminal receives DCI format 2E during DCI decoding, the terminal may confirm that the semi closed loop is configured and recognize the use of the corresponding PRG and use the PRG.

The corresponding method is advantageous in that the semi closed-loop transmission may be supported only in the semi closed-loop operation, but the semi closed-loop transmission may not be supported in the operation other than the semi closed-loop operation as described and further, the number of PDCCH formats to be blind-decoded by the terminal may increase.

Semi Closed-Loop Configuration Method 3

A third method for configuring the semi closed-loop is a method for indirectly configuring the semi closed loop through the TM configuration to announce the semi closed-loop transmission.

In the LTE, the TM is a method for announcing through which method the base station performs transmission to the corresponding terminal and through such a method, the terminal may check whether the corresponding base station transmits the PDSCH based on the CRS or DMRS and which DCI format the corresponding base station uses.

Therefore, by defining the TM to announce the semi closed-loop transmission, it may be configured that the semi closed-loop is configured through the TM configuration.

Such a method has an advantage of not requiring additional DCI and RRC overhead, but has a disadvantage that the corresponding PRG change and the semi closed-loop channel status reporting and transmission may not be dynamically supported. Such a TM may be TM11 in addition to the existing TM10 supported in the LTE.

Semi Closed-Loop Configuration Method 4

A fourth method for configuring the semi closed-loop is a method for indirectly configuring the semi closed loop through the DMRS table configuration to support the semi closed-loop.

A method for announcing new DMRS port and layer transmission is required for the semi closed-loop transmission as mentioned above and may be configured through the RRC field. Therefore, when such an RRC field is configured, the method may be supported by automatically using the semi closed-loop transmission. Such a method also has an advantage that additional DCI and RRC overhead are not required.

Semi Closed-Loop Configuration Method 5

A fifth method for configuring the semi closed-loop is a method for supporting the semi closed-loop through the channel status reporting mode configuration to support the semi closed-loop.

The channel status reporting suitable for the corresponding situation is required for supporting the precoding transmission method for each RE mentioned above and the channel status reporting configuration may be announced to the terminal through the RRC. Therefore, when such a channel status reporting field is configured, PRG extension is automatically used to support the semi closed-loop.

Such a method also has the advantage that the additional DCI and RRC overhead are not required, but may not dynamically support the corresponding PRG extension.

Table 18 illustrates the RRC configuration to support the semi closed-loop.

TABLE 18

Example of configuration for semi-open-loop transmission

```
Semi-open-loop-r14 ::= CHOICE {
    release                         NULL,
    setup                           CHOICE {
        transparent-DMRS-r14            transparent-DMRS-r14,
        non-transparent-                non-transparent-
        DMRS-r14                        DMRS-r14
    }
}
```

In the above table, there may be two methods of transparent and non-transparent DMRS-based semi closed-loop transmission and when the transparent-DMRS is configured, the method of the present disclosure may be supported.

In addition, various configurations including OCC and the like may be additionally supported in the corresponding transparent-DMRS field.

Semi Closed-Loop Configuration Method 6

A sixth method for configuring the semi closed-loop is a method for configuring the semi closed-loop through an additional RRC field depending on the support of an RRC size.

By providing a separate field for the PRG size, it is possible to announce whether to support the semi closed-loop transmission, the channel staus reporting, and the PRG change when the base station supports a predetermined transmission operation to the terminal. Such a method does not require the DCI overhead, but requires RRC field overhead. Further, the PRG extension may not be dynamically supported.

Table 19 below illustrates a direct RRC field required for PRG size support and CDM configuration.

TABLE 19

Example of configuration for CDM type and PRG type

```
transparent-DMRS-r14 ::=   SEQUENCE {
   cdmType                 ENUMERATED {cdm2, cdm4},
   PRGtype                 ENUMERATED {singleRB, multiRB},
}
```

In the above example, when cdmType is cdm2, co-phases $\{1, -1\}$ and $\{j, -j\}$ may be used alternately for each PRG. PRGtype may be based one RB in case of single RB and based on a plurality of RBs in the case of multiRB. In this case, the plurality of RBs may be a value predetermined in the standard or a value that varies depending on the system bandwidth.

Further, as described above, the PRG may be continuously allocated or a method of using the scheduled PRG as the entire PRG may also be used.

In the present disclosure, the transmission, which is an intermediate stage between the open loop transmission and the closed loop transmission, is referred to as a semi-open loop and besides, the semi-open loop may be expressed by various methods including beam diversity, distributed transmission, and the like.

The embodiments of the present disclosure may be mixed with transmission based on various techniques including SFBC as well as a precoder cycling based semi closed-loop MIMO operation. For example, it is possible to support an SFBC-based semi closed-loop MIMO operation in rank 1 and support the precoder cycling-based semi closed-loop MIMO operation in rank 2.

Figure 24:
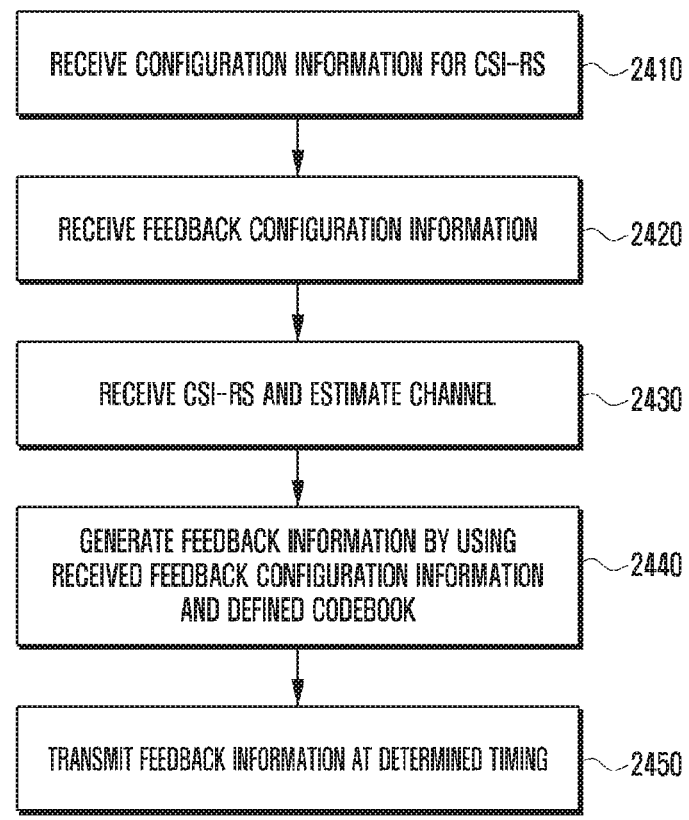
FIG. 24 is a flowchart illustrating an operation procedure of a UE according to an embodiment of the present disclosure.

FIG. 24 is a flowchart illustrating an operation procedure of a terminal according to an embodiment of the present disclosure.

Referring to FIG. 24, in step 2410, the terminal receives configuration information for an aperiodic CSI-RS configuration. Further, the terminal may check at least one of the number of ports for each NP CSI-RS, N1 and N2 which are the number of antennas for each dimension, O1 and O2 which are oversampling factors for each dimension, one subframe config for transmitting multiple CSI-RSs and a plurality of resource configs for configuring the position, codebook subset restriction related information, CSI report related information, a CSI-process index, and transmission power information, based on the received configuration information.

Thereafter, the terminal configures one feedback configuration information based on at least one 2, 4, 8 port CSI-RS position in step 2420. In the corresponding information, a period and an offset of the PMI/CQI, a period and an offset of the RI, a wideband or a subband, a submode, etc. may be configured.

When the terminal receives multiple CSI-RSs in one subframe based on the corresponding information in step 2430, the terminal may estimate a channel between the base station antenna and the receiving antenna of the terminal based on the received CSI-RSs. In this case, the terminal may estimate a channel status by assuming a precoder circulation in the RE level. The terminal may check the number of precoders using the above-described method and estimate the channel status by assuming the precoder circulation.

In step 2440, the terminal generates feedback information rank, PMI, and CQI using the received feedback configuration based on a virtual channel added between the estimated channel and the CSI-RS.

Thereafter, in step 2450, the terminal transmits the feedback information to the base station at predetermined feedback timing according to the feedback configuration of the base station, thereby completing a channel feedback generating and reporting process considering a two-dimensional array.

Further, the terminal may be configured with the semi closed-loop transmission (or semi open loop transmission) through the higher layer signaling (for example, RRC signaling).

Therefore, the terminal may estimate the channel status by assuming the cycling of the precoder using the number of precoders confirmed through the above-described method, report the estimated channel status to the base station, and receive data transmitted by the base station. In this case, the base station may transmit the DMRS through data applied by cycling the precoder for each RE and the DMRS port mapped for each precoder and the terminal may receive the DM-RS.

In this case, the terminal may receive information on the DMRS port mapping. That is, the base station may notify the terminal of the DMRS start port and cycle the DMRS port, notify the DMRS start port and offset, and cycle the DMRS port to which the corresponding offset is applied in the DMRS start port and divide and use the DMRS port. The detailed contents are the same as those described above.

Alternatively, the base station may use the same DMRS port instead of using a different DMRS port for each RE, but may apply the cycling for each layer and may receive the information from the terminal through the DMRS port mapping information.

Accordingly, the terminal may demodulate the precoded data through cycling for each RE by using the DMRS. The detailed contents are the same as those described above and are omitted below.

In addition, when the terminal is configured with the semi closed-loop transmission, the terminal may assume a precoding application unit according to the set number of PRGs. In this case, the terminal may be continuously allocated with the PRGs or may assume the scheduled PRG as the entire PRG. Specifically, a method for allocating the PRG is the same as the above-mentioned method, and will not be described below.

Further, although not shown in the flowchart, the terminal may apply the contents of the present disclosure described above during estimating the channel and receiving and demodulating the data.

Figure 25:
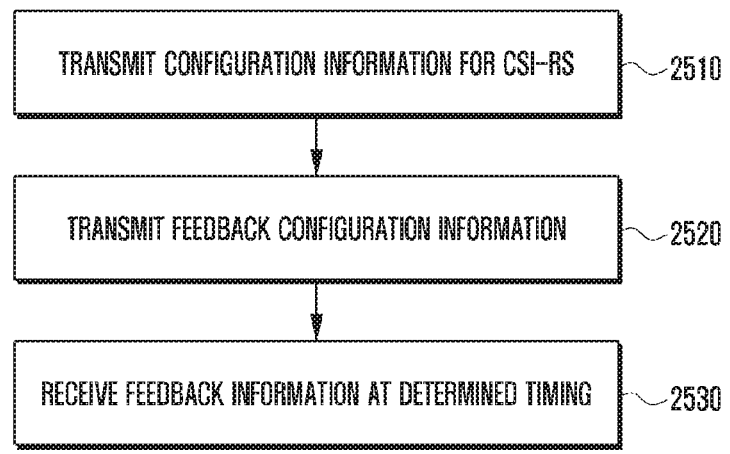
FIG. 25 is a flowchart illustrating the operation procedure of the base station according to an embodiment of the present disclosure.

FIG. 25 is a flowchart illustrating an operation procedure of the base station according to an embodiment of the present disclosure.

Referring to FIG. 25, in step 2510, the base station transmits the configuration information for the CSI-RS for measuring the channel to the terminal. The configuration information may include at least one of the number of ports for each NP CSI-RS, N1 and N2 which are the number of antennas for each dimension, O1 and O2 which are oversampling factors for each dimension, one subframe config for transmitting multiple CSI-RSs and a plurality of resource configs for configuring a position, codebook subset restriction related information, CSI report related information, a CSI-process index, and transmission power information.

Thereafter, the base station transmits the feedback configuration information based on at least one CSI-RS to the terminal in step 2520. In the corresponding information, the period and the offset of the PMI/CQI, the period and the offset of the RI, a wideband or a subband, the submode, etc. may be configured. Thereafter, the base station transmits the configured CSI-RS to the terminal. The terminal estimates the channel for each antenna port and estimates an additional channel for the virtual resource based on the estimated channel. The terminal decides the feedback, and generates the PMI, RI, and CQI corresponding thereto, and transmits the generated PMI, RI, and CQI to the base station.

Accordingly, the base station receives the feedback information from the terminal at a predetermined timing determined in step 2530 and uses the feedback information to determine the channel status between the terminal and the base station.

Further, the base station may configure the semi closed-loop transmission through the higher layer signaling (for example, RRC signaling).

Therefore, the terminal may estimate the channel status by assuming the cycling of the precoder using the number of precoders confirmed through the above-described method and the base station may receive the estimated channel status. In addition, the base station may transmit data to the terminal based on the channel estimation. In this case, the base station may transmit the DMRS through data applied by cycling the precoder for each RE and the DMRS port mapped for each precoder.

In this case, the base station may transmit the information on the DMRS port mapping. That is, the base station may notify the terminal of the DMRS start port and cycle the DMRS port, notify the DMRS start port and offset, and cycle the DMRS port to which the corresponding offset is applied in the DMRS start port and divide and use the DMRS port. The detailed contents are the same as those described above.

Alternatively, the base station may use the same DMRS port instead of using a different DMRS port for each RE, but may apply the cycling for each layer and may announce the information to the terminal through the DMRS port mapping information.

Accordingly, the terminal may demodulate the precoded data through cycling for each RE by using the DMRS. The detailed contents are the same as those described above and are omitted below.

In addition, when the terminal is configured with the semi closed-loop transmission (or semi open loop transmission), the terminal may assume the precoding application unit according to the set number of PRGs. In this case, the base station may be continuously allocated with the PRGs or may assume the scheduled PRG as the entire PRG. Specifically, the method for allocating the PRG is the same as the above-mentioned method, and will not be described below.

Further, although not shown in the flowchart, the terminal may apply the contents of the present disclosure described above during estimating the channel and receiving and demodulating the data.

Figure 26:
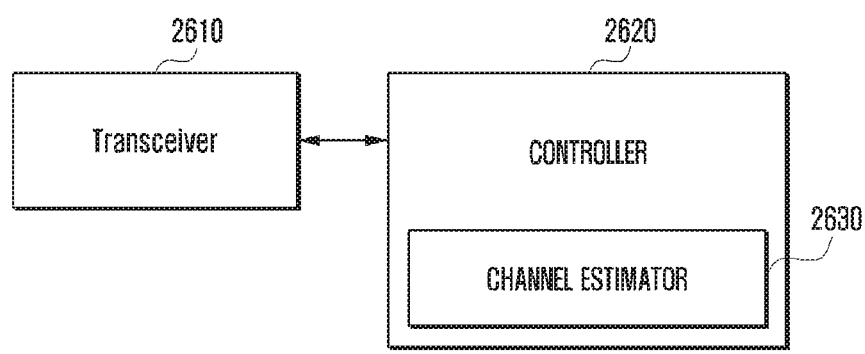
FIG. 26 is a block diagram illustrating an internal structure of a terminal according to an embodiment of the present disclosure.

FIG. 26 is a block diagram illustrating an internal structure of a terminal according to an embodiment of the present disclosure.

Referring to FIG. 26, the terminal includes a transceiver 2610 and a controller 2620.

The transceiver 2610 performs a function of transmitting or receiving data from the outside (e.g., a base station).

Herein, the transceiver 2610 may transmit feedback information to the base station under the control of the controller 2620.

The controller 2620 controls states and operations of all components constituting the terminal. Specifically, the controller 2620 may generate the feedback information according to information allocated from the base station.

In addition, the controller 2620 controls the transceiver 2610 to feed back generated channel information to the base station according to timing information allocated from the base station. To this end, the controller 2620 may include a channel estimator 2630. The channel estimator 2630 determines feedback information required through a CSI-RS and feedback allocation information received from the base station and estimates a channel by using the received CSI-RS based on the feedback information.

Further, a PDSCH is decoded by applying reference signal mapping in which a precoder is applied to a size and a rank of PRG and a DMRS port corresponding to PDSCH transmission described in the embodiment of the present disclosure based on a DCI transmitted by the base station. In FIG. 26, an example in which the terminal is constituted by the transceiver 2610 and the controller 2620 is described, but the present disclosure is not limited thereto and the terminal may further include various components according to functions performed in the terminal. For example, the terminal may further include a display unit for displaying a current state of the terminal, an input unit for inputting a signal such as function execution by a user, a storage unit for storing data generated in the terminal, and the like. Further, it is illustrated that the channel estimator 2630 is included in the controller 2620 as above, but the present disclosure is not necessarily limited thereto. The controller 2620 may control the transceiver 2610 to receive configuration information for each of at least one or more reference signal resources from the base station. Further, the controller 2620 may control the transceiver 2610 to measure the at least one reference signal and to receive the feedback configuration information for generating the feedback information according to the measurement result from the base station.

In addition, the controller 2620 may measure at least one reference signal received through the transceiver 2610 and generate the feedback information according to the feedback configuration information. The control unit 2620 may control the transceiver 2610 to transmit the generated feedback information to the base station at feedback timing according to the feedback configuration information. Further, the controller 2620 may receive a channel status indication-reference signal (CSI-RS) from the base station, generate the feedback information based on the received CSI-RS, and transmit the generated feedback information to the base station. In this case, the controller 2620 may select a precoding matrix for each antenna port group of the base station and further select one additional precoding matrix based on a relationship between antenna port groups of the base station.

Further, the controller 2620 may receive the CSI-RS from the base station, generate the feedback information based on the received CSI-RS, and transmit the generated feedback information to the base station. In this case, the controller 2620 may select one precoding matrix for all antenna port groups of the base station. Further, the controller 2620 may receive the feedback configuration information from the base station, receive the CSI-RS from the base station, generate the feedback information based on the received feedback configuration information and the received CSI-RS, and transmit the generated feedback information to the base station. In this case, the controller 2620 may receive the feedback configuration information corresponding to each antenna port group of the base station and additional feedback configuration information based on a relationship between the antenna port groups.

In addition, the controller 2620 may control all the operation of the terminal described above.

Figure 27:
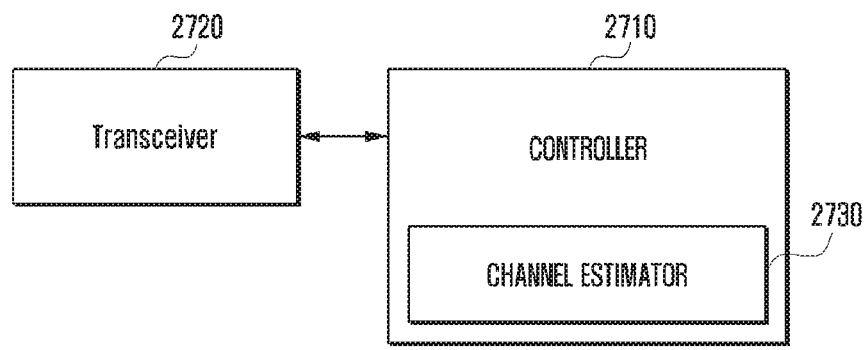
FIG. 27 is a flowchart illustrating the internal structure of the base station according to the embodiment of the present disclosure.

FIG. 27 is a block diagram illustrating an internal structure of the base station according to the embodiment of the present disclosure.

Referring to FIG. 27, the base station includes a controller 2710 and a transceiver 2720.

The controller 2710 controls the states and operations of all components constituting the base station. Specifically, the controller 2710 allocates CSI-RS resources for channel estimation of the terminal to the terminal and allocates feedback resources and feedback timing to the terminal. To this end, the controller 2710 may further include a resource allocator 2730. In addition, a feedback configuration and the feedback timing are allocated so as to prevent feedbacks from a plurality of terminals from colliding with each other and the feedback information configured at the corresponding timing is received and interpreted.

The transceiver 2720 performs a function of transmitting and receiving the data, the reference signal, and the feedback information to and from the terminal. Herein, the transceiver 2720 transmits the CSI-RS to the terminal through the allocated resources under the control of the controller 2710 and receives the feedback of the channel information from the terminal. Further, the terminal maps and transmits a reference signal obtained by applying the precoder to the corresponding DMRS port according to the embodiment of the present disclosure based on the rank, the PMI partial information, the CQI, and the like obtained from the transmitted channel state information.

It is illustrated that the channel allocator 2730 is included in the controller 2710 as above, but the present disclosure is not necessarily limited thereto. The controller 2710 may control the transceiver 2720 to transmit the configuration information for each of the at least one reference signal to the terminal or generate the at least one reference signal. Further, the controller 2710 may control the transceiver 2720 to transmit the feedback configuration information for generating the feedback information according to the measurement result to the terminal.

In addition, the controller 2710 may control the transceiver 2720 to transmit the at least one reference signal to the terminal and receive the feedback information transmitted from the terminal at the feedback timing according to the feedback configuration information.

Further, the controller 2710 may transmit the feedback configuration information to the terminal, transmit the CSI-RS to the terminal, and receive the feedback information generated based on the feedback configuration information and the CSI-RS from the terminal.

In this case, the controller 2710 may transmit the feedback configuration information corresponding to each antenna port group of the base station and the additional feedback configuration information based on the relationship between the antenna port groups. Further, the controller 2710 may transmit a CSI-RS beamformed based on the feedback information to the terminal and receive the feedback information generated based on the CSI-RS from the terminal. According to the embodiment of the present disclosure described above, it is possible to prevent allocation of excessive feedback resources to transmit the CSI-RS in a base station having a large number of transmitting antennas with a two-dimensional antenna array structure and an increase in channel estimation complexity, and the terminal may effectively measure all channels for a large number of transmitting antennas and configure the measured channels as the feedback information to report the feedback information to the base station.

In addition, the controller 2720 may control all the operation of the base station described above.

Embodiment 3

The embedment relates to a general wireless mobile communication system, and more particularly, to a method in which a terminal measures the wireless channel status and generates channel state information (CSI) based on the measured wireless channel status and reports the CSI to a base station in order to perform semi closed-loop transmission in a wireless mobile communication system adopting a multiple access scheme using multi-carriers, such as an orthogonal frequency division multiple access (OFDMA).

Meanwhile, ad described above, in FIG. 16, the CSI-RS can be transmitted using some of positions indicated by A, B, C, D, E, E, F, G, H, I, and J according to the number of antennas transmitting the CSI-RS. The muting can also be applied to some of the positions indicated by A, B, C, D, E, E, F, G, H, I, and J. In the base station up to LTE/LTE-A release 12, the CSI-RS may be transmitted in 2, 4, or 8 REs depending on the number of antenna ports transmitting the CSI-RS. When the number of antenna ports is one or two, the CSI-RS is transmitted to half of specific patterns in FIG. 16, when the number of antenna ports is four, the CSI-RS is transmitted to all of the specific patterns, and when the number of antenna ports is eight, the CSI-RS is transmitted by using two patterns.

The base station may announce the number of CSI-RS ports and CSI-RS Config. of Table 20 to the terminal through the higher layer signaling in order to notify through which pattern among the patterns the terminal is to receive the CSI-RS. The terminal may verify the CSI-RS pattern to be received by referring to Table 20 based on the number of CSI-RS ports and CSI-RS Config.

Meanwhile, the base station may additionally transmit the reference signal through the CSI-RS ports in addition to the {1, 2, 4, 8} CSI-RS ports. In this case, the {1, 2, 4, 8}-port CSI-RS follows the existing mapping rule and the {12, 16}-port CSI-RS is configured by a combination (aggregation) of 4 or 8-port CSI-RS patterns.

Referring to Table 21, the 12-port CSI-RS may be configured by a combination of three 4-port CSI-RS patterns and the 16-port CSI-RS may be configured by a combination of two 8-port CSI-RS patterns.

Further, the CDM-2 or CDM-4 may be supported by using OCC having a length of 2 or 4 with respect to the 12-/16-port CSI-RS.

The base station may announce to the terminal whether to use CSI-RS CDM-2 or CDM-4 through the higher layer signaling considering various factors including the channel status, CSI-RS power boosting, and the like.

Meanwhile, unlike the CSI-RS transmission using different types of patterns depending on the number of antenna ports, the muting is continuously performed by the unit of one pattern. That is, although the muting may be applied to a plurality of patterns, when the muting may not be applied to only a part of one pattern when the position of the muting does not overlap with the position of the CSI-RS. However, the muting may be applied only to a part of one pattern only when the position of the CSI-RS overlaps with the position of the muting. When the CSI-RSs are transmitted for two antenna ports, the signal of each antenna port is transmitted in two REs connected on the time axis in respect to the CSI-RS and the signal of each antenna port is divided as an orthogonal code. Further, when the CSI-RSs are transmitted for four antenna ports, signals for two antenna ports are additionally transmitted in the same manner by using two REs in addition to the CSI-RSs for two antenna ports. The same manner is applied when the CSI-RSs are transmitted for {8, 12, 16} antenna ports.

utilize the feedback information for downlink scheduling. That is, the terminal may measure the reference signal transmitted by the base station in the downlink and feed back information extracted from the reference signal to the base station in a form defined by the LTE/LTE-A standard. Three main types of information which the terminal feeds back in the LTE/LTE-A are described below.

Rank indicator (RI): The number of spatial layers which the terminal may receive in the current channel status

TABLE 20

Mapping from CSI reference signal configuration to (k', l') for normal cyclic prefix

| | Number of CSI reference signals configured | | | | | |
|---|---|---|---|---|---|---|
| | 1 or 2 | | 4 | | 8 | |
| CSI-RS | Normal subframe | Special subframe | Normal subframe | Special subframe | Normal subframe | Special subframe |
| config. | (k', l')  $n'_s$ | (k', l')  $n'_s$ | (k', l')  $n'_s$ | (k', l')  $n'_s$ | (k', l')  $n'_s$ | (k', l')  $n'_s$ |
| 0 | (9, 5)  0 | (9, 5)  0 | (9, 5)  0 | (9, 5)  0 | (9, 5)  0 | (9, 5)  0 |
| 1 | (11, 2)  1 | (11, 5)  0 | (11, 2)  1 | (11, 5)  0 | (11, 2)  1 | (11, 5)  0 |
| 2 | (9, 2)  1 | (9, 2)  1 | (9, 2)  1 | (9, 2)  1 | (9, 2)  1 | (9, 2)  1 |
| 3 | (7, 2)  1 | (7, 5)  0 | (7, 2)  1 | (7, 5)  0 | (7, 2)  1 | (7, 5)  0 |
| 4 | (9, 5)  1 | | (9, 5)  1 | | (9, 5)  1 | |
| 5 | (8, 5)  0 | (8, 5)  0 | (8, 5)  0 | (8, 5)  0 | | |
| 6 | (10, 2)  1 | (10, 5)  0 | (10, 2)  1 | (10, 5)  0 | | |
| 7 | (8, 2)  1 | (8, 2)  1 | (8, 2)  1 | (8, 2)  1 | | |
| 8 | (6, 2)  1 | (6, 5)  0 | (6, 2)  1 | (6, 5)  0 | | |
| 9 | (8, 5)  1 | | (8, 5)  1 | | | |
| 10 | (3, 5)  0 | (3, 5)  0 | | | | |
| 11 | (2, 5)  0 | (2, 5)  0 | | | | |
| 12 | (5, 2)  1 | (5, 5)  0 | | | | |
| 13 | (4, 2)  1 | (4, 5)  0 | | | | |
| 14 | (3, 2)  1 | (3, 2)  1 | | | | |
| 15 | (2, 2)  1 | (2, 2)  1 | | | | |
| 16 | (1, 2)  1 | (1, 5)  0 | | | | |
| 17 | (0, 2)  1 | (0, 5)  0 | | | | |
| 18 | (3, 5)  1 | | | | | |
| 19 | (2, 5)  1 | | | | | |
| 20 | (11, 1)  1 | | (11, 1)  1 | | (11, 1)  1 | |
| 21 | (9, 1)  1 | | (9, 1)  1 | | (9, 1)  1 | |
| 22 | (7, 1)  1 | | (7, 1)  1 | | (7, 1)  1 | |
| 23 | (10, 1)  1 | | (10, 1)  1 | | | |
| 24 | (8, 1)  1 | | (8, 1)  1 | | | |
| 25 | (6, 1)  1 | | (6, 1)  1 | | | |
| 26 | (5, 1)  1 | | | | | |
| 27 | (4, 1)  1 | | | | | |
| 28 | (3, 1)  1 | | | | | |
| 29 | (2, 1)  1 | | | | | |
| 30 | (1, 1)  1 | | | | | |
| 31 | (0, 1)  1 | | | | | |

TABLE 21

Aggregation of CSI-RS resources

| Total number of antenna ports $N_{res}^{CSI}N_{ports}^{CSI}$ | Number of antenna ports per resources $N_{ports}^{CSI}$ | Number of CSI-RS resources $N_{res}^{CSI}$ |
|---|---|---|
| 12 | 4 | 3 |
| 16 | 8 | 2 |

As described above, LTE/LTE-A supports closed-loop MIMO transmission and open-loop MIMO transmission according to whether PMI information at the receiver side is used when a transmission beam pattern is formed.

In the closed-loop transmission of the LTE/LTE-A system, the terminal feeds back information on the downlink channel status to the base station so that the base station can Precoder matrix indicator (PMI): Indicator for a precoding matrix which the terminal prefers in the current channel status Channel quality indicator (CQI): Maximum data rate which the terminal may receive in the current channel status The CQI can be replaced by a signal to interference plus noise ratio (hereinafter, referred to as SINR), a maximum error correction code rate and a modulation scheme, and data efficiency per frequency that can be utilized similar to the maximum data rate.

The RI, PMI, and CQI have meanings in association with each other. As one example, the precoding matrix supported by the LTE/LTE-A is defined differently for each rank. Therefore, a value of the PMI when the RI has a value of 1 and the value of the PMI when the RI has a value of 2 are interpreted differently even the values are the same. In addition, the terminal assumes that the rank value and the PMI value reported to the base station by the terminal are applied in the base station when deciding the CQI. That is, when the terminal reports RI_X, PMI_Y, and CQI_Z to the base station, the terminal can receive the data rate corresponding to the CQI_Z under the assumption that the rank is the RI_X and the precoding is the PMI_Y. As described above, the terminal assumes how the base station performs transmission at the time of calculating the CQI, thereby achieving optimized performance when actual transmission is performed in the corresponding transmission scheme.

In the LTE/LTE-A open-loop MIMO system, unlike the closed-loop MIMO system, the receiver side does not transmit PMI information to the transmitter side. Instead, the receiver of the open-loop MIMO system acquire supportable transmission rate by assuming precoding preconfigured by the scheme specified in the standard or the higher layer signal as precoding for the time and frequency space when generating the CQI according to the time and frequency resources and transfers the acquired transmission rate to the transmitter side through the CQI. The transmitter that receives the CQI from the receiver determines how the terminal needs to perform communication based on the corresponding information. The closed-loop MIMO transmission, which may adaptively use the channel information through the PMI reported by the terminal, exhibits excellent system performance in an environment in which a temporal variation of the channel is small. Meanwhile, PMI reporting overhead required for the closed loop MIMO transmission increases in proportion to the number of base station transmission antenna ports. When it is considered that there is a trend in which the number of base station transmission antenna ports increases for precise beamforming and interference management, or mmWave adoption, it may be inferred that the overhead for PMI reporting may be a bottleneck in the closed loop MIMO. Also, when the terminal moves at a very high speed, both a signal component (desired channel) and both an indirect component (interfering channel) of the channel may be rapidly changed. In this case, the performance of the closed loop MIMO transmission may be greatly degraded due to a problem such as a decrease in effectiveness of the PMI reported by the terminal or the like. On the contrary, the open-loop MIMO system has no overhead for the PMI reporting and has a characteristic to be resistant to a channel change due to a channel randomization effect. Meanwhile, since the open loop MIMO system of the LTE/LTE-A operates based on the CRS, only up to 4 antenna ports may be supported and it is impossible to utilize the PMI information at all.

As described above, the semi closed-loop MIMO transmission may be considered to strengthen the advantages and improve the disadvantages of the open loop MIMO transmission and the closed loop MIMO transmission. In the semi closed-loop MIMO, a part of the PMI preferred by the terminal may be first used for selecting a beam subset or a beam group. Thereafter, the base station may transmit the PDSCH in the form of a precoder cycling open loop MIMO transmission that precodes beams include in the selected beam group. It may be understood that the closed loop transmission scheme is applied to all channel directions in which the PMI is quantized and the open loop transmission scheme is applied when detailed precoding is applied.

Figure 28:
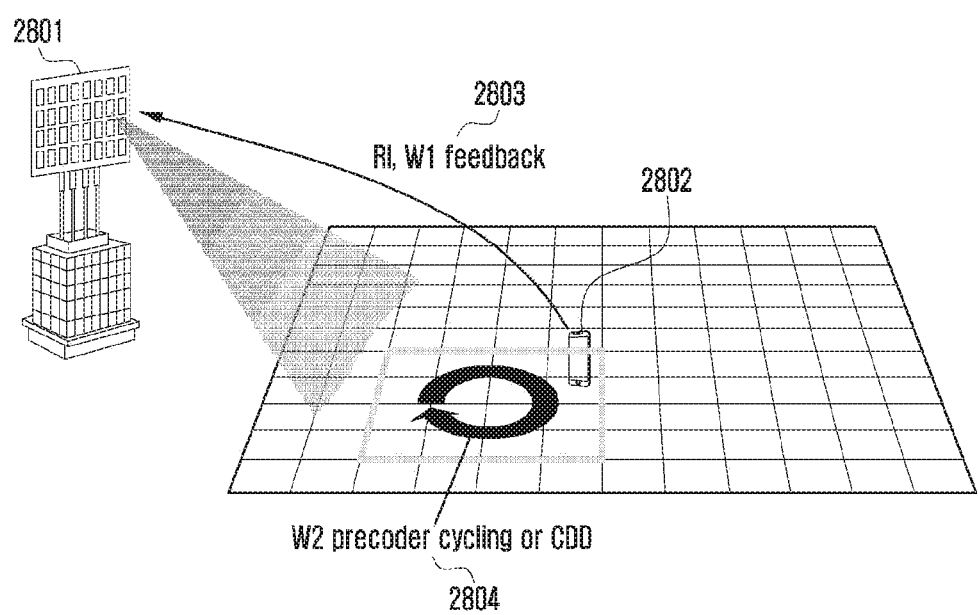
FIG. 28 is a diagram illustrating one example of semi closed-loop transmission.

FIG. 28 is a diagram illustrating one example of the semi closed-loop transmission.

Referring to FIG. 28, a terminal 302 may report a rank and a beam group preferred thereby to a base station 301 through an RI and first PMI i1 303. The base station may select a precoding vector (or matrix) for performing precoder cycling or CDD 304 based on the rank and the beam group and transmit a semi closed-loop based PDSCH.

The above example is not a unique example of the semi closed-loop transmission and a range of a reported PMI and a range of a cycled PMI may be different from i1 and i2. As an example, the i1 may mean one or more PMIs such as i11 or i12.

As described above, in FD-MIMO, N1, N2, O1, O1, and Codebook-Config are set, which indicate the number of antennas for each dimension and an oversampling factor of the corresponding dimension, and a form of the beam group in order to generate the codebook. In this case, i11 denotes a first PMI of a first dimension and indicates a beam group in a vertical (or horizontal) direction. i12 may denote the first PMI of a second dimension and indicate the beam group in the horizontal (or vertical) direction.

As another example, the terminal may report i11 corresponding to the first PMI of the first dimension and a portion of i2 corresponding to the corresponding dimension and the base station may cycle and use the PMI of the second dimension while the PMI of the corresponding dimension is fixed.

In this case, the use of the semi closed-loop MIMO may be different depending on whether the cycling unit is the RB or RE similarly to the existing method. As described above, FIG. 17 is a diagram illustrating a method for cycling precoding for each RE.

The performance of the semi closed-loop MIMO transmission is greatly influenced by the closed loop scheme and the open loop transmission scheme. For example, the performance of the semi closed-loop MIMO may vary depending on how many precoders are to be cycled in on cycling unit during the open loop transmission. For example, the performance may be different when the beam and corresponding co-phasing are all cycled in a beam group designated by one i1 or only the beam is cycled. FIG. 18 is a diagram illustrating a comparison between the performance when one precoded channel is supported for each layer in one RB and the performance when REs use different precoding for each layer in one RB and detailed contents are the same as described above.

Meanwhile, in codebooks up to release 13, a beam group is not designed considering a channel status of a high-mobility terminal. That is, when the semi closed-loop transmission is performed, the precoding matrix for the PMI transmitted by the terminal may not be confirmed using the codebook. In addition, in the case of newly introduced codebooks in the release 13, it is possible to configure the shape of the beam group differently based on the Codebook-Config, but it is difficult to adaptively adapt to a change in channel due to an operation based on higher layer signaling.

Accordingly, the present disclosure provides a concrete method for measuring the reference signal and generating and reporting the channel state information for the semi closed-loop transmission.

The present disclosure will be explained based on i1 as a first PMI and i2 a second PMI, but the present disclosure is also applicable to i11 and i12 structures used in class A codebook of Rel-13 FD-MIMO and besides, the present disclosure is applicable to all semi closed-loop MIMO structures in which the terminal reports only a part of i1 and a part of i2 and the base station cycles a part of the rest.

In order to support the semi closed-loop MIMO based on precoder cycling by the unit of RE described in FIG. 17, the terminal needs to transmit a part of the which is the channel state information and PMI, rank, CQI, PTI, CRI, etc. To this end, the assumption for the precoder is required and two methods are available.

Method 1: Case of using only precoder cycling as open loop precoding of the semi closed-loop MIMO Method 2: Case of using the precoder cycling and cyclic delay diversity (hereinafter, referred to as CDD) as the open loop precoding of the semi closed-loop MIMO In the case of Method 1 above, a relationship between precoder input vectors $x(i)=[x^{(0)}(i) \ldots x^{(\upsilon-1)}(i)]^T$ and $y(i)=[y^{(0)}(i) \ldots y^{(P-1)}(i)]^T$ may be expressed as shown in Equation 5 above and the detailed contents are omitted.

The relationship of $x(i)=[x^{(0)}(i) \ldots x^{(\upsilon-1)}(i)]^T$ and $y(i)=[y^{(0)}(i) \ldots y^{(P-1)}(i)]^T$ may be expressed by the following Equation 7.

$$\begin{bmatrix} y^{(0)}(i) \\ \vdots \\ y^{(P-1)}(i) \end{bmatrix} = W(i) \begin{bmatrix} x^{(0)}(i) \\ \vdots \\ x^{(\upsilon-1)}(i) \end{bmatrix} \quad <\text{Equation 7}>$$

In the case of Method 2 above, the relationship between precoder input vectors $x(i)=[x^{(0)}(i) \ldots x^{(\upsilon-1)}(i)]^T$ and $y(i)=[y^{(0)}(i) \ldots y^{(P-1)}(i)]^T$ may be expressed as shown in Equation 7 above

TABLE 22

D(i) and U depending on v and i

| Number of layers v | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 1 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

In Method 2, assuming Equation 3 above, the terminal selects the precoder based on the codebook configured by the base station. In this case, the precoder may be expressed as $w(i)=C_k$ and precoder index k may be expressed as shown in Equation 6 above according to symbol i. The detailed contents are the same as described above.

Based on the codebook configured by the base station, the precoder index k of Equation 6 may be set according to the precoder index definition method according to the semi closed-loop MIMO method and since the contents are the same as described above in detail, the contents will be described below.

As described above, the precoder index definition method for the semi closed-loop transmission may be variously modified depending on the environment such as the type of codebook and the precoder cycling method.

As described above, in the semi closed-loop transmission, the base station may be reported with a part of the codebook index from the terminal through precoder index definition methods 1 to 4 in order to determine the precoder indexes for the precoder cycling. This may be understood that one type of PMI (when a dual codebook structure is used after release 10, the one type of PMI may be constituted by two or more PMIs. For example, a first PMI, a second PMI, etc.) is processed and used in the semi closed-loop transmission.

For example, the one type of PMI may be referred to as a first PMI (i1) and may be expressed as a first PMI (i11) of the first dimension and a first PMI (i12) of the second dimension.

Meanwhile, it can be seen that the degree of freedom of the precoder cycling which may be obtained by processing the one type of PMI is limited by a beam group shape of the related codebook. This means that optimal performance may not be achieved when high mobility terminals are supported by performing the semi closed-loop transmission based on the codebooks up to release 13 designed considering channel characteristics of low-speed terminals.

In the case of newly introduced codebooks in release 13, it is possible to configure the shape of the beam group differently based on the Codebook-Config, but it is difficult to adaptively adapt to a change in channel due to an operation based on higher layer signaling. For the purpose of solving the above problems, it is possible to improve the performance of the semi closed-loop transmission scheme by introducing an auxiliary CSI. The auxiliary CSI may be expressed as various terms including an auxiliary CSI, an auxiliary PMI, a subspace PMI, subspace information, an MU PMI, a best/worst PMI, and the like.

Figure 29:
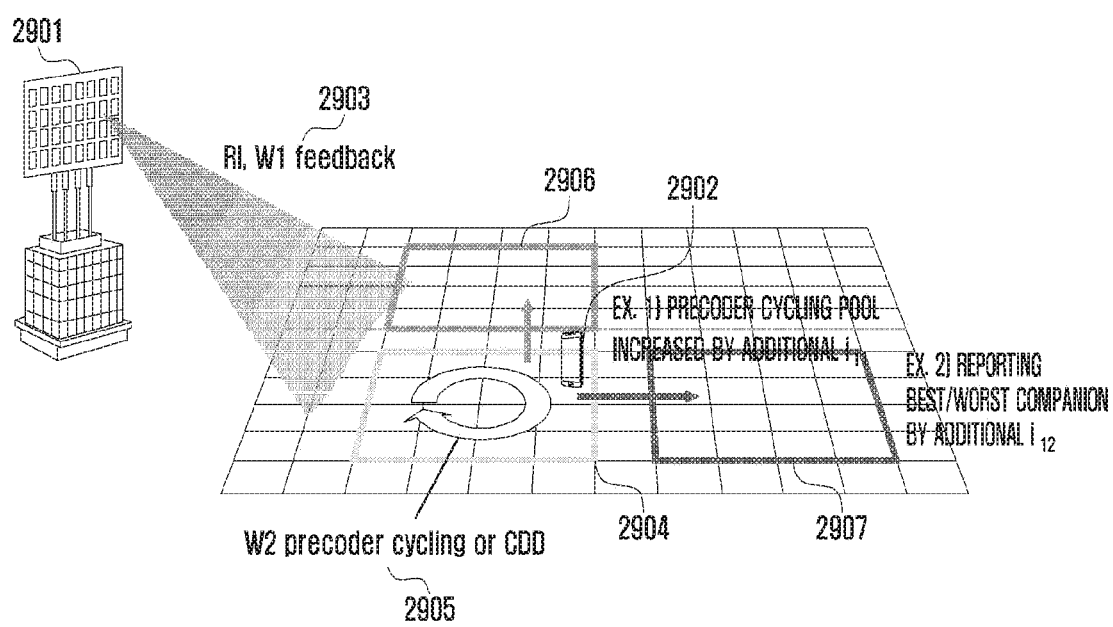
FIG. 29 is a diagram illustrating representative examples of improvement of a semi closed-loop transmission technique through an auxiliary CSI.

FIG. 29 is a diagram illustrating representative examples of improvement of a semi closed-loop transmission technique through an auxiliary CSI.

A base station 2901 may determine which beam group 604 precoder cycling or CDD 605 is to be applied based on an RI and a first PMI 2903 reported by terminal 2902.

When the base station may know another beam group information 606 preferred by the terminal through the auxiliary CSI (auxiliary PMI), the base station may extend a beam resource pool for precoder cycling by using another beam group information 606. The base station may stably support even high-speed terminals whose channel variability is greater than the beam group of the codebook through the semi closed-loop transmission.

As another example, when the base station may know the beam group information 607 that is preferred or not preferred by the terminal via the auxiliary CSI, the base station may enhance system throughput performance such as performing efficient semi closed-loop MU transmission based on beam group information 607.

Embodiment 3-1: Auxiliary CSI Reporting Method for Semi Closed-Loop Transmission The terminal may report the auxiliary CSI for the semi closed-loop transmission to the base station by two methods.

A first method is to define a new CSI feedback mechanism for the auxiliary CSI. In this case, the auxiliary CSI may have a payload and reporting timing independent of the PUCCH or PUSCH.

The first method has an advantage of optimizing the payload and timing for reporting according to a nature of the auxiliary CSI, but there may be a new feedback burden or load for the auxiliary CSI reporting.

A second method is a method for reporting the auxiliary CSI by reusing a part not used in the semi closed-loop transmission in the CSI feedback mechanism for the existing CSI.

As described above, in the case of the semi closed-loop transmission, only some of the existing PMIs are reported (for example, the terminal may report only the first PMI and omit the second PMI). Therefore, the feedback burden required for the semi closed-loop transmission is smaller than an amount required for the closed loop transmission.

Meanwhile, since the terminal may support both the closed loop transmission and the semi closed-loop transmission according to the configuration of the base station, a feedback capability of the terminal is adjusted to the amount required for the closed loop transmission. Therefore, when performing an operation required for the semi closed-loop transmission, the terminal has a predetermined amount of extra feedback capability.

When the case where the terminal reports only the first PMI is considered, the extract feedback capability will be equal to a quantity of resources required to report the second PMI i2 in the closed loop transmission. Therefore, the extra feedback capability may be replaced with the CSI of another content, for example, the auxiliary CSI in the semi closed-loop transmission.

As an example of the second method, a payload and reporting timing or reporting instance (hereinafter, referred to as reporting instance) for i2 in the closed loop transmission may be used for reporting the auxiliary CSI when the semi closed-loop transmission is performed. In general, since the payload for i1 (or i11 or i12) is equal to or larger than a payload (4 bits or less) for i2, there are several following methods to reuse the payload and reporting instances for i2.

Auxiliary CSI reporting method 1 through i2 reporting resource: As a method for reporting the auxiliary CSI by reusing the payload and reporting instance for i2, a method for selecting and reporting PMIs for one of the first dimension and the second dimension, that is, i11 and i12 may be used.

Referring to Table 6, in the case of Codebook-Config=2, 3, 4 and in the case where an antenna array is of 2-dimension (N1 or N2 is not 1), since both i11 and i12 have the payload of 4 bits or less, the auxiliary CSI may be reported by reusing the payload and reporting instance for i2. In this case, i11 or i12 may indicate a beam group (beam group preferred by the terminal) suitable for MU transmission or indicate a beam group unsuitable for the MU transmission. Alternatively, i11 or i12 may indicate a beam group size for beam cycling.

When using such a method, the base station needs to distinguish whether the reported auxiliary CSI is of the first dimension or the second dimension. To this end, the meaning of the auxiliary CSI may be predetermined for each reporting timing. For example, i11 may be transmitted to the first and second auxiliary CSI reporting timing and i12 may be transmitted to the third auxiliary CSI reporting timing.

As another example for specifying the auxiliary CSI dimension, it is possible for the base station to announce of which dimension the terminal should report the auxiliary CSI to the terminal through higher layer signaling or L1 signaling. For example, the base station may instruct the terminal to report i11 when the DI is 0 and report i12 when DI is 1 through a dimension indicator (hereinafter, referred to as DI).

The DI is a name for convenience and may be referred to as a different expression in actual implementation.

As another example for specifying the auxiliary CSI dimension, the terminal may report to the base station what the dimension of the auxiliary CSI currently reported by the terminal is through the DI.

In this case, a DI having a meaning such as may be independently reported or reported by joint encoding together with the auxiliary CSI.

TABLE 23

Content of auxiliary CSI according to DI

| Dimension Indicator | 0 | 1 |
|---|---|---|
| Meaning of PMI2 | i11 | i12 |

Auxiliary CSI reporting method 2 through i2 reporting resource: As the method for reporting the auxiliary CSI by reusing the payload and reporting instance for i2, a method for applying subsampling for i1 (or i11 and i12) may be used.

In this example, a part of the payload of the auxiliary CSI may represent i11 and another part may represent i12. As an example, when the total payload of the auxiliary CSI is 4 bits, the total payload may be constituted by 3 bits in MSB of i11 and 1 bit in MSB of i12. As another example, i11 and i12 may be jointly subsampled through a subsampling table or the like.

Auxiliary CSI reporting method 3 through i2 reporting resource: As the method for reporting the auxiliary CSI by reusing the payload and reporting instance for i2, there is a method for dividing and transmitting auxiliary CSI information to one or more i2 reporting resources.

In reporting modes including aperiodic CSI reporting (aperiodic CSI reporting, PUSCH CSI reporting) mode 1-2, 2-2, and 3-2, periodic CSI reporting (periodic CSI reporting and PUCCH CSI reporting) mode 2-1, and the like, the terminal may individually report i2 information for each subband.

That is, in some reporting modes, the terminal may send multiple second PMI information to the base station. Using the information, the base station may configure aperiodic CSI reporting modes 1-2, 2-2, and 3-2 or periodic CSI reporting mode 2-1 to the terminal and the terminal may be configured to transmit a part of the auxiliary CSI information to the i2 reporting resource for each subband.

For example, when there are three subbands in total and a total of 6 bits of auxiliary CSI are to be reported, it may be appointed that the i2 reporting corresponding to a first subband means MSB 2 bits of the auxiliary CSI, the i2 reporting corresponding to a second subband means 2 bits of the auxiliary CSI, and the i2 reporting corresponding to a third subband means LSB 2 bits of the auxiliary CSI.

Thereafter, in the embodiments, a type and a detailed application example of the auxiliary CSI will be described.

Embodiment 3-2: Type of Auxiliary CSI for Semi Closed-Loop Transmission

The auxiliary CSI for the semi closed-loop transmission may be reported to the base station in various forms and meanings. The following is an example of the type of auxiliary CSI for the semi closed-loop transmission.

Wideband auxiliary CSI: The auxiliary CSI for the semi closed-loop transmission may be reported as the meaning of the wideband CSI. In this case, a single wideband auxiliary CSI may be reported through a single time/frequency resource.

As another example, several auxiliary CSI reporting resources may exist in one reporting period as described in auxiliary CSI reporting method 3 and the auxiliary CSI reporting resources are together interpreted to mean one wideband auxiliary CSI.

Subband auxiliary CSI: The auxiliary CSI for the semi closed-loop transmission may be reported as the meaning of the subband CSI. In this case, multiple subband auxiliary CSIs may be reported through several time/frequency resources.

As an example, several auxiliary CSI reporting resources may exist in one reporting period as described in auxiliary CSI reporting method 3 and the auxiliary CSI reporting resources may mean corresponding subband auxiliary CSIs, respectively.

PMI based auxiliary CSI: Each of the auxiliary CSIs itself may be interpreted to mean an independent codebook index, codebook subset index, or beam group index similarly to the existing PMI.

Delta PMI based auxiliary CSI: Each of the auxiliary CSIs may be interpreted as delta PMI (or PMI variation amount) that means a difference in codebook index between a channel (beam or beam group) direction indicated by the existing PMI and a channel (beam or beam group) to be indicated through the auxiliary CSI. This is a method which is caused in that a current codebook is configured based on a DFT vector and an interest direction is sequentially changed according to the codebook index.

The auxiliary CSI type may be defined in various types of combinations.

For example, in the case of aperiodic CSI reporting mode 3-2 in the existing LTE/LTE-A system, i2 may mean the wideband CSI or subband CSI according to a set PTI value.

Similarly, the auxiliary CSI may also be interpreted as the wideband CSI or subband CSI according to the PTI value set in aperiodic CSI reporting mode 3-2.

As another example, the auxiliary CSI may be reported in the form of the wideband CSI and the delta PMI or reported in the form of the subband CSI and the delta PMI.

Embodiment 3-3: Precoder Cycling Improvement of Semi Closed-Loop Transmission Through Auxiliary CSI In the embodiment, a method for improving precoder cycling of the semi-closed-loop transmission through the auxiliary CSI will be described. The following methods may be used for the precoder cycling using the auxiliary CSI.

Precoder cycling method 1 using auxiliary CSI: The type and the reporting method of auxiliary CSI may be varied as described in the above embodiments, but in this example, a specific situation is assumed for convenience of description.

Figure 30:
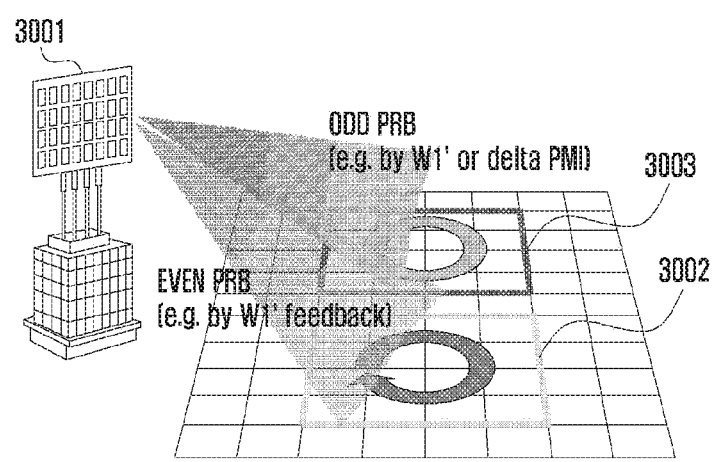
FIG. 30 is a diagram illustrating CSI and auxiliary CSI reporting in this example and semi closed-loop transmission based on the CSI and auxiliary CSI reporting.

FIG. 30 is a diagram illustrating CSI and auxiliary CSI reporting in this example and semi closed-loop transmission based on the CSI and auxiliary CSI reporting.

Referring to FIG. 30, first, the terminal may notify a base station 3001 of information 3002 on a first beam group W1 preferred thereby through the existing RI and a first PMI report. Further, the terminal may notify the base station of information 3003 on a second beam group W1' preferred thereby through the auxiliary CSI such as the delta PMI.

The base station may apply the precoder cycling based on the information 3002 on the first beam group preferred by the terminal to a specific PRB pair (for example, an even PRB pair) and apply the precoder cycling based on the information 3003 on the second beam group preferred by the terminal to another PRB pair (for example, an odd PRB pair).

From the viewpoint of the full band, in precoder cycling method 1, a precoder cycling pool increases, but it is characterized in that the number of precoders cycled in one precoder cycling unit (for example, one or two PRBs) is the same as the number in the existing semi closed-loop transmission.

Precoder cycling method 2 using auxiliary CSI: The type and the reporting method of auxiliary CSI may be varied as described in the above embodiments, but in this example, a specific situation is assumed for convenience of description.

Figure 31:
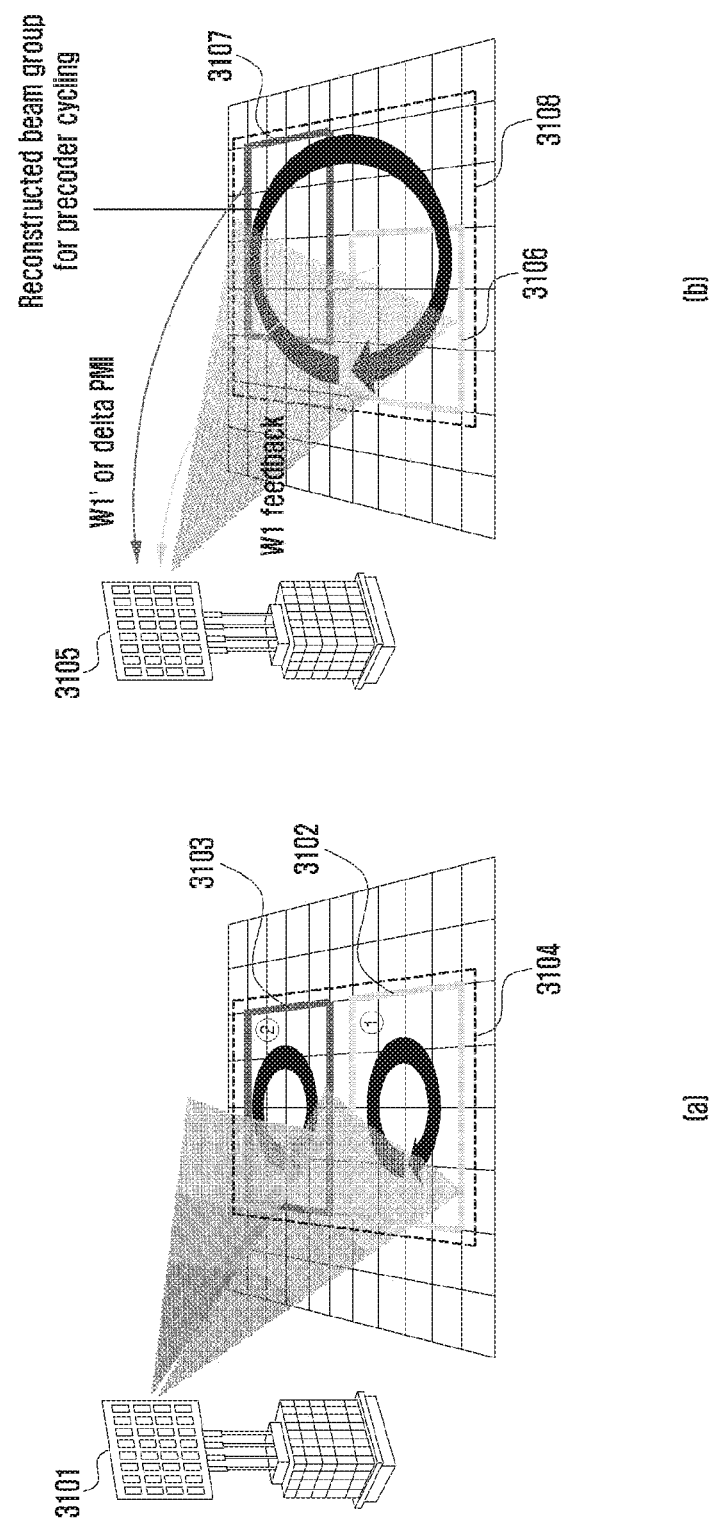
FIG. 31A is a diagram illustrating CSI and auxiliary CSI reporting and semi closed-loop transmission based on the CSI and auxiliary CSI reporting.
FIG. 31B is another diagram illustrating the CSI and the auxiliary CSI reporting and the semi closed-loop transmission based on the CSI and auxiliary CSI reporting.

FIG. 31A is a diagram illustrating CSI and auxiliary CSI reporting in this example and semi closed-loop transmission based on the CSI and auxiliary CSI reporting.

Referring to FIG. 31A, first, the terminal may notify a base station 3101 of information 3102 on the first beam group W1 preferred thereby through the existing RI and the first PMI report. Further, the terminal may notify the base station of information 3103 on the second beam group W1' preferred thereby through the auxiliary CSI such as the delta PMI.

Based thereon, the base station may bundle the information 3202 on the first beam group preferred thereby and the information 3103 on the second beam group preferred by the terminal and configure the bundled information as one beam group (or precoder cycling pool).

In this example, a detailed precoder cycling method may be extended to various methods according to the increased size of the beam group.

For example, precoder cycling is first performed based on the information 3102 on the first beam group preferred by the terminal while the precoder index defining method determined for one cycling unit is used as it is and the precoder cycling may be performed based on the information 3103 on the second beam group.

As another example, a new precoder cycling rule may be applied to the beams included in the information 3102 on the first beam group preferred by the terminal and the information 3103 on the second beam group preferred by the terminal. For example, when N=16 beams are included in the information 3102 and M=16 beams are included in the information 3103 and a total of 32 beams are thus included in a new precoder cycling pool, the number of precoders substantially cycled by applying the subsampling may be maintained as 16 like the existing method by a method such as increasing cycling granularity.

Precoder cycling method 3 using auxiliary CSI: The type and the reporting method of auxiliary CSI may be varied as described in the above embodiments, but in this example, a specific situation is assumed for convenience of description.

FIG. 31B is a diagram illustrating CSI and auxiliary CSI reporting in this example and semi closed-loop transmission based on the CSI and auxiliary CSI reporting.

Referring to FIG. 31B, first, the terminal may notify a base station 3105 of information 3106 on the first beam group W1 preferred thereby through the existing RI and the first PMI report. Further, the terminal may notify the base station of information 3107 on the second beam group W1' preferred thereby through the auxiliary CSI such as the delta PMI.

The base station may know which region (beam region or beam group subset 3108) the terminal prefers based on the first beam group 3106 preferred by the terminal and the second beam group 3107 preferred by the terminal. The region 3108 may be constituted by one or more beam groups and may be defined by a horizontal difference and a vertical difference between the first beam group 3106 preferred by the terminal and the second beam group 3107 preferred by the terminal.

A semi closed-loop transmission precoder index definition method for various beams (or precoder) included in reference numeral 3108 may be applied similarly to the example in precoder cycling method 2 using the auxiliary CSI.

Embodiment 3-4: MU Semi Closed-Loop Transmission Based on Auxiliary CSI

In the embodiment, an efficient multiuser (MU) semi closed-loop transmission will be described through the auxiliary CSI.

The type and the reporting method of auxiliary CSI may be varied as described in the above embodiments, but in this example, a specific situation is assumed for convenience of description.

Figure 32:
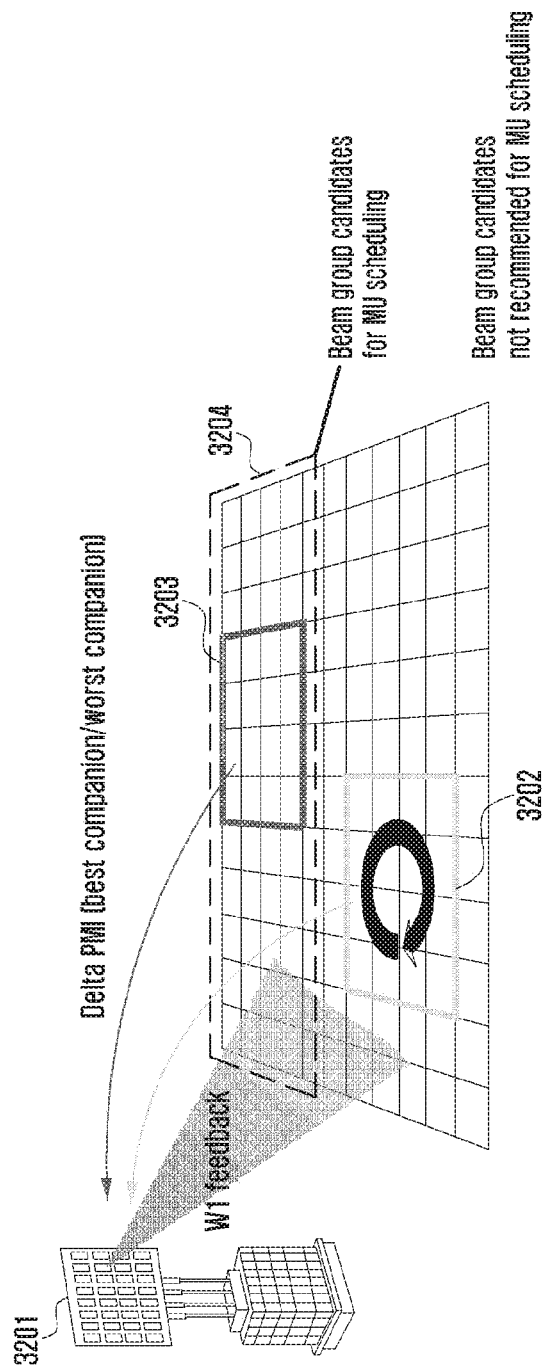
FIG. 32 is yet another diagram illustrating the CSI and the auxiliary CSI reporting and the semi closed-loop transmission based on the CSI and auxiliary CSI reporting.

FIG. 32 is a diagram illustrating CSI and auxiliary CSI reporting in this example and semi closed-loop transmission based on the CSI and auxiliary CSI reporting.

Referring to FIG. 32, first, the terminal may notify a base station 3201 of information 3202 on a first beam group W1 preferred thereby through the existing RI and a first PMI report. Further, the terminal may notify the base station of information 3203 on the second beam group W1' through the auxiliary CSI such as the delta PMI.

In this case, when the information 3203 on the second beam group transmitted through the auxiliary CSI is a beam group (best companion) suitable for MU transmission, the base station may perform the MU transmission by considering the terminals preferred by the beam group toward reference numeral 3203 as a pairing candidate based on a fact that information 3203 is the beam group suitable for the MU transmission.

In this case, when the auxiliary CSI means one of the first dimension and the second dimension (that is, when the auxiliary CSI is i11 or i12), the base station may configure all beam groups which belong to the corresponding direction in the corresponding dimension as a candidate group.

Reference numeral 3204 of FIG. 32 illustrates an example when the auxiliary CSI has horizontal information.

As another example, when the information 3203 on the second beam group transmitted through the auxiliary CSI is a beam group (worst companion) not suitable for the MU transmission, the base station may perform the MU transmission by excluding the terminals that prefer the beam group toward reference numeral 3203 from the pairing candidate based on a fact that the information 3203 is the beam group not suitable for the MU transmission.

In this case, when the auxiliary CSI means one of the first dimension and the second dimension (that is, when the auxiliary CSI is i11 or i12), the base station may exclude all beam groups which belong to the corresponding direction in the corresponding dimension from the candidate group. Meanwhile, one or more precoder cycling patterns may be defined in one precoder cycling unit (for example, one or two PRBs) for efficient MU semi closed-loop transmission.

FIG. 33 is a diagram illustrating an example of two precoder cycling patterns applied in one precoder cycling unit.

It is assumed that in a predetermined codebook, precoding matrices which have two codebook index differences in the first dimension are orthogonal to each other. In this case, even though the precoding matrices having two codebook index differences in the first dimension are simultaneously transmitted, the precoding matrices will not interfere with each other.

As an example, assuming that a beam group of a predetermined codebook is constituted by a total of 16 beams including four beams in the first dimension and four beams in the second dimension, precoder cycling patterns A and B orthogonal to each other may be defined as illustrated in FIG. 10. Referring to FIG. 33, it can be seen that precoder cycling patterns A and B are set to show two codebook index differences.

Therefore, the terminals that are allocated with different precoder cycling patterns are MU-paired to perform the semi closed-loop transmission. Herein, different precoder cycling patterns may be defined by directly specifying the patterns as illustrated in FIG. 10 or may be implicitly defined by defining one or more offsets based on one pattern.

The base station may notify the terminal of the indexes of the different precoder cycling patterns or the offset through the higher layer signaling or L1 signaling.

The application to the above embodiments is not limited to the individual embodiments, and it is possible that one or more embodiments are combined and applied. Although one beam group that may be added as the auxiliary CSI in the above embodiment and FIGS. 29 to 33 is illustrated, the present disclosure is not limited thereto and a plurality of beam group information may be used in actual application.

Figure 34:
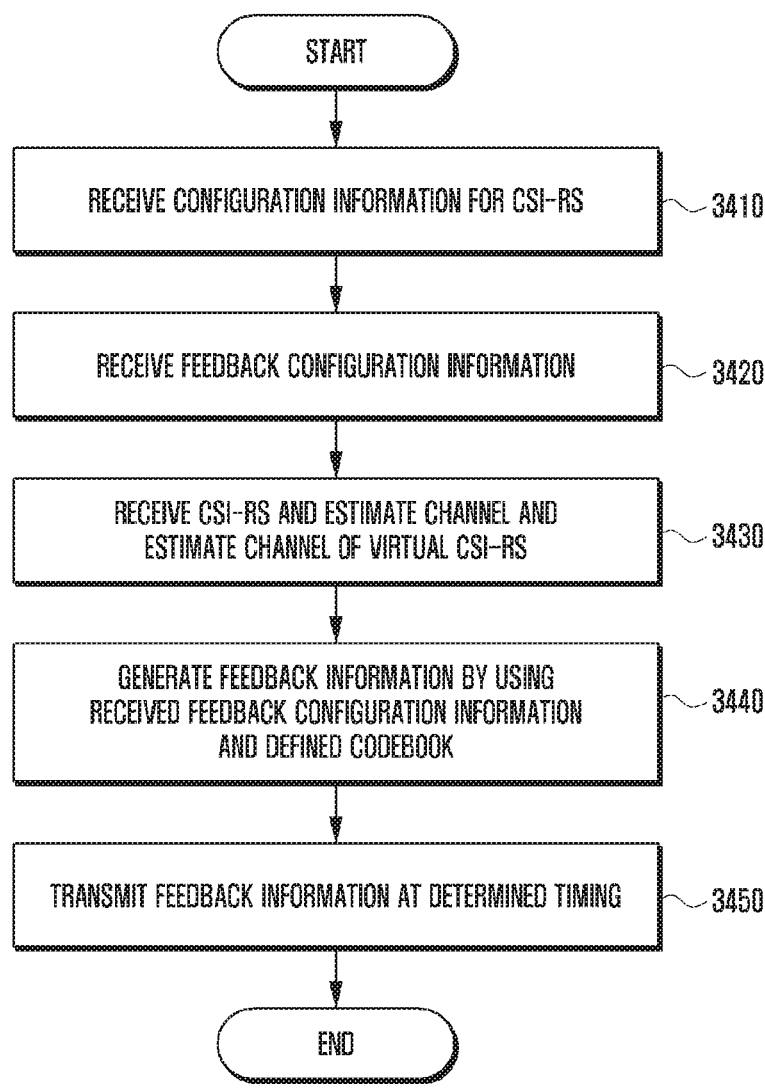
FIG. 34 is a flowchart illustrating the operation procedure of the terminal according to an embodiment of the present disclosure.

FIG. 34 is a flowchart illustrating an operation procedure of a terminal according to an embodiment of the present disclosure.

Referring to FIG. 34, in step 3410, the terminal receives configuration information for a CSI-RS configuration. Further, the terminal may check at least one of the number of ports for each NP CSI-RS, N1 and N2 which are the number of antennas for each dimension, O1 and O2 which are oversampling factors for each dimension, one subframe config for transmitting multiple CSI-RSs and a plurality of resource configs for configuring the position, codebook subset restriction related information, CSI report related information, a CSI-process index, and transmission power information, based on the received configuration information.

Thereafter, the terminal configures one feedback configuration information based on at least one 2, 4, 8 CSI-RS position in step 3420. In the corresponding information, the period and the offset of the PMI/CQI, the period and the offset of the RI, a wideband or a subband, the submode, etc. may be configured.

When the terminal receives multiple CSI-RSs in one subframe based on the corresponding information in steps 3430 and 3440, the terminal may estimate the channel between the base station antenna and the receiving antenna of the terminal based on the received CSI-RSs.

In step 3440, the terminal generates feedback information rank, PMI, and CQI using the received feedback configuration based on a virtual channel added between the estimated channel and the CSI-RS. At this time, one of the embodiments presented in the present disclosure is used for generating the corresponding information, and a plurality of embodiments among the embodiments presented in the present disclosure can be considered together, and this is possible by configuring the submode.

Specifically, the semi closed-loop transmission may mean transmission reporting only a part of the configuration information of the code point. Accordingly, when the semi closed-loop transmission is configured, the terminal can report only a part of the configuration information of the code point, and can report additional information or auxiliary information using the remaining resources.

That is, when the semi closed-loop transmission is configured, the terminal may additionally transmit an auxiliary CSI in addition to the CSI for the semi closed-loop transmission. At this time, a part of the configuration information of the code point may mean, for example, a part of the PMI. In addition, the auxiliary information may mean the aforementioned auxiliary CSI.

Accordingly, the base station may use the auxiliary CSI as described above, such as expanding the beam group to which the precoder is circularly applied or generating a new group using the auxiliary CSI. The detailed configuration and use method of the auxiliary CSI are the same as those described above, and hereinafter will be omitted.

Thereafter, in step 3450, the UE transmits the feedback information to the base station at a predetermined feedback timing according to the feedback configuration of the base station, thereby completing a channel feedback generation and reporting process considering a two-dimensional array.

Figure 35:
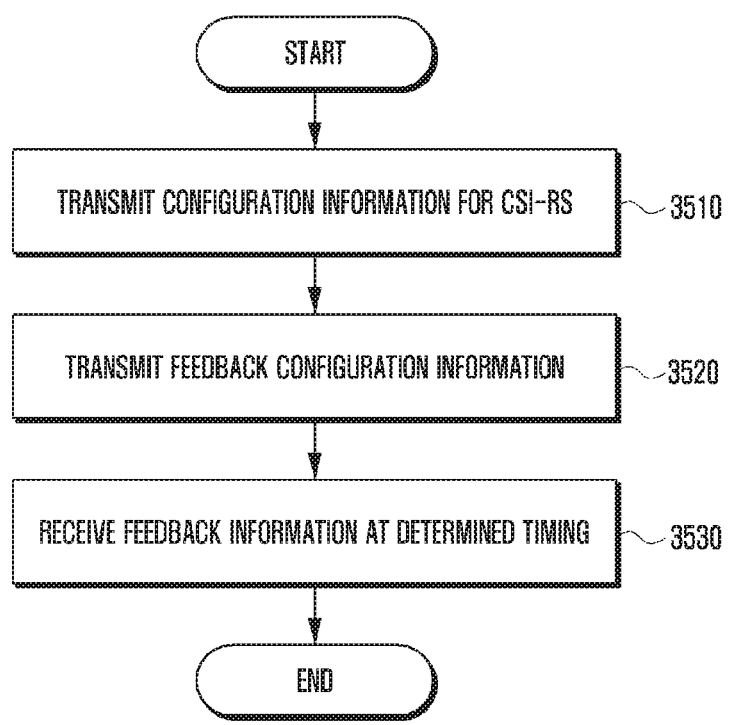
FIG. 35 is a flowchart illustrating the operation procedure of the base station according to the embodiment of the present disclosure.

FIG. 35 is a flowchart illustrating an operation procedure of the base station according to the embodiment of the present disclosure.

Referring to FIG. 35, in step 3510, the base station transmits the configuration information for the CSI-RS for measuring the channel to the terminal. The configuration information may include at least one of the number of ports for each NP CSI-RS, N1 and N2 which are the number of antennas for each dimension, O1 and O2 which are oversampling factors for each dimension, one subframe config for transmitting multiple CSI-RSs, A plurality of resource configs for configuring the position, codebook subset restriction related information, CSI report related information, a CSI-process index, and transmission power information.

Thereafter, the base station transmits the feedback configuration information based on at least one CSI-RS to the terminal in step 1220. In the corresponding information, the period and the offset of the PMI/CQI, the period and the offset of the RI, wideband or subband, the submode, etc. may be configured.

Thereafter, the base station transmits the configured CSI-RS to the UE. The terminal estimates the channel for each antenna port and estimates an additional channel for the virtual resource based on the estimated channel. At this time, one of the embodiments presented in the present disclosure is used for generating the corresponding information, and a plurality of embodiments among the embodiments presented in the present disclosure can be considered together, and this is possible by configuring the submode. The terminal decides the feedback, generates the PMI, RI, and CQI corresponding thereto, and transmits the generated PMI, RI, and CQI to the base station.

Accordingly, the base station receives the feedback information from the terminal at a predetermined timing determined in step 1230 and uses the feedback information to determine the channel status between the terminal and the base station.

In this case, the base station may receive information generated using one of the above-described embodiments, and may determine a channel state using the received information.

Accordingly, when the semi closed-loop transmission is configured, the base station may receive only a part of the configuration information of the code point, and receive additional information or auxiliary information using the remaining resources. That is, when the semi closed-loop transmission is configured, the base station may additionally receive an auxiliary CSI in addition to the CSI for the semi closed-loop transmission. At this time, a part of the configuration information of the code point may mean, for example, a part of the PMI. In addition, the auxiliary information may mean the aforementioned auxiliary CSI.

Accordingly, the base station may use the auxiliary CSI as described above, such as expanding the beam group to which the precoder is circularly applied or generating a new group using the auxiliary CSI. The detailed configuration and use method of the auxiliary CSI are the same as those described above, and hereinafter will be omitted.

Figure 36:
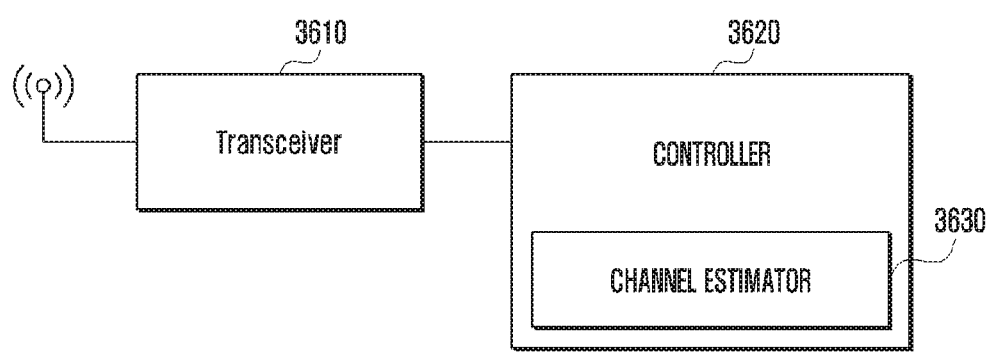
FIG. 36 is a block diagram illustrating an internal structure of a terminal according to an embodiment of the present disclosure.

FIG. 36 is a block diagram illustrating an internal structure of a terminal according to an embodiment of the present disclosure.

Referring to FIG. 36, the terminal includes a transceiver 3610 and a controller 3620.

The transceiver 3610 performs a function of transmitting or receiving data from the outside (e.g., a base station). Herein, the transceiver 3610 may transmit feedback information to the base station under the control of the controller 3620.

The controller 3620 controls states and operations of all components constituting the terminal. Specifically, the controller 3620 may generate the feedback information according to information allocated from the base station.

In addition, the controller 3620 controls the transceiver 3610 to feed back the generated channel information to the base station according to timing information allocated from the base station. To this end, the controller 3620 may include a channel estimator 3630. The channel estimator 3630 determines the feedback information required through a CSI-RS and feedback allocation information received from the base station and estimates a channel by using the received CSI-RS based on the feedback information.

Further, a PDSCH is decoded by applying reference signal mapping in which a precoder is applied to a size and a rank of PRG and a DMRS port corresponding to the PDSCH transmission described in the embodiment of the present disclosure based on a DCI transmitted by the base station. In FIG. 36, an example in which the terminal is constituted by the transceiver 3610 and the controller 3620 is described, but the present disclosure is not limited thereto and the terminal may further include various components according to functions performed in the terminal. For example, the terminal may further include a display unit for displaying a current state of the terminal, an input unit for inputting a signal such as function execution by a user, a storage unit for storing data generated in the terminal, and the like. Further, it is illustrated that the channel estimator 3630 is included in the controller 3620 as above, but the present disclosure is not necessarily limited thereto. The controller 3620 may control the transceiver 3610 to receive configuration information for each of at least one or more reference signal resources from the base station. Further, the controller 3620 may control the transceiver 3610 to measure the at least one reference signal and receive the feedback configuration information for generating the feedback information according to the measurement result from the base station.

In addition, the controller 3620 may measure at least one reference signal received through the transceiver 3610 and generate the feedback information according to the feedback configuration information. The control unit 3620 may control the transceiver 3610 to transmit the generated feedback information to the base station at feedback timing according to the feedback configuration information. Further, the controller 3620 may receive a channel status indication-reference signal (CSI-RS) from the base station, generate feedback information based on the received CSI-RS, and transmit the generated feedback information to the base station. In this case, the controller 3620 may select a precoding matrix for each antenna port group of the base station and further select one additional precoding matrix based on a relationship between antenna port groups of the base station.

Further, the controller 3620 may receive the CSI-RS from the base station, generate the feedback information based on the received CSI-RS, and transmit the generated feedback information to the base station. In this case, the controller 3620 may select one precoding matrix for all antenna port groups of the base station. Further, the controller 3620 may receive the feedback configuration information from the base station, receive the CSI-RS from the base station, generate the feedback information based on the received feedback configuration information and the received CSI-RS, and transmit the generated feedback information to the base station. In this case, the controller 3620 may receive the feedback configuration information corresponding to each antenna port group of the base station and additional feedback configuration information based on a relationship between the antenna port groups.

In addition, the controller 3620 may control all the operation of the terminal described above.

Specifically, when the semi closed-loop transmission is configured, the controller 3620 may report only a part of the configuration information of the code point, and may report additional information or auxiliary information using the remaining resources. A part of the configuration information of the code point may mean, for example, a part of the PMI. In addition, the auxiliary information may mean the aforementioned auxiliary CSI.

The detailed configuration and use method of the auxiliary CSI are the same as those described above, and hereinafter will be omitted.

Figure 37:
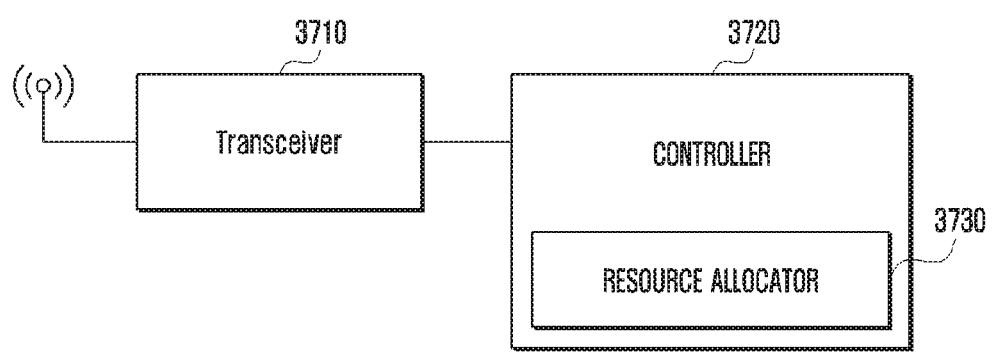
FIG. 37 is a flowchart illustrating the internal structure of the base station according to the embodiment of the present disclosure.

FIG. 37 is a flowchart illustrating the internal structure of the base station according to the embodiment of the present disclosure.

Referring to FIG. 37, the base station includes a controller 3710 and a transceiver 3720.

The controller 3710 controls the states and operations of all components constituting the base station. Specifically, the controller 3710 allocates CSI-RS resources for channel estimation of the terminal to the terminal and allocates feedback resources and a feedback timing to the terminal. To this end, the controller 3710 may further include a resource allocator 3730. In addition, the feedback configuration and the feedback timing are allocated so as to prevent feedbacks from a plurality of terminals from colliding with each other and the feedback information configured at the corresponding timing is received and interpreted. The transceiver 3720 performs functions of transmitting and receiving the data, the reference signal, and the feedback information to and from the terminal.

Herein, the transceiver 3720 transmits the CSI-RS to the terminal through the allocated resources under the control of the controller 3710 and receives the feedback of channel information from the terminal. Further, the terminal maps and transmits a reference signal obtained by applying the precoder to the corresponding DMRS port according to the embodiment of the present disclosure based on the rank, the PMI partial information, the CQI, and the like obtained from the transmitted channel state information.

It is illustrated that the channel allocator 3730 is included in the controller 3710 as above, but the present disclosure is not necessarily limited thereto. The controller 3710 may control the transceiver 3720 to transmit the configuration information for each of the at least one reference signal to the terminal or generate the at least one reference signal. Further, the controller 3710 may control the transceiver 3720 to transmit the feedback configuration information for generating the feedback information according to the measurement result to the terminal.

In addition, the controller 3710 may control the transceiver 3720 to transmit the at least one reference signal to the terminal and receive the feedback information transmitted from the terminal at the feedback timing according to the feedback configuration information. Further, the controller 3710 may transmit the feedback configuration information to the terminal, transmit the CSI-RS to the terminal, and receive the feedback information generated based on the feedback configuration information and the CSI-RS from the terminal. In this case, the controller 3710 may transmit the feedback configuration information corresponding to each antenna port group of the base station and the additional feedback configuration information based on the relationship between the antenna port groups. Further, the controller 3710 may transmit a CSI-RS beamformed based on the feedback information to the terminal and receive the feedback information generated based on the CSI-RS from the terminal. According to the embodiment of the present disclosure described above, it is possible to prevent allocation of excessive feedback resources to transmit the CSI-RS in a base station having a large number of transmitting antennas with a two-dimensional antenna array structure and an increase in channel estimation complexity, and the terminal may effectively measure all channels for a large number of transmitting antennas and configure the measured channels as the feedback information to report the feedback information to the base station.

In addition, the controller 3720 may control all the operation of the base station described above.

Accordingly, when the semi closed-loop transmission is configured, the controller 3720 may receive only a part of the configuration information of the code point, and receive additional information or auxiliary information using the remaining resources among the resources configured in the feedback configuration information. A part of the configuration information of the code point may mean, for example, a part of the PMI. In addition, the auxiliary information may mean the aforementioned auxiliary CSI.

The detailed configuration and use method of the auxiliary CSI are the same as those described above, and hereinafter will be omitted.

Embodiment 4

CSI-RS overhead is increased as the number of antennas supported by a base station in a mobile communication system and the need for CSI-RS support for each terminal according to support of UE specific beamformed CSI-RS technology are increased by FDM-MIMO, etc. As a result, a method is required in which the base station allocates and supports an aperiodic CSI-RS to the terminal according to needs of the base station and the terminal for an efficient system and a CSI-RS operation unlike the existing periodic CSI-RS and the terminal reports channel state information based on the aperiodic CSI-RS.

Therefore, the present disclosure provides a method and device for measuring interference in order for a terminal to generate channel state information in a mobile communication system that performs MIMO transmission using a plurality of base stations (evolved node B (eNB)) transmitting antennas.

Figure 38:
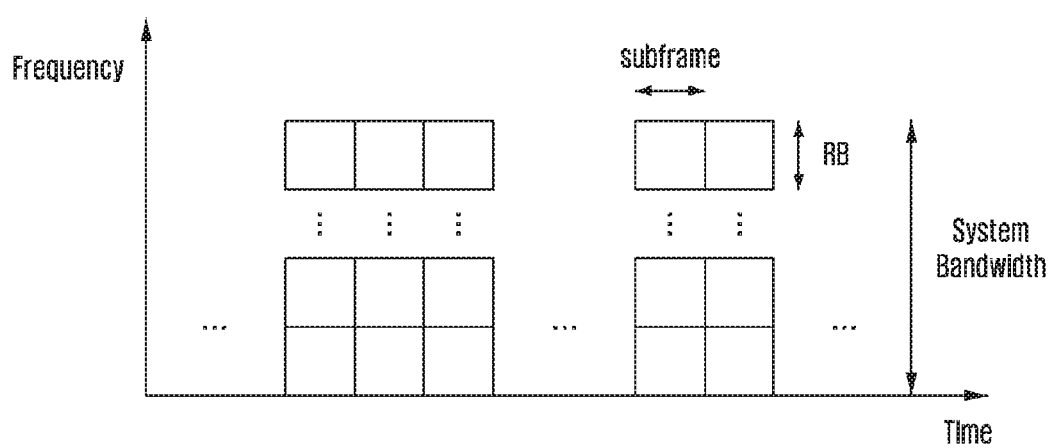
FIG. 38 is a diagram illustrating time and frequency resources in an LTE/LTE-A system.

FIG. 38 is a diagram illustrating time and frequency resources in an LTE/LTE-A system.

In FIG. 38, a radio resource transmitted from a base station (or 'eNB') to a user equipment (UE) is divided into resource block (RBs) units on a frequency axis and into subframe units on a time axis. The RB is generally constituted by 12 subcarriers in the LTE/LTE-A system and occupies a bandwidth of 180 kHz. On the contrary, in the LTE/LTE-A system, the subframe is generally constituted by 14 OFDM symbol periods and occupies a time interval of 1 msec. In the scheduling, the LTE/LTE-A system can allocate the resource in a unit of the subframe on the time axis and the resource in a unit of the RB on the frequency axis.

Figure 39:
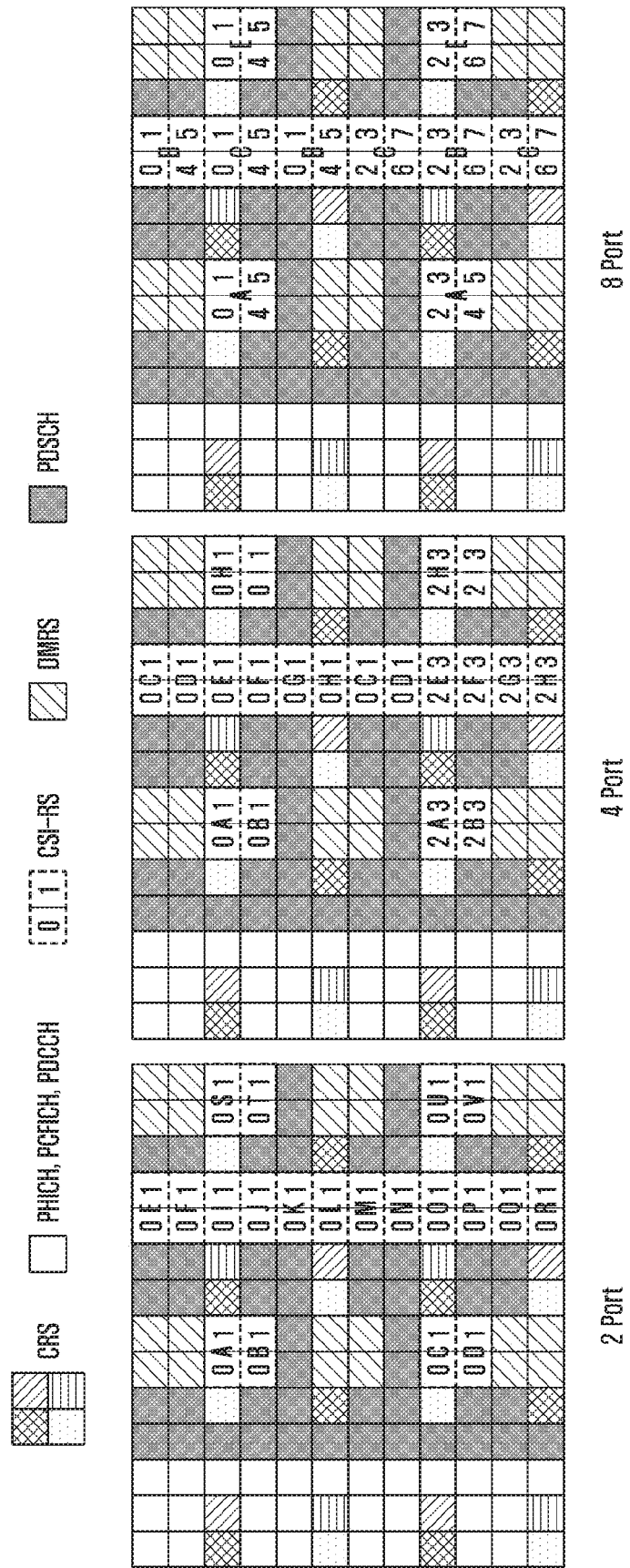
FIG. 39 is a diagram illustrating 2, 4, and 8 antenna port CSI-RS transmissions using 1 subframe and a radio resource of 1 RB, which are the minimum units for downlink scheduling in the LTE/LTE-A system.

FIG. 39 is a diagram illustrating 2, 4, and 8 antenna port CSI-RS transmissions using 1 subframe and a radio resource of 1 RB, which are the minimum units for downlink scheduling in the LTE/LTE-A system.

The radio resource illustrated in FIG. 39 is constituted by one subframe on the time axis and one RB on the frequency axis. Such a radio resource is constituted by 12 subcarriers in a frequency domain and 14 OFDM symbols in a time domain, thereby providing a total of 168 natural frequency and time positions. In the LTE/LTE-A, respective natural frequencies and time positions in FIG. 39 are referred to as resource elements (REs).

A plurality of different types of signals below may be transmitted to the radio resource illustrated in FIG. 39. This is the same as those described in FIG. 16 and hereinafter will be omitted.

The base station can boost the transmission power of the CSI-RS in order to enhance channel estimation accuracy. When the CSI-RSs for four or eight antenna ports (APs) are transmitted, a specific CSI-RS port is transmitted only in the CSI-RS RE at a predetermined position and not transmitted in other OFDM symbols within the same OFDM symbol.

Further, the terminal can be allocated with CSI-IM (or interference measurement resources (IMR)) together with the CSI-RS. The CSI-IM resource has the same resource structure and position as the CSI-RS supporting 4 ports. The CSI-IM is a resource for accurately measuring interference from an adjacent base station by a terminal which receives data from at least one base station. For example, when the adjacent base station intends to measure an amount of interference when transmitting the data and an amount of interference when not transmitting the data, the base station constructs the CSI-RS and two CSI-IM resources, and one CSI-IM allows the adjacent base station to continuously transmit the signal and the other CSI-IM allows the adjacent base station not to continuously transmit the signal, thereby effectively measuring the interference amount of the adjacent base station.

In the LTE-A system, the base station can notify to the terminal CSI-RS configuration information (CSI-RS configuration) through higher layer signaling. The CSI-RS configuration includes an index of the CSI-RS configuration information, the number of ports included in the CSI-RS, a transmission period of the CSI-RS, a transmission offset, CSI-RS resource configuration information (CSI-RS resource configuration), a CSI-RS scrambling ID, QCL information, and the like.

When the CSI-RSs are transmitted for two antenna ports, the signal of each antenna port is transmitted in two REs connected on the time axis and the signal of each antenna port is divided as an orthogonal code and subjected to code division multiplexing (CDM). Further, when the CSI-RSs are transmitted for four antenna ports, signals for two remaining antenna ports are transmitted in the same manner by using two REs in addition to the CSI-RSs for two antenna ports. The same manner is applied when the CSI-RSs are transmitted for eight antenna ports.

In case of transmitting 12 and 16 CSI-RSs more than 8, 12 and 16 CSI-RSs are transmitted by combining the existing 4 or 8 CSI-RSs in an RRC configuration. In other words, when 12 CSI-RSs are transmitted, three 4-port CSI-RS transmission positions are bundled and transmitted to one 12-port CSI-RS, and when 16 CSI-RSs are transmitted, two 8-port CSI-RS transmission positions are bundled and transmitted to one 16-port CSI-RS.

In addition, as described above, one difference between the 12 and 16-port CSI-RS transmission and the existing 8-port or less CSI-RS transmission is that CDM having a size of 4 is supported. The existing 8 port or less CSI-RS is transmitted by overlapping CSI-RS 2 port with two time symbols by supporting CDM2, and as a result, the full power may be used in transmitting the CSI-RS by supporting power boosting up to 6 dB based on 8 ports. However, in the case of 12-port or 16-port CSI-RS, the full power cannot be used for the CSI-RS transmission with the combination of the CDM2 and 6 dB. Therefore, for such a case, CDM4 is supported to help the full power be used. In a cellular system, the base station needs to transmit the reference signal to the UE in order to measure a downlink channel status. In the long term evolution advanced (LTE-A) system of the 3GPP, the terminal measures the channel status between the base station and the terminal using the CRS or a channel state information reference signal (CSI-RS) transmitted by the base station. For the channel status, several elements need to be basically considered and the channel status includes the interference amount in the downlink.

The interference amount in the downlink includes an interference signal and thermal noise generated by the antenna belonging to the adjacent base station and it is important for the terminal to determine the channel status of the downlink. As one example, when the signal is transmitted from a base station having one transmitting antenna to a terminal having one receiving antenna, the terminal needs to determine energy per symbol which may be received in the downlink and the interference amount to be received simultaneously in an interval of receiving the corresponding symbol by using the reference signal received from the base station and decide an energy per symbol to interference density ratio (Es/Io). The decided Es/Io is converted into a data transmission rate or a value corresponding thereto, and is notified to the base station in the form of a channel quality indicator (CQI), thereby enabling the base station to determine whether to transmit the data to the terminal at a certain data transmission rate in the downlink.

In the case of the LTE-A system, the terminal feeds back information on the downlink channel status to the base station so that the base station can utilize the feedback information for downlink scheduling. That is, the UE measures the reference signal transmitted by the base station in the downlink and feeds back information extracted from the reference signal to the base station in a form defined by the LTE/LTE-A standard. In the LTE/LTE-A, there are three main types of information to be fed back by the terminal feeds, and the three main types of information will be hereinafter omitted as described above.

A base station having a large-scale antenna for performing channel information generating and reporting needs to configure a reference signal resource for measuring channels of 8 or more antennas and transmit the reference signal resource to the terminal. As illustrated in FIG. 2, as the available CSI-RS resources, up to 48 REs may be used, but it is possible to configure up to 8 CSI-RSs per one CSI process at present. Therefore, a new CSI-RS configuring method is required to support an FD-MIMO system that can operate based on 8 or more CSI-RS ports. As one example, in LTE/LTE-A release 13, 1, 2, 4, 8, 12, or 16 CSI-RS ports can be configured in one CSI process. In this case, a mapping method of CSI-RS ports is the same as described above and hereinafter will be omitted.

Figure 40:
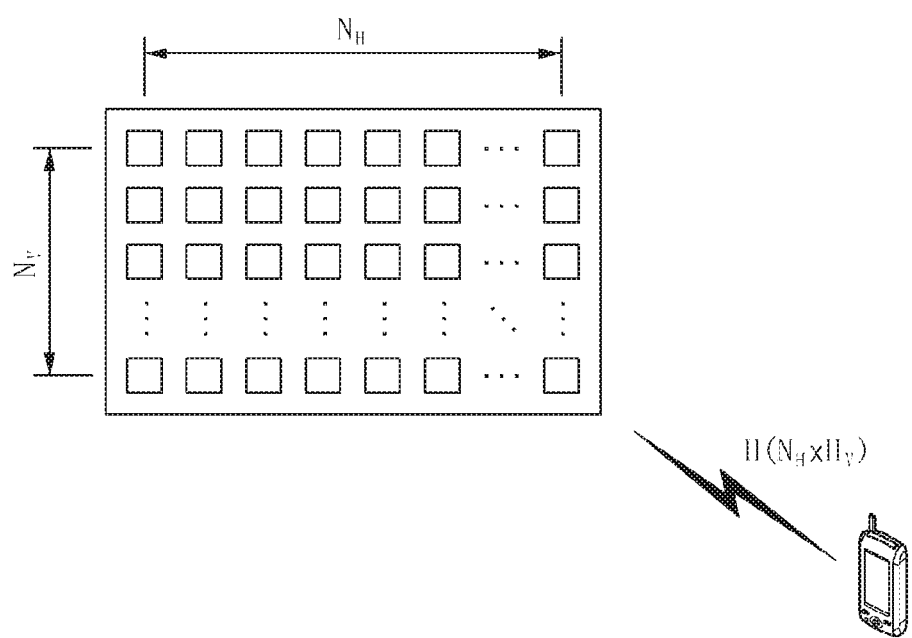
FIG. 40 is a diagram illustrating an example of CSI-RS RE mapping for n-th and n+1-th PRBs when a base station transmits eight CSI-RSs.

FIG. 40 is a diagram illustrating a communication system to which the present disclosure is applied.

Figure 49:
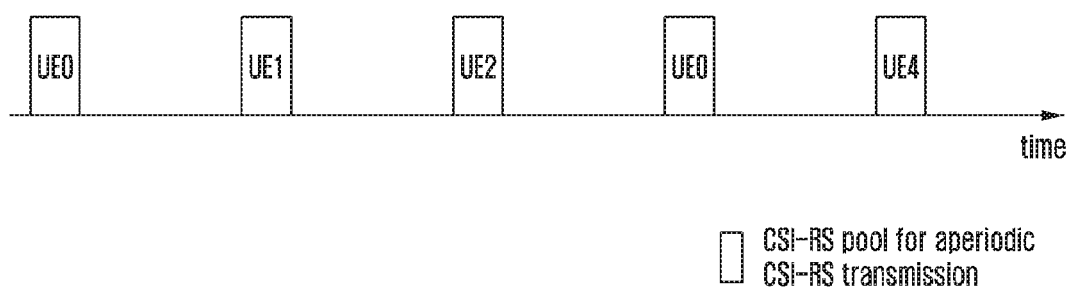
FIG. 49 is a diagram illustrating a method in which the base station allocates the pool for the aperiodic CSI-RS and allocates the pool to each terminal.

In FIG. 40, a transmitting equipment of the base station transmits the radio signal using dozens or more transmitting antennas. A plurality of transmitting antennas is arranged to maintain a predetermined distance as illustrated in FIG. 49. The predetermined distance may correspond to, for example, a multiple of half a wavelength length of the transmitted radio signal. In general, when the distance that is half the wavelength length of the radio signal is maintained between the transmitting antennas, the signals transmitted from the respective transmitting antennas are affected by radio channels having low correlation with each other. As the distance of the transmitting antenna increases, the correlation between the signals decreases.

The base station transmitting equipment having the large-scale antenna can arrange the antennas two-dimensionally as illustrated in FIG. 40 in order to prevent a scale of the equipment from becoming very large. In this case, the base station needs to transmit the signal by using NH antennas arranged on a horizontal axis and NV antennas arranged on a vertical axis and the terminal needs to measure the channels for the corresponding antennas.

The detailed contents for the communication system are the same as described in FIG. 15 and hereinafter will be omitted.

In order to effectively implement the MIMO system, as described above, the terminal needs to accurately measure the channel status and interference magnitudes and transmit effective channel state information to the base station using the measured channel status and interference magnitudes. The base station receiving the channel state information decides to which terminals to perform transmission, at what data rate to perform transmission, what precoding to apply, and so forth, in association with downlink transmission by using the received channel state information. In case of the FD-MIMO system, since the number of transmitting antennas is large, when a method for transmitting/receiving the channel state information of the LTE/LTE-A system in the related art is applied, there is an uplink overhead problem that a lot of control information needs to be transmitted in uplink.

In the mobile communication system, time, frequency, and power resources are limited. Therefore, when more resources are allocated to the reference signal, the resources that can be allocated to the transmission of the traffic channel (data traffic channel) are reduced, and as a result, an absolute amount of data to be transmitted can be reduced. In such a case, although the performance of channel measurement and estimation is improved, the absolute amount of data to be transmitted is reduced, so that overall system capacity performance may be still lowered.

Therefore, a proper distribution between the resource for the reference signal and the resource for the traffic channel transmission is required so as to derive optimum performance in terms of a total system capacity.

As illustrated in FIG. 40, the base station having the large-scale antenna needs to configure the resources for measuring channels of 8 or more antennas and transmit the resources to the terminal, and as the available resources, up to 40 REs may be used as illustrated in FIG. 39, but one cell may be used only 2, 4, and 8 REs. Therefore, in order to support channel measurement for the large-scale antenna required by the FD-MIMO system, CSI-RS patterns for 16 and 32 REs that are not supported by the current system are required, and such a pattern needs to be designed by considering various aspects such as power boosting and wireless channel estimator implementation for accurate and efficient CSI generation.

Further, when a base station which uses four horizontal-dimension antennas in the related art uses a vertical-dimension antenna for performance enhancement, a size to apply the corresponding antenna may be not particularly 4 or 8. Therefore, the CSI-RS pattern to support 12 antennas used as three vertical antennas for supporting the size and various other antenna numbers also needs to be newly designed.

Therefore, the present disclosure provides a method in which a base station allocates CSI-RS resource related information in advance in order to allocate an aperiodic CSI-RS to a terminal and triggers the allocated information. The aperiodic CSI-RS may be configured based on a CSI-RS RE supported by the existing Rel-13, and as another method, only a CSI-RS may be transmitted without transmitting a PDSCH to a specific subframe or subband or a RB.

In the case of a first method, a CSI-RS pool is made based on a configuration of a plurality of existing CSI-RSs, and as a result, the base station may aperiodically allocate the CSI-RS pool.

In the case of a second method, since the PDSCH is not transmitted to the corresponding RB, a DMRS for decoding the PDSCH is not also required and since such a resource is dynamically allocated according to a PCFICH, the quantity of resources may vary depending on the corresponding resource, and as a result, port indexing also needs to be changed. The present disclosure proposes a method for a configuration, allocation, and various procedures for the aperiodic CSI-RS transmission.

In an embodiments described below, a method for configuring multiple CSI-RS ports considering one or more matters described above will be described.

Table 24 below shows an RRC field for configuring a CSI-RS configuration.

TABLE 24

| RRC configuration for supporting periodic CSI-RS in CSI process | | | |
|---|---|---|---|
| CSI-RS config | CSI-IM config | CQI report config | Etc |
| No. antenna ports Resource config Time and frequency position in subframe Subframe config Periodicity and subframe offset Qcl-CRS-info (QCL Type R) CRS information for CoMP | Resource config Time and frequency position in a subframe Subframe config Periodicity config Periodicity and subframe offset | Periodic Mode, resource, periodicity, offset. Aperiodic Mode. PMI/RI report RI reference CSI process SubframePattern | $P_c$ Code book-subset restriction |

A configuration for reporting a channel status based on the periodic CSI-RS in the CSI process may be categorized into four types as shown in Table 24.

CSI-RS config information is used for configuring frequency and time positions of a RE in which the CSI-RS is to be transmitted. Here, how many ports the corresponding CSI-RS have is configured through configuring of the number of antennas.

Resource config information is used for configuring an RE position in an RB and Subframe config information is used for configuring a period and an offset of a subframe. Table 25 is a table for configuring the resource config and subframe config currently supported by the LTE.

TABLE 25

Configuration of Resource config and Subframe config (a) Configuration of Resource config

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

(b) Configuration of Subframe config

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}-5$ |
| 15-34 | 20 | $I_{CSI-RS}-15$ |
| 35-74 | 40 | $I_{CSI-RS}-35$ |
| 75-154 | 80 | $I_{CSI-RS}-75$ |

The terminal may check the frequency and time positions and the period and the offset of a resource in which the CSI-RS is to be transmitted through Table 25 above.

Qcl-CRS-info is used for configuring quasi co-location information for CoMP.

CSI-IM config information is used for configuring the frequency and time positions of a resource in which the CSI-IM is to be transmitted for measuring interference. Since the CSI-IM is continuously configured based on 4 ports, it is not necessary to configure the number of antenna ports and the Resource config and the Subframe config may be configured in the same scheme as the CSI-RS.

CQI report config information is information to configure how to report the channel status using the corresponding CSI process. The corresponding configuration may include information related with a periodic channel status report configuration, an aperiodic channel status report configuration, a PMI/RI report configuration, an RI reference CSI process configuration, a subframe pattern configuration, and the like. Besides, there are a PC, which means a power ratio between a PDSCH and a CSI-RS RE required for the terminal to generate a channel status report, a codebook subset restriction for configuring which codebook is used, and the like.

As described above, the FD-MIMO base station needs to configure reference signal resources for measuring channels of 8 or more antennas and transmit the configured reference signal resources to the terminal, and in this case, the number of reference signals may vary depending on a base station antenna configuration and a measurement type. As one example, in LTE/LTE-A release 13, it is possible to configure {1, 2, 4, 8, 12, 16}-port CSI-RSs on the assumption of full port mapping. Herein, the full port mapping means that every TXRU has a dedicated CSI-RS port for channel estimation.

Meanwhile, as described above, there is high possibility that 16 or more TXRUs will be introduced after LTE/LTE-A release 14. Further, the shape of a supportable antenna array will greatly increase compared to the release 13. This means that various numbers of TXRUs should be supported in the LTE/LTE-A release 14.

Table 26 shows a list of available two-dimensional antenna array structures according to the number of CSI-RS ports under a situation of the full port mapping. In Table 26, {18, 20, 22, 24, 26, 28, 30, 32}-port CSI-RSs are considered, and when it is considered that two different polarized antennas may exist at the same position in a polarized antenna structure, {9, 10, 11, 12, 13, 14, 15, 16} different AP positions may be considered. Meanwhile, the shape of a two-dimensional rectangular or square antenna array may be represented with the number N1 of different AP positions in a first dimension (vertical or horizontal direction) and the number N2 of different AP positions in a second dimension (horizontal or vertical direction) and combinations which are available in respective port numbers are (N1, N2) in Table 3. Table 3 shows that there may be antenna array shapes of various cases depending on the number of CSI-RS ports.

TABLE 26

Available 2D antenna array geometry according to the number of aggregated CSI-RS ports based on full port mapping

| Number of aggregated CSI-RS ports | Number of aggregated CSI-RS ports per polarization | Available 2D antenna array geometry, (N$_1$, N$_2$) (1D configurations were omitted) | | | | Impact on 2D RS and feedback design |
|---|---|---|---|---|---|---|
| 18 | 9  | (3, 3) | —      | —      | —      | Low  |
| 20 | 10 | (2, 5) | (5, 2) | —      | —      | Med  |
| 22 | 11 | —      | —      | —      | —      | —    |
| 24 | 12 | (2, 6) | (3, 4) | (4, 3) | (6, 2) | High |
| 26 | 13 | —      | —      | —      | —      | —    |
| 28 | 14 | (2, 7) | (7, 2) | —      | —      | Med  |
| 30 | 15 | (3, 5) | (5, 3) | —      | —      | Med  |
| 32 | 16 | (2, 8) | (4, 4) | (8, 2) | —      | High |

As described above, in order to support 16 or more multiple CSI-RS ports, it is necessary to consider the following various matters.

- CSI-RS configuration method including a large number of ports suitable for various 2-dimensional antenna array shapes including a cross polarization structure and channel conditions
- Method for reducing CSI-RS resource overhead due to a large number of CSI-RS ports Embodiment 4-1

A method for defining the CSI-RS resource in one RB for aperiodic CSI-RS transmission may include two methods to be described below.

Method 1 for defining time/frequency resource required for aperiodic CSI-RS transmission: Transmission using existing CSI-RS RE.

Method 2 for defining time/frequency resource required for aperiodic CSI-RS transmission: Defining new resource for CSI-RS transmission.

Definition method 1 is a method for transmitting the aperiodic CSI-RS to the resources for the existing 1, 2, 4, 8-port CSI-RS transmission illustrated in FIG. 39. An advantage of such a method is that the PDSCH for data transmission may be together transmitted to the existing and new terminals together with new aperiodic CSI-RS transmission. However, such a method is disadvantageous in that when the corresponding base station allocates and transmits the aperiodic CSI-RS resources to a specific terminal, other terminals receiving data needs to be allocated with the corresponding resources as the ZP CSI-RS. Definition method 2 is a method for defining a new resource only for the CSI-RS transmission.

Figure 41:
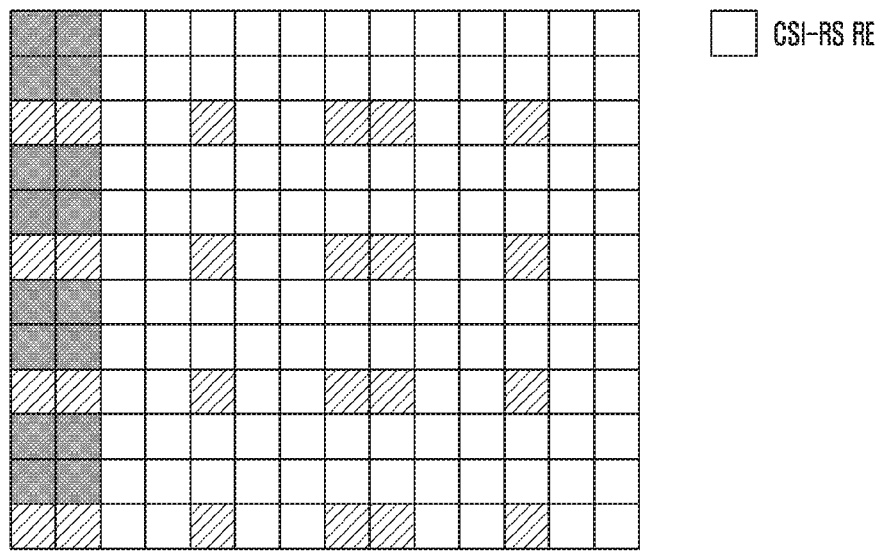
FIG. 41 is an illustration of a new resource only for the CSI-RS transmission.

FIG. 41 is an illustration of a new resource only for the CSI-RS transmission.

In FIG. 41, all bands, subbands, or RBs corresponding to the corresponding subframe are used only for the CSI-RS transmission. Therefore, in this case, a DMRS for decoding the PDSCH need not be transmitted. Therefore, all bands except for a region where a PDCCH needs to be transmitted and a region where a CRS needs to be transmitted may be used as the RE to which the CSI-RS is transmitted.

In this case, when a subframe in which the aperiodic CSI-RS transmission is configured is an MBSFN subframe, the CRS is transmitted only in a symbol in which only the PDCCH is to be transmitted, the number of CSI-RS REs may further increase in this case.

Further, a special subframe may be used by excluding a guard period (GP) and an uplink transmission interval (UpPTS) from the corresponding subframe. As one example, when transmission of two PDCCH symbols and MBSFN subframes are assumed, 144 REs may be used for the CSI-RS transmission. Such a method is advantageous in that a large number of CSI-RS REs may be secured within one RB, so that the CSI-RS REs may be simultaneously transmitted to a large number of terminals, and the ZP CSI-RS need not to be configured separately for the aperiodic CSI-RS transmission because the PDSCH is not simultaneously transmitted. Such an advantage helps the terminal to use the aperiodic CSI-RS regardless of the position. Further, when the terminal using the time/frequency resource definition method 2 dynamically allocates the aperiodic CSI-RS to a specific subframe (all bands), subband, or RB, the corresponding subframe may promise to transmit a signal, for a sync operation (PSS/SSS), contain SystemInformationBlockType1 (SIB1) information containing system information, or not to transmit all or some corresponding aperiodic CSI-RSs in a region where the corresponding aperiodic CSI-RS is allocated in the case of a paging subframe.

Embodiment 4-2

A method for configuring a unit for transmitting the CSI-RS resource may include the following methods.
  Method 1 for defining aperiodic CSI-RS resource transmission unit: Allocation and transmission to all bands
  Method 2 for defining aperiodic CSI-RS resource transmission unit: Allocation and transmission to specific subband
  Method 3 for defining aperiodic CSI-RS resource transmission unit: Allocation and transmission to specific bandwidth part
  Method 4 for defining aperiodic CSI-RS resource transmission unit: Allocation and transmission to specific RBG
  Method 5 for defining aperiodic CSI-RS resource transmission unit: Allocation and transmission to specific discontinuous RB
  Method 6 for defining aperiodic CSI-RS resource transmission unit: Allocation and transmission to specific continuous RB
  Method 1 for defining aperiodic CSI-RS resource transmission unit:
Transmission unit definition method 1 is a method for allocating and transmitting the aperiodic CSI-RS to all bands. Such a transmission method is advantageous in that since the CSI-RS is continuously transmitted to in all bands like the existing periodic CSI-RS, it is not necessary to dynamically transmit the information in addition to a fact that the aperiodic CSI-RS is transmitted, and since channel state information is continuously generated by measuring the CSI-RS in all bands like the operation of the existing terminal, the operation of the terminal is most similar to the existing operation of the terminal. However, such a transmission method is disadvantageous in terms of efficient CSI-RS allocation and transmission because the aperiodic CSI-RS needs to be continuously allocated and transmitted to all bands.
  Method 2 for Defining Aperiodic CSI-RS Resource Transmission Unit
  Transmission unit definition method 2 is a method for allocating and transmitting the aperiodic CSI-RS to the specific subband. In the channel status report, the size of the subband depends on a system bandwidth supported by the corresponding system. Table 27 shows a subband size depending on a configuration of the corresponding system bandwidth.

TABLE 27

Subband Size (k) vs. System Bandwidth

| System Bandwidth $N_{RB}^{DL}$ | Subband Size (k) |
|---|---|
| 6-7 | NA |
| 8-10 | 4 |
| 11-26 | 4 |
| 27-63 | 6 |
| 64-110 | 8 |

As a result, the number of subbands varies depending on the configuration of the corresponding system bandwidth. As one example, in the case of 50 RBs, 6 RBs are configured as one subband according to the above table, and as a result, 9 subbands exist. For such a configuration, a field with 9 bits may be used and configured as the bitmap. In this case, since a range which the terminal needs to estimate is smaller than the entire bandwidth, channel estimation complexity of the terminal may be reduced and since the corresponding range is the same as the existing subband channel estimation unit, the terminal may use the existing hardware as it is. Further, there is an advantage that the CSI-RS resources may be used flexibly for each subband. However, RRC or L1 signaling is required.
  Method 3 for Defining Aperiodic CSI-RS Resource Transmission Unit
  Transmission unit definition method 3 is a method for allocating the aperiodic CSI-RS to specific bandwidth parts.
  Table 28 shows definition of the bandwidth parts used in the existing periodic channel status report.

TABLE 28

Subband Size (k) and Bandwidth Parts (J) vs. System Bandwidth

| System Bandwidth $N_{RB}^{DL}$ | Subband Size k (RBs) | Bandwidth Parts (J) |
|---|---|---|
| 6-7 | NA | NA |
| 8-10 | 4 | 1 |
| 11-26 | 4 | 2 |
| 27-63 | 6 | 3 |
| 64-110 | 8 | 4 |

Figure 42:
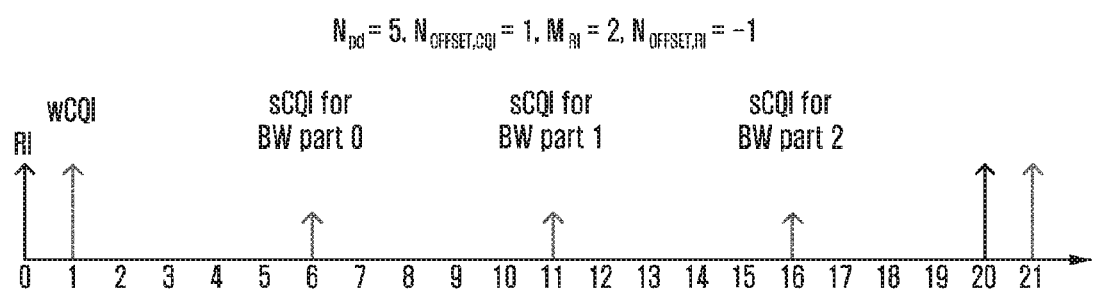
FIG. 42 is a diagram illustrating that the UE performs a periodic channel status report by using the bandwidth parts.

FIG. 42 is a diagram illustrating that the terminal performs a periodic channel status report by using the bandwidth parts.

In FIG. 42, the terminal defines all subbands as J bandwidth parts according to the system bandwidth as shown in the above table, reports the preferred subband position for each bandwidth part, and reports PMIs and CQIs corresponding to the corresponding subbands to the base station.

Therefore, when the aperiodic CSI-RS is allocated according to the bandwidth part, it is possible to support the degree of freedom less than the degree of freedom which increases by supporting the subband, and as a result, there is an advantage that the aperiodic CIS-RS may be transmitted to not the full bandwidth but a partial bandwidth while requiring small configuration information.

When the transmission unit definition method 3 is used, the terminal may select a specific subband within the bandwidth part and perform the channel status report only in the corresponding subband, such as the existing periodic channel status report in the aperiodic channel status report. Therefore, a transmission amount of uplink data which the terminal requires for the aperiodic channel status report may be reduced.

Method 4 for Defining Aperiodic CSI-RS Resource Transmission Unit

Transmission unit definition method 4 is a method for allocating and transmitting the aperiodic CSI-RS to the specific RBG. In the channel status report, the size of the RBG depends on the system bandwidth supported by the corresponding system.

Table 29 shows a subband size depending on a configuration of the corresponding system bandwidth.

TABLE 29

| RBG size (P) vs. System Bandwidth | |
|---|---|
| Bandwidth (#RBs) | RBG size (P) |
| ≤10 | 1 |
| 11-26 | 2 |
| 27-63 | 3 |
| 64-110 | 4 |

As a result, the size of the RBG varies depending on the configuration of the corresponding system bandwidth. As one example, in the case of 50 RBs, 3 RBs are configured as one RBG according to the above table, and as a result, 18 subbands exist. For such a configuration, a field with 18 bits may be used and configured as the bitmap.

In this case, since the range the terminal which needs to estimate is smaller than that of the entire band, the channel estimation complexity of the terminal may be reduced. In addition, it is advantageous in that the CSI-RS resource may be flexibly used in unit of RBG smaller than subbands and the existing downlink resource allocation type 0 may be reused.

Figure 43:
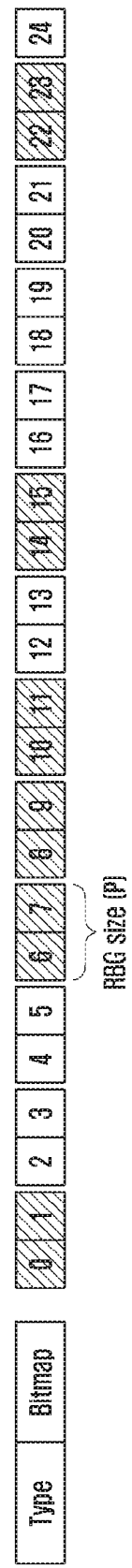
FIG. 43 is a diagram illustrating downlink resource allocation type 0.

FIG. 43 is a diagram illustrating downlink resource allocation type 0.

As illustrated in FIG. 43, Type 0 is a method of allocating resources in unit of the RBG determined according to the system bandwidth.

To allocate the resources based on Type 0, the base station first uses bit information to inform the resource allocation type. Further, for practical resource allocation, the terminal may be allocated with the corresponding RBG using a bitmap of a size of $\lceil N_{RB}^{DL}/P \rceil$ using the RBG size according to the system bandwidth size of Table 28 and receive downlink data from the corresponding resource. Likewise, the base station may allocate the aperiodic CSI-RS for each RBG by using the corresponding method to notify to the terminal whether to transmit the aperiodic CSI-RS to the RBG. However, such a method requires there RRC or L1 signaling.

Method 5 for Defining Aperiodic CSI-RS Resource Transmission Unit

Transmission unit definition method 5 is a method for allocating and transmitting the aperiodic CSI-RS to the specific discontinuous RB. Such a method is advantageous in that the flexibility of resource use increases because the aperiodic CSI-RS transmission is supported for each discontinuous RB, but is disadvantageous in that the signaling overhead for transmission may increase in order to use the corresponding method.

In this case, downlink resource allocation type 1 may be reused for transmission unit definition method 5.

Figure 44:
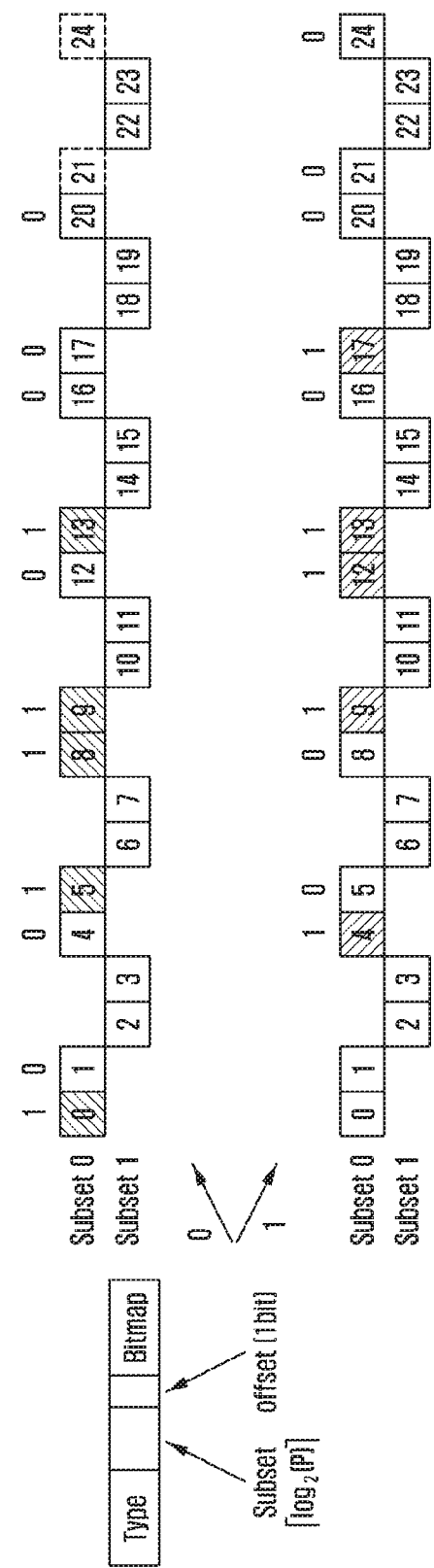
FIG. 44 is a diagram illustrating downlink resource allocation type 1.

FIG. 44 is a diagram illustrating downlink resource allocation type 1.

As illustrated in FIG. 44, in order to allocate the resources based on Type 1, the base station first uses bit information to inform the resource allocation type.

In addition, since the signaling overhead excessively increases in order to allocate the resources to all bands for each RB at once, the corresponding resources may be transmitted in two by the offset. In addition, Type 1 uses the same amount of signaling as Type 0 and to this end, the corresponding RB may be allocated by using a bitmap having the size of $(\lceil N_{RB}^{DL}/P \rceil - \lceil \log_2(P) \rceil - 1)$ which is an amount obtained by excluding for selecting a subset and 1 bit for selecting the offset from the bitmap having a size $\lceil N_{RB}^{DL}/P \rceil$ used in Type 1 and the downlink data may received in the corresponding resource.

Specifically, referring to FIG. 44, which of the two divided resources is to be used may be indicated using the offset. For example, if the offset is set to 0, the upper resources of FIG. 44 may be used, and if the offset is set to 1, the lower resources of FIG. 44 may be used.

In addition, a subset may be selected using the subset information, and the resource allocated among the subsets may be indicated using a bitmap.

By reusing the method of downlink resource allocation type 1, the base station may transmit the aperiodic CSI-RS to the terminal. In this case, the method may be the RRC or L1 signaling.

Further, in the aperiodic CSI-RS transmission in the discontinuous RB allocation, unlike the downlink data allocation, overhead not required for the CSI-RS transmission such as the MCS for each codeword is not needed, and as a result, more DCI bits may also be configured than the downlink resource allocation. Therefore, in this case, it is also possible to allocate a bitmap of a full size excluding the offset.

Method 6 for Defining Aperiodic CSI-RS Resource Transmission Unit

Transmission unit definition method 6 is a method for allocating and transmitting the aperiodic CSI-RS to the specific continuous RB. Such a method is advantageous in that the signaling overhead is reduced compared to other allocation methods because only a start RB position and the length thereof or an end RB position is reported, unlike the method that supports the aperiodic CSI-RS transmission for each discontinuous RB.

However, since the aperiodic CSI-RS needs to be continuously transmitted only to consecutive RBs, only a specific position needs to be selected or the aperiodic CSI-RS needs to be transmitted to a lot of bands including unnecessary bands under a situation in which it is determined that the efficiency of the terminal is high in the discontinuous RBs or subbands.

In this case, downlink resource allocation type 2 may be reused for transmission unit definition method 6.

Figure 45:
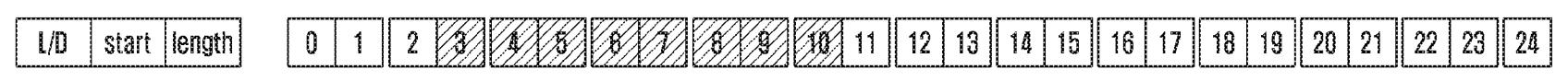

FIG. 45 is a diagram illustrating downlink resource allocation type 2.

As illustrated in FIG. 45, in order to allocate the resources based on Type 2, the base station first uses 1 bit for reporting whether the corresponding resources are allocated in the form of localized virtual resource block (LVRB) or distributed virtual resource block (DVRB). Based thereon, the start RB position and the length thereof are reported through a resource indication value (RIV).

In this case, the start position and the length may be obtained according to a DCI format as shown in Equation 1 below.

For, DCI format 1A, 1B and 1D, $$RIV = \begin{cases} N_{RB}^{DL}(L_{CRBs} - 1) + RB_{start} & (L_{CRBs} - 1) \leq \lfloor N_{RB}^{DL}/2 \rfloor \\ N_{RB}^{DL}(N_{RB}^{DL} - L_{CRBs} + 1) + (N_{RB}^{DL} - 1 - RB_{start}) & \text{otherwise} \end{cases}$$

<Equation 8>

For, DCI format 1C, $$RIV = \begin{cases} N_{VRB}'^{DL}(L'_{CRBs} - 1) + RB'_{start} & (L'_{CRBs} - 1) \leq \lfloor N_{VRB}'^{DL}/2 \rfloor \\ N_{VRB}'^{DL}(N_{VRB}'^{DL} - L'_{CRBs} + 1) + (N_{VRB}'^{DL} - 1 - RB'_{start}) & \text{otherwhise} \end{cases}$$

where $$RB'_{start} = RB_{start}/N_{RB}^{step} \quad L'_{CRBs} = L_{CRBs}/N_{RB}^{step} \quad N_{VRB}'^{DL} = \lfloor N_{VRB}^{DL}/N_{RB}^{step} \rfloor$$

Resource allocation bits used in this case are $\lceil \log_2 N_{RB}^{DL}(N_{RB}^{DL}+1)/2 \rceil$ and $\lceil \log_2(\lfloor N_{VRB,gap1}^{DL}/N_{RB}^{step} \rfloor (\lfloor N_{VRB,gap1}^{DL}/N_{RB}^{step} \rfloor +1)/2) \rceil$ bits. Although only the downlink resource allocation method is described in the embodiment of the present disclosure, an uplink resource allocation method operating on the same principle may also be used for signaling through the same principle as mentioned above. Further, although the current resource allocation in the LTE/LTE-A is transmitted through the DCI which is L1, the above method may be equally applied to the configuration through the RRC signaling.

Embodiment 4-3

In time/frequency resource definition method 2 required for the aperiodic CSI-RS transmission described in the embodiment 4-1 of the present disclosure, the PDSCH is not transmitted to the terminal in the subframe required for the aperiodic CSI-RS transmission as described above. Therefore, the resource required for the PDSCH transmission and the resource required for the DMRS transmission required for the PDSCH decoding may be used as the CSI-RS.

In this case, the base station reports the OFDM symbol required for the PDCCH transmission through the PCFICH and the corresponding resource may not be used in the subframe or RB required for the aperiodic CSI-RS transmission because the PDCCH needs to be transmitted. Further, the CRS may not be used for the aperiodic CSI-RS transmission because the CRS is commonly used by all terminals of the base station depending on the use such as sync or RRM with the base station as well as the PDSCH decoding.

However, in LTE Rel-12, a multicast-broadcast single-frequency network (MBSFN) subframe may be configured by using the RRC configuration in subframes except for subframes 0, 4, 5, and 9 in FDD and subframes 0, 1, 5, and 6 in TDD. In the corresponding subframe, the CRS is not transmitted in a PDSCH transmission part except for the PDCCH area, and as a result, the CSI-RS transmission area may increase.

As described above, the CSI-RS resources usable in one RB or subframe proposed in the present disclosure may be changed according to the PCFICH transmission, the MBSFN configuration, a subframe index, and the like. In the periodic CSI-RS transmission using 1, 2, 4, and 8 ports in the related art, since the resources capable of transmitting the CSI-RS are continuously fixed, the transmission is available by defining one port index for each antenna. Since the periodic CSI-RS transmission using ports 12 and 16 is also based on the existing resources, the corresponding periodic CSI-RS transmission may be performed by combining the existing 4-port or 8-port CSI-RS.

However, the method proposed by the present disclosure may not be supported by a fixed port definition method like the related art because the resources capable of transmitting the CSI-RS are changed. Therefore, a mapping rule between a new resource and the port is required.

Figure 46:
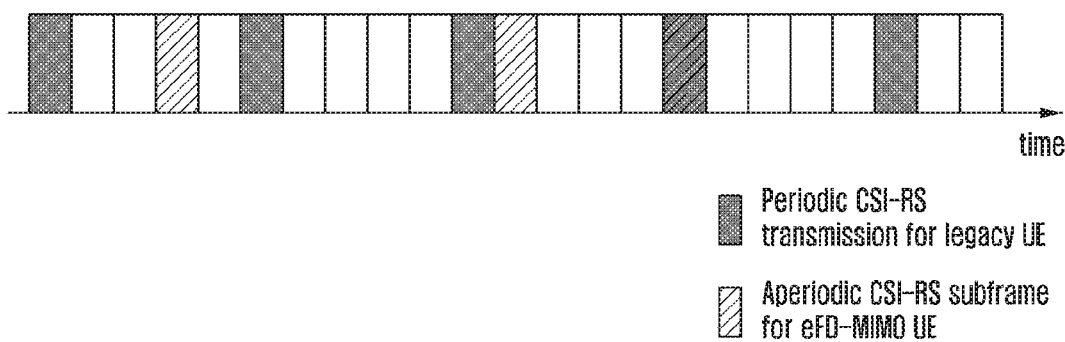
FIG. 46 illustrates a structure in which the aperiodic CSI-RS RB or the subframe presented by the present disclosure is transmitted.

FIG. 46 illustrates a structure in which the aperiodic CSI-RS RB or the subframe presented by the present disclosure is transmitted.

Referring to FIG. 46, the base station may configure the periodic CSI-RS to the terminals. Since the existing LTE terminal does not support the aperiodic CSI-RS transmission, the corresponding terminals needs to continuously transmit the periodic CSI-RS and report the channel state information to the terminal.

Further, even a terminal supporting new aperiodic CSI-RS transmission may receive a report of approximate channel state information by allocating a small CSI-RS port using virtualization or beamforming. The base station may determine whether the terminal is a terminal requiring the aperiodic CSI-RS transmission through the reported channel state information and allocate the aperiodic CSI-RS transmission to the terminal requiring the aperiodic CSI-RS transmission.

Therefore, as illustrated in FIG. 46, the periodic CSI-RS transmission and the aperiodic CSI-RS may be transmitted in different subframes, but may be transmitted in the same subframe according to the channel status of the terminal.

In the embodiment, the base station and the terminal determine REs available as the aperiodic CSI-RS in the corresponding RB. In this case, the CSI-RS REs may be secured by excluding all or some of the PDCCH, the CRS, the PCFICH, the PHICH, a PSS, an SSS, and paging.

In the case of the DMRS, since the PDSCH transmission is not performed in the corresponding RB, it is not necessary to transmit the PDSCH. Accordingly, in port index definition method 1 proposed by the present disclosure, the number of ports may be indexed after securing corresponding available REs. In this case, the base station needs to transmit to the terminal positions of a k-th frequency RE and a l-th time symbol where the CSI-RS port starts. In order to transmit to the terminal the positions of the frequency and the time symbol where the bases station starts, a pair (k, l) may be reported based on the entirety of one RB. For example, in the case of a 0-th subcarrier and a 4-th time symbol in the RB, a pair (0, 4) is made and in the case of a 6-th subcarrier and a 7-th symbol, a pair (6, 7) is made. In this case, on the contrary, in configuring the positions of the time and the frequency, a method in which the position of the time symbol is first reported and the position of the frequency is configured later may be used.

Further, the pair (k, 1) may be reported based on not one RB but a slot. For example, the (0, 4) may be expressed as (0, 4) ns=0 and the (6, 7) may be expressed as (6, 0) ns=1.

In addition, the two methods may be expressed by one parameter. For example, index 0 is expressed as (0, 0) and index 1 is expressed as (1, 0). Further, indexes 0 and 1 may be expressed even as a relationship expression of the parameter and (k, 1). Equation 9 is an example of such a relationship expression.

Based on the RB, $k=\mathrm{mod}(I,12), l=\lfloor I/14 \rfloor$

Based on the Slot, $n_s = \lfloor I/64 \rfloor, k = \mathrm{mod}(I,12), l = \lfloor \mathrm{mod}(I,64)/7 \rfloor$ <Equation 9>

The method for configuring the CSI-RS port index starting resource proposed by the present disclosure may be divided into the following methods.

CSI-RS starting resource configuration method 1: Configured through the DCI

CSI-RS starting resource configuration method 2: Configuring corresponding available resource through the RRC CSI-RS starting resource configuration method 3: Configuring the corresponding available resource separately to be divided into normal subframe and MBSFN subframe through the RRC CSI-RS Starting Resource Configuration Method 1:

The starting resource configuration method 1 described above is a configuration method through the DCI.

Such a method is a method in which the base station reports the index of the corresponding resource position to the terminal and the terminal configures the corresponding resource based on the number of antenna ports by receiving the index.

However, since positions that may be configured as a starting position may be significantly diversified (168 bits are required assuming that all REs may be configured), such a method is disadvantageous in that the overhead is large. However, when the corresponding CSI-RS allocation unit may be configured in the slot or a smaller unit other than the RB, the number of bits may be reduced. Therefore, the use of the slot or the smaller unit may be considered. In this case, although the aperiodic starting resource configuration is transmitted through the DCI, the number of CSI-RS antenna ports required for the terminal, whether subsampling is performed, the number of antenna ports after subsampling, PC, codebook subset restriction, etc. may be configured through the RRC.

CSI-RS Starting Resource Configuration Method 2

The starting resource configuration method 2 mentioned above is a configuration method through the RRC.

The base station configures the corresponding resource position to the terminal through the RRC in advance and the terminal may configure the corresponding resource together with the number of antenna ports by using the resource position. Such a field may have the same name as ResourceConfig-r14 using a similar field name to the existing periodic CSI-RS resource.

However, in such a method, since the terminal may receive the aperiodic CSI-RS only at a specific position defined in advance, CSI-RS resource efficiency may be relatively reduced. Therefore, in this case, an increase in degree of freedom of the aperiodic CSI-RS transmission by providing a plurality of candidates for the aperiodic CSI-RS transmission may be also considered. To this end, the base station reports to the terminal which candidate is transmitted through the DCI and the terminal may use an indicated configuration among a plurality of configurations by determining that the aperiodic CSI-RS is transmitted based on the reported candidate to be transmitted.

Tables 30 and 31 show a mapping relationship between such a DCI field and the aperiodic CSI-RS configuration.

Table 30 shows allocation DCI signaling when there is a separate aperiodic CSI-RS transmission bit.

| AP-CSI-RS indicator | Report contents |
|---|---|
| 00 | First aperiodic CSI-RS configuration configured through RRC information |
| 01 | Second aperiodic CSI-RS configuration configured through RRC information |
| 10 | Third aperiodic CSI-RS configuration configured through RRC information |
| 11 | Fourth aperiodic CSI-RS configuration configured through RRC information |

Table 31 shows allocation DCI signaling when there is no separate aperiodic CSI-RS transmission bit.

| AP-CSI-RS indicator | Report contents |
|---|---|
| 00 | No aperiodic CSI-RS transmission |
| 01 | First aperiodic CSI-RS configuration configured through RRC information |
| 10 | Second aperiodic CSI-RS configuration configured through RRC information |
| 11 | Third aperiodic CSI-RS configuration configured through RRC information |

Table 30 shows allocation DCI signaling when there is a separate aperiodic CSI-RS transmission bit.

The base station additionally uses 1 bit to indicate whether the aperiodic CSI-RS is transmitted. Therefore, since the corresponding bit additionally exists, the signaling does not need the content that there is no aperiodic CSI-RS transmission and two bits are used to indicate one of four aperiodic CSI-RS configurations.

Table 31 shows allocation DCI signaling when there is no separate aperiodic CSI-RS transmission bit.

Since the base station does not additionally use 1 bit to indicate whether the aperiodic CSI-RS is transmitted, the corresponding field also needs to be included in the indication. Therefore, up to three fields may be configured using two bits.

Although the above example is exemplified using two bits, the number of indications may increases to 3 bits, 4 bits, and so on. Further, the number of CSI-RS antenna ports required for the terminal, whether subsampling is performed, the number of antenna ports after subsampling, the PC, the codebook subset restriction, etc. may be together configured for each corresponding field through the RRC. However, in this case, when the MBSFN subframe is configured, the port mapping and resource position of the corresponding RB may vary depending on the position of the subframe and all available configurations need to be made according to the case. Therefore, when the number of corresponding configurations is small, the degree of freedom decreases and when the number of corresponding configurations is large, DCI overhead for choosing the configurations increases, and as a result, the efficiency of the aperiodic CSI-RS resource transmission may deteriorate.

CSI-RS Starting Resource Configuration Method 3

CSI-RS starting resource configuration method 3 is a method for configuring the available resources separately to be divided into the normal subframe and the MBSFN subframe through the RRC.

Such a method is basically similar to starting resource configuration method 2, but in such a method, the DCI overhead may be reduced by configuring the available resources separately in the normal subframe and the MBSFN subframe.

The terminal checks whether the subframe in which the corresponding aperiodic CSI-RS is configured is the normal subframe or a subframe configured as the MBSFN subframe to determine the aperiodic CSI-RS configuration indicated in the configuration corresponding to the subframe.

For example, when four of a total of eight preconfigurations are to be used for the MBSFN subframe and four are to be used for the normal subframe, a 3-bit DCI needs to be continuously transmitted in method 2, while only a 2-bit DCI may be transmitted in method 3.

However, while Method 2 may be freely adjusted regardless in which subframe 8 preconfigurations are used, Method 3 needs to continuously restrict the number by dividing the number by four, and as a result, it is disadvantageous in that there may be a limit in the aperiodic CSI-RS transmission.

A method for defining the port index based on the starting resource configuration in the CSI-RS RB or subframe proposed in the present disclosure may be divided into the following two methods according to the possibility of simultaneous transmission with the existing terminal.

Figure 47:
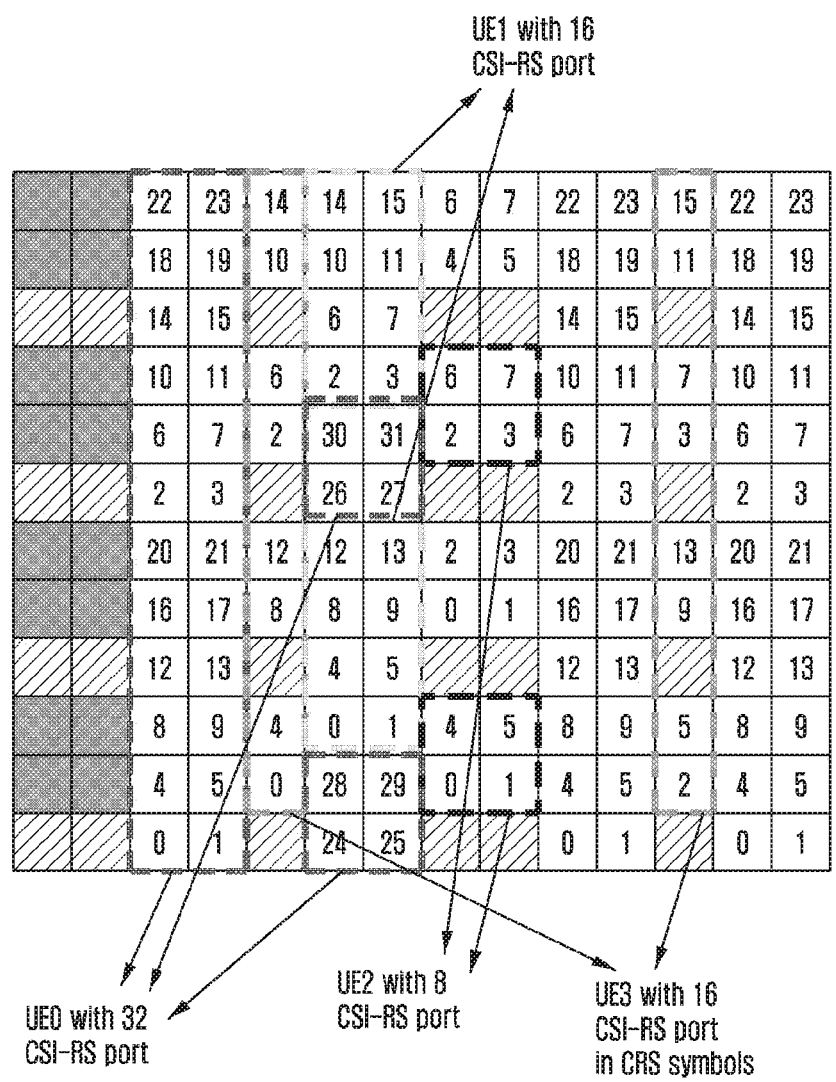
FIG. 47 is a diagram illustrating a port index definition method based on port index definition method 1 and an example of allocating the port index to the terminal.

CSI-RS RB or port index definition method 1: Allocating port index to corresponding transmittable resources according to frequency and time resources CSI-RS RB or port index definition method 2: Dividing corresponding transmittable resources into existing CSI-RS resource and new CSI-RS resource and allocating port index according to frequency and time resources for each resource FIG. 47 is a diagram illustrating a port index definition method based on port index definition method 1 and an example of allocating the port index to the terminal.

The frequency resources of the corresponding RBs may be divided in half and the ports may be alternately arranged based on the positions of the given frequency RE and symbol using the starting point configuration method mentioned above.

In the case of the time symbol, the ports may be arranged using two time symbols in CDM2 and four time symbols in CDM4 from the corresponding time symbol. As an example, in FIG. 10, the base station configures (0, 2) as (k, l) to terminal 0 as 32 antenna port CDM2. Therefore, the terminal divides one RB in half using two time symbols based on the configuration, maps ports 0 and 1 to k=0, maps ports 2 and 3 to k=6, maps ports 4 and 5 to k=1, and maps ports 6 and 7 to k=7, or the like. In this case, since there are only 12 frequency resources in one RB, it is impossible to map all of 32 antenna ports into two time symbols. Therefore, only ports 22 and 23 are mapped to the corresponding time symbol and subsequent port 24 or later is moved and mapped to the next time symbol.

It is noted that the symbol to which the CRS is transmitted is not together used when a time symbol in which the CRS is not transmitted is allocated, but used together with the symbol in which the CRS is transmitted. This means that the REs in which the CRS is transmitted need to consume a large amount of power for the CRS, and as a result, transmittable power may be relatively small as compared with normal REs. Therefore, it is preferable to map the port indexes by separately collecting the port indexes because the configuration of PC that means the assumption of the power ratio between the CSI-RS and the PDSCH may be different from that of the general REs.

An example of configuring and using the time and frequency resources in the CRS may be described based on terminal 3 of FIG. 47. Terminal 3 is configured with (k, l)=(1, 4) together with the CDM2 as an initial position. Since the corresponding position is a position where the CRS is transmitted, the terminal maps the CSI-RS port to the CDM2 by grouping different CRS symbols.

In the example of FIG. 47, it is exemplified that the terminal 3 groups and uses a 4-th symbol and an 11-th symbol in which the CRS is transmitted, but adjacent CRS symbols may be combined and used. When the adjacent CRS symbols are combined and used, performance may be leveled because a time symbol distance between two resources is the same within the CSI-RS resources in which the CRS symbol is transmitted.

Figure 48:
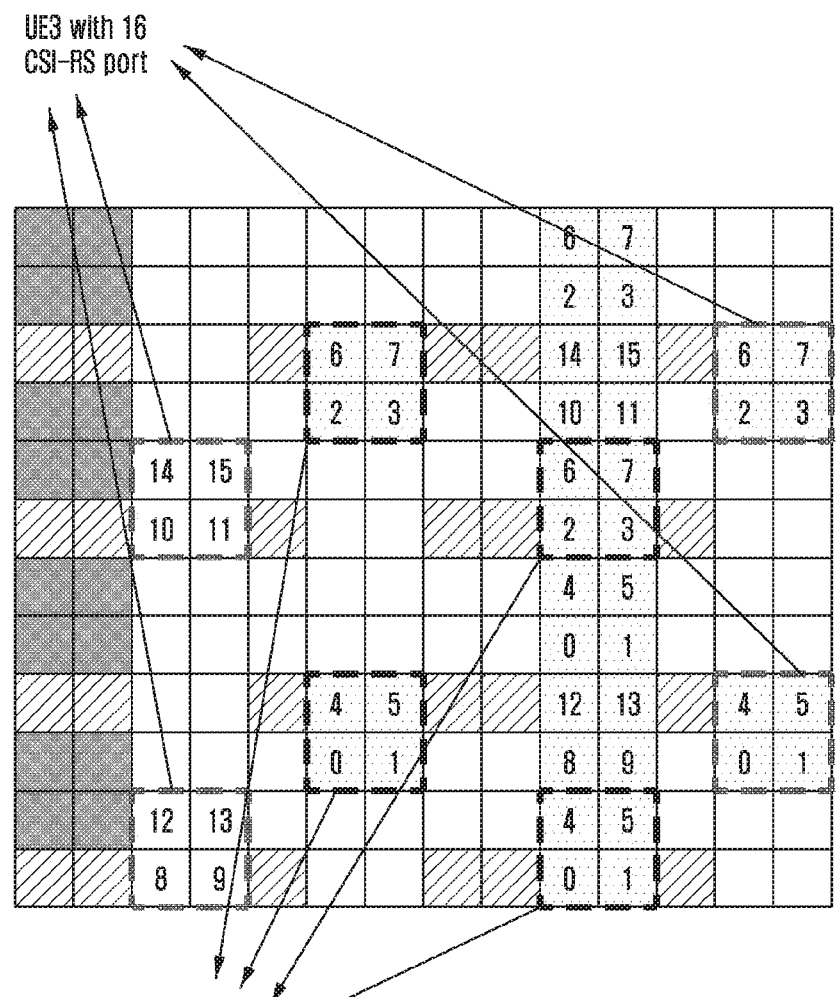
FIG. 48 is a diagram illustrating a port index definition method based on port index definition method 2.

However, when the two resources are separated from each other as described in the example of FIG. 10, the performance may be lowered in the corresponding resource, which is separated by 7 symbols than a case where symbols 7 and 8 are grouped and used. Further, in the case of the CDM4, all four symbols in which the CRS is transmitted are combined and used. Such a method helps the resources to be efficiently used when only the aperiodic CIS-RS is transmitted while being allocated to one RB, but as illustrated in FIG. 9, when the existing periodic CSI-RS and the aperiodic CSI-RS allocation need to be overlapped and transmitted, resource utilization may not be efficient. Further, as mentioned above, since the CRS symbol and the normal symbol may be different in terms of the use of the power, a plurality of PCs may be configured in the CSI-RS configuration so that the corresponding resource may be applied differently for each symbol and when the base station indicates the symbol in which the CRS is transmitted, PC for the corresponding CSI-RS may be used and when the base station transmits the CRS to the normal symbol, PC for the normal symbol may be used. FIG. 48 is a diagram illustrating a port index definition method based on port index definition method 2. The method of FIG. 48 is basically the same as the method of FIG. 47 mentioned above except that the existing method is used in the REs used as the existing CSI-RS.

When the terminal is allocated with the resource used as the CSI-RS RE in the related art as a starting point, the ports are mapped only in the CSI-RS REs used in the related art by the existing method.

Therefore, when terminal 0 of FIG. 48 is allocated with 16 resources, the terminal 0 uses the resources of the existing CSI-RS RE without using the above frequency resources after 4/5 and 6/7 port allocation. Such a method is advantageous in that the port indexing method becomes somewhat complicated, but the CSI-RS may be transmitted together with the existing terminal.

In the above embodiments, it is assumed that in the port mapping method, the CSI-RS is transmitted by configuring one transmission position, but a plurality of start positions and the number of antenna ports for each start position are configured like the configuration of 12 and 16 CSI-RS ports in Rel-13 CSI-RS and the corresponding positions are combined to generate 12 and 16 or more, for example, 22, 24, 26, 28, 30, and 32 CSI-RS ports. Further, in the example, the ports are exemplified like ports 0, 1, . . . , 15, but may be used like CSI-RS ports 15, 16, . . . , 30 used in the LTE and 16 ports or more, for example, CSI-RS ports 22, 24, 26, 28, 30, and 32 may be generated.

Further, the configuration method may be used not only for the configuration of a non zero power (NZP) CSI-RS but also for the configuration of a zero power (ZP) CSI-RS or CSI-IM. In this case, in the case of the ZP CSI-RS or CSI-IM, the number of antenna ports is fixed to 4, the antenna configuration is not required, and the subsampling may not be applied. In addition, the aperiodic CSI-IM includes CSI-RS related resources and CSI-IM related resources simultaneously in one field for each aperiodic CSI-RS. When the corresponding field is indicated, an operation in which the channel is measured at the CSI-RS position and the interference is measured at the CSI-IM position may be performed. In addition, when a corresponding resource is transmitted to some bands (RB, RBG, subband, bandwidth parts, etc.) other than all bands, a new DCI format may be defined to allocate the corresponding resource and the corresponding format may be allocated by using existing resource allocation types 0, 1, 2, etc. proposed by the present disclosure. Since the aperiodic CSI-RS configuration requires the aperiodic channel status report, the aperiodic CSI-RS configuration may be based on a UL DCI format. In this case, information may be transmitted in one DCI format for uplink data transmission allocation and aperiodic CSI-RS transmission indication and two DCIs are simultaneously transmitted to be received by the terminal. In this case, an additional ID or RNTI for the aperiodic CSI-RS transmission may be required. Therefore, the terminal may be allocated with the position of the CSI-RS resource and report the channel status by applying the number of antenna ports indicated by the terminal, whether the subsampling is performed, the number of antenna ports after the subsampling, the PC, the codebook subset restriction, etc. In this case, since it is guaranteed that the aperiodic CSI-RS is transmitted in the subframe in which the DCI is transmitted, the subframe configuration may not be included in the aperiodic CSI-RS configuration.

Embodiment 4-4

When the aperiodic CSI-RS is transmitted to existing CSI-RS REs using time/frequency resource definition method 1 described in the first embodiment, zero power (ZP) CSI-RS information needs to be configured in order to transmit correct rate matching information to the terminal that receives the PDSCH at the same time as the CSI-RS. The method for configuring the ZP CSI-RS resource may include two following methods.

ZP CSI-RS resource definition method 1: Method for configuring the ZP CSI-RS in advance through the RRC and using the configured ZP CSI-RS as the pool for the aperiodic CSI-RS transmission ZP CSI-RS resource definition method 2: Method for dynamically configuring the ZP CSI-RS according to the situation through the RRC and using the configured ZP CSI-RS as the pool for the aperiodic CSI-RS transmission ZP CSI-RS resource definition method 1 is a method for making the pool for the aperiodic CSI-RS and allocating the aperiodic CSI-RS only in the corresponding pool.

FIG. 49 is a diagram illustrating a method in which the base station allocates the pool for the aperiodic CSI-RS and allocates the pool to each terminal.

In FIG. 49, the base station may configure the CSI-RS pool through the RRC configuration in advance like a rectangle.

Since the number of ZP CSI-RSs that may be aperiodically configured in the current LTE system is not limited within the configured ZP CSI-RS, the base station may allocate a large number of ZP CSI-RSs to the existing terminal. Therefore, the CSI-RS pool for the aperiodic CSI-RS transmission may be configured even for the existing terminal that does not support the aperiodic CSI-RS.

Since the terminal determines in advance that the corresponding position is the ZP CSI-RS, the terminal may determine that the PDSCH is not transmitted in the corresponding resource when the PDSCH is transmitted and may perform rate-matching through the determination.

In the corresponding ZP CSI-RS, the base station may aperiodically allocate only the CSI-RS resource to the terminal. In this case, in order to aperiodically allocate the NZP CSI-RS, the base station needs to dynamically transmit the NZP CSI-RS to the terminal.

When the positions of the resources indicated by the ZP CSI-RS configuration and the NZP CSI-RS configuration are the same as each other in the LTE, since the NZP CSI-RS configuration takes a priority, the terminal regards the corresponding resource as the NZP CSI-RS at the time of allocating the aperiodic CSI-RS, and as a result, it is possible to measure the channel in the corresponding resource.

FIG. 46 illustrates the aperiodic CSI-RS for only one terminal in the CSI-RS pool consisting of one subframe, but the aperiodic CSI-RS may be transmitted to a plurality of terminals. Further, as described above, the transmission unit may be all subbands or some subbands. When the aperiodic CSI-RS transmission is supported for the terminal using the corresponding method, the terminal may not expect to transmit the aperiodic CSI-RS resource that do not overlap with the ZP CSI-RS for supporting with the existing terminal. The method for configuring the CSI-RS pool through the semi-static ZP CSI-RS configuration has an advantage in that the terminal may operate smoothly together with the existing terminal. However, since the semi-static ZP CSI-RS needs to be allocated in advance for this purpose, the number of REs for the PDSCH transmission may be reduced. This may lead a result in which an effect of the aperiodic CSI-RS that an increase in system performance through efficient resource utilization may not be sufficiently achieved.

ZP CSI-RS Resource Definition Method 2

ZP CSI-RS resource definition method 2 is a method for dynamically configuring the ZP CSI-RS according to the situation through the DCI. In this case, the method in which the base station transmits the corresponding configuration may be divided as follows.

Dynamic ZP CSI-RS resource transmission method 1: Configured through a 1-bit signal Dynamic ZP CSI-RS resource transmission method 2: Configured through a signal of 2 bits or more When the ZP CSI-RS is configured through the 1-bit signal by resource transmission method 1, the terminal may check only whether the ZP CSI-RS exists in the corresponding resource. Therefore, the terminal should continuously assume that the ZP CSI-RS continuously exists in all subframes with respect to all downlink resources with which the terminal is allocated for transmitting the PDSCH when the aperiodic ZP CSI-RS exists through the corresponding method. Therefore, in this case, even if the base station does not need to transmit the aperiodic NZP CSI-RS to all bands allocated to the terminal, the terminal may not assume that the PDSCH is transmitted to the corresponding resource, so that the resources may be unnecessarily consumed. However, it is advantageous in that the signaling overhead for the dynamic configuration may be minimized. When the ZP CSI-RS is configured through the signal of 2 bits or more by resource transmission method 2, the number of antenna ports, a start resource, etc. may be configured in advance through the RRC as described in the third embodiment of the present disclosure. In this case, the terminal may additionally check information on not only the presence of the ZP CSI-RS in the corresponding resource but also at which position the ZP CSI-RS is configured.

Figure 50:
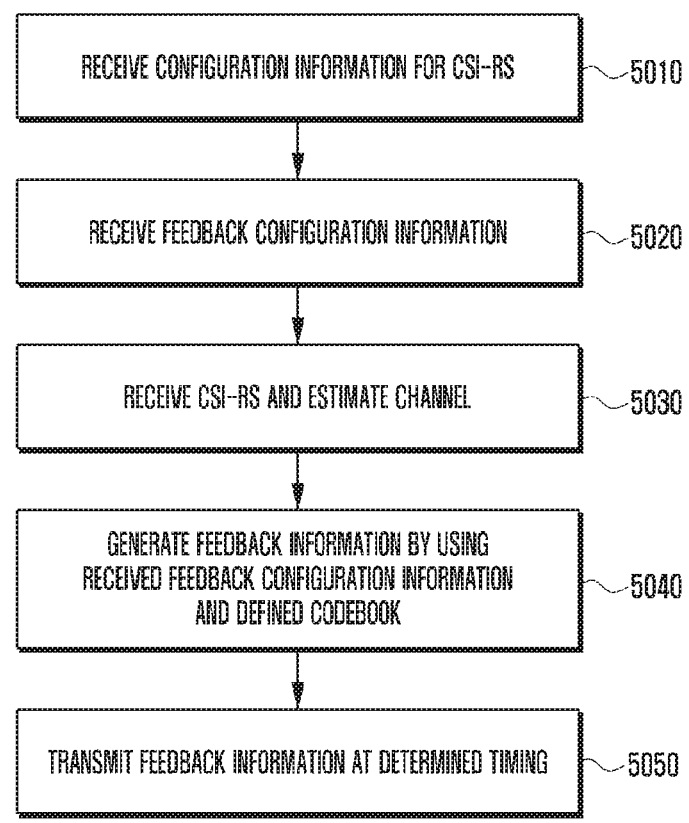
FIG. 50 is a flowchart illustrating an operation procedure of a UE according to an embodiment of the present disclosure.

Therefore, the terminal may check whether the ZP CSI-RS exists with respect to some of predetermined downlink resources for transmitting the PDSCH when the aperiodic ZP CSI-RS exists through the corresponding method. Such a configuration is possible in the RRC field and may be considered for all units like the proposed CSI-RS transmission unit. Therefore, the PDSCH may be decoded assuming that the ZP CSI-RS exists in the corresponding resource overlapping with the PDSCH transmission. Such a method is disadvantageous in that more flexible and various aperiodic ZP CSI-RS transmission is possible, but DCI overhead is required. FIG. 50 is a flowchart illustrating an operation procedure of a terminal according to an embodiment of the present disclosure.

Referring to FIG. 50, in step 5010, the terminal receives configuration information on the aperiodic CSI-RS configuration. Further, the terminal may check at least one of the number of ports for each aperiodic CSI-RS, N1 and N2 which are the number of antennas for each dimension, O1 and O2 which are oversampling factors for each dimension, one subframe config for transmitting multiple CSI-RSs and a plurality of resource configs for configuring the position, codebook subset restriction related information, CSI report related information, a CSI-process index, and transmission power information, based on the received configuration information.

In this case, the configuration information on the aperiodic CSI-RS configuration may be configured separately from the CSI-RS configuration information. Alternatively, the terminal may receive the CSI-RS configuration information and also additionally receive information indicating whether the CSI-RS configuration information is for an aperiodic CSI-RS. In this case, the information indicating whether the information is for the aperiodic CSI-RS may be configured as information of 1 bit and may be received through DCI and the like.

Thereafter, the terminal configures one feedback configuration information based on at least one CSI-RS position in step 5020. In the corresponding information, the period and the offset of the PMI/CQI, the period and the offset of the RI, wideband or subband, the submode, etc. may be configured.

When the terminal receives multiple CSI-RSs in one subframe based on the configuration information on the CSI-RS configuration in step 5030, the terminal estimates the channel between the base station antenna and the receiving antenna of the terminal based on the received CSI-RSs.

In the case, according to the present disclosure, the aperiodic CSI-RS may be transmitted, and the aperiodic CSI-RS may use a resource to which the existing CSI-RS is transmitted or may be transmitted using a new resource.

Also, the aperiodic CSI-RS may be transmitted through at least one of a full band, a specific subband, a specific bandwidth portion, a specific RBG, a discontinuous RB, or a continuous RB as described above.

In addition, the starting resource to which the CSI-RS is transmitted may be configured through DCI, or configured through RRC, or can be configured to be divided into a normal subframe and an MBSFN subframe.

Further, the port index of the CSI-RS may be dynamically decided using the resource allocated to the terminal and the overhead. Particularly, the terminal may allocate a port index according to the frequency and the time resource to the corresponding transmittable resource or allocate the corresponding transmittable resource to be divided into an existing CSI-RS resource and a new CSI-RS resource for each resource.

The detailed contents are the same as described above, and hereinafter will be omitted.

In step 5040, the terminal generates the feedback information rank, PMI, and CQI using the received feedback configuration based on a virtual channel added between the estimated channel and the aperiodic CSI-RS. At this time, one of the embodiments presented in the present disclosure can be used for generating the corresponding information, and a plurality of embodiments among the embodiments presented in the present disclosure can be considered together.

Thereafter, in step 5050, the terminal transmits the feedback information to the base station at a predetermined feedback timing according to the feedback configuration of the base station, thereby completing a channel feedback generation and reporting process considering a two-dimensional array.

In addition, one or the plurality of the embodiments proposed in the present disclosure may be applied to the operation of the terminal.

Figure 51:
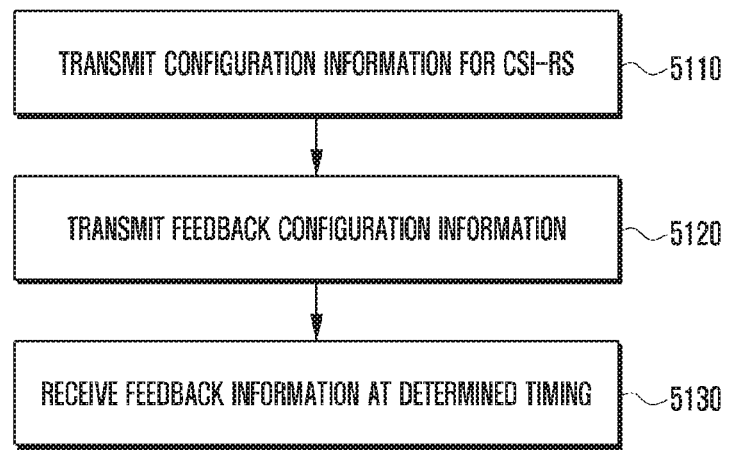
FIG. 51 is a flowchart illustrating the operation procedure of the base station according to an embodiment of the present disclosure.

FIG. 51 is a flowchart illustrating the operation procedure of the base station according to an embodiment of the present disclosure.

Referring to FIG. 51, in step 5110, the base station transmits the configuration information for the CSI-RS for measuring the channel to the terminal.

The configuration information for the CSI-RS may include configuration information for the aperiodic CSI-RS. In this case, the base station may configure the configuration information for the aperiodic CSI-RS configuration separately from CSI-RS configuration information. Alternatively, the base station may transmit the CSI-RS configuration information and also additionally transmit information indicating whether the CSI-RS configuration information is for an aperiodic CSI-RS. In this case, the information indicating whether the information is for the aperiodic CSI-RS may be configured as information of 1 bit and the base station may transmit the information through DCI and the like.

The configuration information may include at least one of the number of ports for each aperiodic CSI-RS, N1 and N2 which are the number of antennas for each dimension, O1 and O2 which are oversampling factors for each dimension, one subframe config for transmitting multiple CSI-RSs and a plurality of resource configs for configuring the position, codebook subset restriction related information, CSI report related information, a CSI-process index, and transmission power information.

Thereafter, the base station transmits the feedback configuration information based on at least one aperiodic CSI-RS to the terminal in step 5120.

In the corresponding information, the period and the offset of the PMI/CQI, the period and the offset of the RI, wideband or subband, the submode, etc. may be configured. Thereafter, the base station transmits the configured CSI-RS to the terminal. The terminal estimates the channel for each antenna port and estimates an additional channel for the virtual resource based on the estimated channel. The terminal decides the feedback, and generates the PMI, RI, and CQI corresponding thereto, and transmits the generated PMI, RI, and CQI to the base station.

Accordingly, the base station receives the feedback information from the terminal at a predetermined timing which is determined in step 5130 and uses the feedback information to determine the channel status between the terminal and the base station.

In this case, the base station may transmit the aperiodic CSI-RS and receive the feedback information generated based on the CSI-RS.

According to the present disclosure, the base station may transmit the aperiodic CSI-RS and the base station may transmit the aperiodic CSI-RS using the resource to which the existing CSI-RS is transmitted or a new resource.

Also, the aperiodic CSI-RS may be transmitted through at least one of a full band, a specific subband, a specific bandwidth portion, a specific RBG, a discontinuous RB, or a continuous RB as described above.

In addition, the base station may configure the starting resource to which the CSI-RS is transmitted through DCI or through RRC, or can be configured to be divided into a normal subframe and an MBSFN subframe.

Further, the port index of the CSI-RS may be dynamically decided using the resource allocated to the terminal and the overhead. Particularly, the terminal may allocate a port index according to the frequency and the time resource to the corresponding transmittable resource or allocate the corresponding transmittable resource to be divided into an existing CSI-RS resource and a new CSI-RS resource for each resource.

The detailed contents are the same as described above, and hereinafter will be omitted.

Figure 52:
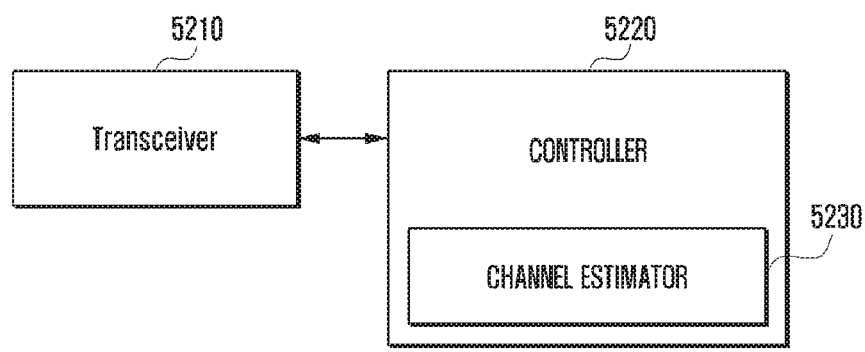
FIG. 52 is a block diagram illustrating an internal structure of a terminal according to an embodiment of the present disclosure.

FIG. 52 is a block diagram illustrating an internal structure of a terminal according to an embodiment of the present disclosure.

Referring to FIG. 52, the terminal includes a transceiver 5210 and a controller 5220. The transceiver 5210 performs a function of transmitting or receiving data from the outside (e.g., a base station). Herein, the transceiver 5210 may transmit feedback information to the base station under the control of the controller 5220.

The controller 5220 controls states and operations of all components constituting the terminal. Specifically, the controller 5220 may generate the feedback information according to information allocated from the base station.

In addition, the controller 5220 controls the transceiver 5210 to feedback the generated channel information to the base station according to timing information allocated from the base station. To this end, the controller 5220 may include a channel estimator 5230. The channel estimator 5230 determines the feedback information required through a CSI-RS and feedback allocation information received from the base station and estimates a channel by using the received CSI-RS based on the feedback information.

Further, a PDSCH is decoded by applying reference signal mapping in which a precoder is applied to a size and a rank of PRG and a DMRS port corresponding to the corresponding PDSCH transmission described in the embodiment of the present disclosure based on a DCI transmitted by the base station. In FIG. 52, an example in which the terminal is constituted by the transceiver 5210 and the controller 5220 is described, but the present disclosure is not limited thereto and the terminal may further include various components according to functions performed in the terminal. For example, the terminal may further include a display unit for displaying a current state of the terminal, an input unit for inputting a signal such as function execution by a user, a storage unit for storing data generated in the terminal, and the like. Further, it is illustrated that the channel estimator 5230 is included in the controller 5220 as above, but the present disclosure is not necessarily limited thereto. The controller 5220 may control the transceiver 5210 to receive configuration information for each of one or more reference signal resources from the base station. Further, the controller 5220 may control the transceiver 5210 to measure the at least one reference signal and to receive the feedback configuration information for generating the feedback information according to the measurement result from the base station.

In addition, the controller 5220 may measure at least one reference signal received through the transceiver 5210 and generate the feedback information according to the feedback configuration information. The control unit 5220 may control the transceiver 5210 to transmit the generated feedback information to the base station at feedback timing according to the feedback configuration information. Further, the controller 5220 may receive a channel status indication-reference signal (CSI-RS) from the base station, generate the feedback information based on the received CSI-RS, and transmit the generated feedback information to the base station. In this case, the controller 5220 may select a precoding matrix for each antenna port group of the base station and further select one additional precoding matrix based on a relationship between antenna port groups of the base station. Further, the controller 5220 may receive the CSI-RS from the base station, generate the feedback information based on the received CSI-RS, and transmit the generated feedback information to the base station. In this case, the controller 5220 may select one precoding matrix for all antenna port groups of the base station. Further, the controller 5220 may receive the feedback configuration information from the base station, receive the CSI-RS from the base station, generate the feedback information based on the received feedback configuration information, and transmit the generated feedback information to the base station. In this case, the controller 5220 may receive the feedback configuration information corresponding to each antenna port group of the base station and the additional feedback configuration information based on a relationship between the antenna port groups.

In addition, the controller 5220 may control all the operation of the terminal described above.

Figure 53:
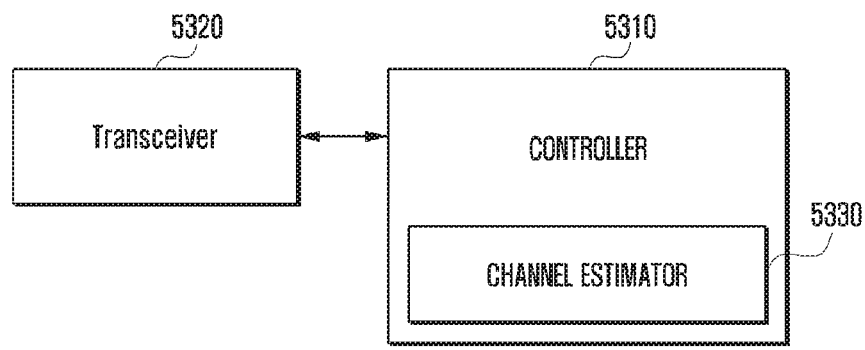
FIG. 53 is a flowchart illustrating the internal structure of the base station according to the embodiment of the present disclosure.

FIG. 53 is a flowchart illustrating the internal structure of the base station according to the embodiment of the present disclosure.

Referring to FIG. 53, the base station includes a controller 5310 and a transceiver 5320. The controller 5310 controls the states and operations of all components constituting the base station. Specifically, the controller 5310 allocates CSI-RS resources for channel estimation of the terminal to the terminal and allocates feedback resources and a feedback timing to the terminal. To this end, the controller 5310 may further include a resource allocator 5330. In addition, a feedback configuration and the feedback timing are allocated so as to prevent feedbacks from a plurality of terminals from colliding with each other and the feedback information configured at the corresponding timing is received and interpreted. The transceiver 5320 performs functions of transmitting and receiving the data, the reference signal, and the feedback information to and from the terminal.

Herein, the transceiver 5320 transmits the aperiodic CSI-RS to the terminal through the allocated resources under the control of the controller 5310 and receives the feedback for channel information from the terminal. It is illustrated that the resource allocator 5330 is included in the controller 5310 as above, but the present disclosure is not particularly limited thereto. The controller 5310 may control the transceiver 5320 to transmit the configuration information for each of the at least one reference signal to the terminal or generate the at least one reference signal. Further, the controller 5310 may control the transceiver 5320 to transmit the feedback configuration information for generating the feedback information according to the measurement result to the terminal.

In addition, the controller 5310 may control the transceiver 5320 to transmit the at least one reference signal to the terminal and receive the feedback information transmitted from the terminal at the feedback timing according to the feedback configuration information. Further, the controller 5310 may transmit the feedback configuration information to the terminal, transmit the aperiodic CSI-RS to the terminal, and receive the feedback information generated based on the feedback configuration information and the CSI-RS from the terminal. In this case, the controller 5310 may transmit the feedback configuration information corresponding to each antenna port group of the base station and the additional feedback configuration information based on the relationship between the antenna port groups. Further, the controller 5310 may transmit a CSI-RS beamformed based on the feedback information to the terminal and receive the feedback information generated based on the CSI-RS from the terminal. According to the embodiment of the present disclosure described above, it is possible to prevent allocation of excessive feedback resources to transmit the CSI-RS in a base station having a large number of transmitting antennas with a two-dimensional antenna array structure and an increase in channel estimation complexity, and the terminal may effectively measure all channels for a large number of transmitting antennas and configure the measured channels as the feedback information and report the feedback information to the base station.

In addition, the controller 5320 may control all the operation of the base station described above.

Embodiment 5

The present disclosure relates to a general wireless mobile communication system, and more particularly, to a method for measuring a channel quality (wireless channel status) and transmitting and receiving a PMI and channel state information notified to a base station in order for a terminal to operate as a hybrid MIMO system in a wireless mobile communication system adopting a multiple access scheme using multi-carriers, such as an orthogonal frequency division multiple access (OFDMA).

In the LTE/LTE-A, the periodic feedback of the terminal may be configured as one feedback mode or reporting mode of four following modes according to what information is included in the periodic feedback.
1. Reporting mode 1-0: RI, wideband CQI (wCQI)
2. Reporting mode 1-1: RI, wCQI, PMI
3. Reporting mode 2-0: RI, wCQI, subband CQI (sCQI)
4. Reporting mode 2-1: RI, wCQI, sCQI, PMI The feedback timing of each information for the four feedback modes is determined by values such as $N_{pd}$, $N_{OFFSET,CQI}$, $M_{RI}$, and $N_{OFFSET,RI}$, which are transferred through the higher layer signal.

In feedback mode 1-0, a transmission period of wCQI is $N_{pd}$ and the feedback timing is determined with a subframe offset value of $N_{OFFSET,CQI}$. Further, the transmission period of RI is $N_{pd} \cdot M_{RI}$ and the offset is $N_{OFFSET,CQI} + N_{OFFSET,CQI}$.

Figure 54:
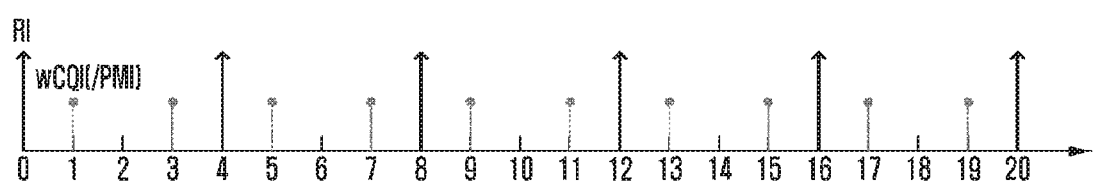
FIG. 54 is a diagram illustrating feedback timing of channel state information.

FIG. 54 is a diagram illustrating feedback timing of channel state information.

In FIG. 3, each timing represents a subframe index. FIG. 54 is a diagram illustrating feedback timing of RI and wCQI in the case of $N_{pd}=2$, $M_{RI}=2$, $N_{OFFSET,CQI}=1$, and $N_{OFFSET,RI}=-1$.

In feedback mode 1-0, the transmission period of wCQI may be 2 and the offset value may be determined as 1. Therefore, in feedback mode 1-0, the terminal may transmit wCQI with a period of two subframes from subframe 1.

Further, in feedback mode 1-0, the transmission period of RI may be 4 and the offset value may be determined as 0. Therefore, in feedback mode 1-0, the terminal may transmit RI with a period of four subframes from subframe 0.

Feedback mode 1-1 has the same feedback timing as mode 1-0, but has a difference that wCQI and PMI are transmitted together at wCQI transmission timing.

Meanwhile, in feedback mode 2-0, the feedback period of sCQI may be $N_{pd}$ and the offset value may be determined as $N_{OFFSET,CQI}$. In addition, the feedback period for wCQI may be $H \cdot N_{pd}$ and the offset value may be determined as $N_{OFFSET,CQI}$ like the offset value of sCQI. Herein, $H=J \cdot K+1$ may be defined and K may be transferred to the higher layer signal and J may be a value determined according to the system bandwidth.

For example, a value of J for a 10 MHz system may be defined as 3. As a result, the wCQI may be transmitted once every sCQI transmission once in substitution. In addition, the period of the RI may be $M_{RI} \cdot H \cdot N_{pd}$ and the offset may be determined as $N_{OFFSET,CQI} + N_{OFFSET,RI}$.

Figure 55:
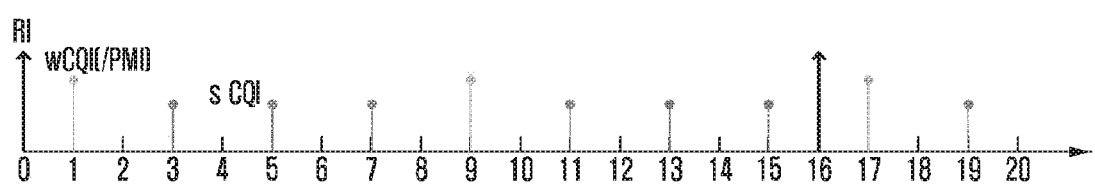
FIG. 55 is another diagram illustrating the feedback timing of the channel state information.

FIG. 55 is another diagram illustrating the feedback timing of the channel state information.

FIG. 55 is a diagram illustrating feedback timing of RI, sCQI, and wCQI in the case of $N_{pd}=2$, $M_{RI}=2$, $J=3$ (10 MHz), $K=1$, $N_{OFFSET,CQI}=1$, and $N_{OFFSET,RI}=-1$.

As described above, in feedback mode 2-0, the feedback period of sCQI may be 2 and the offset value may be determined as 1. Therefore, in feedback mode 2-0, the terminal may transmit sCQI with a period of two subframes from subframe 1. Although the sCQI is not illustrated in a subframe in which the wCQI and the sCQI are simultaneously transmitted, but the sCQI may be transmitted in a subframe in which the wCQI is transmitted.

Meanwhile, in the feedback mode 2-0, the feedback period for the wCQI may be determined as 2*H, and H may be determined as 4 by referring to the above equation. Therefore, the feedback period of the wCQI may be 8 and the offset value may be determined as 1. Therefore, in feedback mode 2-0, the terminal may transmit the wCQI with a period of eight subframes from subframe 1.

Further, in feedback mode 2-0, the transmission period of RI may be 16 and the offset value may be determined as 0. Therefore, in feedback mode 2-0, the terminal may transmit the RI with a period of sixteen subframes from subframe 0.

Further, feedback mode 2-1 has the same feedback timing as mode 2-0, but has a difference that the PMI is transmitted together at the wCQI transmission timing.

The aforementioned feedback timing corresponds to a case where the number of CSI-RS antenna ports is 4 or less and a terminal that is allocated with CSI-RSs for 8 antenna ports needs to feed back two PMI information unlike the feedback timing.

For 8 CSI-RS antenna ports, Feedback mode 1-1 is again divided into two submodes. In a first submode (hereinafter, may referred to as submode 1 or a first submode, the RI may be transmitted together with first PMI information (hereinafter, may be referred to as PMI1 or first PMI information) and second PMI information (hereinafter, may be referred to as PMI2 or second PMI information) may be transmitted together with the wCQI.

Herein, the feedback periods and the offsets for the wCQI and the second PMI are defined as $N_{pd}$ and $N_{OFFSET,CQI}$ and the feedback periods and the offset values for the RI and the first PMI information are defined as $M_{RI} \cdot N_{pd}$ and $N_{OFFSET,CQI} + N_{OFFSET,RI}$, respectively. Herein, when a precoding matrix corresponding to the first PMI is W1 and the precoding matrix corresponding to the second PMI is W2, the terminal and the base station share information that the precoding matrix preferred by the terminal is decided as W1W2.

In case of feedback mode 2-1 for 8 CSI-RS antenna ports, feedback of precoding type indicator (PTI) information is added. The PTI is fed back together with the RI and the period of the feedback is defined as $M_{RI} \cdot H \cdot N_{pd}$ and the offset is defined as $N_{OFFSET,CQI} + N_{OFFSET,RI}$.

When the PTI is 0, the first PMI, the second PMI, and the wCQI may be all fed back, the wCQI and the second PMI may be together transmitted at the same timing. In this case, a period in which the wCQI and the second PMI are transmitted may be $N_{pd}$ and the offset may be determined as $N_{OFFSET,CQI}$. In addition, the period of the first PMI may be $H' \cdot N_{pd}$ and the offset may be determined as $N_{OFFSET,CQI}$. Herein, H' may be transmitted by the higher layer signal.

On the contrary, when the PTI is 1, the PTI and the RI are together transmitted and the wCQI and the second PMI are together transmitted, and the sCQI is additionally fed back at separate timing. In this case, the first PMI is not transmitted. The periods and the offsets of the PTI and the RI are equal to those when the PTI is 0 and the period of the sCQI is defined as $N_{pd}$ and the offset is defined as $N_{OFFSET,CQI}$. The wCQI and the second PMI are fed back with a period of $H \cdot N_{pd}$ and an offset of $N_{OFFSET,CQI}$ and H is defined like the case where the number of CSI-RS antenna ports is 4.

Figure 56:
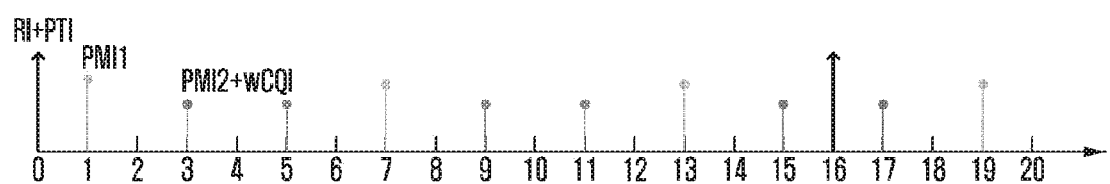
FIG. 56 is a diagram illustrating the feedback timing of the channel state information depending on a PTI value.

FIG. 56 is a diagram illustrating the feedback timing of the channel state information depending on a PTI value.

Referring to FIG. 56, FIG. 56 illustrates feedback timing when the PTI value is 0 with respect to a case of $N_{pd}=2$, $M_{RI}=2$, J=3 (10 MHz), K=1, H'=3, $N_{OFFSET,CQI}=1$, and $N_{OFFSET,RI}=-1$.

As described above, the PTI may be fed back together with the RI and according to the method described above, the feedback period may be determined as 16 and the offset may be determined as 0.

Accordingly, the terminal may transmit the RI and the PTI with the period of 16 subframes from subframe 0.

When the PTI is 0, the first PMI, the second PMI, and the wCQI may be all fed back, and the wCQI and the second PMI may be together transmitted at the same timing and the transmission period may be determined 2 and the offset may be determined as 1.

Accordingly, the terminal may transmit the wCQI and the second PMI information with the period of 2 subframes from subframe 1.

In addition, the period of the first PMI may be 6 and the offset may be determined as 1. Accordingly, the terminal may transmit the first PMI information with the period of 6 subframes from subframe 1 (515).

As described above, although the sCQI is not illustrated in the subframe in which the wCQI and the sCQI are simultaneously transmitted, but the sCQI may be transmitted even in the subframe in which the wCQI is transmitted.

Figure 57:
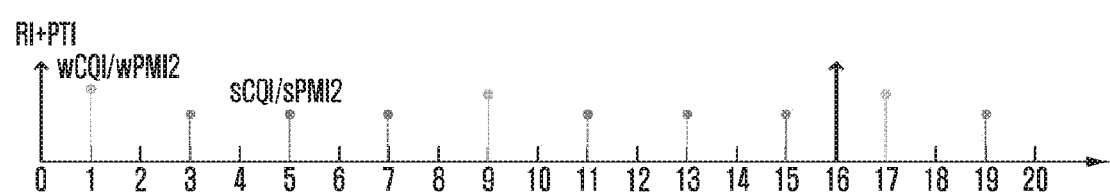
FIG. 57 is another diagram illustrating the feedback timing of the channel state information depending on the PTI value.

FIG. 57 is another diagram illustrating the feedback timing of the channel state information depending on the PTI value.

Referring to FIG. 57, FIG. 57 illustrates feedback timing when the PTI value is 1 with respect to a case of $N_{pd}=2$, $M_{RI}=2$, J=3 (10 MHz), K=1, H'=3, $N_{OFFSET,CQI}=1$, and $N_{OFFSET,RI}=-1$.

As described above, the PTI may be fed back together with the RI and according to the method described above, the feedback period may be determined as 16 and the offset may be determined as 0.

Accordingly, the terminal may transmit the RI and the PTI with the period of 16 subframes from subframe 0.

Further, when the PTI is 1, the wCQI and the second PMI may be transmitted together and the sCQI may be fed back at different timing. In this case, the first PMI may not be transmitted.

The period of the sCQI may be determined as 2 and the offset may be determined as 1. Accordingly, the terminal may transmit the sCQI with the period of 2 subframes from subframe 1.

In addition, the feedback periods of the wCQI and the second PMI may be 8 and the offset may be determined as 1. Accordingly, the terminal may transmit the wCQI and the second PMI information with the period of 8 subframes from subframe 1.

As described above, although the sCQI is not illustrated in the subframe in which the wCQI and the sCQI are simultaneously transmitted, but the sCQI may be transmitted even in the subframe in which the wCQI is transmitted.

In the LTE/LTE-A, aperiodic feedback is also supported in addition to the periodic feedback of the terminal. When the base station intends to acquire the aperiodic feedback information of a specific terminal, the base station may perform uplink data scheduling of the corresponding terminal by configuring to perform the aperiodic feedback using an aperiodic feedback indicator (or a channel state information request field, channel state information request information) included in downlink control information (DCI) for uplink data scheduling of the corresponding terminal. Accordingly, when the terminal receives the indicator configured to perform the aperiodic feedback in an n-th subframe, the terminal may perform uplink transmission including the aperiodic feedback information in data transmission in an (n+k)-th subframe. Herein, k as a parameter defined in the 3GPP LTE Release 11 standard is 4 in frequency division duplexing (FDD) and defined as shown in Table 32 in time division duplexing (TDD).

TABLE 32

K value for each subframe number n in TDD UL/DL configuration

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

When the aperiodic feedback is configured, the feedback information includes the RI, the PMI, and the CQI as in the case of the periodic feedback, and the RI and the PMI may not be fed back according to the feedback configuration. In addition, the CQI may include both the wCQI and the sCQI or may include only wCQI information.

Table 33 below shows a reporting type of the periodic channel status report reported using the PUCCH, information reported for each the corresponding reporting type, and a payload size of the information used.

vided. In the LTE/LTE-A, the periodic feedback of the terminal may be transmitted to the base station through the PUCCH. In this case, since an information amount which may be transmitted by the PUCCH at one time is limited, various feedback objects such as RI, wCQI, sCQI, PMI1, wPMI2, and sPMI2 are transmitted to the PUCCH through subsampling or two or more pieces of feedback information

TABLE 33

PUCCH reporting type

| PUCCH Reporting Type | Reported | Mode State | Mode 1-1 (bits/BP) | Mode 2-1 (bits/BP) | Mode 1-0 (bits/BP) | Mode 2-0 (bits/BP) |
|---|---|---|---|---|---|---|
| 1 | Sub-band CQI | RI = 1 | NA | 4 + L | NA | 4 + L |
|   |   | RI > 1 | NA | 4 + 3 + L | NA | 4 + L |
| 1a | Sub-band CQI/ second PMI | 8 ports, RI = 1 | NA | 4 + 4 + L | NA | NA |
|   |   | 8 ports, 1 < RI < 5 | NA | 4 +2 + 3 + L | NA | NA |
|   |   | 8 ports, RI > 4 | NA | 4 + 3 + L | NA | NA |
| 2 | Wideband CQI/ PMI | 2 ports, RI = 1 | 4 + 2 | 4 + 2 | NA | NA |
|   |   | 4 ports, RI = 1 | 4 + 4 | 4 + 4 | NA | NA |
|   |   | 2 ports, RI > 1 | 4 + 1 + 3 | 4 + 1 + 3 | NA | NA |
|   |   | 4 ports, RI > 1 | 4 + 4 + 3 | 4 + 4 + 3 | NA | NA |
| 2a | Wideband first PMI | 8 ports, RI < 3 | NA | 4 | NA | NA |
|   |   | 8 ports, 2 < RI < 8 | NA | 2 | NA | NA |
|   |   | 8 ports, RI = 8 | NA | 0 | NA | NA |

4 CQI
3 Spatial differential CQI-PMI
T PMI
J Jointly coded RI + first PMI
P Precoder Type Indication (PTI)

The terminal transmits the RI/PTI/PMI/CQI information and the like using the PUCCH reporting type required according to the PUCCH reporting mode and the reporting instance of the periodic channel status report as shown in Table 33 above.

However, the terminal can transmit only one PUCCH reporting type at one reporting time due to the characteristics of the report using the PUCCH in which the periodic channel status report is limited in the allocated resources and the payload size to be transmitted. Therefore, when the reporting times between CSI processes in one cell collide with each other or reporting times of different cells in a carrier aggregation (CA) situation collide with each other, the priority is set according to the PUCCH reporting type to resolve the collision.

In this case, a criterion for determining the priority is a reporting period. The longer the reporting period, the higher the priority and the more important the information, and the shorter the reporting period, the lower the priority. In the current standard, according to the reporting type, the priority is given in the order of RI>wideband PMI>wideband CQI>subband PMI and CQI, and when reports in which the reports of different cells have the same priority collide with each other, information on a cell having a low cell index is transmitted to resolve the collision.

Further, when there is information which is not reported by the collision, the corresponding information may continues to report the remaining periodic channel status using the most recently reported information. For example, in the case where the wideband PMI information is not reported, the wideband PMI which is most recently reported is 0, the wideband PMI at the current reporting time is also assumed to be 0 and the remaining second PMI and CQI information are reported.

Meanwhile, in the LTE/LTE-A, a codebook subsampling function for the periodic channel status reporting is proare encoded together (hereinafter, referred to as joint encoding) to be transmitted to a PUCCH.

As an example, when the number of CSI-RS ports configured in the base station is 8, the RI and the PMI1 reported in submode 1 of PUCCH mode 1-1 may be joint-encoded as shown in Table 34.

Based on Table 34, RI consisting of 3 bits and PMI1 consisting of 4 bits are joint-encoded with a total of 5 bits.

TABLE 34

Joint encoding of RI and $i_1$ for PUCCH mode 1-1 submode 1

| Value of joint encoding of RI and the first PMI $I_{RI/PMI_1}$ | RI | Codebook index $i_1$ |
|---|---|---|
| 0-7 | 1 | $2I_{RI/PMI_1}$ |
| 8-15 | 2 | $2(I_{RI/PMI_1}-8)$ |
| 16-17 | 3 | $2(I_{RI/PMI_1}-16)$ |
| 18-19 | 4 | $2(I_{RI/PMI_1}-18)$ |
| 20-21 | 5 | $2(I_{RI/PMI_1}-20)$ |
| 22-23 | 6 | $2(I_{RI/PMI_1}-22)$ |
| 24-25 | 7 | $2(I_{RI/PMI_1}-24)$ |
| 17 | 8 | 0 |
| 27-31 | reserved | NA |

Meanwhile, in submode 2 of PUCCH mode 1-1, PMI1 of 4 bits and PMI2 of other 4 bits are jointly encoded as a total of 4 bits as shown in Table 35. Since a subsampling level is larger than Submode 1 (4→3 for Submode 1, 8→4 for Submode 2), it is impossible to report more precoding indexes.

TABLE 35

Joint encoding of RI, $i_1$ and $i_2$ for PUCCH mode 1-1 submode 2

| | Relationship between the first PMI value and codebook index $i_1$ | | Relationship between the second PMI value and codebook index $i_2$ | | |
|---|---|---|---|---|---|
| R1 | Value of the first PMI $I_{PMI1}$ | Codebook index $i_1$ | Value of the second PMI $I_{PMI2}$ | Codebook index $i_2$ | total #bits |
| 1 | 0-7 | $2I_{PMI1}$ | 0-1 | $2I_{PMI2}$ | 4 |
| 2 | 0-7 | $2I_{PMI1}$ | 0-1 | $I_{PMI2}$ | 4 |
| 3 | 0-1 | $2I_{PMI1}$ | 0-7 | $4\lfloor I_{PMI2}/4\rfloor + I_{PMI2}$ | 4 |
| 4 | 0-1 | $2I_{PMI1}$ | 0-7 | $I_{PMI2}$ | 4 |
| 5 | 0-3 | $I_{PMI1}$ | 0 | 0 | 2 |
| 6 | 0-3 | $I_{PMI1}$ | 0 | 0 | 2 |
| 7 | 0-3 | $I_{PMI1}$ | 0 | 0 | 2 |
| 8 | 0 | 0 | 0 | 0 | 0 |

As another example, when there are 8 CSI-RS ports configured in the base station, the PMI2 reported in PUCCH mode 2-1 may be subsampled as shown in Table 36.

TABLE 36

PUCCH mode 2-1 codebook subsampling

| | Relationship between the second PMI value and codebook index $i_2$ | |
|---|---|---|
| RI | Value of the second PMI $I_{PMI2}$ | Codebook index $i_2$ |
| 1 | 0-15 | $I_{PMI2}$ |
| 2 | 0-3 | $2I_{PMI2}$ |
| 3 | 0-3 | $8 \cdot \lfloor I_{PMI2}/2 \rfloor + (I_{PMI2} \bmod 2)$ |
| 4 | 0-3 | $2I_{PMI2}$ |
| 5 | 0 | 0 |
| 6 | 0 | 0 |
| 7 | 0 | 0 |
| 8 | 0 | 0 |

Referring to Table 36, the PMI2 is reported as 4 bits when the associated RI is 1. However, when the associated RI is more than 2, a differential CQI for a second codeword should be additionally reported together, so that it may be confirmed that the PMI2 is subsampled with 2 bits and reported. In the LTE/LTE-A, it is possible to apply subsampling or joint encoding for a total of six periodic feedbacks including Table 34, Table 35, and Table 36.

There are two methods to support multiple antennas supported by the FD-MIMO. Specifically, a method for supporting a plurality of antennas uses a non-precoded CSI-RS (hereinafter, referred to as NP CSI-RS) or a beamformed CSI-RS (hereinafter, referred to as BF CSI-RS).

Figure 58:
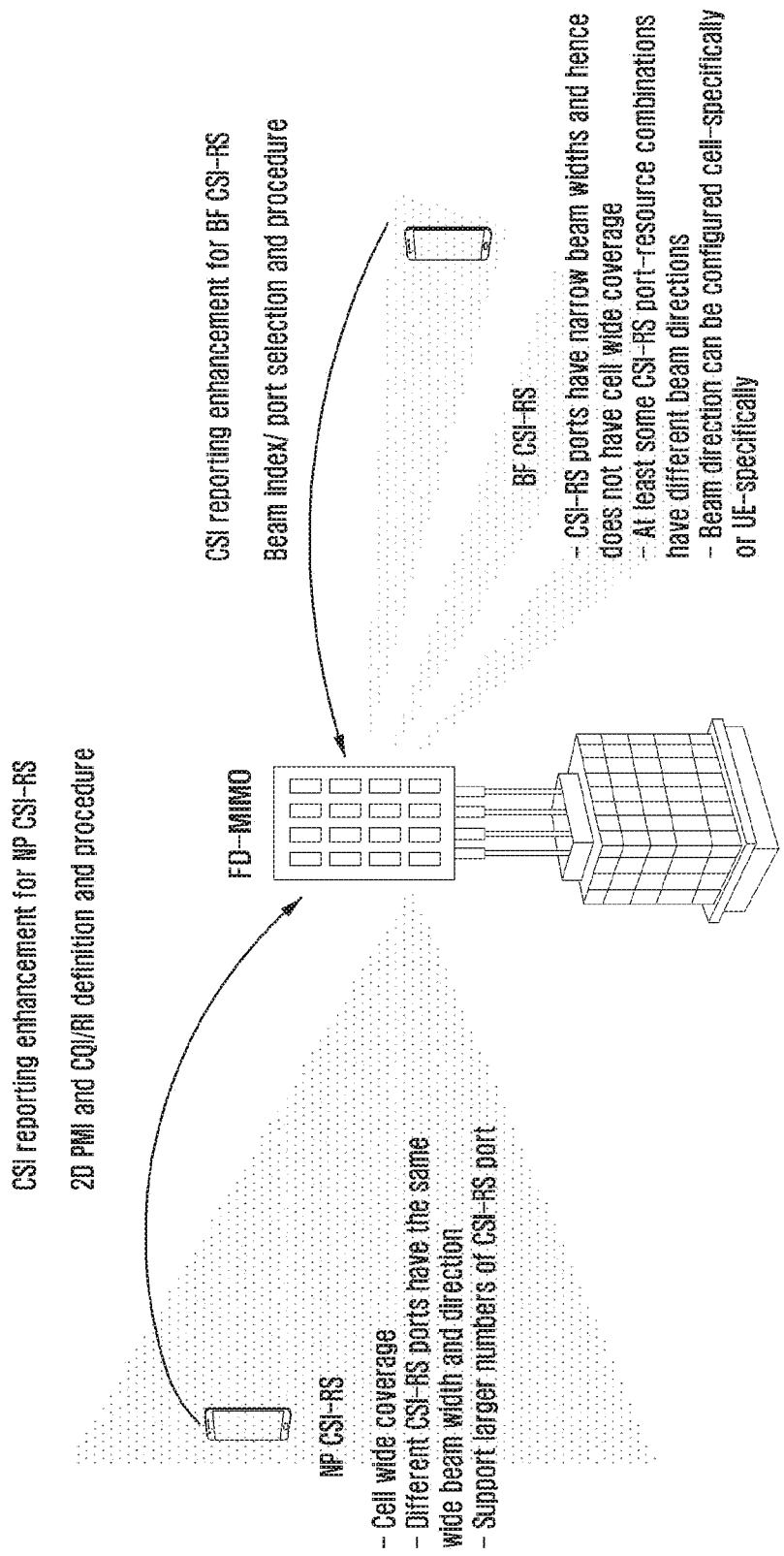
FIG. 58 is a diagram illustrating various scenarios usable by using an NP CSI-RS and a BF CSI-RS in FD-MIMO.

FIG. 58 is a diagram illustrating various scenarios usable by using an NP CSI-RS CSI-RS and a BF CSI-RS in FD-MIMO.

A method of using the NP CSI-RS is a method in which the base station transmits a CSI-RS having a wide beam width to transmit the CSI-RS to the terminal similarly to the existing CSI-RS and the terminal transmits the RI/PMI/CQI suitable for the corresponding beam to the base station.

In the existing Rel-11 LTE, up to 8 CSI-RS ports are supported. However, in order to support the FD-MIMO, a method of supporting various NP CSI-RS ports of 12/16/32/64 and a 2D codebook for PMI report may be considered.

On the contrary, a method of using the BF CSI-RS is a method of dividing the entire beam area into 1D or 2D in order to optimize the number of codebooks which are calculated by the terminal at one time and CSI-RS overhead.

In this case, it is possible to distinguish a cell specific BF CSI-RS and a terminal specific BF CSI-RS again according to a method of selecting the ID or 2D sector required for the terminal.

A method of using the cell specific BF CSI-RS is a method for transmitting a plurality of beams, which is the same as each other in terms of a cell, to the terminal and selecting a beam based on the channel status report reported based on the transmitted beams and transmitting data by the terminal. In this case, a method such as CSI-RS resource index (hereinafter, CRI) or beam index (hereinafter, BI) can be used for the channel status reporting.

The method allows the terminal to select information on a preferred beam and transmit the selected information to the base station when there are multiple CSI-RS resources or CSI-RS ports in one CSI process.

In the existing method, to this end, the base station needs to select the information by configuring a plurality of CSI processes and receiving all of respective channel state information, but in the present disclosure, the terminal selects the corresponding information to save uplink resources and reduce base station operation complexity.

In this case, such BI or CRI may also cause the collision like the RI/PMI/CQI used in the conventional periodic channel status reporting. Therefore, it is necessary to configure the priority in consideration of such a collision and to make an appointment for the operation when the collision occurs. Further, as mentioned above, although the same information which is most recently reported is assumed in the existing case, statistical characteristics of the channel to be measured can be changed because resources in which beams or TP are different assumed by the CRI may be designated, and as a result, it is dangerous to use the same information reported most recently in the corresponding periodic channel status report similarly to the existing case.

Figure 59:
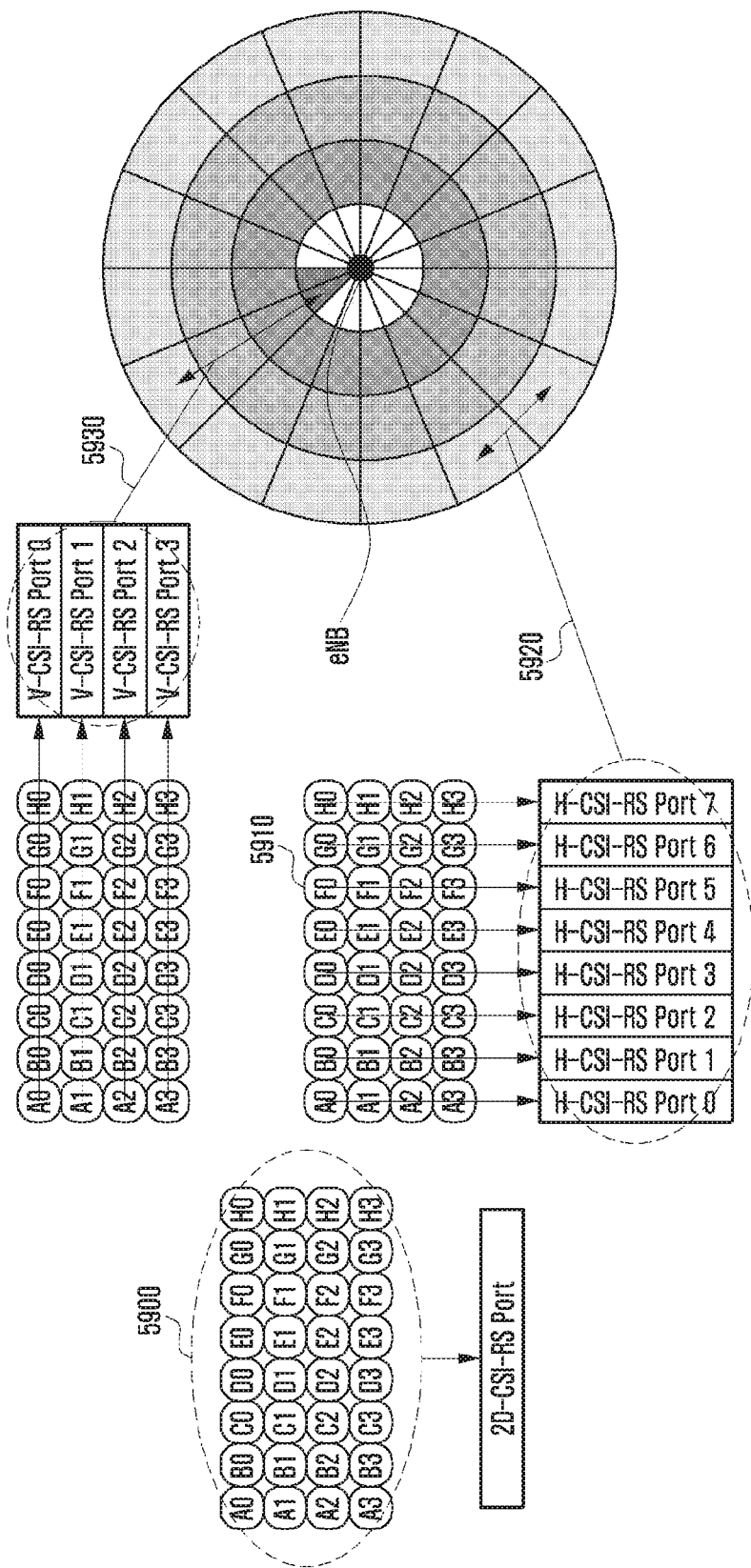
FIG. 59 is a diagram illustrating a method of transmitting a reference signal according to the present disclosure.

FIG. 59 is a diagram illustrating a method of transmitting a reference signal according to the present disclosure.

In general, when the number of transmission antennas is large like the FD-MIMO, the base station needs to transmit a reference signal (hereinafter, CSI-RS) proportional to the number of antennas need to be transmitted. As an example, when 8 transmission antennas are used in the LTE/LTE-A, the base station transmits CSI-RSs corresponding to 8 ports to the terminal to measure a downlink channel status.

In this case, for transmitting the CSI-RSs corresponding to 8 ports in the base station, radio resources including eight REs as shown in FIGS. 16A and 16B need to be used in one RB. When the CSI-RS transmission is applied to the FD-MIMO, the radio resources proportional to the number of transmission antennas need to be allocated to the CSI-RS. That is, when the number of transmission antennas of the base station is 128, the base station needs to transmit the CSI-RS using a total of 128 REs in one RB. Such a CSI-RS transmission scheme may increase accuracy of channel measurement between the antennas, but excessive radio resources are required, and as a result, there is an adverse effect of reducing radio resources required for wireless data transmission and reception. Therefore, considering the advantages and disadvantages, a base station having a large number of transmission antennas may consider two following methods in transmitting the CSI-RS like the FD-MIMO.

CSI-RS transmission method 1: Method for allocating and transmitting radio resources as many as antennas to the CSI-RS CSI-RS transmission method 2: Method for separating and transmitting the CSI-RS into a plurality of dimensions The base station operating the FD-MIMO in FIG. 59 may be configured by a total of 32 antennas. However, the scope of the present disclosure is not limited thereto, and the base station may be configured by 32 or more or 32 or less antennas.

A first antenna group 5900 in FIG. 59 shows a method for transmitting a CSI-RS by allocating radio resources as many as antennas using CSI-RS transmission method 1. In the first antenna group 5900, 32 antennas are represented by A0, . . . , A3, B0, . . . , B3, C0, . . . , C3, D0, . . . , D3, E0, . . . , E3, F0, . . . , F3, G0, . . . , G3, H0, . . . , H3, respectively.

The 32 antennas of the first antenna group 5900 are transmitted to one two-dimensional CSI-RS and a 2D-CSI-RS to measure channel statuses of horizontal and vertical antennas is configured by 32 antenna ports represented above. Such a method may increase the accuracy of the channel information because all of the radio resources are allocated for each antenna, but has a disadvantage in that the method is not effective in terms of resource efficiency because relatively many radio resources for control information or data are used.

A second antenna group 5910 in FIG. 59 may be defined to generate channel information using the CSI-RS transmission method 2. The CSI-RS transmission method 2 is a method that allows the terminal to perform channel measurement for a large number of transmission antennas while allocating a relatively small number of radio resources even if channel information with relatively low accuracy is generated.

The CSI-RS transmission method 2 is a method for separating and transmitting all CSI-RSs into N dimensions, and as an example, when the transmission antennas of the base station are arranged in 2D, the CSI-RSs are separated into two dimensions and transmitted. In this case, one CSI-RS operates in a horizontal CSI-RS (hereinafter, referred to as H-CSI-RS) for measuring horizontal channel information, and the other CSI-RS may operate in a vertical CSI-RS (hereinafter, referred to as V-CSI-RS) for measuring vertical channel information.

In FIG. 59, 32 antennas of the second antenna group 5910 may be represented by A0, . . . , A3, B0, . . . , B3, C0, . . . , C3, D0, . . . , D3, E0, . . . , E3, F0, . . . , F3, G0, . . . , G3, H0, . . . , H3, respectively, similarly to the first antenna group 5900. Further, the 32 antennas of FIG. 7 may be transmitted to two CSI-RSs. In this case, the H-CSI-RS to measure a horizontal channel status may be constituted by 8 antenna ports below.

H-CSI-RS port 0: Configured by combining antennas A0, A1, A2 and A3

H-CSI-RS port 1: Configured by combining antennas B0, B1, B2, and B3

H-CSI-RS port 2: Configured by combining antennas C0, C1, C2, and C3

H-CSI-RS port 3: Configured by combining antennas D0, D1, D2, and D3

H-CSI-RS port 4: Configured by combining antennas E0, E1, E2, and E3

H-CSI-RS port 5: Configured by combining antennas F0, F1, F2, and F3

H-CSI-RS port 6: Configured by combining antennas G0, G1, G2, and G3

H-CSI-RS port 7: Configured by combining antennas H0, H1, H2, and H3

Hereinabove, generating one CSI-RS port by combining the plurality of antennas means antenna virtualization and may be generally made by linearly combining the plurality of antennas.

Further, the V-CSI-RS to measure a vertical channel status may be constituted by 4 antenna ports below.

V-CSI-RS port 0: Configured by combining antennas A0, B0, C0, D0, E0, F0, G0, and H0

V-CSI-RS port 1: Configured by combining antennas A1, B1, C1, D1, E1, F1, G1, and H1

V-CSI-RS port 2: Configured by combining antennas A2, B2, C2, D2, E2, F2, G2, and H2

V-CSI-RS port 3: Configured by combining antennas A3, B3, C3, D3, E3, F3, G3, and H3

As described above, when the plurality of antennas are arranged in a 2D array of M×N (vertical direction×horizontal direction), the terminal may measure the channel of the FD-MIMO by using N horizontal CSI-RS ports and M vertical CSI-RS ports. That is, when two CSI-RSs are used, the terminal may determine the channel state information by using M+N CSI-RS ports for M×N transmission antennas.

As such, CSI-RS overhead may be reduced by the method of determining the information on more transmission antennas by using a smaller number of CSI-RS ports. In the CSI-RS transmission method 1, M×N=K CSI-RSs are used to determine the channel information for the transmission antenna of the FD-MIMO and such an approach may be similarly applied to a case of using two CSI-RSs.

Although in the present disclosure, the CSI-RS transmission method 1 is assumed and described, such an approach may be similarly expanded and applied and used even in the case of using the CSI-RS transmission method 2.

The following abbreviations are used in describing the present disclosure.

Rank indicator (RI): Rank indicator indicating that the terminal reports the rank of a channel obtained by applying the precoding to the BF CSI-RS to the base station or determines the rank according to a predetermined rule First PMI (W1): First precoding matrix indicator indicating that the terminal acquires the optimal precoding based on the channel obtained by applying the precoding to the BF CSI-RS and reports the obtained optimal precoding to the base station. The first precoding matrix indicator may represent a group of beams selected in horizontal and vertical directions. Further, the W1 may be respectively divided and separated into components in horizontal and vertical directions.

Second PMI (W2): Second precoding matrix indicator indicating that the terminal acquires optimal precoding based on the channel obtained by applying the precoding to the BF CSI-RS and reports the obtained optimal precoding to the base station. The second precoding matrix indicator may indicate co-phasing required to correct a phase difference between a beam selected in a group of the beams selected in the horizontal and vertical directions and an antenna having a different polarization. Similarly to W1, the W2 may also be respectively divided and separated into the components in horizontal and vertical directions.

CQI: Data transmission rate supportable by the terminal, which is generated on the assumption that the precoding is applied.

In order to allow the terminal to report the feedback information, the terminal receives the configuration of the feedback information for the 2D-CSI-RS. In this case, the corresponding 2D-CSI-RS may be a signal designating a plurality of CSI-RS ports or a signal designating the plurality of CSI-RS ports by combining a plurality of, for example, 2, 4, or 8-port CSI-RSs (resource configuration or subframe configuration). Thereafter, the terminal is allocated with one feedback through radio resource control (RRC) information. For the feedback allocation, one CSI-RS resource may be shown in Table 37 or contain only some components of Table 37.

[Table 37]
CSI process configuration information
NZP CSI-RS ID List
CSI-IM-ID List
CSR List
Channel Measurement Restriction
Interference Measurement Restriction
Report Both
Report Periodic Proc Id
Report Aperiodic Proc
Etc. . . .

In Table 37, a non-zero power (NZP) CSI-RS ID List is a field for configuring IDs of CSI-RS resources required to transmit the CRI. The corresponding field may be configured using the ID of the CSI-RS configuration included in Table 38 below.

[Table 38]
CSI-RS configuration information
CSI-RS Config 1D
Antenna Ports Count
Resource Config
Subframe Config
Scrambling Identity
qcl CRS Info
Etc. . . .

In Table 38, CSI-RS config 1D indicates the ID of the corresponding configuration. Antenna ports count indicates the number of CSI-RSs in the configuration and resource config indicates a configuration regarding which REs the CSI-RS uses in one RB. Subframe config information indicates a configuration for notifying the transmission period and the offset and scrambling identity is information of configuring an ID in which the CSI-RS is scrambled. Qcl CRS info contains scrambling ID related information and CRS related information required for CoMP operation.

As described above, since the respective configurations have the configurations related to the respective numbers of antenna ports, CSI-RS resources having different antenna port numbers may be combined and configured.

In Table 37, a CSI-IM ID List is a field for configuring the IDs of CSI-IM resources required for transmitting the CRI. The number of IDs included in the corresponding field may be the same as the number of IDS included in the NZP CSI-RS ID List. The corresponding field may be configured using the ID of the CSI-RS configuration included in Table 39 below.

[Table 39]
CSI-IM configuration information
CSI-IM Config 1D
Resource Config
Subframe Config
Etc. . . .

In Table 39 above, a CSI-IM config 1D indicates an ID of the corresponding configuration. Similarly to the CSI-RS, Resource config indicates a configuration regarding which REs the corresponding CSI-IM uses in one RB and Subframe config indicates a configuration for notifying the transmission period and the offset.

In Table 37 above, a channel measurement restriction and an interference measurement restriction are information indicating whether measurement restrictions applied to the CSI-RS and the CSI-IM are configured, respectively.

In the above table, there is a corresponding field in the CSI process configuration, but the corresponding field may exist in the periodic and aperiodic CSI reporting configuration or may exist separately outside the CSI process.

In Table 37 above, Report Both may include s an RI reference CSI process related configuration and a PMI-RI reporting related configuration.

Aperiodic report configuration information Report Aperiodic Proc may include aperiodic channel status report related information. Report Periodic Proc Id contains an ID of a configuration which the corresponding CSI process is to use for the periodic channel status report and the corresponding configuration may use a configuration included in Table 40 below.

[Table 40]
Periodic channel status report configuration information
CQI PUCCH resource index
CQI PMI Config Index
CQI Format Indicator Periodic
CRI ConfigIndex
RI Config Index
SimultaneousAckNackAndCQI
CQI-Mask
CSI ConfigIndex As shown in Table 40 above, in the corresponding configuration, information on resources to be used by the PUCCH to be reported, a CQI/PMI reporting related period, an offset, and submodes are configured.

Further, CRI ConfigIndex is needed in addition to the conventional periodic channel status report configuration. The CRI ConfigIndex is used for setting a time for reporting the CRI and the terminal may set the CRI report period and offset by using the corresponding ConfigIndex.

Since in the NZP CSI-RS ID List included in Table 37 above, since configurations having different numbers of antenna ports may be combined and one or a plurality of CSI-RS resources are selected and reported, the NZP CSI-RS ID List has a problem that may not be solved only by the conventional LTE periodic channel status report configuration.

Embodiment 5-1

The embodiment 5-1 is a method for solving a problem caused by a combination of several CSI-RS resources having different antenna port numbers.

A wideband channel status report operates without the submode when a single structure codebook such as Rel-8 2Tx and 4Tx codebook is used as described above, and when a dual structure codebook such as Rel-10 8Tx codebook and Rel-12 4Tx codebook is used, Submodes 1 and 2 can be configured as the RRC, and as a result, Submodes 1 and 2 have different subsamplings and the periodic channel status reporting operation is changed.

In the conventional case, since Submodes 1 and 2 are configured for each CSI process, the submode is configured only when the CSI-RS configured in the CSI process uses the dual structure codebook. However, when the channel status is reported by using the CR', some resources use the dual structure codebook and other resources use the single structure codebook. Accordingly, even when only one CSI-RS among a plurality of CSI-RS resources configured in the CSI process uses the dual structure codebook, the submode is required.

In addition, a channel status report type supported according to the resource may be changed. In the case of a terminal positioned at a cell edge having a low SINR, the channel status report information may be relatively inaccurate, and the channel state information report is received on a wideband level rather than receiving the channel state information report for each subband, and as a result, it may be effective to reduce the resources required for the report. On the contrary, in the case of a terminal having a too high SINR, channel securing between the BS and the MS is sufficient, so that a system performance difference from the wideband report may not be large even without receiving the channel state information report in the subband. However, in most cases, even though resource overhead required for reporting is large, the subband report may enhance system performance, and as a result, both the subband report and the wideband report are required. When the channel state information may be reported by differentiating the wideband and subband reports for each resource, it is efficient as described above, but terminal implementation may be complicated.

There are two following methods for supporting and configuring the CRI considering the above.

Configuration method 1 for periodic channel status report:
Supporting periodic channel status report configuration for each CSI-RS resource Configuration method 2 for periodic channel status report:
Supporting periodic channel status report configuration in common with CSI-RS resources Configuration method 1 of the periodic channel status report is a method for supporting the periodic channel status report configuration for each CSI-RS resource. In the case of such a method, the periodic channel status configuration of Table 40 needs to be made according to the number of CSI-RS resources. Table 41 shows the CSI process configuration according to the configuration.

[Table 41]
CSI process configuration information
NZP CSI-RS ID List
CSI-IM-ID List
CSR List
Channel Measurement Restriction
Interference Measurement Restriction
Report Both
Report Periodic Proc Id List
Report Aperiodic Proc
Etc. . . .

In Table 37 above, when one periodic channel status report configuration ID is used by using the Report Periodic Proc Id List described above, an ID required for the periodic channel status report configuration may be informed and used for each resource. In this case, a duplicate configuration may be made by using the same ID.

However, the channel state information such as CRI/RI/PTI/CQI/PMI needs to be all transmitted at the same time. Therefore, the CRI Config Index, the RI Config Index, and the CQI Config Index, which are configured for each CSI-RS resource, need to have the same value.

However, in case of the submode, each of the CRI Config Index, the RI Config Index, and the CQI Config Index may be configured in the CSI-RS resource supporting the dual codebook. Therefore, there is an advantage that different submodes may be used depending on the CSI-RS resource. For example, a beam transmitted for an area close to the center of the cell has a relatively high SINR and a distance from the base station is short, so that the RI and W1 bits are transmitted together to receive the RI sufficiently even if RI coverage falls. In the case of submode 1, since there are relatively few subsampling, it is possible to support more precoding, and as a result, when submode 1 is used, better performance may be secured.

However, in the case of the terminal positioned at the cell edge, there is a problem in securing the RI coverage when the rank and the wideband PMI are transmitted together. Therefore, it is possible to solve the problem by configuring Submode 2 for such resource.

Further, the wideband reporting and subband reporting configurations may also be made independently. As each periodic channel status report configuration is set to wideband reporting and subband reporting, each resource is selected according to the CRI and reported with a reporting period according to the periodic channel status report configuration allocated to the selected resource.

Configuration method 2 for the periodic channel status report is a method for supporting one periodic channel status report configuration for all CSI-RS resources.

As described in the configuration method 1, since the period and the offset for the channel status report have only one value, one Configuration may be shared rather than providing a plurality of periodic channel status report configurations. However, since one configuration is provided, the channel status report using the CRI has a low degree of freedom for the configuration unlike the configuration method 1.

In the configuration method 1 described above, submode1/submode2 in the wideband/subband reporting and the wideband reporting can be arbitrarily configured for each CSI-RS resource, but the submodes should be limited to one in the configuration method 2. In case of Submode1/submode2, only when one or more CSI-RS resources of the configured CSI-RS resources use a codebook using the dual codebook structure codebook, that is, when 8 CSI-RS ports are configured or 4 CSI-RS ports and enhanced codebook are configured (alternativeCodeBookEnabledFor4TX-r12=TRterminal), the corresponding configuration is applied to use the submode. A method for determining whether the terminal or the base station reports the periodic channel status based on the submode configuration using the submode configuration operation will be illustrated in FIG. 60 below.

Figure 60:
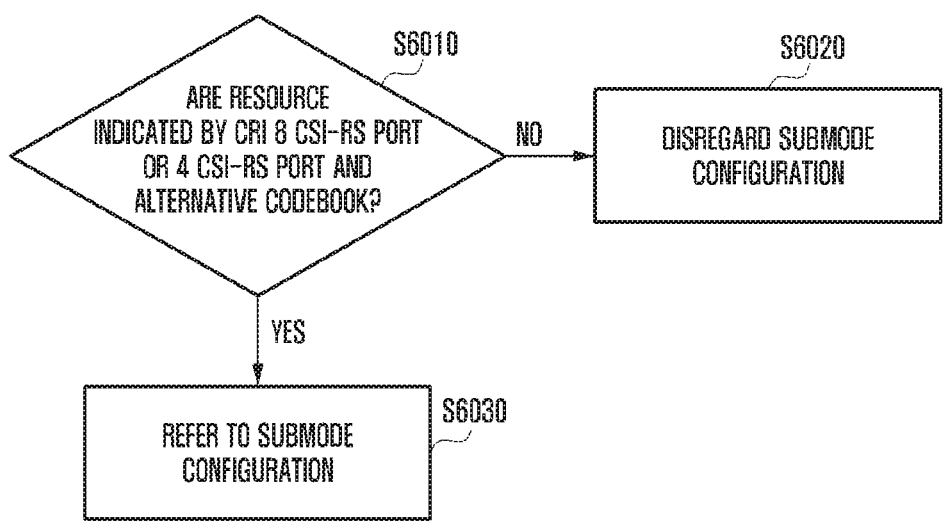
FIG. 60 is a diagram illustrating a process of reporting a channel status based on a submode configuration according to the present disclosure.

FIG. 60 is a diagram illustrating a process of reporting a periodic channel status based on the submode configuration according to the present disclosure.

Referring to FIG. 60, the terminal or the base station may check whether the resource indicated by the CRI in step S6010 is an 8 CSI-RS port or a 4 CSI-RS port and an alternative codebook.

If the resource indicated by the CRI is not the 8 CSI-RS port and is not the 4 CSI-RS port and the alternative codebook, the terminal or the base station may ignore the configuration of the submode in step S6020. Specifically, the terminal may ignore the configuration of the submode and report the periodical channel status, and the terminal may ignore the configuration of the submode and receive the periodic channel status report.

On the other hand, if the resource indicated by the CRI is the 8 CSI-RS port or the 4 CSI-RS port and the alternative codebook, the terminal or the base station may refer to the configuration of the submode in step S6030. Specifically, the terminal may refer to the configuration of the submode and report the periodical channel status, and the terminal may refer to the configuration of the submode and receive the periodic channel status report.

In Configuration method 2, a method for arbitrarily reporting the wideband/subband may consider a method for making both configurations together. In this case, it is possible to periodically or aperiodically make the periodic channel status report configuration in Table 40 or the CSI process configuration in Table 41 using Periodic CSI reporting CSI-RS ID List or Aperiodic CSI reporting CSI-RS ID List. In addition, a first CSI-RS resource and a second CSI-RS resource are configured by a bitmap in the order configured in the NZP CSI-RS ID List instead of the ID, and when the corresponding resource configuration is 0 and the wideband channel status report is 1, the subband channel status may be reported.

In this case, since the wideband configuration and the subband configuration simultaneously exist in the periodic channel status report, the terminal checks what report the corresponding resource reported through the CRI is configured for and determines whether to use the wideband or subband configuration according to the configuration, and the base station needs to predict the channel status report of the terminal based on the determination. A method for checking whether the terminal or the base station uses the wideband configuration or the subband configuration according to the periodic channel status report is illustrated in FIG. 61 below.

Figure 61:
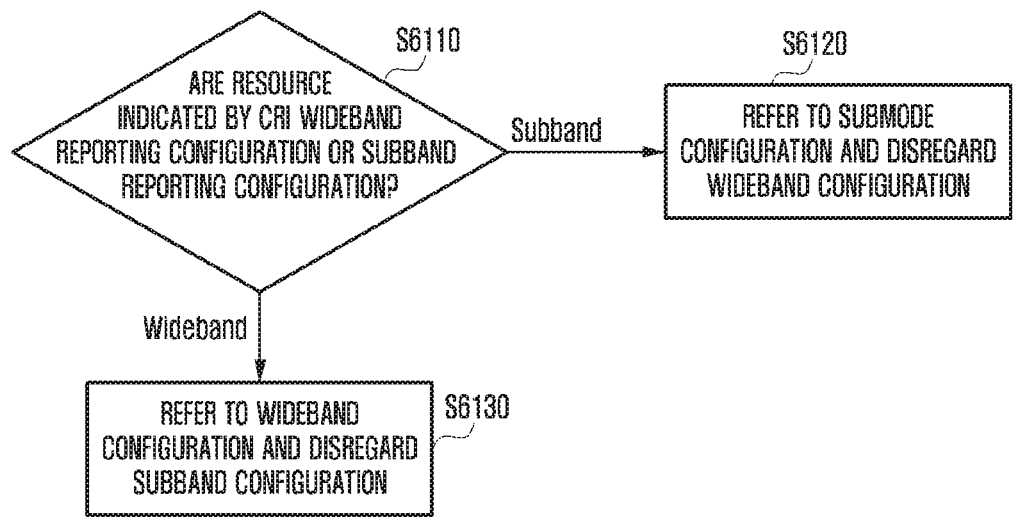
FIG. 61 is a diagram illustrating a process of reporting the channel status based on a band configuration according to the present disclosure.

FIG. 61 is a diagram illustrating a process of reporting a periodic channel status based on the band configuration according to the present disclosure.

Referring to FIG. 61, the terminal or the base station may determine whether the resource indicated by the CRI is a wideband report configuration or a narrowband report configuration in step S6110.

If it is determined as the narrowband report configuration, the terminal or the base station refers to the narrowband configuration in step S6120, and the wideband configuration can be ignored. Specifically, the terminal may perform periodic channel status reporting using the narrowband configuration, and the base station may receive the channel status report referring to the periodic channel status report using the narrowband configuration.

On the other hand, if it is determined as the wideband report configuration, the terminal or the base station refers to the wideband configuration in step S6130, and the narrowband configuration can be ignored. Specifically, the terminal may perform periodic channel status reporting using the wideband configuration, and the base station may receive the channel status report referring to the periodic channel status report using the wideband configuration.

Embodiment 5-2

As described above, when a plurality of channel status reports collides with each other in the same cell or among a plurality of cells, the periodic channel status report has a priority for resolving the collision by considering characteristics of the PUCCH having transmission resource and payload restrictions. Further, when such a collision occurs, in the case of the RI/PTI and W1, corresponding information which is the most recently reported is used to resolve the collision. However, when the CRI is introduced, another operation is required.

Figure 62:
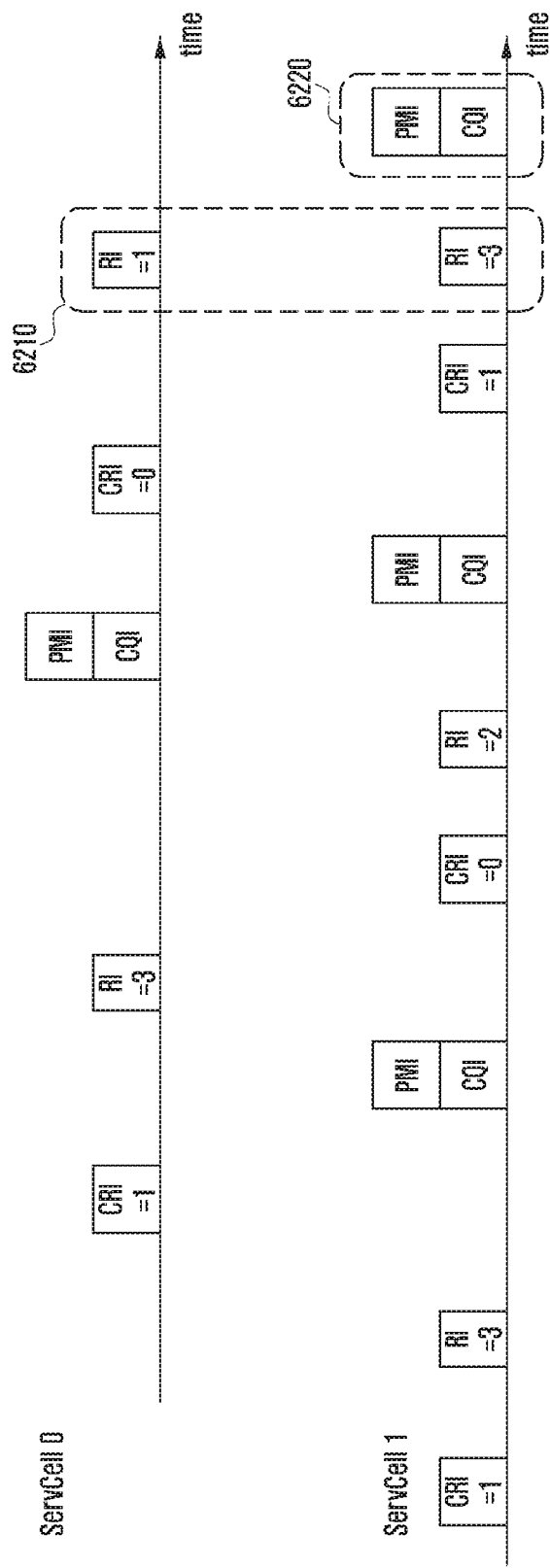
FIG. 62 below illustrates such a collision situation of PUCCH reports.

FIG. 62 illustrates such a collision situation of the PUCCH reports.

Referring to FIG. 62, the periodic channel status reporting situation illustrated in FIG. 62 means that the terminal reports the wideband channel status using two CSI processes.

In this case, the RI reports of serving cell 0 and serving cell 1 may collide with each other at reference numeral 6210. Since the reports of serving cells 0 and 1 both have the same priority as the RI, when such a collision occurs, the terminal reports information of a serving cell with a low cell index, therefore, the terminal does not report the RI of serving cell 1.

As mentioned above, using the CRI, the terminal selects one or a plurality of CSI-RSs among the CSI-RSs to which different beams are transmitted to the CSI-RS and transmits the selected CSI-RSs to the base station. Accordingly, when the terminal selects the same CSI-RS resource using the CRI, the same operation can be performed as in the conventional case. However, when another CRI is reported, statistical characteristics of the channel measured through the corresponding CSI-RS and the statistical characteristics of the channel measured through the previously reported CSI-RS may be completely different, and as a result, such an operation may degrade system performance. Therefore, a method for solving such a problem is described below.

Assumption method 1 for reporting on channel state information collision: Assuming most recently reported information reported by assuming the same CSI Assumption method 2 for reporting on channel state information collision: Using a fixed value predefined or set by the standard The assumption method 1 above is a method for assuming the most recently reported information reported by assuming the same CRI.

In the case of 6220 in FIG. 62, the reported channel has different statistical characteristics because the CRI is changed from 0 to 1 as previously reported. Therefore, information when the most recently reported CRI is 0 is used, rather than the previously reported information when the CRI is 0.

In this case, in FIG. 62 above, the RI to be assumed is not the most recently reported 2 but the most recently reported 3 among the RIs reported using the same CRI. Such a method may be the best method when the change of the corresponding CSI-RS resource is not large due to interworking with the latest report.

However, due to the characteristics of the PUCCH report, a long period is required, and when the PUCCH report is combined with a measurement restriction, the statistical characteristics of the channel may be changed, and thus the PUCCH report may be inaccurate even though the report is performed using the same CRI. Although the RI has been described in the above example, it should be noted that Assumption method 1 may be similarly used even for the PMI.

Assumption method 2 above is a method of using a fixed value that is defined or set in advance by the standard. In this case, according to assumption method 2, the value predefined by the standard may be the lowest RI which is reportable among the RIs configured by a codebook subset restriction.

In the case of 6220 in the above report of FIG. 62, the CRI is changed from 0 to 1 previously reported, and in this case, an RI value is used which is defined in the standard in advance or configured using an RRC field. In this case, the RI value defined in advance in the standard may be 1. Similarly to Assumption method 1, as the PMI value, the PMI value which is defined in the standard in advance or configured by using the RRC field may also be used. In this case, the value defined in the standard in advance may be 0.

In such a method, when the channel characteristics are rapidly changed, the channel status may be reported by using the accurate RI and PMI values defined in advance, but when the channel characteristics are not significantly changed, inaccurate RI or PMI value is still used, and as a result, performance may be degraded.

Assumption methods 1 and 2 above mean operations when the previously reported CRI and the recently reported CRI are different. When the previously reported CRI and the recently reported CRI are the same, the channel status is reported by assuming the most recently reported corresponding status report similarly to the convention LTE standard. A method in which the terminal or the base station transmits or decodes the channel state information report by using the corresponding method when collision of the periodic channel state information report transmission occurs is illustrated in FIG. 63 below.

Figure 63:
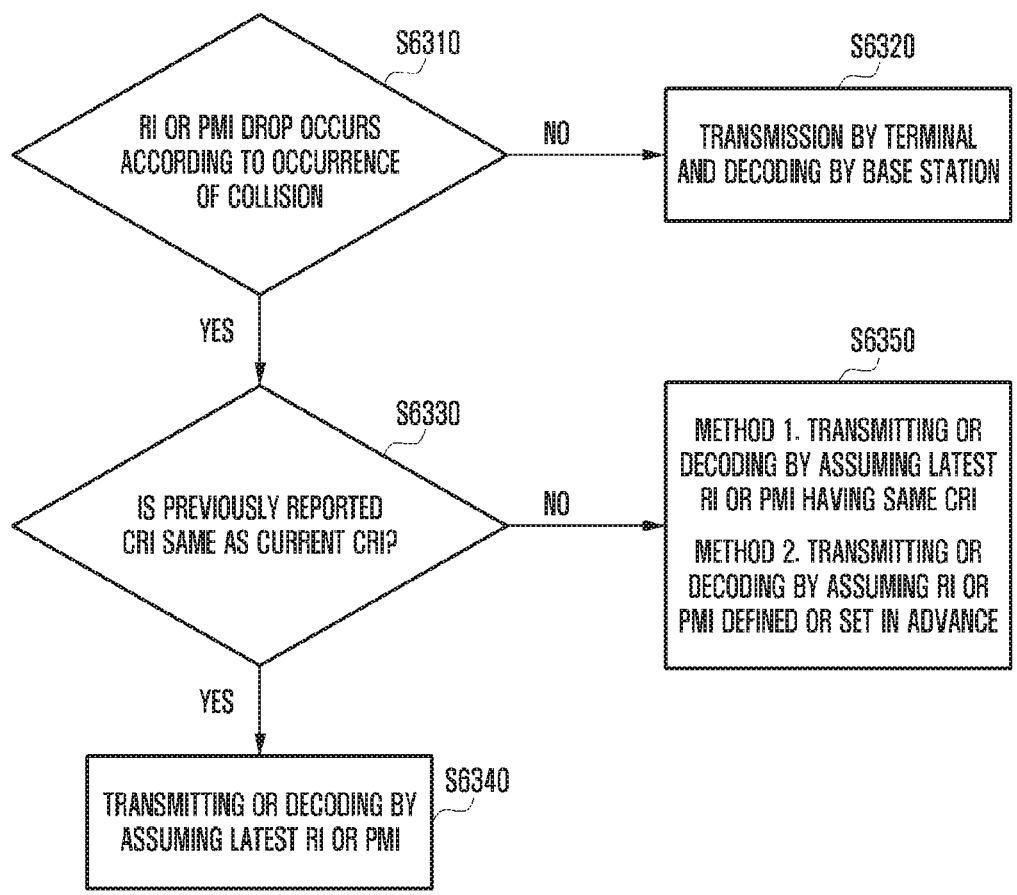
FIG. 63 is a diagram illustrating a method for transmitting or decoding a channel status report when a collision occurs in periodic status report transmission according to the present disclosure.

FIG. 63 is a diagram illustrating a method for transmitting or decoding a channel status report when a collision occurs in periodic status report transmission according to the present disclosure.

Referring to FIG. 63, the terminal or the base station may check whether channel state information (for example, RI or PMI) due to a collision is dropped in step S6310.

When the channel state information is not dropped, the terminal may transmit the channel state information in step S6320 and the base station may receive and decode the channel state information.

On the contrary, when the channel state information is dropped, the terminal or the base station may check whether the CRI previously reported in step S6330 is equal to the current CRI.

When the previously reported CRI is equal to the current CRI, the terminal and the base station may operate by assuming the latest channel state information in step S6340.

Specifically, the terminal may transmit the channel state information on the assumption of the latest RI or PMI, and the base station may perform decoding based on the latest RI or PMI.

On the contrary, when the previously reported CRI is different from the current CRI, the terminal and the base station may transmit the channel state information by using a first method or second method and decode the transmitted channel state information in step S3650.

Specifically, the first method is a method that assumes the latest RI or PMI having the same CRI as described above. Accordingly, the terminal transmits the channel state information according to the latest RI or PMI having the same CRI and the base station may decode the received channel state information assuming the latest RI or PMI having the same CRI.

The second method is a method that assumes an RI or PMI defined or set in advance. Accordingly, the terminal may transmit the channel state information according to the RI or PMI defined or set in advance and the base station may decode the received channel state information assuming the RI or PMI defined or set in advance.

Embodiment 5-3

For the FD-MIMO operation, the above scheme needs to be changed to a scheme in which both the network equipment and the antenna of the base station support the FD-MIMO and an adaptive antenna system (AAS). However, since the changed scheme consumes much cost, a macro cell maintains the conventional scheme and a small cell or a femto cell can also sufficiently support the FD-MIMO, and as a result, the changed scheme becomes an efficient scheme.

In this case, CRI reporting does not occur in Pcell, but the CRI reporting may occur in the Scell.

Figure 64:
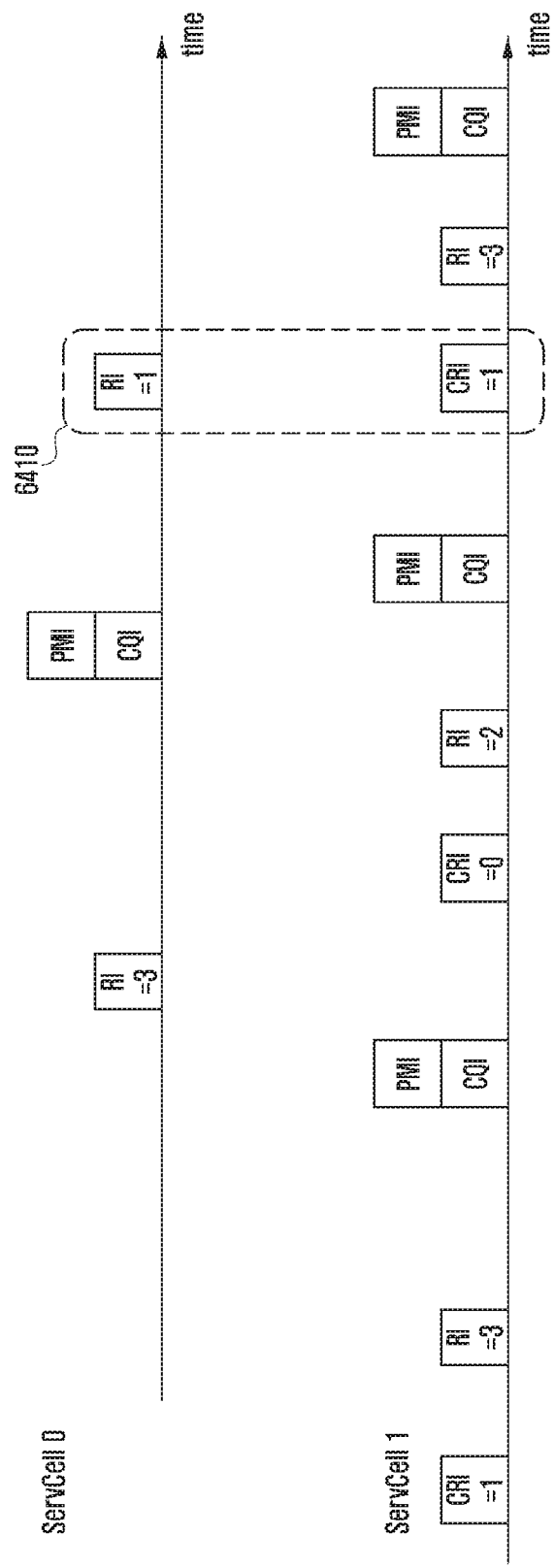
FIG. 64 is a diagram illustrating a case where a CRI report does not occur in PCell, but the CRI report occurs in SCell.

FIG. 64 is a diagram illustrating a case where the CRI report does not occur in the PCell and the CRI report occurs in the SCell.

In reference numeral 6410, the collision may occur between the RI report of Pcell (serving cell 0) and the CRI report, of Scell (serving cell 1).

However, unlike the CRI, the RI is information having the highest priority in the Pcell. In addition, the Pcell plays a more important role than the Scell, such as providing coverage and transmitting and receiving control information. Therefore, in the conventional PUCCH reporting, when reports having the same priority collide with each other, information of a cell having lower ServCellIndex may be transmitted in priority so that information of the Pcell may be transmitted in priority.

The CRI is important information to know which CSI-RS resource is selected in the cell, but RI information for transmission of the Pcell may be important. In this case, the RI of the Pcell may be made to have a higher priority through the following method.

The priority definition method proposed by the present disclosure is a method for making the priority of the RI equal to that of the CRI only in a cell in which the CRI report is not configured. In this case, when the Pcell is not an FD-MIMO base station, the priority of the RI is made equal to the CRI, so that the RI of the cell having low ServCellIndex may be transmitted with a higher priority than the CRI of a cell having high ServCellIndex.

Figure 65:
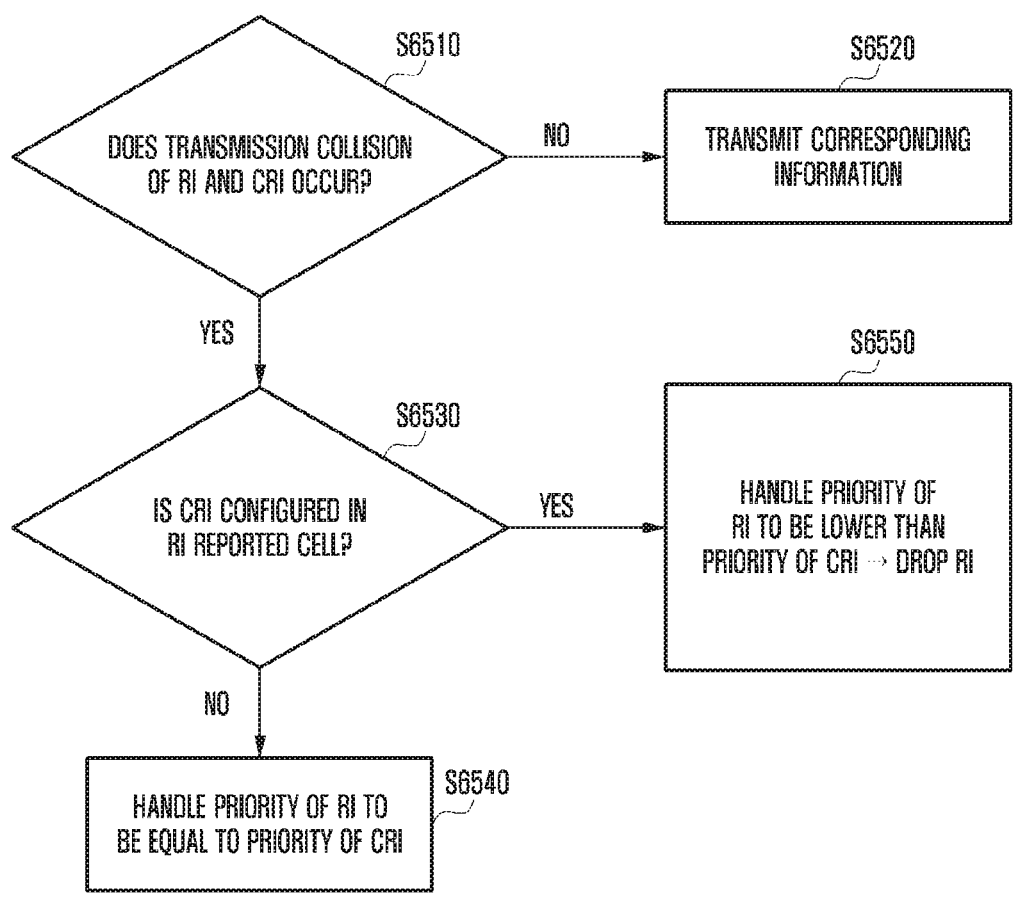
FIG. 65 is a diagram illustrating operations of the terminal and the base station in the case where the CRI report does not occur in the PCell, but the CRI report occurs in the SCell.

FIG. 65 is a diagram illustrating operations of the terminal and the base station in the case where the CRI report does not occur in the PCell, but the CRI report occurs in the SCell.

Referring to FIG. 65, in step S6510, the terminal or the base station may check whether a collision between the RI and the CRI transmission occurs.

For example, the terminal or the base station may check whether the CRI transmission of the RI transmission of the PCell and the CRI transmission of the SCell collide.

When the RI transmission and the CRI transmission do not collide, the terminal may transmit the corresponding information in step S6520 and the base station may receive the information.

When the RI and the CRI collide, the terminal or the base station may check whether the CRI is configured in a cell in which the RI is reported in step S6530.

In addition, when the CRI is configured in the cell in which the RI is reported, the terminal or the base station may handle a priority of the RI to be lower than the priority of the CRI in step S6540. Therefore, the terminal or the base station may transmit information on a cell having a small index.

On the contrary, when the CRI is not configured in the cell in which the RI is reported, the terminal or the base station may handle a priority of the RI to be equal to the priority of the CRI in step S6550. Therefore, the terminal may drop the RI and transmit the CRI.

Embodiment 5-4

In a method in which both the CRI and the RI are transmitted with a long period, when the corresponding information is not reported, since a time up to a next reporting period is relatively long, the method has a relatively large influence on performance. Therefore, when the CRI and RI reporting periods collide or overlap with each other in the same cell, the performance may be enhanced by using the following methods.

Operation method 1 when CRI and RI collide: The CRI and the RI are jointly encoded and transmitted.

Operation method 2 when CRI and RI collide: When the corresponding feedback operation is a subband feedback using PUCCH 1-1 submode 1 or PTI, the RI is dropped and when the corresponding feedback operation is not the subband feedback, the CRI and the RI are jointly encoded.

Operation method 3 when CRI and RI collide: When a payload obtained by adding the CRI and the RI is equal to or larger than or larger than specific bits, the RI is dropped and if not, the CRI and the RI are jointly encoded.

Operation method 4 when CRI and RI collide: The RI is dropped.

Operation method 1 is a method for continuously jointly encoding the CRI and the RI. In this case, since transmission of the CRI and the RI may be continuously guaranteed, Operation method 1 may exhibit more effective performance among the methods when the decoding is possible. However, since the size of the payload obtained by adding the CRI and the RI increases, the coverage of the transmission decreases, and as a result, when the channel status is not sufficiently good, the system performance may still be degraded.

Figure 66:
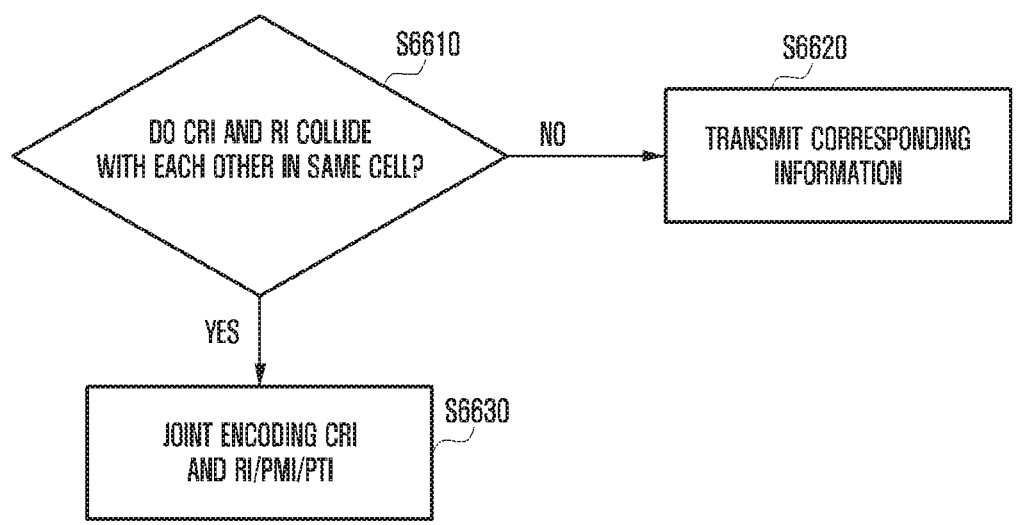
FIG. 66 is a flowchart illustrating the operations of the base station and the terminal when the CRI and the RI collide.

FIG. 66 is a flowchart illustrating the operations of the base station and the terminal when the CRI and the RI collide.

Referring to FIG. 66, in step S6610, the terminal or the base station may check whether the RI and the CRI collide in the same cell.

When the CRI and the RI do not collide, the terminal may transmit the corresponding information in step S6620 and the base station may receive the information.

On the contrary, when the CRI and the RI collide, the terminal may jointly encode the CRI and the RI and transmit the CRI and RI and the base station may receive the transmitted CRI and RI in step S6630.

In the present disclosure, a case where the CRI and the RI collide with each other is exemplified. However, a case where a PMI or a PTI collides with the CRI may also be applied, and in this case, the terminal may jointly encode the CRI, the PMI, or the PTI.

Operation method 2 is a method for restricting joint encoding according to the feedback operation. As described above, in the case of submode 1 in the wideband reporting, the RI/W1 is subsampled and made to a maximum of 5 bits and transmitted at one time. Therefore, when 3 bits for the CRI are added thereto, the payload size increase sharply and thus, the RI and CRI coverage decreases sharply.

Likewise, in the subband reporting using the PTI, a maximum of 4 bits are already used for the RI/PTI. Here, when 3 bits for the CRI are added thereto, the payload size increases to 7 bits. Therefore, there may be a method for dropping the RI/PMI/PTI in case of a feedback configuration in which the payload is already sufficiently large at a corresponding time and jointly encoding the RI/PMI/PTI when the payload is not sufficiently large.

Such a method has an advantage that coverage and joint encoding may be effectively combined, but the corresponding joint encoding operation can not be used in the subband reporting using PUCCH mode 1-1 submode 1 and the PTI.

Figure 67:
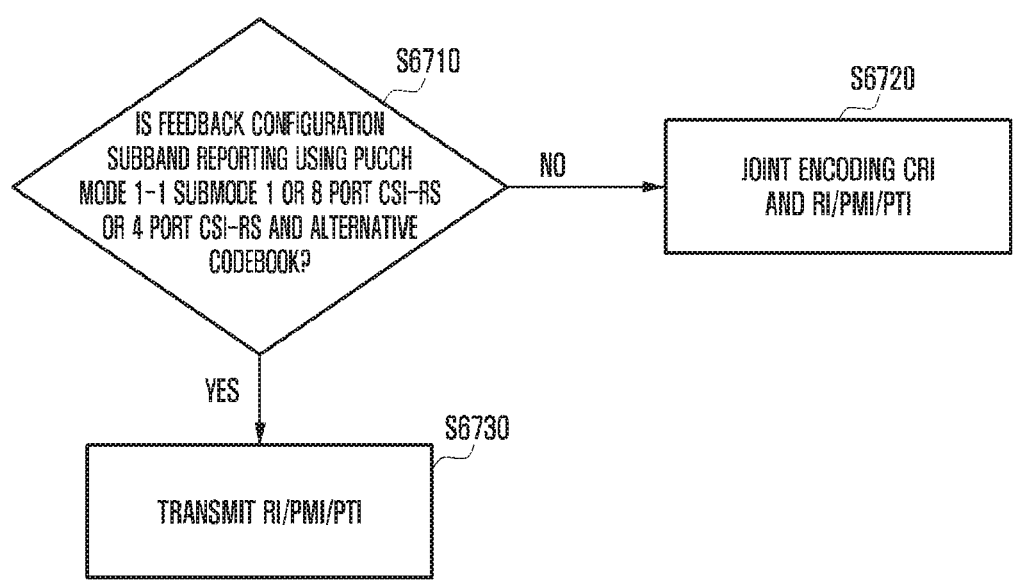
FIG. 67 is a flowchart illustrating the corresponding operations of the base station and the terminal when the CRI and the RI collide.

FIG. 67 is a flowchart illustrating the corresponding operations of the base station and the terminal when the CRI and the RI collide.

Referring to FIG. 67, when the CRI and the RI collide, the terminal and the base station may check whether the feedback configuration is a narrowband report using the alternative codebook of a PUCCH mode 1-1 submode 1 or a 8 port CSRI-RS or 4 port CSI-RS in step S6710.

If the feedback configuration is not the narrowband report using the alternative codebook of a PUCCH mode 1-1 submode 1 or a 8 port CSRI-RS or 4 port CSI-RS, the terminal may jointly encode and transmit the CRI and the RI in step S6720 and the base station may receive the transmitted CRI and RI.

In the present disclosure, a case where the CRI and the RI collide with each other is exemplified. However, a case where a PMI or a PTI collides with the CRI may also be applied, and in this case, the terminal may jointly encode the CRI, the PMI, or the PTI.

On the other hand, if the feedback configuration is the narrowband report using the alternative codebook of a PUCCH mode 1-1 submode 1 or a 8 port CSRI-RS or 4 port CSI-RS, the terminal may transmit the RI in step S6730. Alternatively, the terminal may transmit the PMI or the PTI.

Operation method 3 is a method for restricting joint encoding according to a feedback payload size.

As described in method 2 above, by using PUCCH mode 1-1 with submode1 and using PUCCH mode 2-1 and 8 port CSI-RS or 4 port CSI-RS with alternative codebook, the size of the payload increases due to the size of the RI/W1 or RI/PTI.

However, in the case of the RI, the number of bits varies depending on the configured CSI-RS port number and the number of layers supportable of a terminal capability. Further, even in the case of the CRI, according to the number of configured resources, when the number of resources is two or less, the CRI may be adjusted to 1 bit, when the number of resources is four or less, the CRI may be adjusted to 2 bits, and when the number of resources is eight or less, the CRI may be adjusted to 3 bits. Therefore, restricting the joint encoding based only on the feedback configuration may still result in limiting the operation even though the payload size for the joint encoding is smaller. Accordingly, the CRI/RI/PMI/PTI transmission may be more efficiently supported through such determination.

Figure 68:
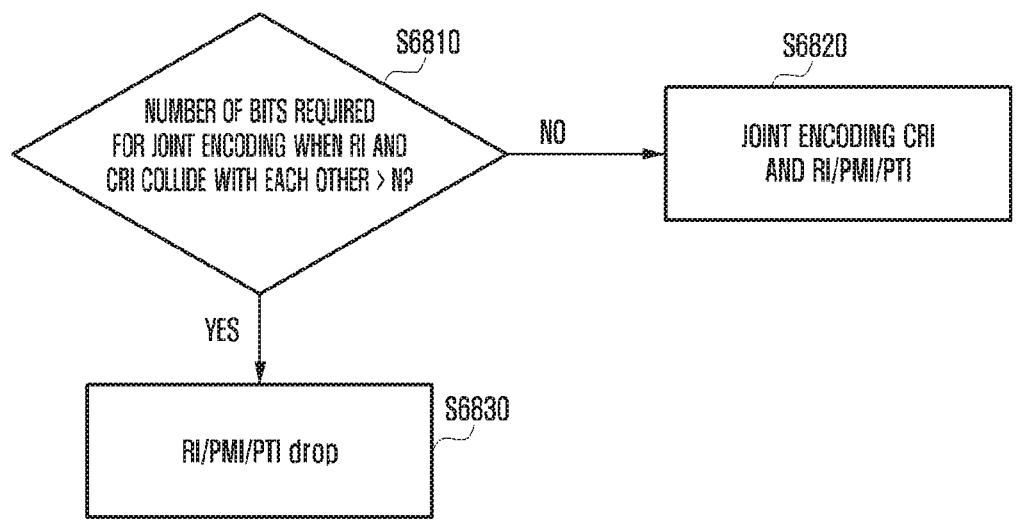
FIG. 68 is a flowchart illustrating the corresponding operations of the base station and the terminal when the CRI and the RI collide.

FIG. 68 is a flowchart illustrating the corresponding operations of the base station and the terminal when the CRI and the RI collide.

Referring to FIG. 68, when a collision occurs between CRI and RI, the terminal or the base station may check whether the number of bits required for joint encoding at the time of the collision between CRI and RI is greater than a predetermined value N in step S6810.

If the number of bits required for joint encoding at the time of the collision between CRI and RI is smaller than the predetermined value N, the terminal may jointly encode and transmit the CRI and the RI in step S6820, and the base station may receive the transmitted CRI and RI.

In the present disclosure, a case where the CRI and the RI collide with each other is exemplified. However, a case where a PMI or a PTI collides with the CRI may also be applied, and in this case, the terminal may jointly encode the CRI, the PMI, or the PTI.

If the number of bits required for joint encoding at the time of the collision between CRI and RI is greater than the predetermined value N, the terminal may drop the RI in step S6830. Alternatively, the terminal may drop the PMI or the PTI.

Embodiment 5-5

The embodiment 5-5 proposes a CRI reporting time and a CRI reporting method based on a CSI-RS port configuration and a CRI reporting configuration for the CRI reporting presented by the present disclosure.

The CRI as a concept of reporting one of several CSI-RS resources contains information on the wideband, and as a result, the CRI has a higher reporting tank and a longer reporting period than the RI. Therefore, it is preferable that the reporting period is defined based on a multiple of the RI reporting period. Based thereon, the CRI reporting time may be defined as shown in Equation 10 below.

In the case of fullband channel status report: $(10 \times n_f + \lfloor n_s/2 \rfloor - N_{OFFSET,CQI} - N_{OFFSET,RI}) \bmod (N_{pd} \cdot M_{RI} \cdot M_{CRI}) = 0$ In the case of subband channel status report: $(10 \times n_f + \lfloor n_s/2 \rfloor - N_{OFFSET,CQI} - N_{OFFSET,RI}) \bmod (H \cdot N_{pd} \cdot M_{RI} \cdot M_{CRI}) = 0$   <Equation 10>

In this case, the $M_{RI}$ may be used by directly setting values such as 1, 2, 4, 8, 16, and 32 when the offset is fixed to one value or the offset is not used.

The above report allows the MCRI to be introduced for the CRI report in the conventional RI reporting period and to be reported using a multiple of the corresponding RI reporting period. At this time, MCRI is a parameter for configuring the CRI reporting period as shown in the above Equation.

In the CRI report, when the CRI is reported as a combination of CSI-RS resources consisting only of 1 port CSI-RSs, the RI is not reported. Therefore, such a reporting period may not be a multiple of the conventional RI. Therefore, the following methods may be considered for this case.

CRI report method 1 in 1 port CSI-RS: Report at multiple timing of CQI report period CRI report method 2 in 1 port CSI-RS: Report at multiple of CQI report period by applying offset CRI report method 3 in 1 port CSI-RS: Report at multiple of CQI report period, but CQI is not reported.

CRI reporting method 1 in the 1 port CSI-RS is a method of reporting at a multiple timing of the CQI reporting period. As mentioned above, since there is no RI/PMI report in the 1 port CSI-RS, there is only a CQI reporting period that may be set to be the multiple for the channel status reporting. Therefore, it is possible to define the CRI reporting time to become the multiple of the CQI reporting period by using the CQI reporting period. Equation 11 shows an example of the CRI reporting time when Reporting method 1 is used.

In the case of fullband channel status report: $(10 \times n_f + \lfloor n_s/2 \rfloor - N_{OFFSET,CQI}) \bmod (N_{pd} \cdot M_{CRI}) = 0$ In the case of subband channel status report: $(10 \times n_f + \lfloor n_s/2 \rfloor - N_{OFFSET,CQI}) \bmod (H \cdot N_{pd} \cdot M_{CRI}) = 0$   <Equation 11>

For the method above, the mapping between the CRI time configuration and the MCRI may be defined as shown in Table 42.

TABLE 42

Mapping of $I_{CRI}$ to $M_{CRI}$

| $I_{CRI}$ | Value of $M_{CRI}$ |
|---|---|
| 0 | 1 |
| 1 | 2 |
| 2 | 4 |
| 3 | 8 |
| 4 | 16 |
| 5 | 32 |
| $6 \leq I_{CRI} \leq 7$ | Reserved |

In this case, since the CRI reporting time is continuously the multiple of the CQI period in the case of the 1 port CSI-RS, a maximum set reporting period becomes relatively shorter than other CSI-RS ports of 2 or more ports. Therefore, new period 64 may be introduced for this purpose. Table 43 below shows mapping when assuming the matters.

TABLE 43

Mapping of $I_{CRI}$ to $M_{CRI}$

| $I_{CRI}$ | Value of $M_{CRI}$ |
|---|---|
| 0 | 1 |
| 1 | 2 |
| 2 | 4 |
| 3 | 8 |
| 4 | 16 |
| 5 | 32 |
| 6 | 64 |
| 7 | Reserved |

The period 64 of Table 43 above can be set at all CSI-RS ports, but in this case, there is a problem that the period in the 1 port CSI-RS mentioned above is relatively short. Therefore, it is also possible to allow the period 64 to be set only when all CSI-RS resources configured by the terminal are the 1 port CSI-RS. In addition, in the above example, only the period 64 is included, but period 128 may be together included. In this case, it is also possible to allow the periods 64 and 128 to be set only when all of the configured CSI-RS resources are the 1 port CSI-RS.

In addition, for the report, a new PUCCH reporting type may be created in which the CRI and the CQI are reported together. Table 44 below shows an example of the reporting type.

TABLE 44

Mapping of $I_{CRI}$ to $M_{CRI}$

| PUCCH Reporting Type | Reported | Mode State | PUCCH Reporting Modes | | | |
|---|---|---|---|---|---|---|
| | | | Mode 1-1 (bits/B P*) | Mode 2-1 (bits/B P*) | Mode 1-0 (bits/B P*) | Mode 2-0 (bits/B P*) |

At this time, k is $k = \lceil \log_2(K) \rceil$ and K means the number of configured CSI-RS resources. At this time, since the terminal does not report the RI, the corresponding bit is not required, the terminal reports only the CQI, and since rank=1 at all times, only 4 bits are sufficient.

However, in the case of such a method, since the CRI is continuously transmitted like the CQI, the PDCCH coverage may be reduced. In addition, in CSI-RS channel status reporting of 2 ports or more, a lot of reporting time is required in order to add the CRI to all elements such as the PTI/RI/PMI/CQI and thereafter, separately sending the PTI/RI/PMI/CQI, and as a result, performance may be degraded due to the resulting time delay. However, the 1 port CSI-RS has only the CQI and is a structure in which the CRI is added to the CQI, thereby minimizing the delay and the performance degradation.

CRI reporting method 2 in the 1 port CSI-RS is a method used in a type in which the offset is added to the method of Reporting method 1 above. In this case, the base station may add the offset to the CRI reporting time based on the multiple of the CQI reporting time as needed, which may not cause the problem such as the PDCCH coverage mentioned in reporting method 1 above. Equation 3 shows the reporting time according to CRI reporting method 2 in the 1 port CSI-RS of the present disclosure.

In the case of fullband channel status report: $(10 \times n_f + \lfloor n_s/2 \rfloor - N_{OFFSET,CQI} - N_{OFFSET,CRI}) \bmod (N_{pd} \cdot M_{CRI}) = 0$ In the case of subband channel status report: $(10 \times n_f + \lfloor n_s/2 \rfloor - N_{OFFSET,CQI} - N_{OFFSET,CRI}) \bmod (H \cdot N_{pd} \cdot M_{CRI}) = 0$ <Equation 12>

In the case of using Equation 12, the offset needs to be defined differently from a case where there is no offset, and the resulting relationship between the RRC configuration and the $M_{CRI}$ and the offset may be expressed as shown in Table 45 below.

TABLE 45

Mapping of $I_{CRI}$ to $M_{CRI}$ and $N_{OFFSET,CRI}$

| $I_{CRI}$ | Value of $M_{CRI}$ | Value of $N_{OFFSET,CRI}$ |
|---|---|---|
| $0 \leq I_{CRI} \leq 160$ | 1 | $-I_{CRI}$ |
| $161 \leq I_{CRI} \leq 321$ | 2 | $-(I_{CRI}-161)$ |
| $322 \leq I_{CRI} \leq 482$ | 4 | $-(I_{CRI}-322)$ |
| $483 \leq I_{CRI} \leq 643$ | 8 | $-(I_{CRI}-483)$ |
| $644 \leq I_{CRI} \leq 804$ | 16 | $-(I_{CRI}-644)$ |
| $805 \leq I_{CRI} \leq 965$ | 32 | $-(I_{CRI}-805)$ |
| $966 \leq I_{CRI} \leq 1023$ | Reserved | |

In Table 45 above, 160 which is a maximum available value of the current CQI reporting period is set as the offset to set up to a period of 32 times. In this case, since the 1 port CSI-RS is based on the PMI reporting period, the reporting period is relatively short as compared with the case of 2 ports or more. Therefore, the reporting period of 64 times may be additionally used to solve such a problem. Tables 4 and 47 below illustrate tables of such a case.

TABLE 46

Mapping of $I_{CRI}$ to $M_{CRI}$ and $N_{OFFSET,CRI}$

| $I_{CRI}$ | Value of $M_{CRI}$ | Value of $N_{OFFSET,CRI}$ |
|---|---|---|
| $0 \leq I_{CRI} \leq 160$ | 1 | $-I_{CRI}$ |
| $161 \leq I_{CRI} \leq 321$ | 2 | $-(I_{CRI}-161)$ |
| $322 \leq I_{CRI} \leq 482$ | 4 | $-(I_{CRI}-322)$ |
| $483 \leq I_{CRI} \leq 643$ | 8 | $-(I_{CRI}-483)$ |
| $644 \leq I_{CRI} \leq 804$ | 16 | $-(I_{CRI}-644)$ |
| $805 \leq I_{CRI} \leq 965$ | 32 | $-(I_{CRI}-805)$ |
| $966 \leq I_{CRI} \leq 1023$ | 64 | $-(I_{CRI}-966)$ |

TABLE 47

Mapping of $I_{CRI}$ to $M_{CRI}$ and $N_{OFFSET,CRI}$

| $I_{CRI}$ | Value of $M_{CRI}$ | Value of $N_{OFFSET,CRI}$ |
|---|---|---|
| $0 \leq I_{CRI} \leq 160$ | 1 | $-I_{CRI}$ |
| $161 \leq I_{CRI} \leq 321$ | 2 | $-(I_{CRI}-161)$ |
| $322 \leq I_{CRI} \leq 482$ | 4 | $-(I_{CRI}-322)$ |
| $483 \leq I_{CRI} \leq 643$ | 8 | $-(I_{CRI}-483)$ |
| $644 \leq I_{CRI} \leq 804$ | 16 | $-(I_{CRI}-644)$ |
| $805 \leq I_{CRI} \leq 965$ | 32 | $-(I_{CRI}-805)$ |
| $966 \leq I_{CRI} \leq 1126$ | 64 | $-(I_{CRI}-966)$ |
| $1127 \leq I_{CRI} \leq 2048$ | Reserved | |

CRI reporting method 3 in the 1 port CSI-RS is a method that does not report the CQI at the CRI reporting time in the method of Reporting method 1 in the 1 port CSI-RS. In this case, since the base station does not report the CQI at the CRI reporting time as needed, the problem such as the PDCCH coverage mentioned in Reporting method 1 may not be caused. However, since the CQI may not be reported at the corresponding time, the accuracy of the channel state information may relatively decrease.

Although most of the methods proposed in the embodiments of the present disclosure are prepared by assuming the periodic channel status reporting, it should be noted that when the same method may be applied to the aperiodic channel status reporting, the same method may be applied and used.

Figure 69:
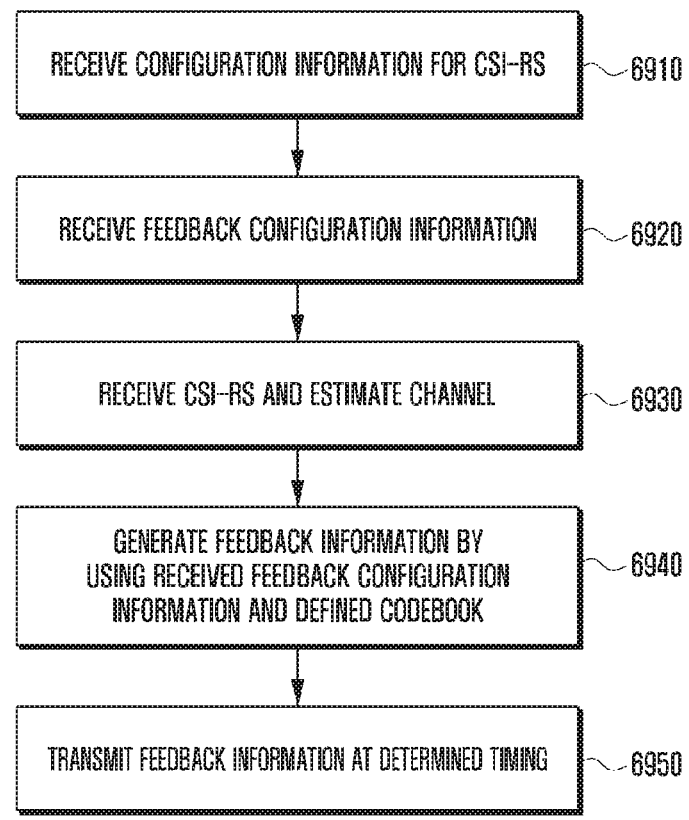
FIG. 69 is a flowchart illustrating the operation procedure of the terminal according to an embodiment of the present disclosure.

FIG. 69 is a flowchart illustrating an operation procedure of the terminal according to an embodiment of the present disclosure.

Referring to FIG. 69, in step 6910, the terminal receives configuration information for a CSI-RS configuration. The information may include information regarding which CSI-RS resources are used for the corresponding CRI reporting. Further, the terminal may verify at least one of the number of ports for each CSI-RS resource, the timing and the resource position at which each CSI-RS resource is transmitted, whether the RI-reference CSI-process is configured, and the corresponding CSI-RS resource index, CSI-IM resource location and timing, and transmission power information.

Thereafter, the terminal configures one feedback configuration information based on at least one CSI-RS position in step 6920. The configuration information may be either one or may exist for each CSI-RS resource according to the method of the present disclosure. It is also possible to determine whether the configuration information is applied according to the number of CSI-RS ports or the codebook.

When the terminal receives the CSI-RS in step 6930, the terminal estimates the channel between the base station antenna and the reception antenna of the terminal.

In step 6940, the terminal generates the feedback information rank, PMI, and CQI using the received feedback configuration and the defined codebook based on a virtual channel added between the estimated channel and the CSI-RS. In this case, when the collision of information transmission occurs in the feedback configured by the base station due to the configuration, the terminal may determine whether to drop or jointly encode the corresponding information and by which information next information is to be transmitted during dropping according to the method of the present disclosure.

Thereafter, in step 6950, the terminal transmits the determined feedback information to the base station at a predetermined feedback timing according to the feedback configuration of the base station, thereby completing a channel feedback generation and reporting process using the CRI.

In this case, one or the plurality of the embodiments proposed in the present disclosure may be applied to the operation of the terminal. The detailed contents are the same as described above.

For example, if the transmission of the channel state information collides at the predetermined feedback timing according to the feedback configuration of the base station, the terminal may drop some channel state information. In addition, the terminal may use the most recently reported channel state information or may use a predefined value with respect to the same CRI for the dropped channel state information.

In addition, when a collision between the RI and the CRI occurs, a cell in which the RI is reported is low in the PCell or cell index, and the CRI reporting is not configured, the terminal may report the RI.

In addition, the operation of the terminal in the case where the reporting of the channel state information collides, the reporting time and reporting method of the CRI, and the like are the same as those described above, and will not be described below.

Figure 70:
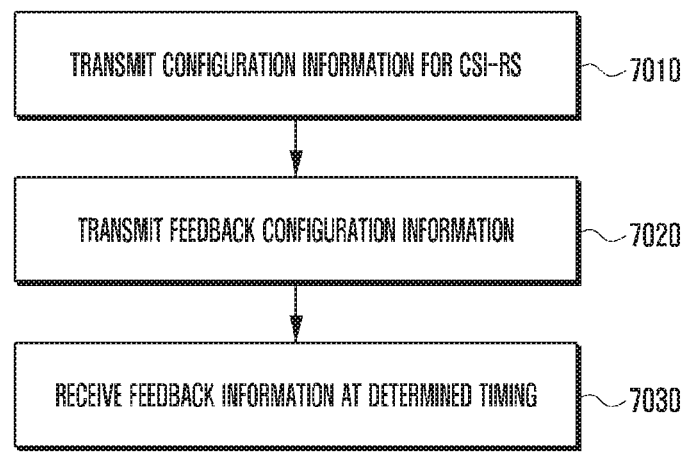
FIG. 70 is a flowchart illustrating the operation procedure of the base station according to an embodiment of the present disclosure.

FIG. 70 is a flowchart illustrating the operation procedure of the base station according to an embodiment of the present disclosure.

Referring to FIG. 70, in step 7010, the base station transmits to the terminal the configuration information for one or more CSI-RS resources for measuring the channel. The configuration information may include at least one of the number of ports for each CSI-RS resource, the timing and the resource position at which each CSI-RS is transmitted, whether the RI-reference CSI-process is configured, and the corresponding CSI-RS process index, CSI-IM resource position and timing, and transmission power information.

Thereafter, the base station transmits to the terminal the feedback configuration information based on at least one CSI-RS in step 7020. In this case, the information may be configured by differently determining whether to configure the information depending on the number of CSI-RS ports and the codebook according to the present disclosure. Thereafter, the base station transmits the configured CSI-RS resources to the terminal. The terminal estimates the channel for each antenna port and estimates an additional channel for the virtual resource based on the estimated channel. The terminal decides the feedback according to the methods proposed by the present disclosure and generates the PMI, RI, and CQI corresponding thereto and transmits the generated PMI, RI, and CQI to the base station.

Accordingly, the base station receives the feedback information from the terminal at a predetermined timing determined in step 7030 and uses the feedback information to determine the channel status between the terminal and the base station.

In this case, one or the plurality of the embodiments proposed in the present disclosure, may be applied to the operation of the base station. The detailed contents are the same as described above.

For example, if the transmission of the channel state information collides at the predetermined feedback timing according to the feedback configuration of the base station, the terminal may drop some channel state information and the base station may use only some channel state information. Accordingly, the base station may use the most recently reported channel state information or may use a predefined value with respect to the same CRI for the dropped channel state information.

In addition, when a collision between the RI and the CRI occurs, a cell in which the RI is reported is low in the PCell or cell index, and the CRI reporting is not configured, the base station may report the RI.

In addition, the operation of the base station in the case where the reporting of the channel state information collides, the reporting time and reporting method of the CRI, and the like are the same as those described above, and will not be described below.

Figure 71:
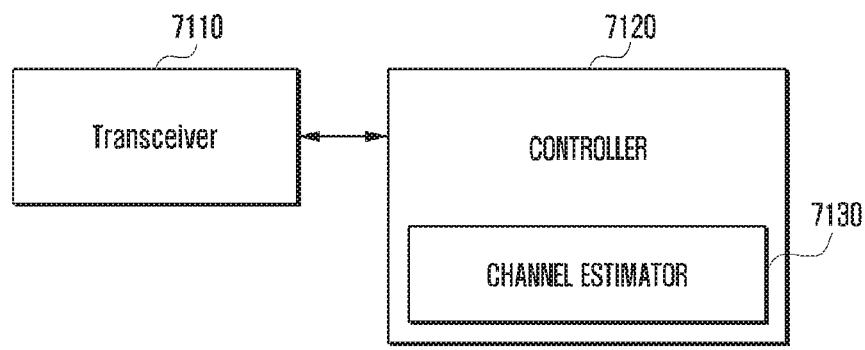
FIG. 71 is a block diagram illustrating an internal structure of a terminal according to an embodiment of the present disclosure.

FIG. 71 is a block diagram illustrating an internal structure of a terminal according to an embodiment of the present disclosure.

Referring to FIG. 71, the terminal includes a transceiver 7110 and a controller 7120.

The transceiver 7110 performs a function of transmitting or receiving data from the outside (e.g., a base station). Herein, the transceiver 7110 may transmit feedback information to the base station under the control of the controller 7120. The controller 7120 controls states and operations of all components constituting the terminal. Specifically, the controller 7120 generates the feedback information according to information allocated from the base station. In addition, the controller 7120 controls the transceiver 7110 to feedback the generated channel information to the base station according to timing information allocated from the base station. To this end, the controller 7120 may include a channel estimator 7130. The channel estimator 7130 determines the feedback information required through the CSI-RS and the feedback allocation information received from the base station and estimates a channel by using the received CSI-RS based on the feedback information.

In FIG. 71, an example in which the terminal is constituted by the transceiver 7110 and the controller 7120 is described, but the present disclosure is not limited thereto and the terminal may further include various components according to functions performed in the terminal. For example, the terminal may further include a display unit for displaying a current state of the terminal, an input unit for inputting a signal such as function execution by a user, a storage unit for storing data generated in the terminal, and the like. Further, it is illustrated that the channel estimator 7130 is included in the controller 7120 as above, but the present disclosure is not particularly limited thereto.

The controller 7120 may control the transceiver 7110 to receive configuration information for each of one or more reference signal resources from the base station. Further, the controller 7120 may control the transceiver 7110 to measure the at least one reference signal and to receive the feedback configuration information for generating the feedback information according to the measurement result from the base station.

In addition, the controller 7120 may measure at least one reference signal received through the transceiver 7110 and generate the feedback information according to the feedback configuration information. The control unit 7120 may control the transceiver 7110 to transmit the generated feedback information to the base station at feedback timing according to the feedback configuration information. Further, the controller 7120 may receive a channel status indication-reference signal (CSI-RS) from the base station, generate feedback information based on the received CSI-RS and determination of whether the CSI-RS meets a condition for a CRI, and transmit the generated feedback information to the base station. In this case, in the feedback information, transmission contents may vary depending on methods restricted by the present disclosure. In this case, the controller 7120 may select a precoding matrix for each antenna port group of the base station and further select one additional precoding matrix based on a relationship between antenna port groups of the base station. Further, the controller 7120 may receive the CSI-RS from the base station, generate the feedback information based on the received CSI-RS, and transmit the generated feedback information to the base station. In this case, the controller 7120 may select one precoding matrix for all antenna port groups of the base station. Further, the controller 7120 may receive feedback configuration information from the base station, receive a CSI-RS from the base station, generate feedback information based on the received feedback configuration information and the received CSI-RS, and transmit the generated feedback information to the base station. In this case, the controller 7120 may receive the feedback configuration information corresponding to each antenna port group of the base station and the additional feedback configuration information based on a relationship between the antenna port groups.

In addition, the controller 7120 may control all the operation of the terminal described above.

Figure 72:
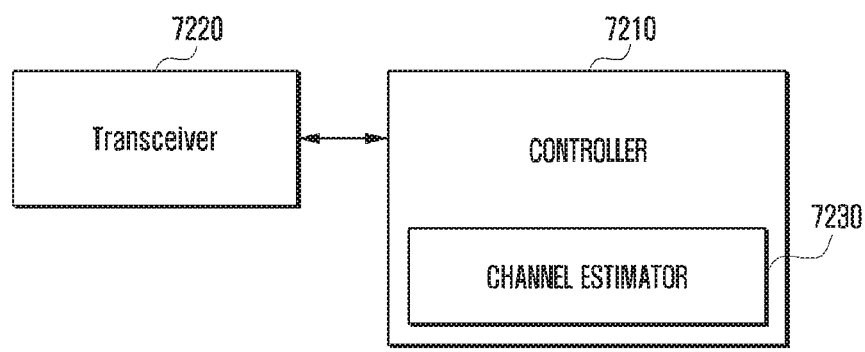
FIG. 72 is a flowchart illustrating the internal structure of the base station according to the embodiment of the present disclosure.

FIG. 72 is a block diagram illustrating an internal structure of the base station according to the embodiment of the present disclosure.

Referring to FIG. 72, the base station includes a controller 7210 and a transceiver 7220.

The controller 7210 controls the states and operations of all components constituting the base station. Specifically, the controller 7210 allocates CSI-RS resources for channel estimation of the terminal to the terminal and allocates feedback resources and a feedback timing to the terminal. To this end, the controller 7210 may further include a resource allocator 7230.

In addition, a feedback configuration and the feedback timing are allocated so as to prevent feedbacks from a plurality of terminals from colliding with each other and the feedback information configured at the corresponding timing is received and interpreted. The transceiver 7220 performs functions of transmitting and receiving the data, the reference signal, and the feedback information to and from the terminal. Herein, the transceiver 7220 transmits the CSI-RS to the terminal through the allocated resources under the control of the controller 7210 and receives the feedback of channel information from the terminal.

It is illustrated that the channel allocator 7230 is included in the controller 7210 as above, but the present disclosure is not particularly limited thereto. The controller 7210 may control the transceiver 7220 to transmit the configuration information for each of the at least one reference signal to the terminal or generate the at least one reference signal. Further, the controller 7210 may control the transceiver 7220 to transmit to the terminal the feedback configuration information for generating the feedback information according to the measurement result.

In addition, the controller 7210 may control the transceiver 7220 to transmit the at least one reference signal to the terminal and receive the feedback information transmitted from the terminal at the feedback timing according to the feedback configuration information. In this case, in the feedback information, transmission contents may vary depending on methods restricted by the present disclosure. Further, the controller 7210 may transmit the feedback configuration information to the terminal, transmit the CSI-RS to the terminal, and receive from the terminal the feedback information generated based on the feedback configuration information and the CSI-RS.

In this case, the controller 7210 may transmit the feedback configuration information corresponding to each antenna port group of the base station and the additional feedback configuration information based on the relationship between the antenna port groups. Further, the controller 7210 may transmit a CSI-RS beamformed based on the feedback information to the terminal and receive the feedback information generated based on the CSI-RS from the terminal.

In addition, the controller 7210 may determine which channel state information the terminal transmits and use the channel state information through determination of whether the corresponding CSI-RS meets the condition for the CRI. According to the embodiment of the present disclosure described above, it is possible to prevent allocation of excessive feedback resources to transmit the CSI-RS in the base station having a large number of transmitting antennas with a two-dimensional antenna array structure and an increase in channel estimation complexity, and the terminal may effectively measure all channels for a large number of transmitting antennas, configure the measured channels as the feedback information and report the feedback information to the base station.

In addition, the controller 7220 may control all the operation of the base station described above.

Meanwhile, preferred embodiments of the present disclosure have been disclosed in the present disclosure and the drawing and although specific terminologies are used, but they are used in a general meaning for easily describe the technical content of the present disclosure and help understanding the present disclosure and are not limited to the scope of the present disclosure. In addition to the embodiments disclosed herein, it is apparent to those skilled in the art that other modified examples based on the technical spirit of the present disclosure can be executed.

The invention claimed is:

1. A method performed by a terminal in a wireless communication system, the method comprising:
   receiving, from a base station, information on a physical resource block (PRB) bundling size for channel state information (CSI) codebook subset restriction information, information for wideband or subband, and CSI reference signal (CSI-RS) related information;
   obtaining a first precoding matrix indicator (PMI) associated with a CSI-RS in case that a precoder is defined by the first PMI and a second PMI and a mode for transmitting only the first PMI among the first PMI and the second PMI is configured;
   transmitting, to the base station, a channel quality indicator (CQI) and only the first PMI among the first PMI and the second PMI; and
   receiving, from the base station, data,
   wherein the precoder is defined for a precoder resource block group (PRG), and
   wherein a size of the PRG is determined based on the information on the PRB bundling size.

2. The method of claim 1, wherein the information on the PRB bundling size indicates a number of PRBs for the PRG.

3. The method of claim 1, wherein the information on the PRB bundling size, the codebook subset restriction information, the information for wideband or subband, and the CSI-RS related information are received via radio resource control (RRC) signaling.

4. The method of claim 1, wherein the CSI-RS related information includes information on resources on which the CSI-RS is transmitted.

5. A method performed by a base station in a wireless communication system, the method comprising:
transmitting, to a terminal, information on a physical resource block (PRB) bundling size for channel status information (CSI) codebook subset restriction information, information for wideband or subband, and CSI reference signal (CSI-RS) related information;
receiving, from the terminal, a first precoding matrix indicator (PMI) associated with a CSI-RS and a channel quality indicator (COI) in case that a precoder is defined by the first PMI and a second PMI and a mode for receiving only the first PMI among the first PMI and the second PMI is configured; and
transmitting, to the terminal, data,
wherein the precoder is defined for a precoder resource block group (PRG), and
wherein a size of the PRG is determined based on the information on the PRB bundling size.

6. The method of claim 5,
wherein the information on the PRB bundling size indicates a number of PRBs for the PRG.

7. The method of claim 5, wherein the information on the PRB bundling size, the codebook subset restriction information, the information for wideband or subband, and the CSI-RS related information are received via radio resource control (RRC) signaling, and
wherein the CSI-RS related information includes information on resources on which the CSI-RS is transmitted.

8. A terminal in a wireless communication system, the terminal comprising:
a transceiver; and
a controller configured to:
receive, from a base station, information on a physical resource block (PRB) bundling size for channel state information (CSI) codebook subset restriction information, information for wideband or subband, and CSI reference signal (CSI-RS) related information,
obtain a first precoding matrix indicator (PMI) associated with a CSI-RS in case that a precoder is defined by the first PMI and a second PMI and a mode for transmitting only the first PMI among the first PMI and the second PMI is configured,
transmit, to the base station, only the first PMI among the first PMI and the second PMI, and a channel quality indicator (COI), and
receive, from the base station, data,
wherein the precoder is defined for a precoder resource block group (PRG), and
wherein a size of the PRG is determined based on the information on the PRB bundling size.

9. The terminal of claim 8, wherein the
information on the PRB bundling size indicates a number of PRBs for the PRG.

10. The terminal of claim 8, wherein the information on the PRB bundling size, the codebook subset restriction information, the information for wideband or subband, and the CSI-RS related information are received via radio resource control (RRC).

11. The terminal of claim 9, wherein the CSI-RS related information includes information on resources on which the CSI-RS is transmitted.

12. A base station in a wireless communication system, the base station comprising:
a transceiver; and
a controller coupled with the transceiver and configured to:
transmit, to a terminal, information on a physical resource block (PRB) bundling size for channel status information (CSI) codebook subset restriction information, information for wideband or subband, and CSI-reference signal (CSI-RS) related information,
receive, from the terminal, a first precoding matrix indicator (PMI) associated with a CSI-RS and a channel quality indicator (COI) in case that a precoder is defined by the first PMI and a second PMI and a mode for receiving only the first PMI among the first PMI and the second PMI is configured, and
transmit, to the terminal, data,
wherein the precoder is defined for a precoder resource block group (PRG), and
wherein a size of the PRG is determined based on the information on the PRB bundling size.

13. The base station of claim 12, wherein the information on the PRB bundling size indicates a number of PRBs for the PRG.

14. The base station of claim 12, wherein the information on the PRB bundling size, the codebook subset restriction information, the information for wideband or subband, and the CSI-RS related information are received via radio resource control (RRC) signaling.

15. The base station of claim 12, wherein the CSI-RS related information includes information on resources on which the CSI-RS is transmitted.

* * * * *